(12) United States Patent
Campbell et al.

(10) Patent No.: US 12,458,511 B2
(45) Date of Patent: Nov. 4, 2025

(54) SYSTEMS AND METHODS FOR JOINT FUSION

(71) Applicant: Crossroads Extremity Systems, LLC, Memphis, TN (US)

(72) Inventors: Michael Campbell, Virginia Beach, VA (US); Scott Shawen, Charlotte, NC (US); Daniel Sayger, Olive Branch, MS (US); Michael Chad Hollis, Collierville, TN (US)

(73) Assignee: Crossroads Extremity Systems, LLC, Memphis, TN (US)

( * ) Notice: Subject to any disclaimer, the term of this patent is extended or adjusted under 35 U.S.C. 154(b) by 529 days.

(21) Appl. No.: 17/933,984

(22) Filed: Sep. 21, 2022

(65) Prior Publication Data
US 2023/0092178 A1    Mar. 23, 2023

Related U.S. Application Data

(60) Provisional application No. 63/261,456, filed on Sep. 21, 2021.

(51) Int. Cl.
| | |
|---|---|
| *A61B 17/56* | (2006.01) |
| *A61B 17/15* | (2006.01) |
| *A61B 17/17* | (2006.01) |
| *A61F 2/46* | (2006.01) |
| *A61F 2/30* | (2006.01) |
| *A61F 2/42* | (2006.01) |

(52) U.S. Cl.
CPC .......... *A61F 2/4606* (2013.01); *A61B 17/151* (2013.01); *A61B 17/1775* (2016.11); *A61B 2017/565* (2013.01); *A61F 2002/30622* (2013.01); *A61F 2002/4238* (2013.01)

(58) Field of Classification Search
CPC ..... A61B 17/15; A61B 17/151; A61B 17/152; A61B 17/1682; A61B 17/1775
See application file for complete search history.

(56) References Cited

U.S. PATENT DOCUMENTS

| | | | | |
|---|---|---|---|---|
| 6,030,391 | A * | 2/2000 | Brainard | A61B 17/15 606/82 |
| 8,784,457 | B2 * | 7/2014 | Graham | A61B 17/809 606/286 |
| 9,622,805 | B2 * | 4/2017 | Santrock | A61B 17/1682 |
| 9,936,994 | B2 * | 4/2018 | Smith | A61B 17/1728 |
| 10,292,713 | B2 | 5/2019 | Fallin et al. | |
| 10,299,842 | B2 | 5/2019 | Hollis et al. | |
| 10,335,220 | B2 * | 7/2019 | Smith | A61B 17/152 |
| 10,849,631 | B2 * | 12/2020 | Hatch | A61B 17/151 |
| 11,844,533 | B2 * | 12/2023 | Hatch | A61B 17/151 |
| 11,931,020 | B2 * | 3/2024 | Carlo, III | A61B 17/1775 |
| 2018/0317906 | A1 | 11/2018 | Hollis et al. | |
| 2018/0353172 | A1 | 12/2018 | Hartdegen et al. | |

* cited by examiner

*Primary Examiner* — Anu Ramana
(74) *Attorney, Agent, or Firm* — BakerHostetler

(57) ABSTRACT

Apparatus and methods are disclosed for correcting deformities in a patient's foot. In one example, a metatarsus adductus is addressed using a pin placement guide that is angulated to be placed in alignment with a cuneiform and a metatarsal, such that the TMT joint can be subsequently cut, and the metatarsal moved into proper alignment. Th pin placement guide can be a variable angle guide, or a kit of fixed-angle pin placement guides can be provided.

19 Claims, 107 Drawing Sheets

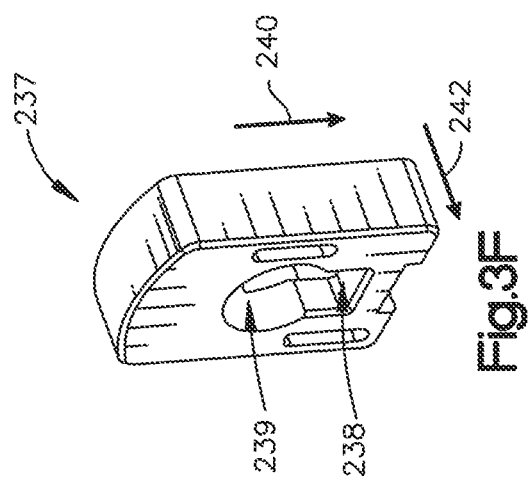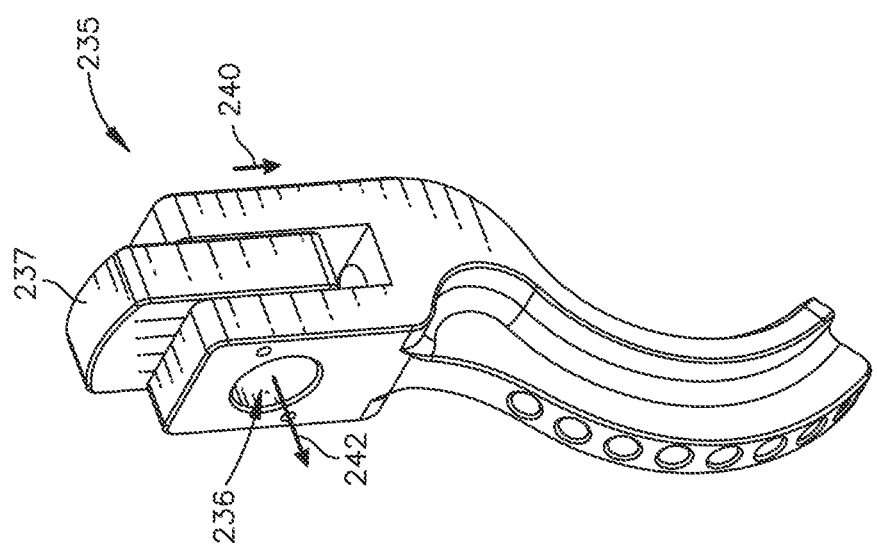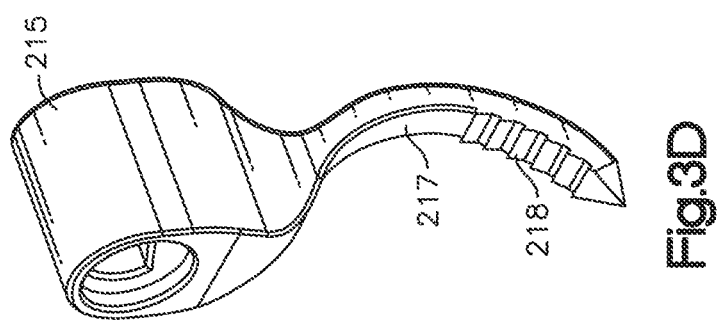

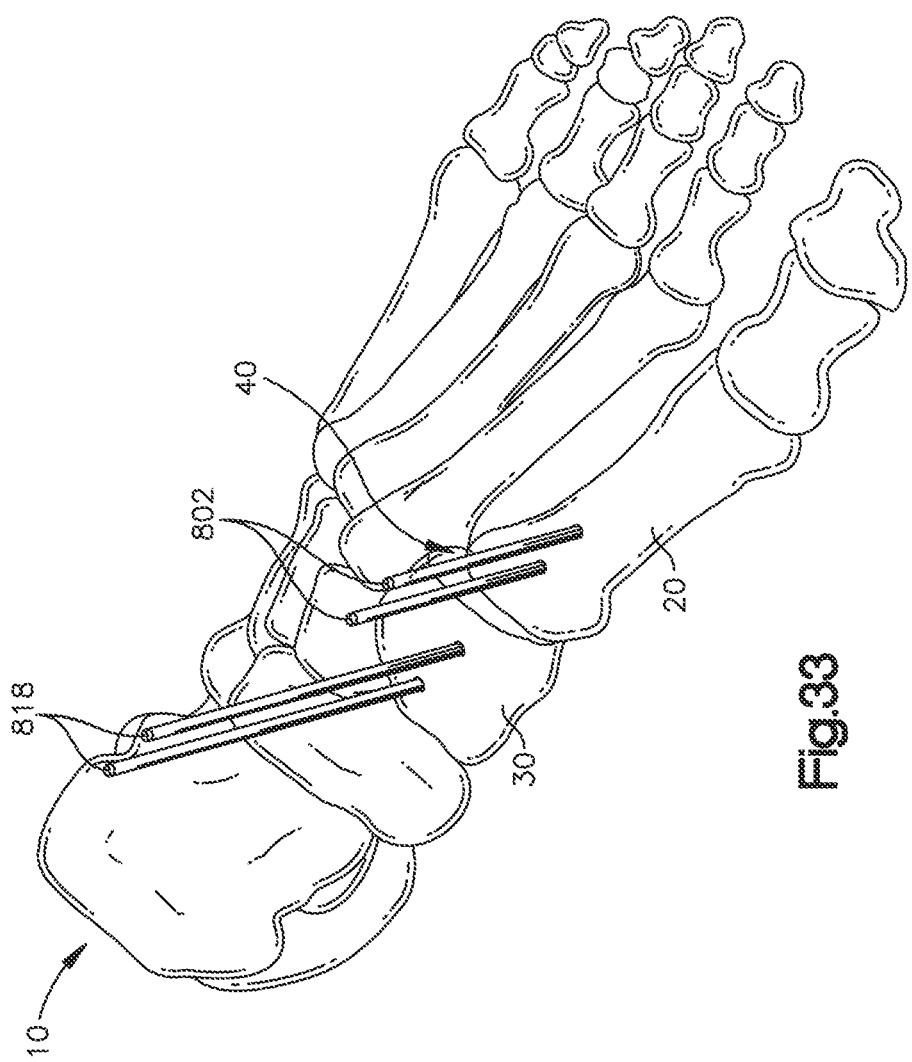

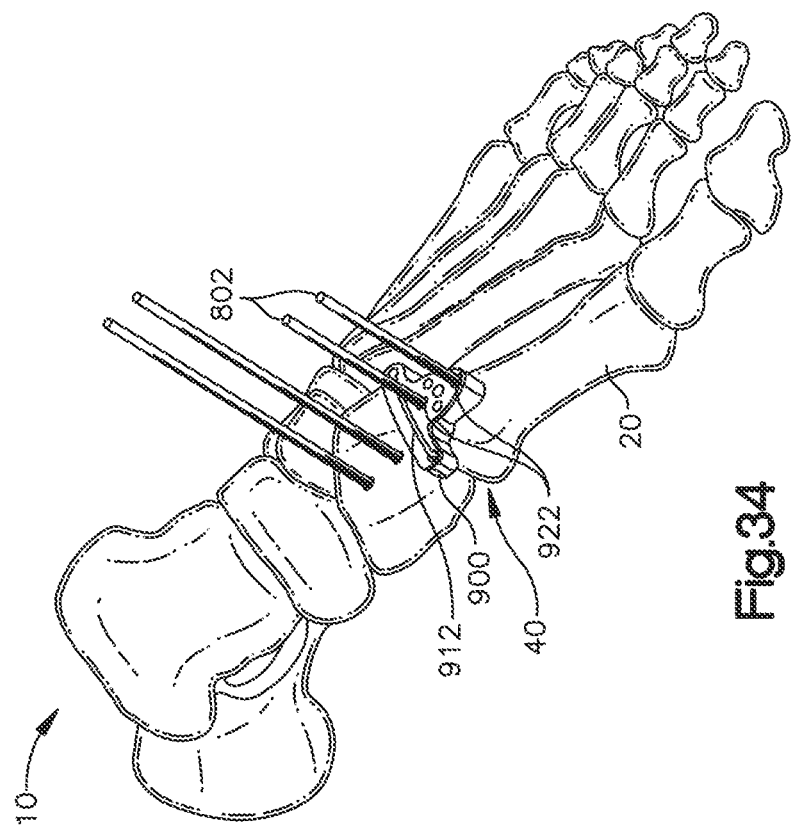

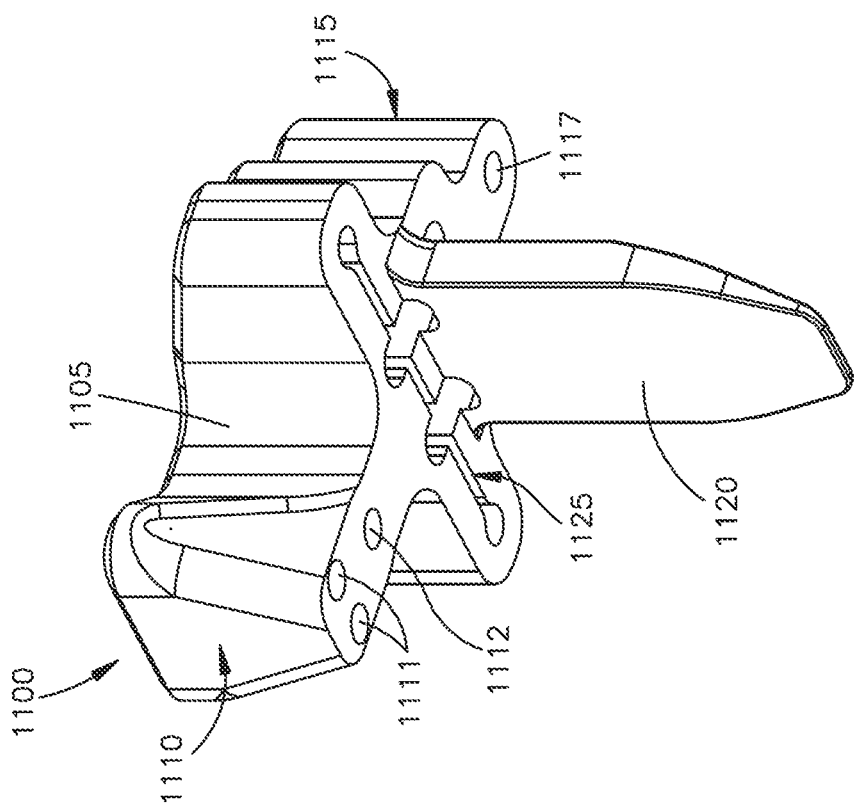
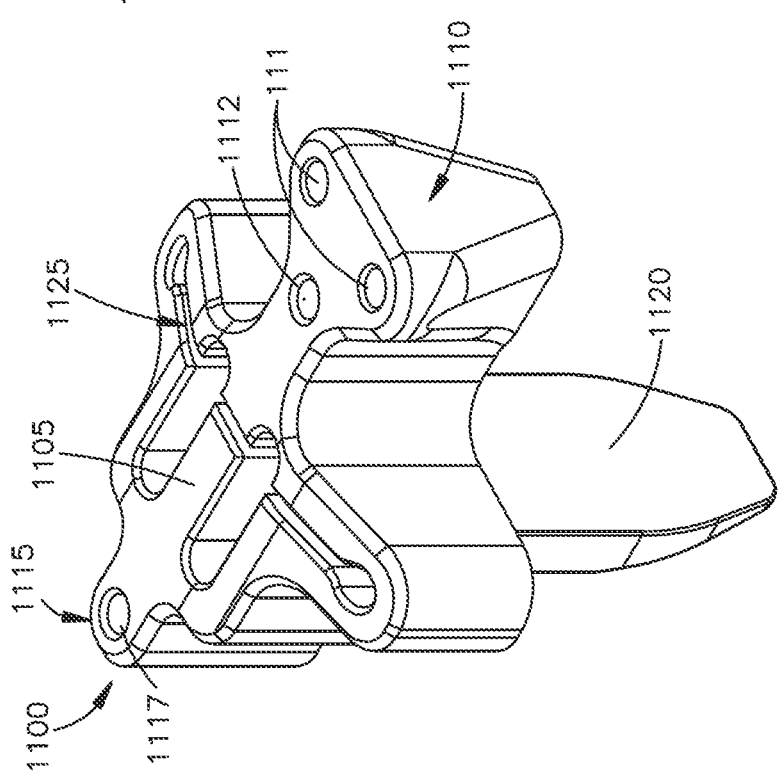
Fig.49B
Fig.49A

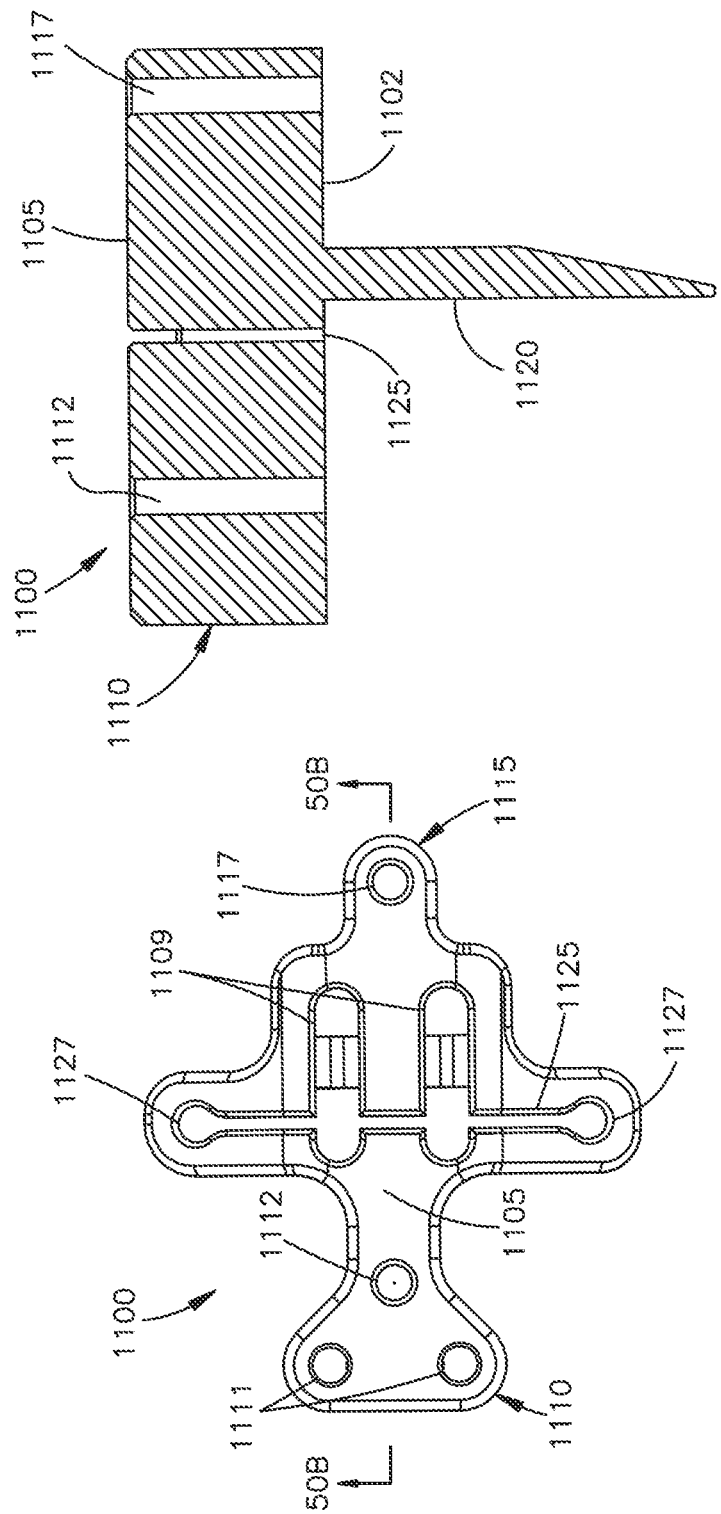

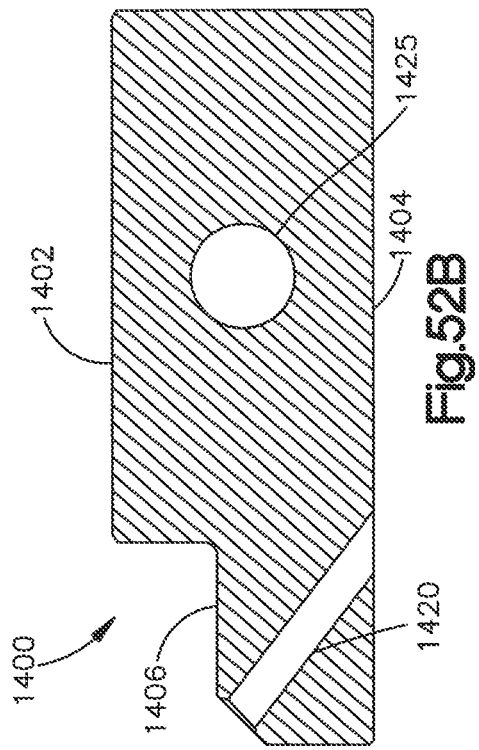
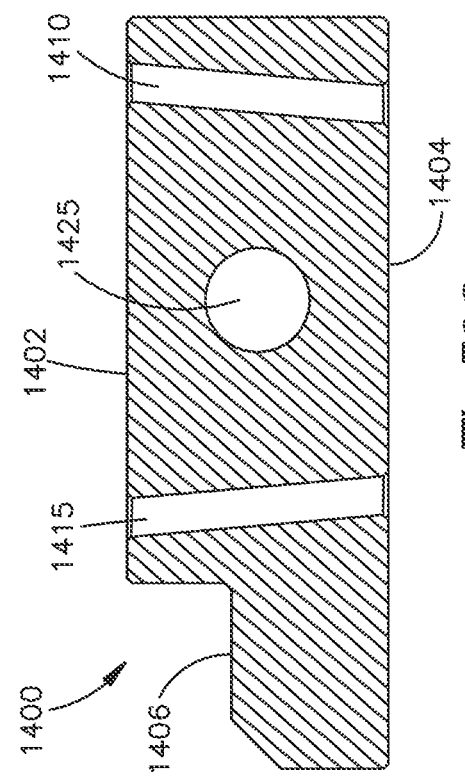
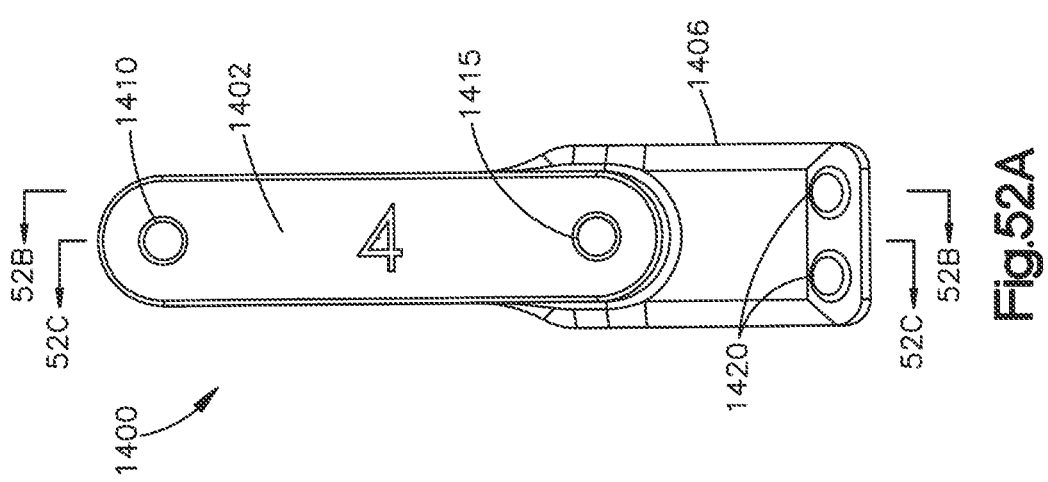

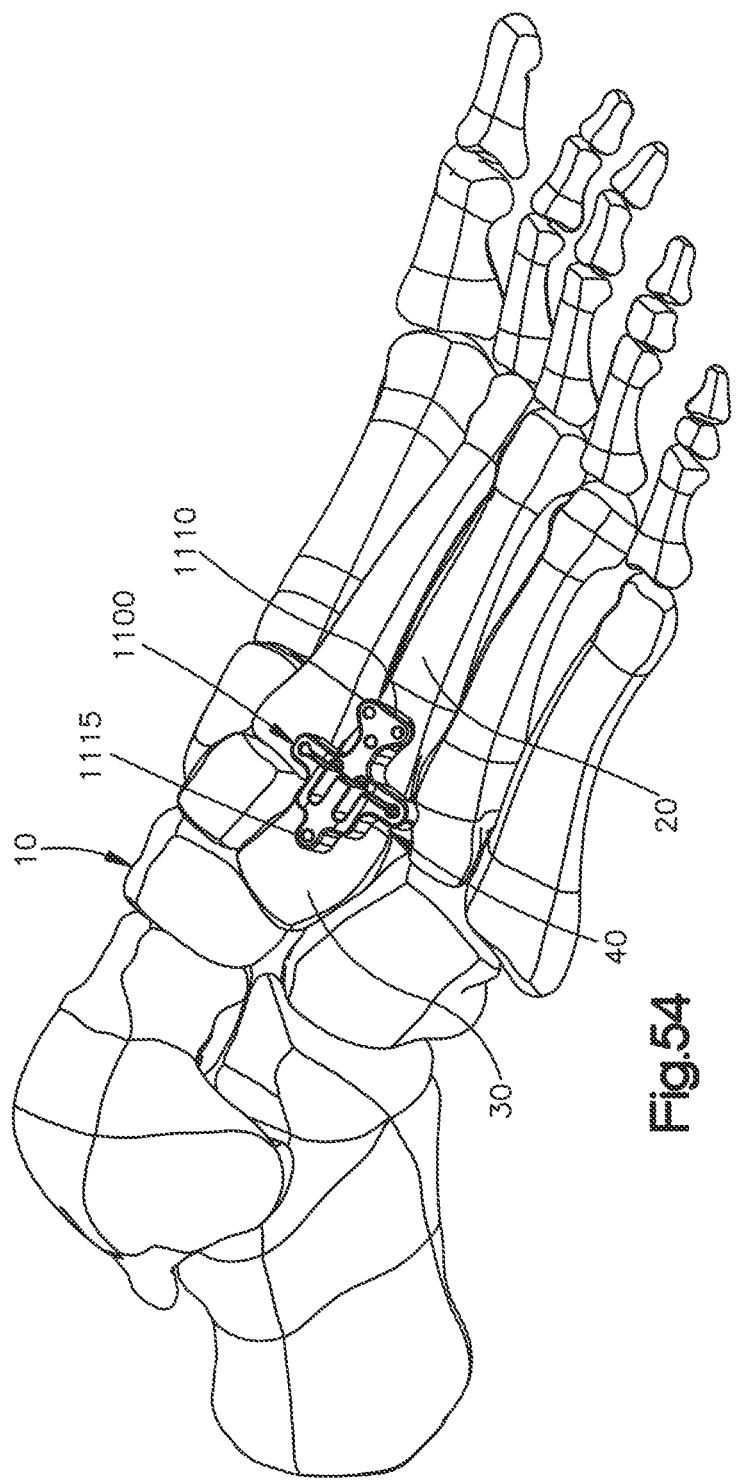

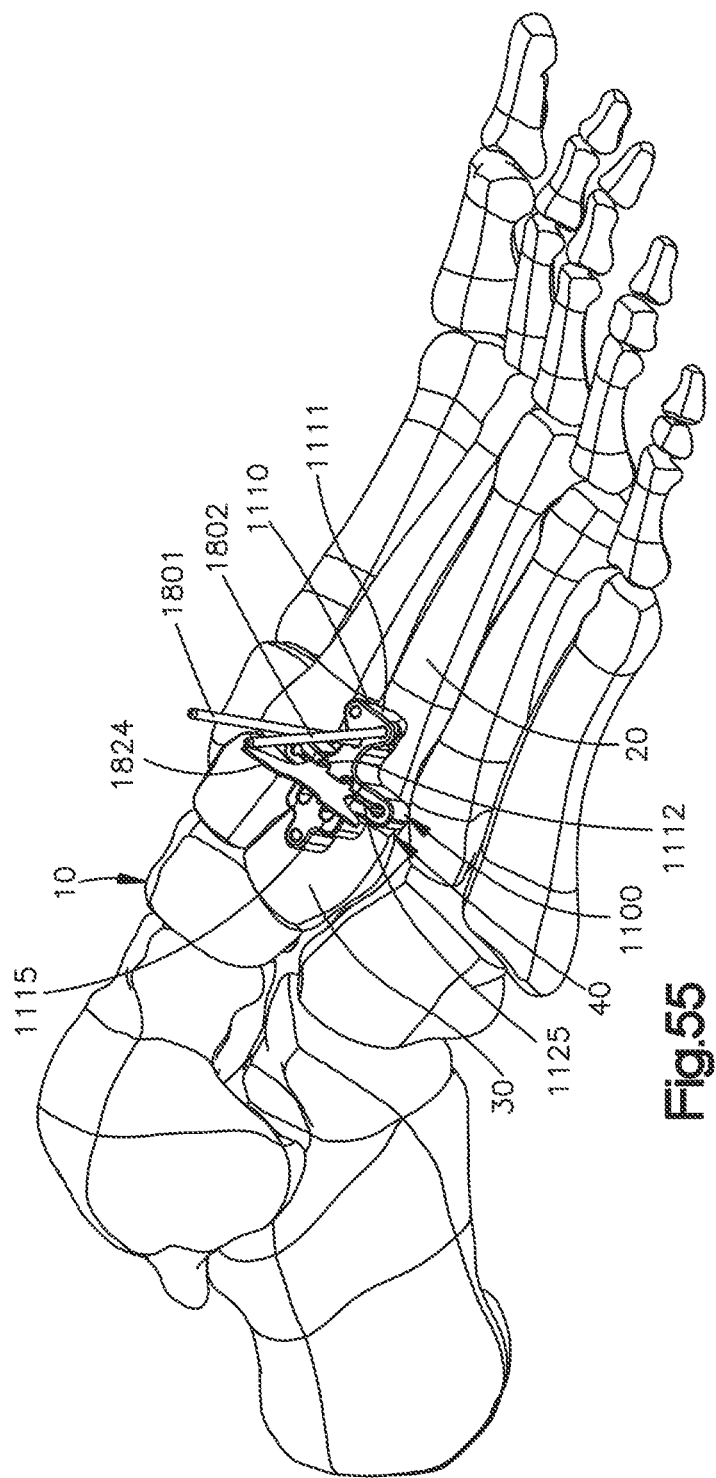

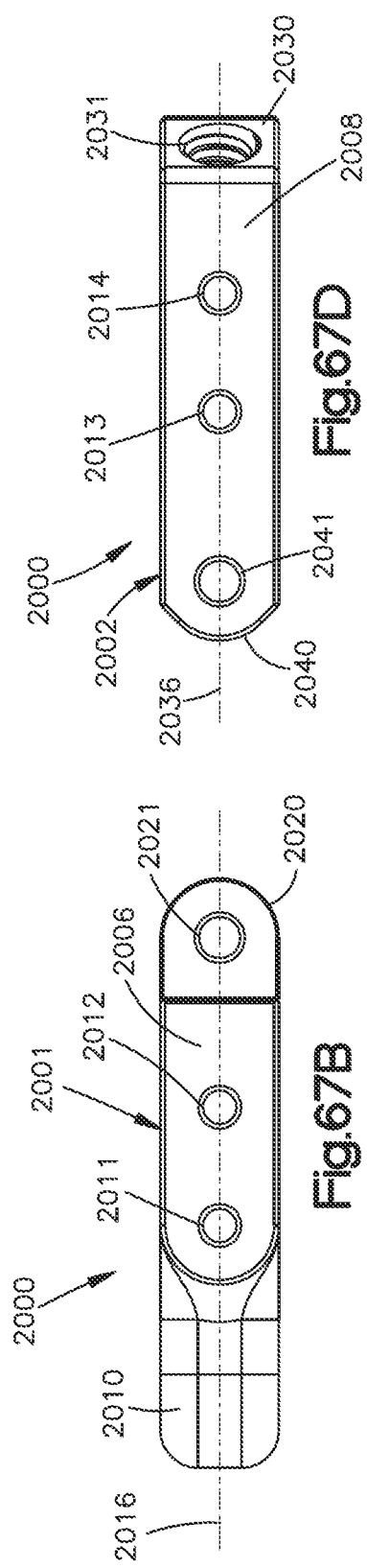
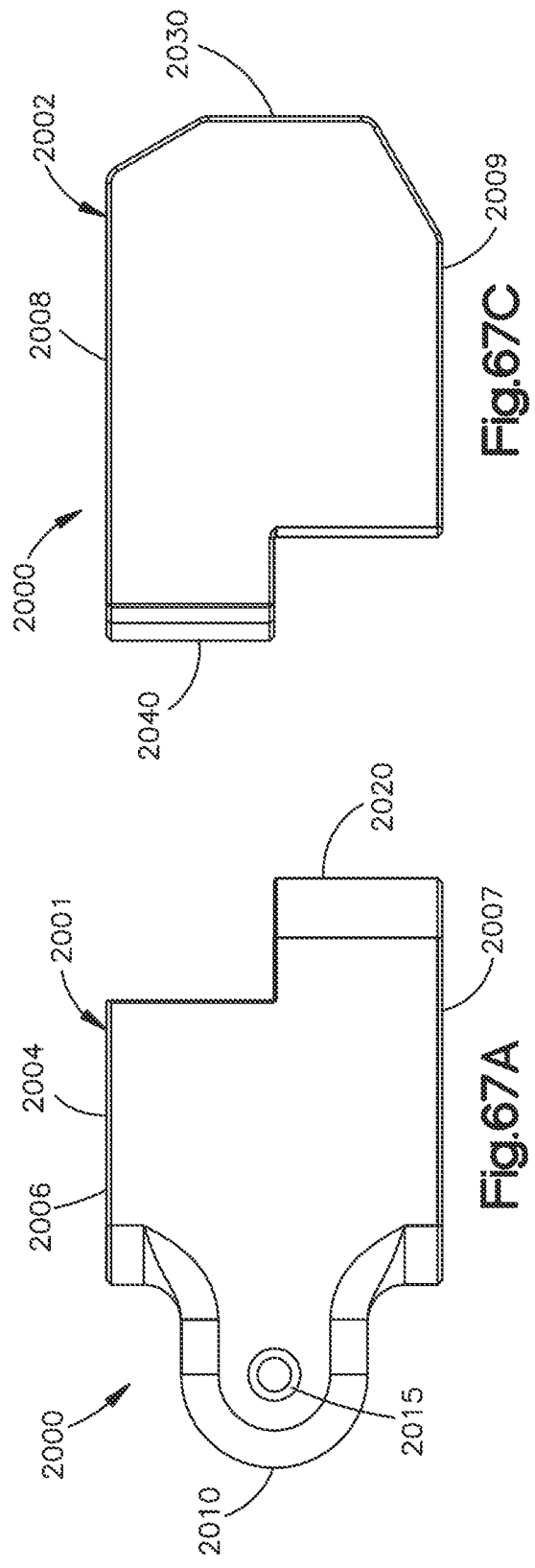

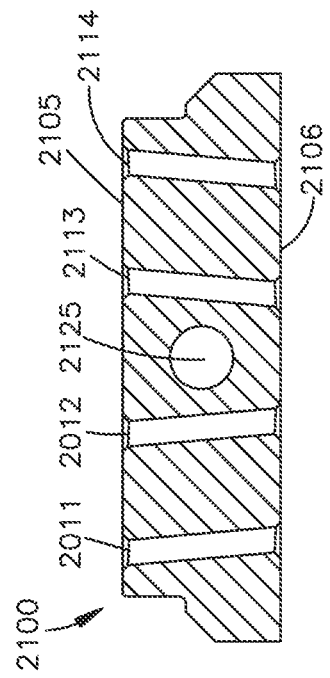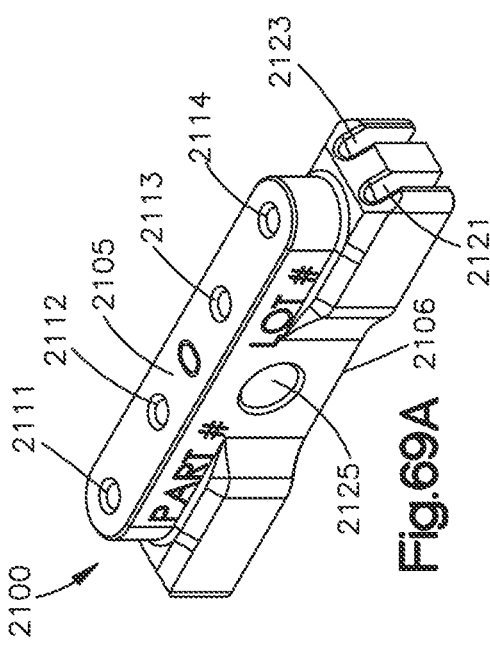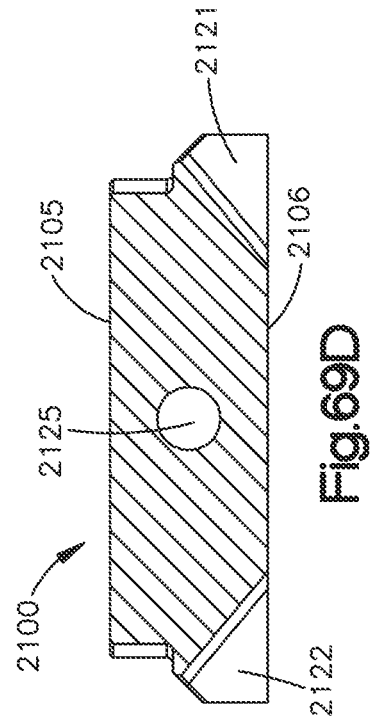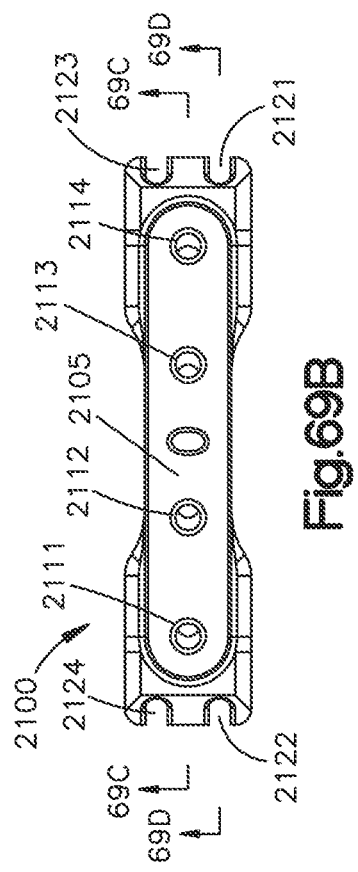

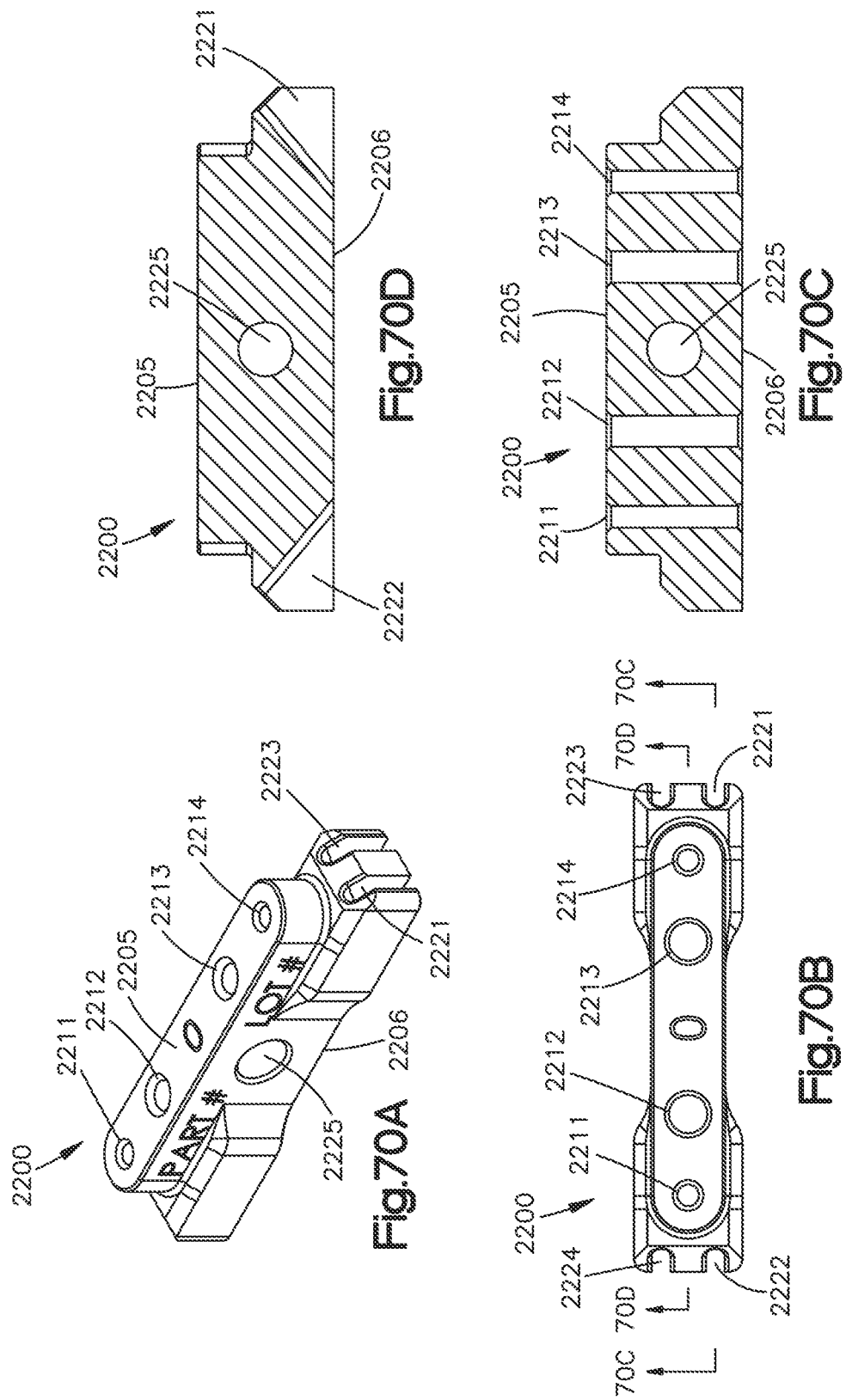

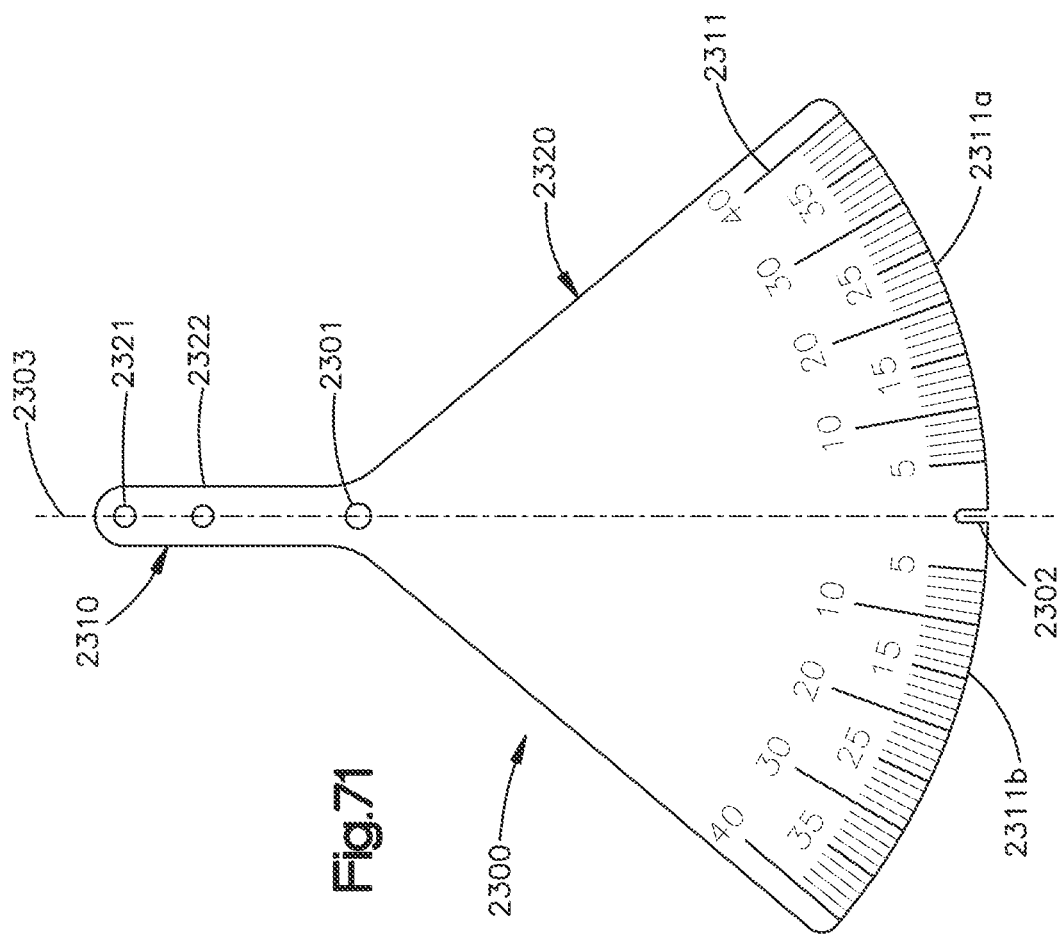

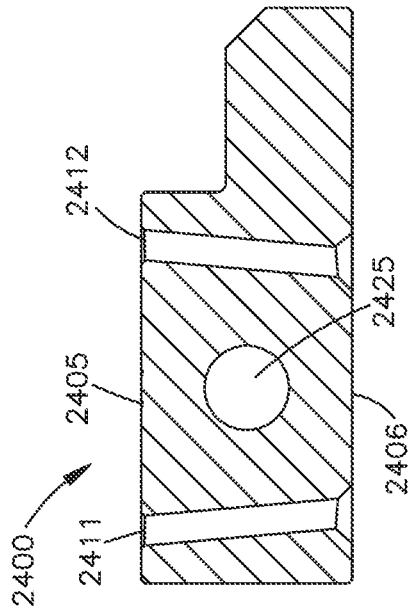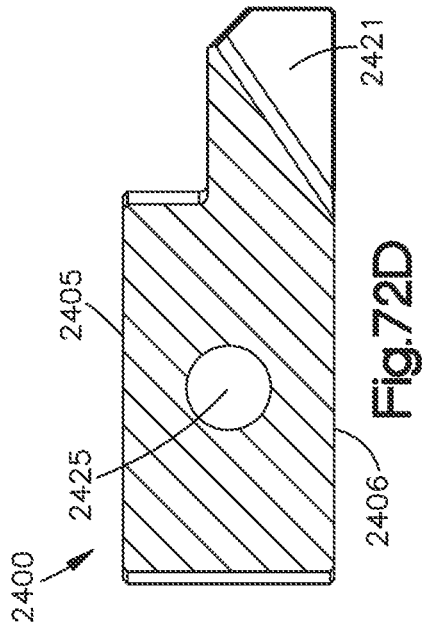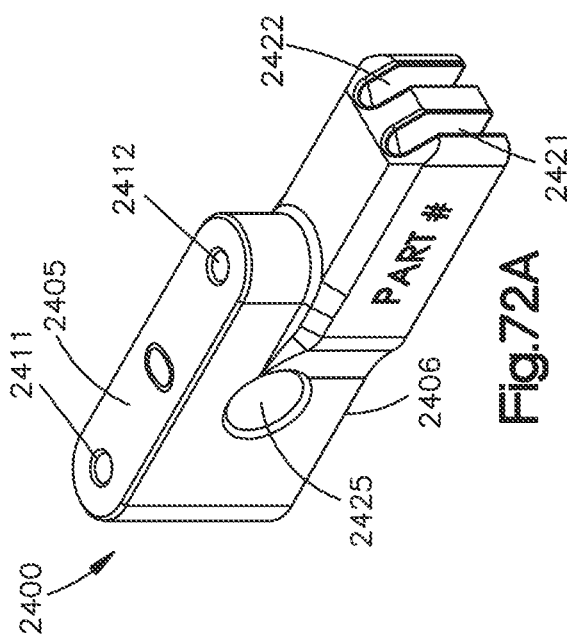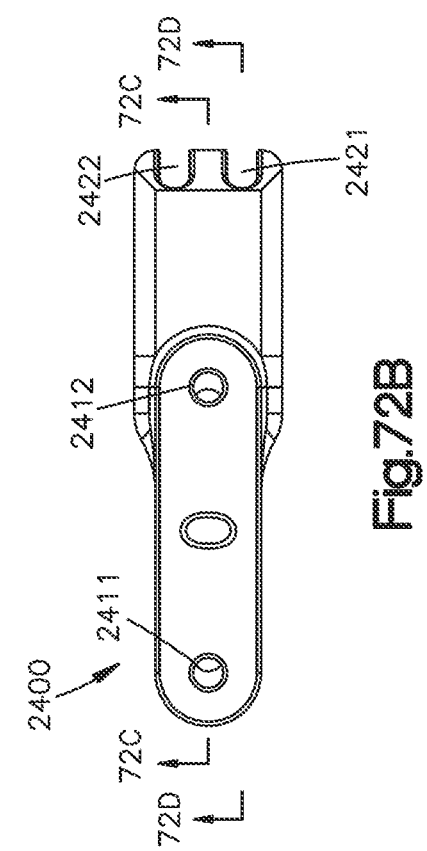

SYSTEMS AND METHODS FOR JOINT FUSION

CROSS-REFERENCE TO RELATED APPLICATIONS

This claims priority to U.S. Patent Application Ser. No. 63/261,456 filed Sep. 21, 2021, the disclosure of which is hereby incorporated by reference as if set forth in its entirety herein.

FIELD

The present disclosure relates to medical devices and more particularly to systems and methods for fusion of the tarsometatarsal joint.

BACKGROUND

Tarsometatarsal joint fusion is a surgical procedure that fuses a cuneiform bone with a respective metatarsal bone within the middle foot. Fusion of the tarsometatarsal joint stiffens the joint to correct deformities in the tarsometatarsal region.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIG. 3D is a perspective view of a lateral hook of the linear reducer illustrated in FIG. 3A;

FIG. 3E is a perspective view of medial hook of the linear reducer illustrated in FIG. 3A;

FIG. 3F is a perspective view of a quick release insert of the linear reducer illustrated in FIG. 3A;

FIGS. 8-24 are perspective views of the bones of a foot, sequentially illustrating an example Lapidus bunionectomy procedure performed using example bunionectomy devices disclosed herein, wherein;

FIG. 8 is a perspective view of the bones of the foot, showing the cut guide of FIG. 2A installed;

FIG. 9 is a perspective view of the bones of the foot, showing a saw blade inserted through a slot of the cut guide of FIG. 8;

FIG. 10 is a perspective view of the bones of the foot, showing the linear reducer of FIG. 3A installed;

FIG. 11 is a perspective view of the bones of the foot, showing the control handle of FIG. 4A installed;

FIG. 12 is a perspective view of the bones of the foot, showing the control handle rotated within the frontal plane, and further showing the linear reducer in a compressed configuration;

FIG. 13 is a perspective view of the bones of the foot, showing cuneiform pins inserted through the cut guide and into the first cuneiform;

FIG. 14 is a perspective view of the bones of the foot, showing a saw blade inserted through the cut guide and into the first cuneiform;

FIG. 15 is a perspective view of the bones of the foot, showing the saw blade, the cut guide, the linear reducer, and the control handle removed;

FIG. 16 is a perspective view of the bones of the foot, showing the compressor block of FIG. 5A installed over the metatarsal pins and cuneiform pins so as to compress the TMT joint;

FIG. 17 is a perspective view of the bones of the foot, showing a cross pin inserted through the compressor block to temporarily fix the compressed TMT joint in place;

FIG. 18 is a perspective view of the bones of the foot, showing the metatarsal pins and cuneiform pins removed;

FIG. 19 is a perspective view of the bones of the foot, showing the compressor block removed;

FIG. 20 is a perspective view of the bones of the foot, showing a bone plate placed against the TMT joint;

FIG. 21 is a perspective view of the bones of the foot, showing the bone plate fixed to the metatarsal and the cuneiform, and further showing the cross pin removed;

FIG. 22 is a perspective view of the bones of the foot, showing the cross screw drill guide of FIG. 7A placed within a cross screw aperture of the bone plate;

FIG. 23 is a perspective view of the bones of the foot, showing placement of a cross screw;

FIG. 24 is an enlarged perspective view of the bones of the foot of FIG. 23 with portions transparent, showing placement of a cross screw;

FIGS. 25-29 are perspective views of the bones of a foot, sequentially illustrating a portion of an example Lapidus bunionectomy procedure performed using example bunionectomy devices disclosed herein, wherein;

FIG. 25 is a perspective view of the bones of the foot, showing the cut guide of FIG. 2H temporarily secured to the foot;

FIG. 26 is a perspective view of the bones of the foot, showing a saw blade extending through the cut guide and into the first metatarsal;

FIG. 27 is a perspective view of the bones of the foot, showing the saw blade and the cut guide removed;

FIG. 28 is a perspective view of the bones of the foot, showing the cut guide reversed and temporarily secured to the foot;

FIG. 29 is a perspective view of the bones of the foot, showing a saw blade extending through the cut guide and into the medial cuneiform, and further showing installation of the linear reducer of FIG. 3A and the control handle of FIG. 4A;

FIGS. 33-35 are perspective views of the bones of a foot, sequentially illustrating a re-cutting portion of an example Lapidus bunionectomy procedure performed using the example bunionectomy devices disclosed herein, wherein;

FIG. 33 is a perspective view of the bones of the foot, showing guide pins inserted into the medial cuneiform and the first metatarsal, after removal of remove portions of the first metatarsal and the first cuneiform;

FIG. 34 is a perspective view of the bones of the foot, showing the recutting guide of FIG. 30A seated against the first metatarsal;

FIG. 35 is a perspective view of the bones of the foot, showing a saw blade inserted through the recutting guide and into the first metatarsal;

FIGS. 36-38 are perspective views of the bones of a foot, sequentially illustrating a frontal plane realignment portion of an example Lapidus bunionectomy procedure using the example bunionectomy devices disclosed herein, wherein;

FIG. 36 is a perspective view of the bones of the foot, showing installation of the realignment guide of FIG. 32A over the first cuneiform and the first metatarsal;

FIG. 37 is a perspective view of the bones of the foot, showing the realignment guide removed;

FIG. 38 is a perspective view of the bones of the foot, showing the realignment guide again installed so as to cause rotational adjustment of the first metatarsal and compression of the TMT joint;

FIGS. 39-48 are perspective views of the bones of a foot, sequentially illustrating a frontal plane realignment portion of an example Lapidus bunionectomy procedure using the example bunionectomy devices disclosed herein, wherein;

FIG. 39 is a perspective view of the bones of the foot, showing the realignment guide of FIG. 31A installed over metatarsal pins;

FIG. 40 is a perspective view of the bones of the foot, showing a substitute metatarsal pin is partially inserted into the first metatarsal through the realignment guide;

FIG. 41 is a perspective view of the bones of the foot, showing a proximal metatarsal pin corresponding to the substitute metatarsal pin removed;

FIG. 42 is a perspective view of the bones of the foot, showing the substitute metatarsal pin further inserted through first metatarsal to a fully inserted position;

FIG. 43 is a perspective view of the bones of the foot, showing the substitute metatarsal pin further inserted through first metatarsal to a fully inserted position;

FIG. 44 is a perspective view of the bones of the foot, showing a second replacement metatarsal pin partially inserted through the realignment guide, and the remaining metatarsal pin removed;

FIG. 45 is a perspective view of the bones of the foot, showing the second replacement metatarsal pin further inserted through the realignment guide;

FIG. 46 is a perspective view of the bones of the foot, showing the realignment guide removed;

FIG. 47 is a perspective view of the bones of the foot, showing the first metatarsal rotated within the frontal plane to a final orientation;

FIG. 48 is a perspective view of the bones of the foot, showing installation of the compressor block of FIG. 5A;

FIG. 49A is a perspective view of another example of a cut guide configured as a cutting guide and a pin guide for joint fusion procedures described herein;

FIG. 49B is another perspective view of the cut guide illustrated in FIG. 49A;

FIG. 50A is a top plan view of the cut guide illustrated in FIG. 49A;

FIG. 50B is a cross sectional view of the cut guide illustrated in FIG. 49A;

FIG. 52A is a top plan view of the compressor block of FIG. 51A;

FIG. 52B is a cross-sectional view of the compressor block of FIG. 52A taken along line 52B-25B;

FIG. 52C is a cross-sectional view of the compressor block of FIG. 52A taken along line 52C-25C;

FIGS. 54-65 are perspective views of the bones of a foot, sequentially illustrating an example fusion procedure of the tarsometatarsal (TMT) joint performed using the example joint fusion devices disclosed herein, wherein;

FIG. 54 is a perspective view of the bones of the foot, showing installation of the cut guide of FIG. 49A;

FIG. 55 is a perspective view of the bones of the foot, showing first and second bone pins extending through the cut guide and into a first bone, and a saw blade extending through the cut guide and into the first bone;

FIG. 56 Is a perspective view of the bones of the foot, showing the cut guide reversed and temporarily secured to the foot;

FIG. 57 is a perspective view of the bones of the foot, showing a saw blade extending through the cut guide and into a second bone;

FIG. 58 is a perspective view of the bones of the foot, showing the saw blade and the cut guide removed;

FIG. 59 is a perspective view of the bones of the foot, showing installation of the compressor block of FIG. 15A, and a cross pin that is inserted through the compressor block such that the cross pin passes through a compressed joint between the first and second bones;

FIG. 60 is a perspective view of the bones of the foot, showing installation of a drill guide that is used to drill pilot holes with a drill;

FIG. 61 is a perspective view of the bones of the foot, showing the drill guide removed;

FIG. 62 is a perspective view of the bones of the foot, showing a reamer in one of the pilot holes, and a pin in another of the pilot holes;

FIG. 63 is a perspective view of the bones of the foot, showing the reamer in the other of the pilot holes;

FIG. 64 is a perspective view of the bones of the foot, showing the reamer removed and an inserter driving an implant into the first and second bones across the joint;

FIG. 65 is a perspective view of the bones of the foot, showing the implant disposed in the bone, and the inserter removed;

FIG. 66A illustrates a patient's foot including a metatarsus adductus deformity;

FIG. 66B illustrates correction of the metatarsus adductus deformity in the patient's foot;

FIG. 67A shows a side view of a first portion of a variable-angle pin placement guide;

FIG. 67B shows a top view of the first portion of a pin placement guide;

FIG. 67C shows a side view of a second portion of a pin placement guide;

FIG. 67D shows a top view of the second portion of the pin placement guide;

FIG. 68A shows a top view of the first fixed-angle pin placement guide that defines a first fixed angle;

FIG. 68B shows a top view of the first fixed-angle pin placement guide that defines a second fixed angle different than the first fixed angle;

FIG. 68C shows a top view of the first fixed-angle pin placement guide that defines a third fixed angle different than each of the first and second fixed angles;

FIG. 69A shows a perspective view of a compressor block including cross pin slots;

FIG. 69B shows a top view of the compressor block;

Figure 68A:
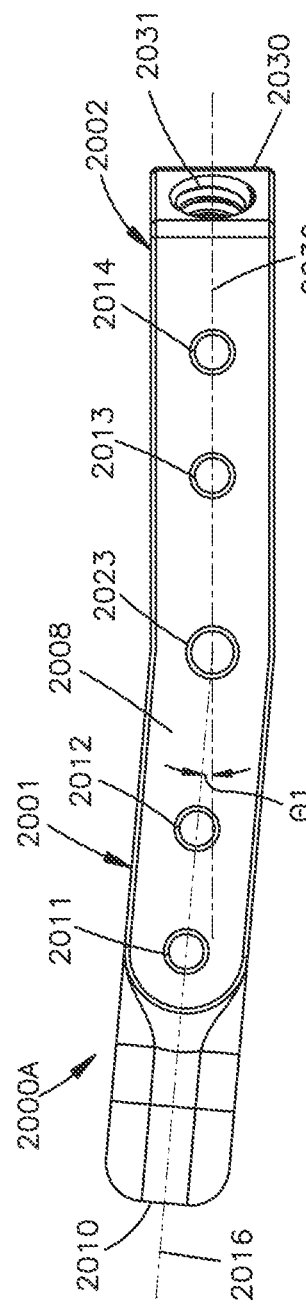
Figure 68B:
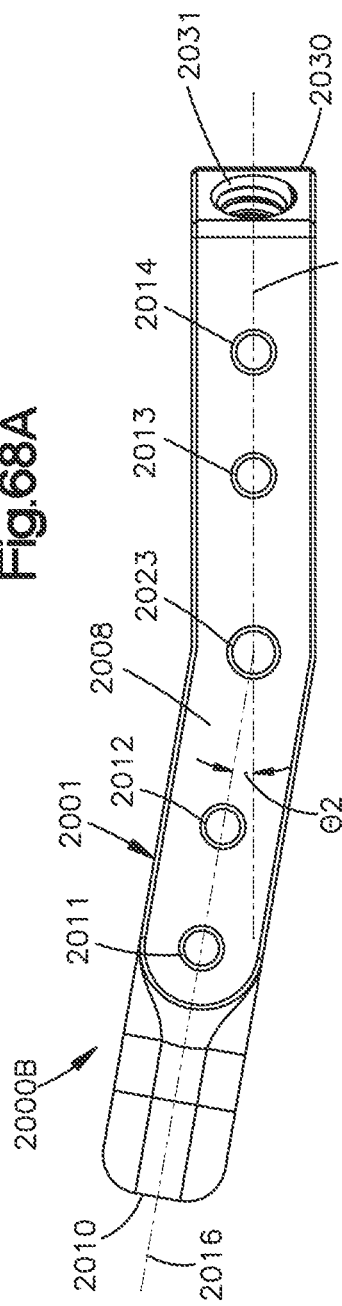
Figure 68C:
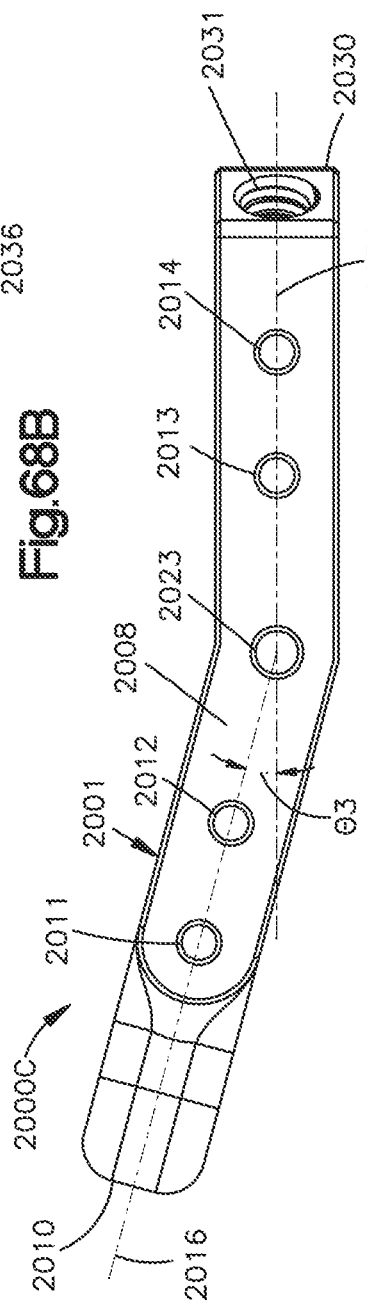
Figure 73C:
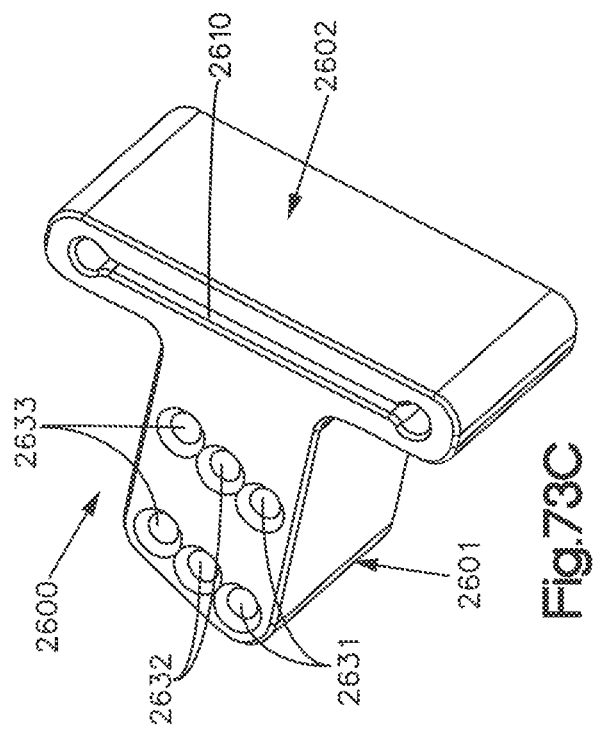
Figure 73D:
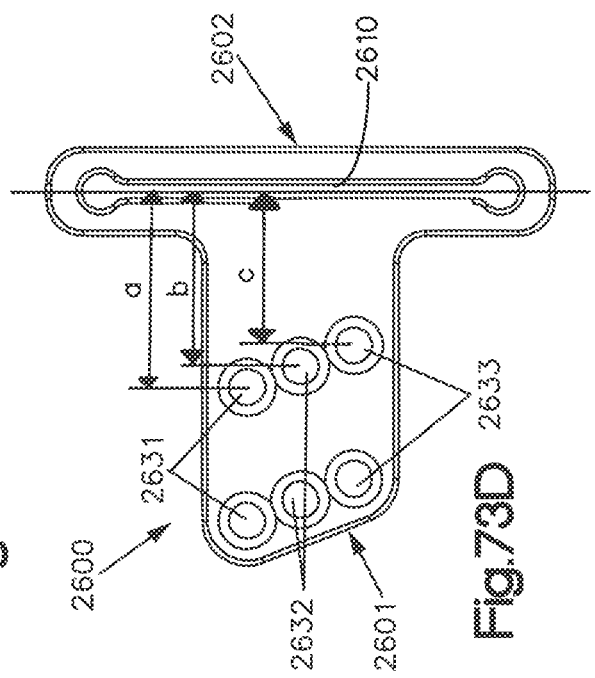
Figure 73A:
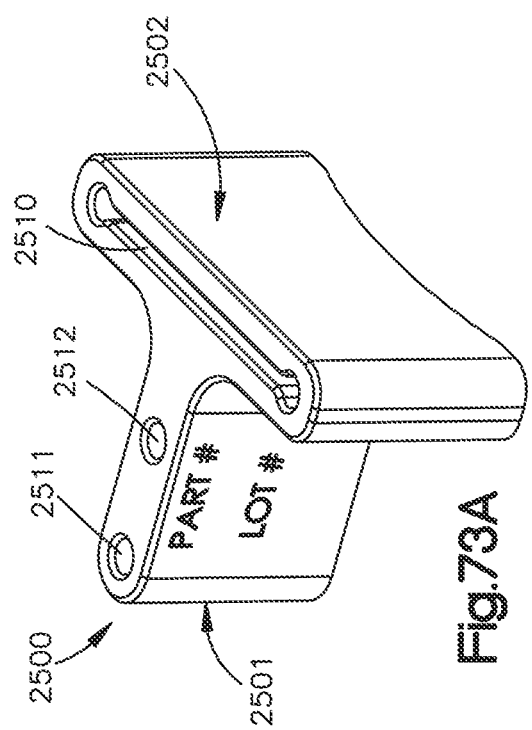
Figure 73B:
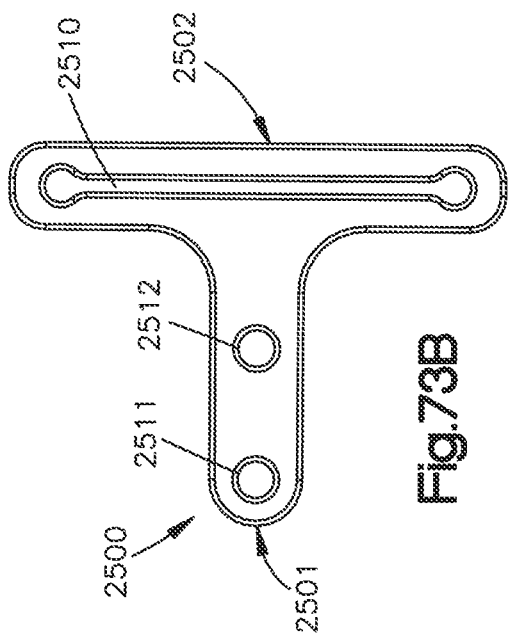
Figure 74:
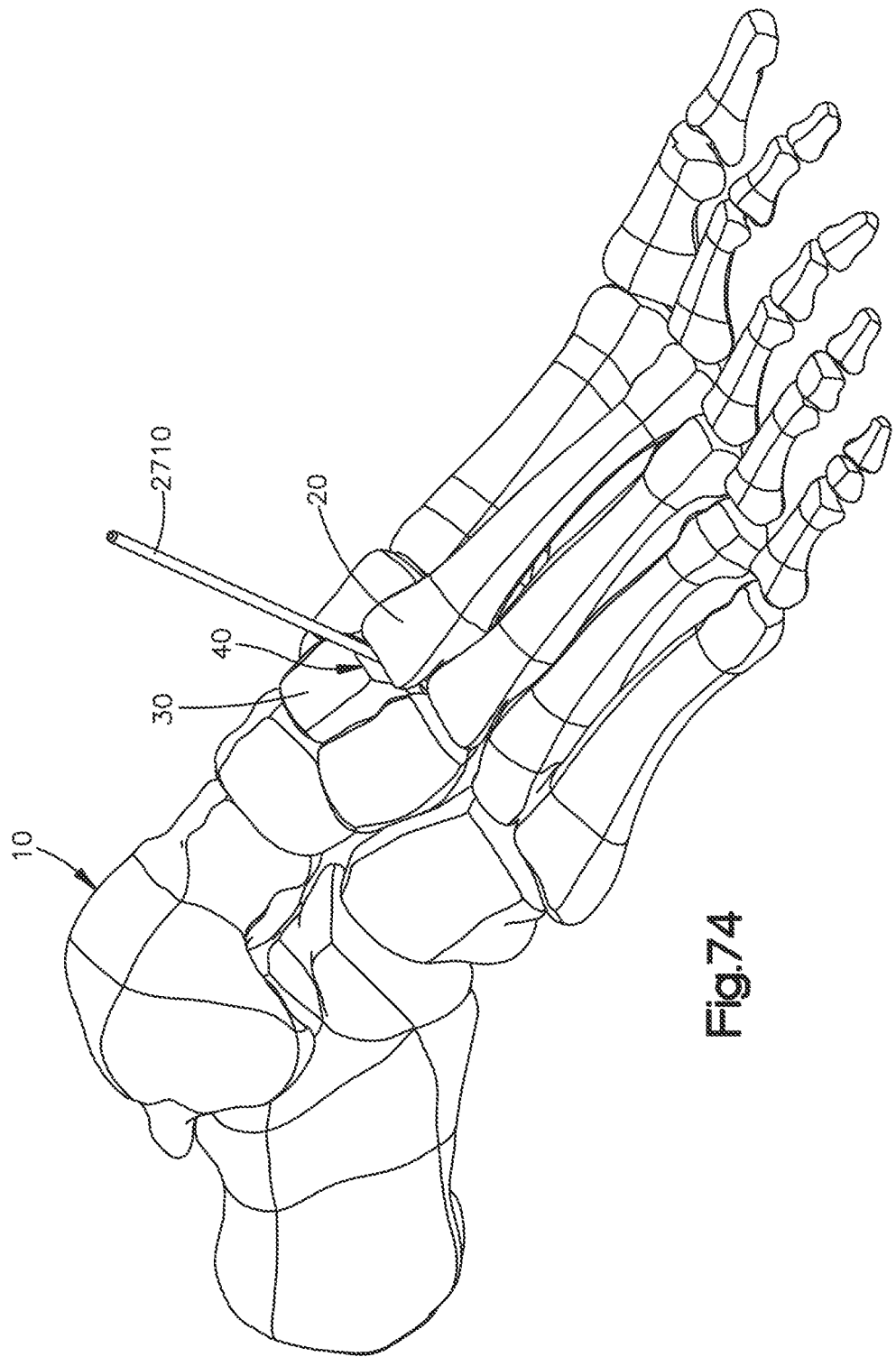
Figure 75:
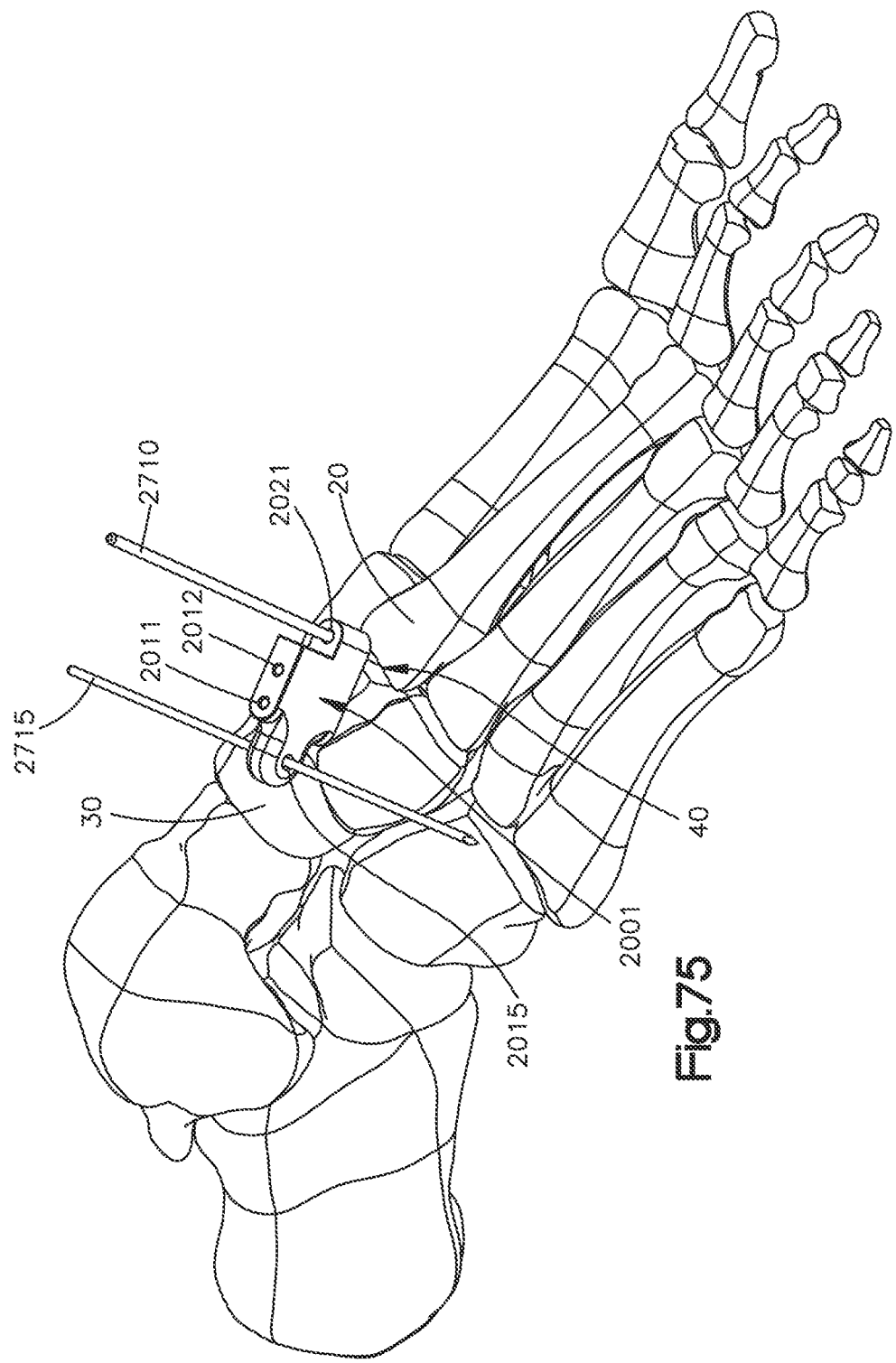
Figure 76A:
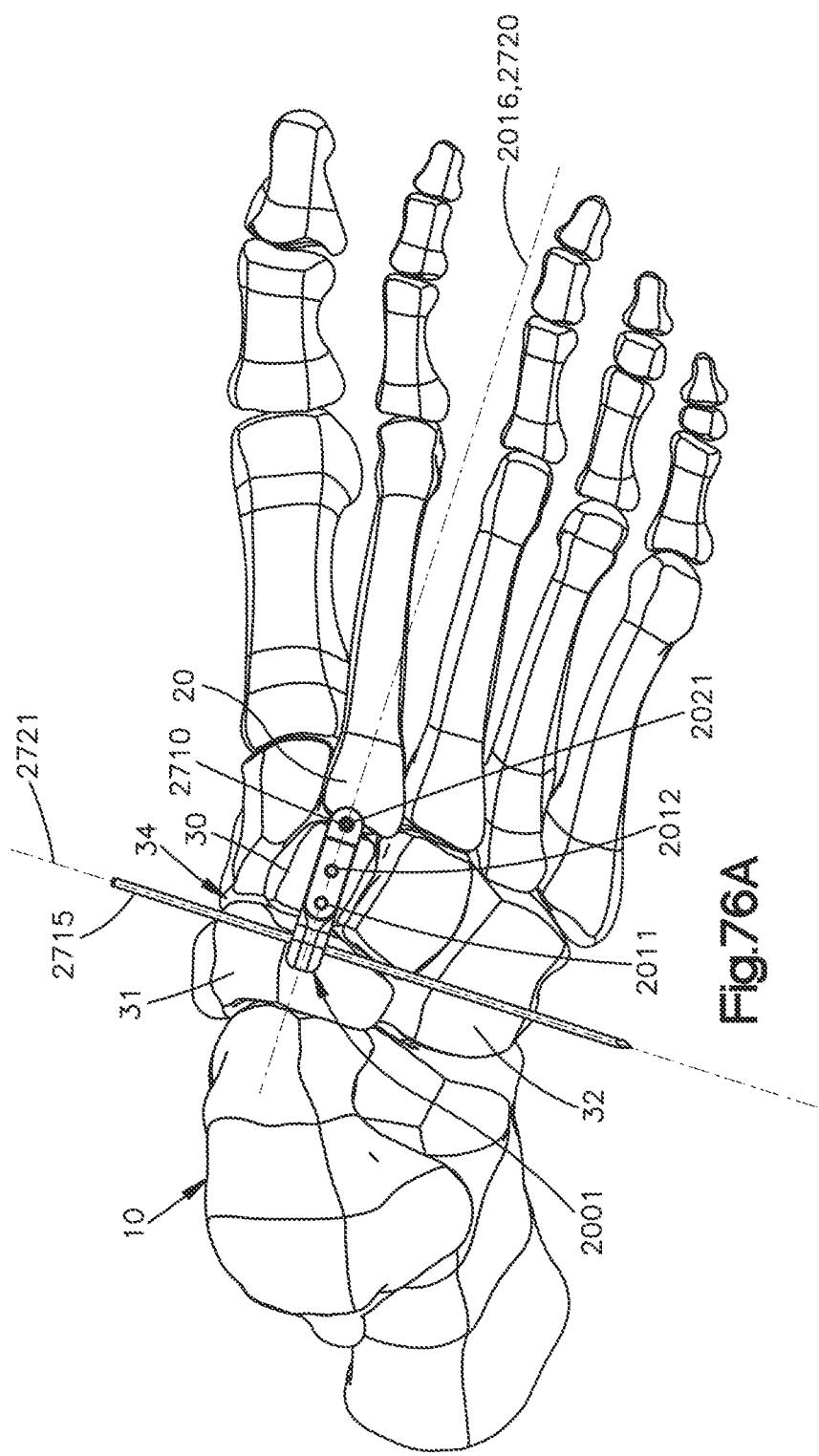
Figure 76B:
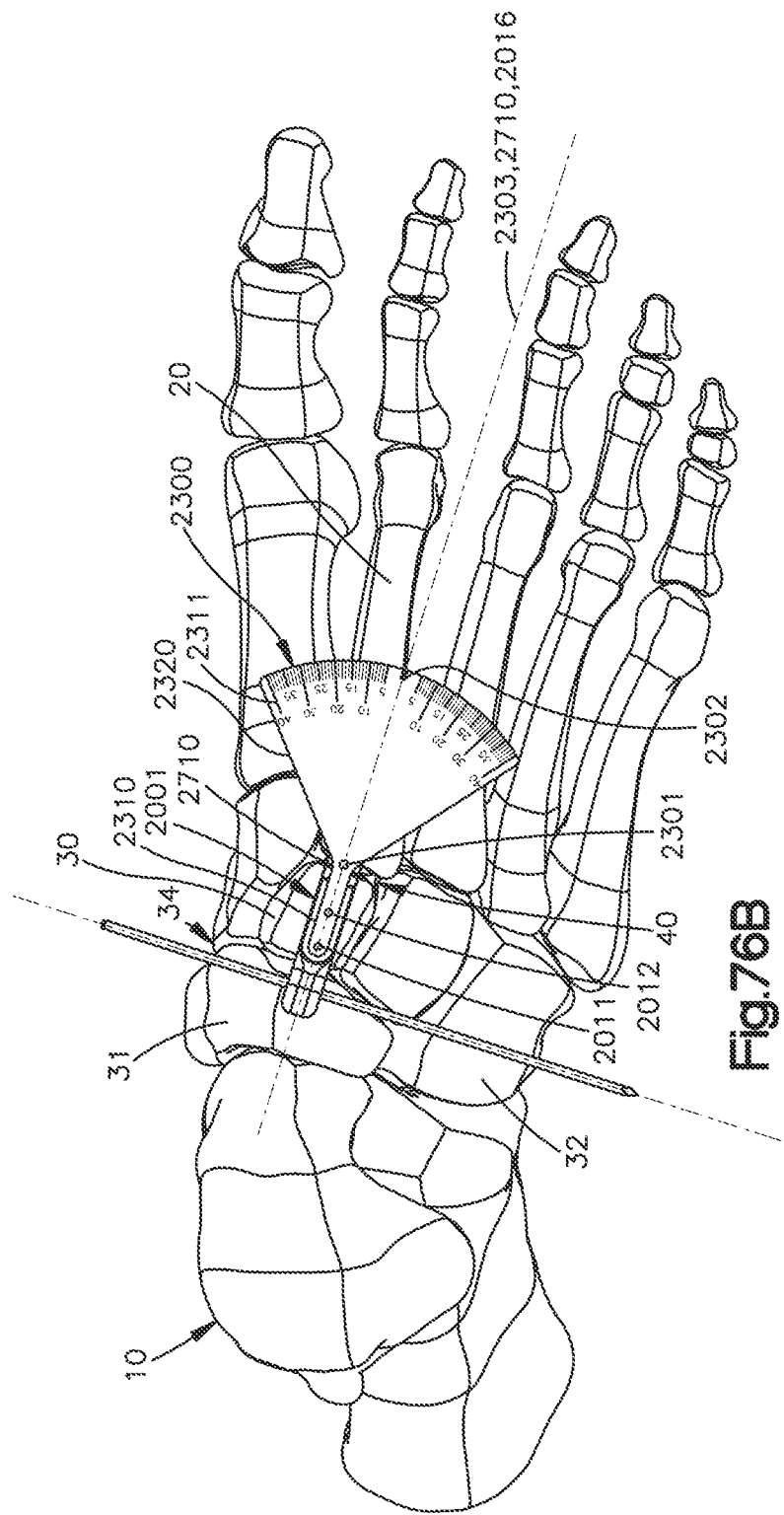
Figure 77:
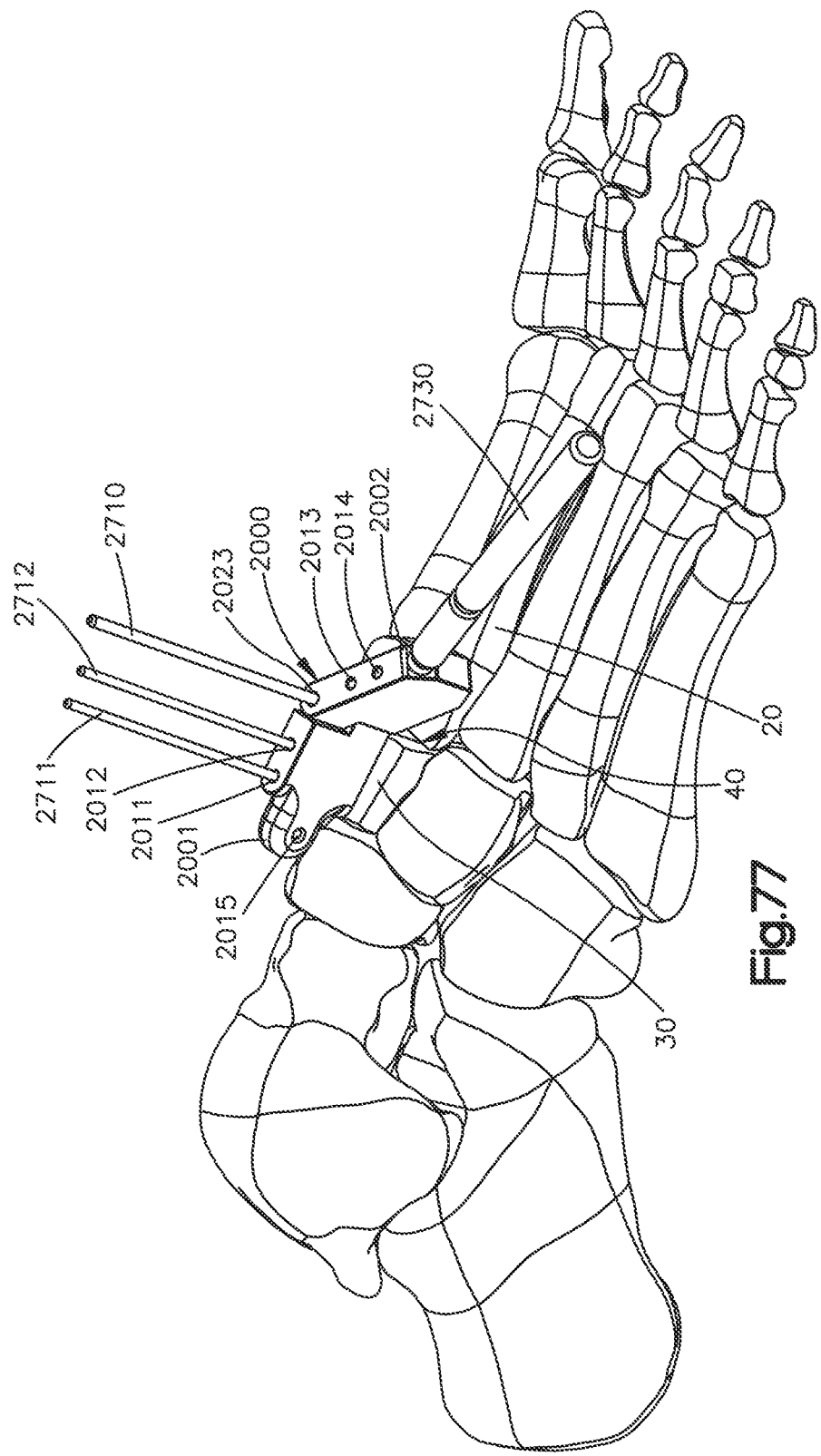
Figure 78:
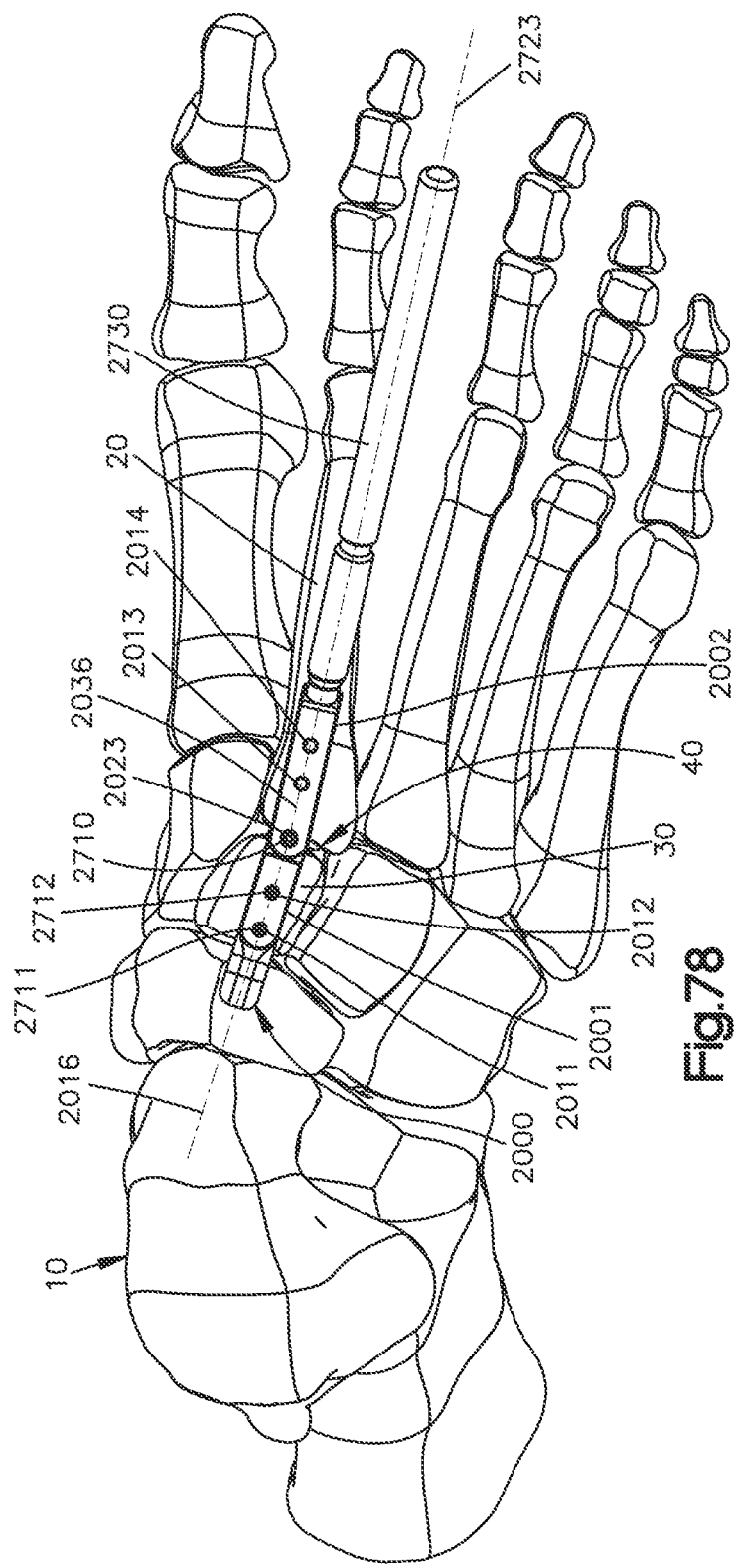
Figure 79:
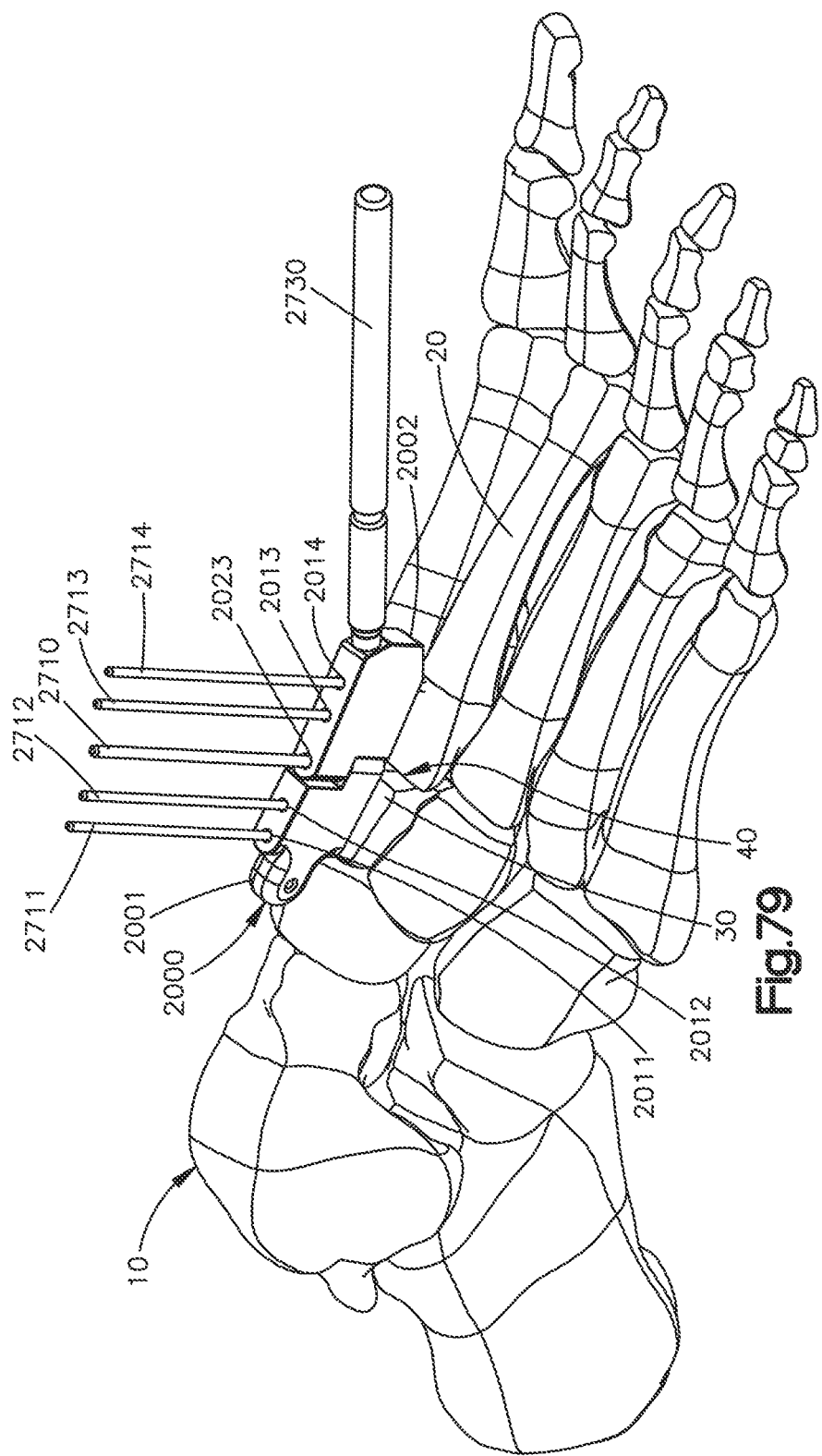
Figure 80A:
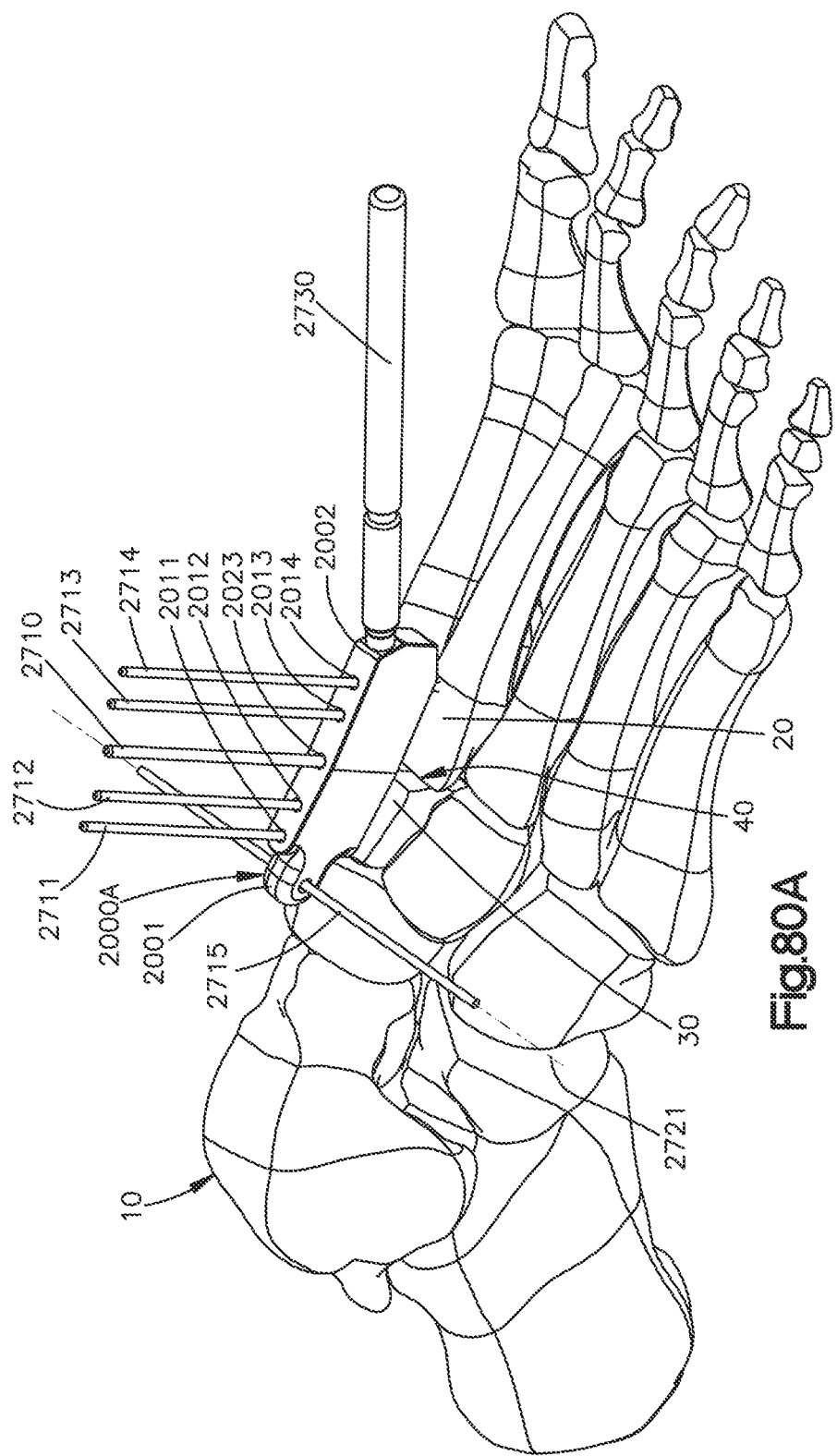
Figure 80B:
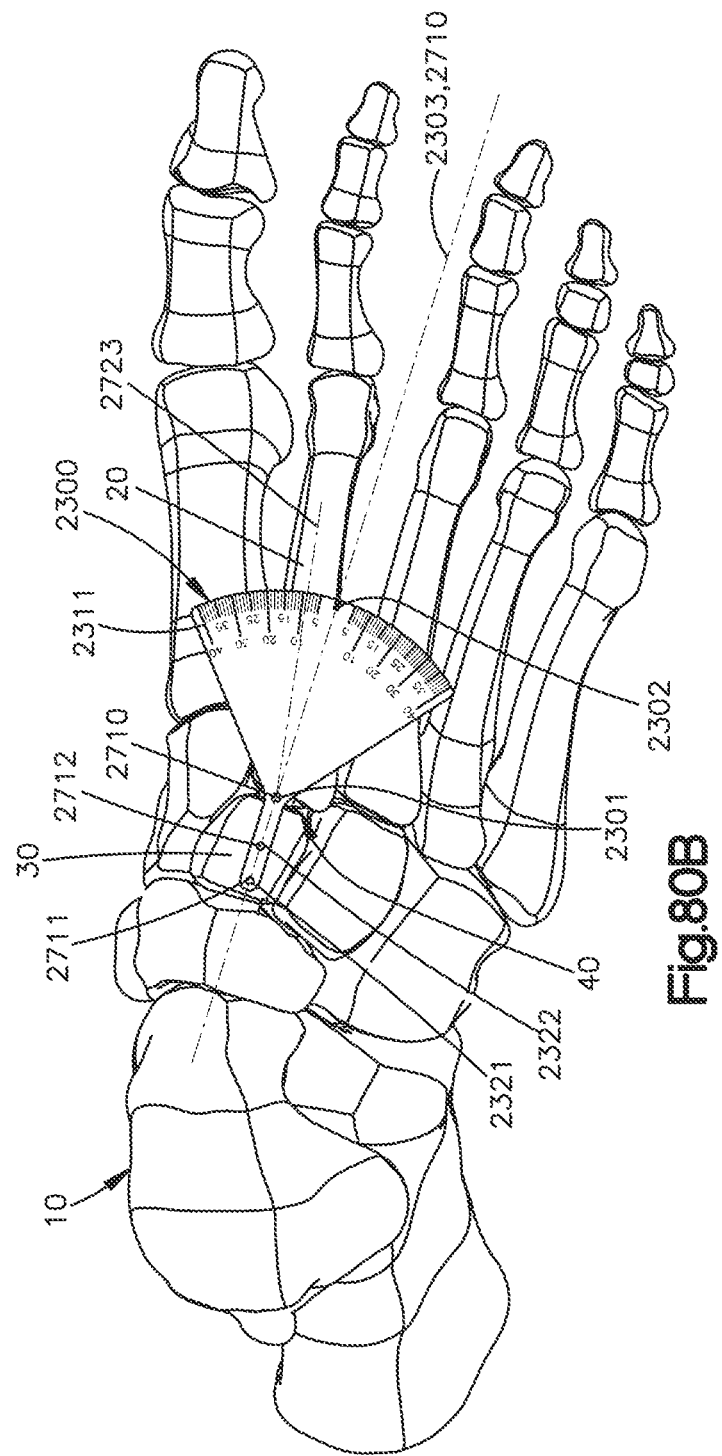
Figure 80C:
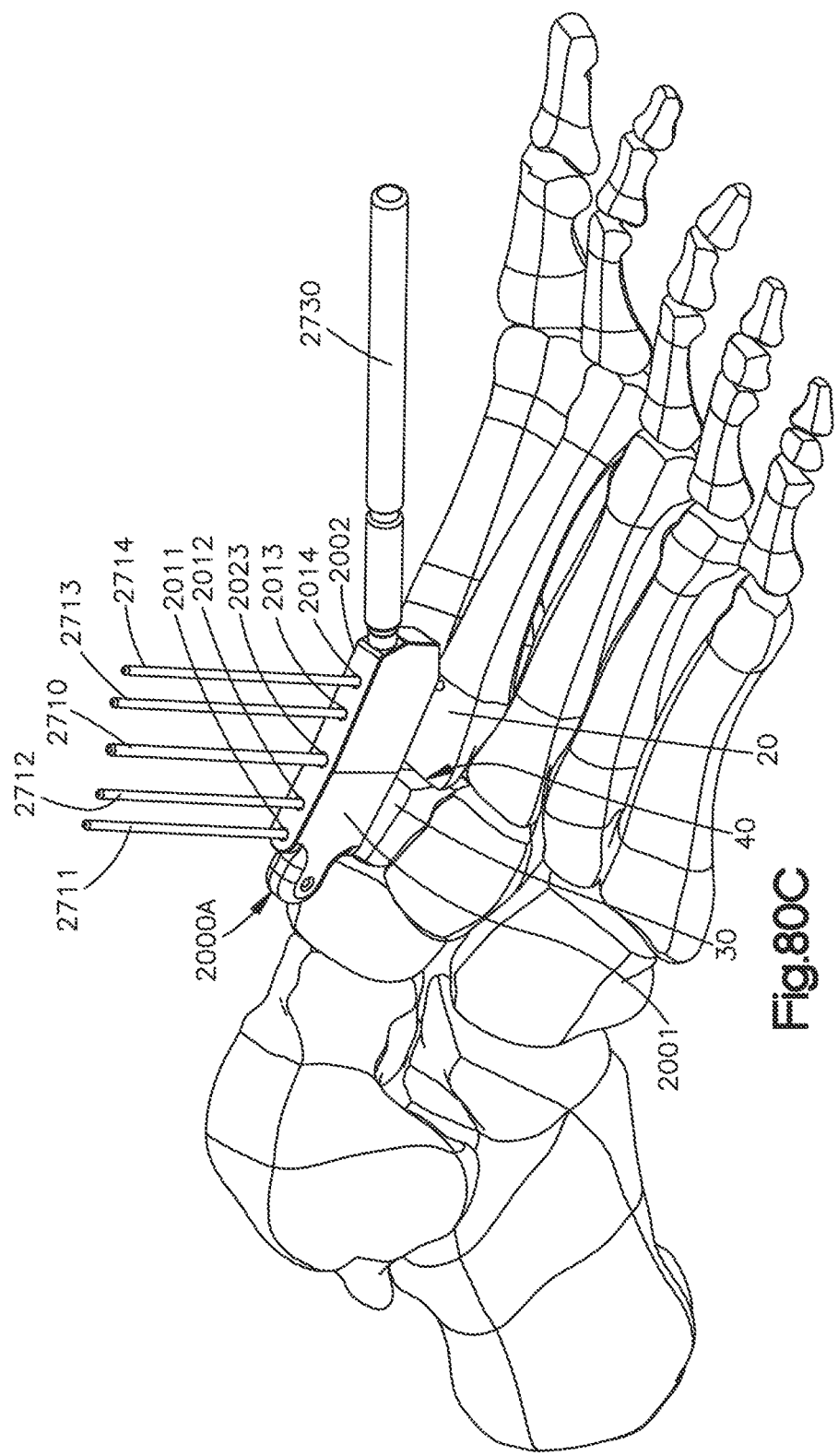
Figure 80D:
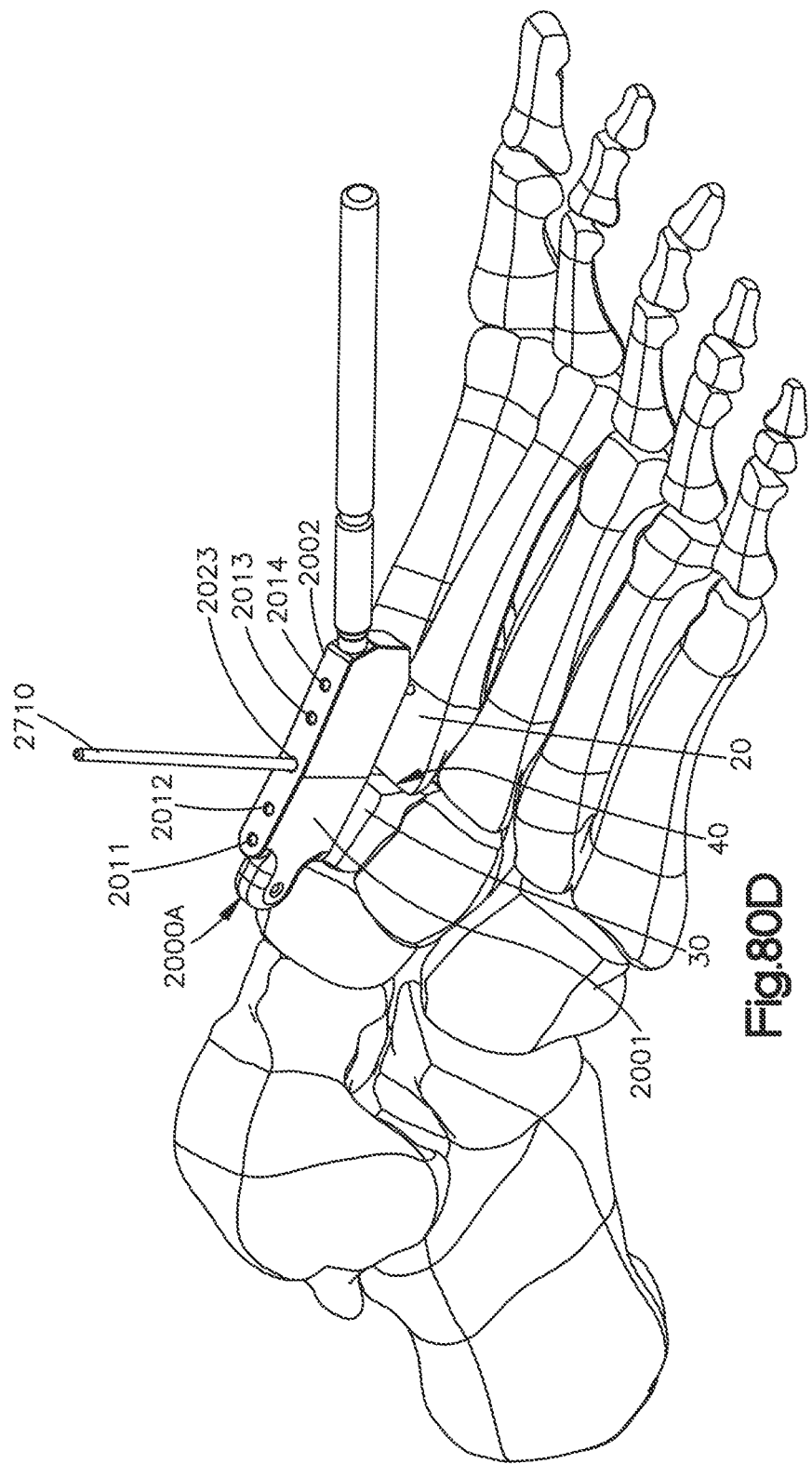
Figure 81:
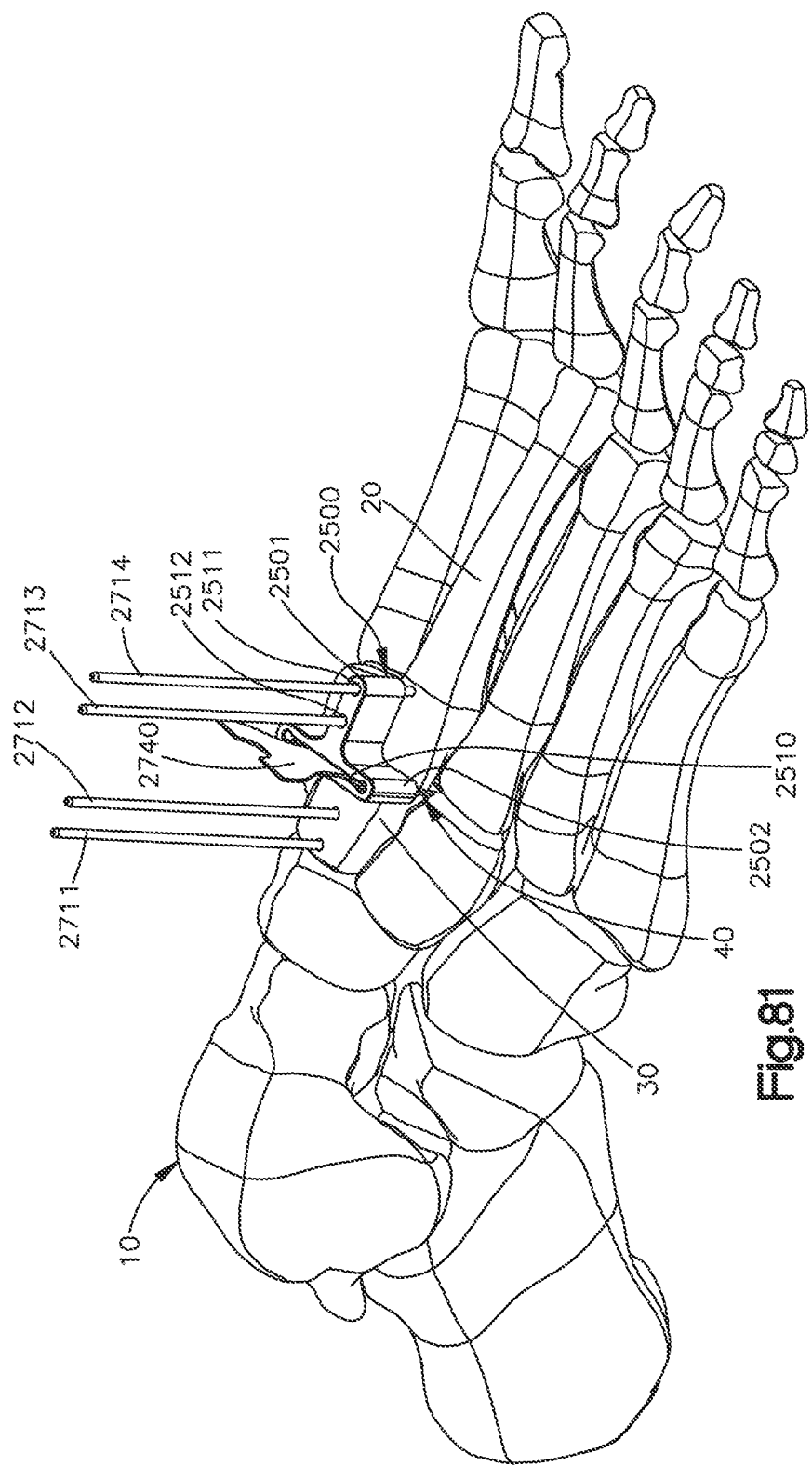
Figure 82:
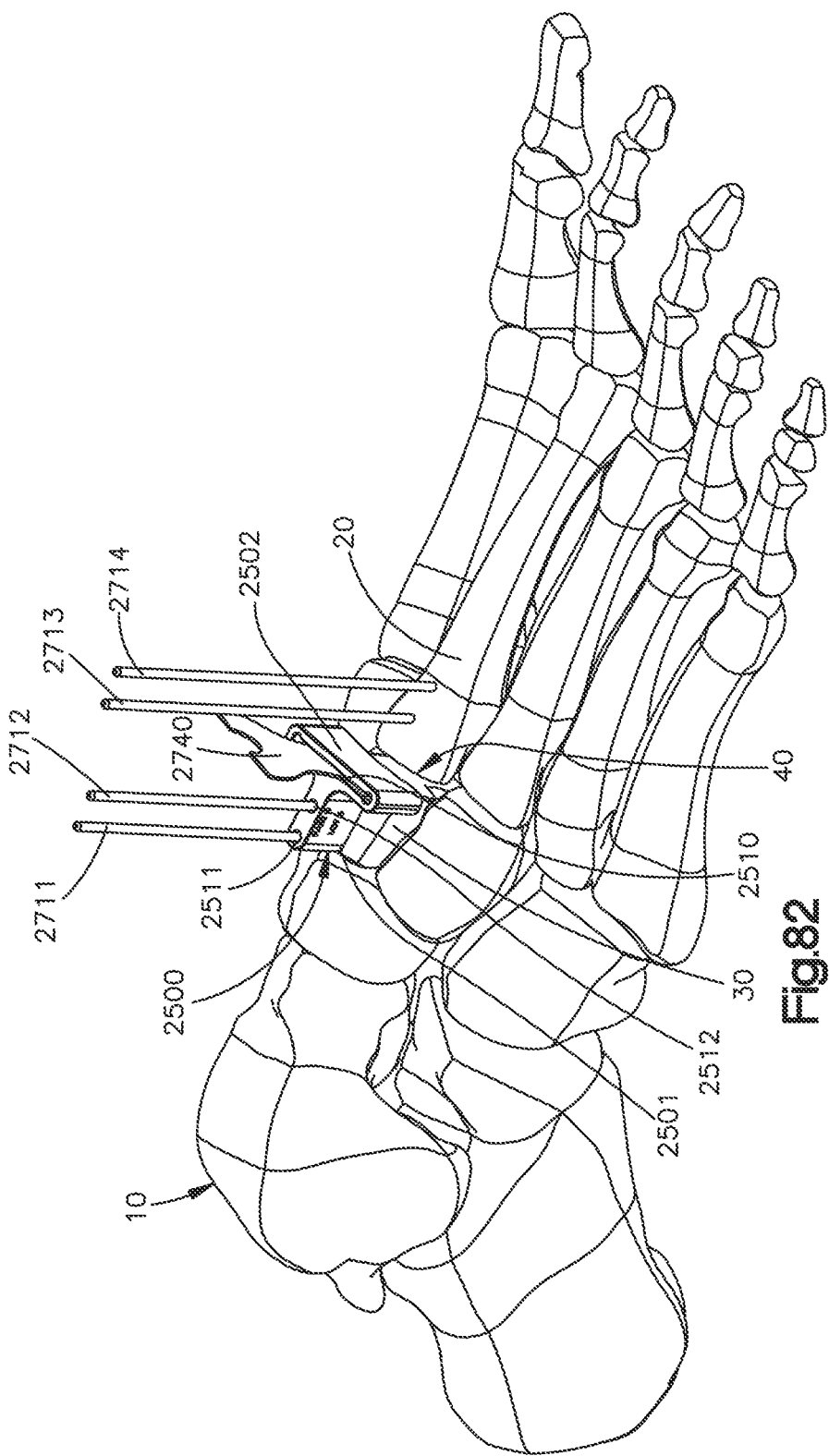
Figure 83:
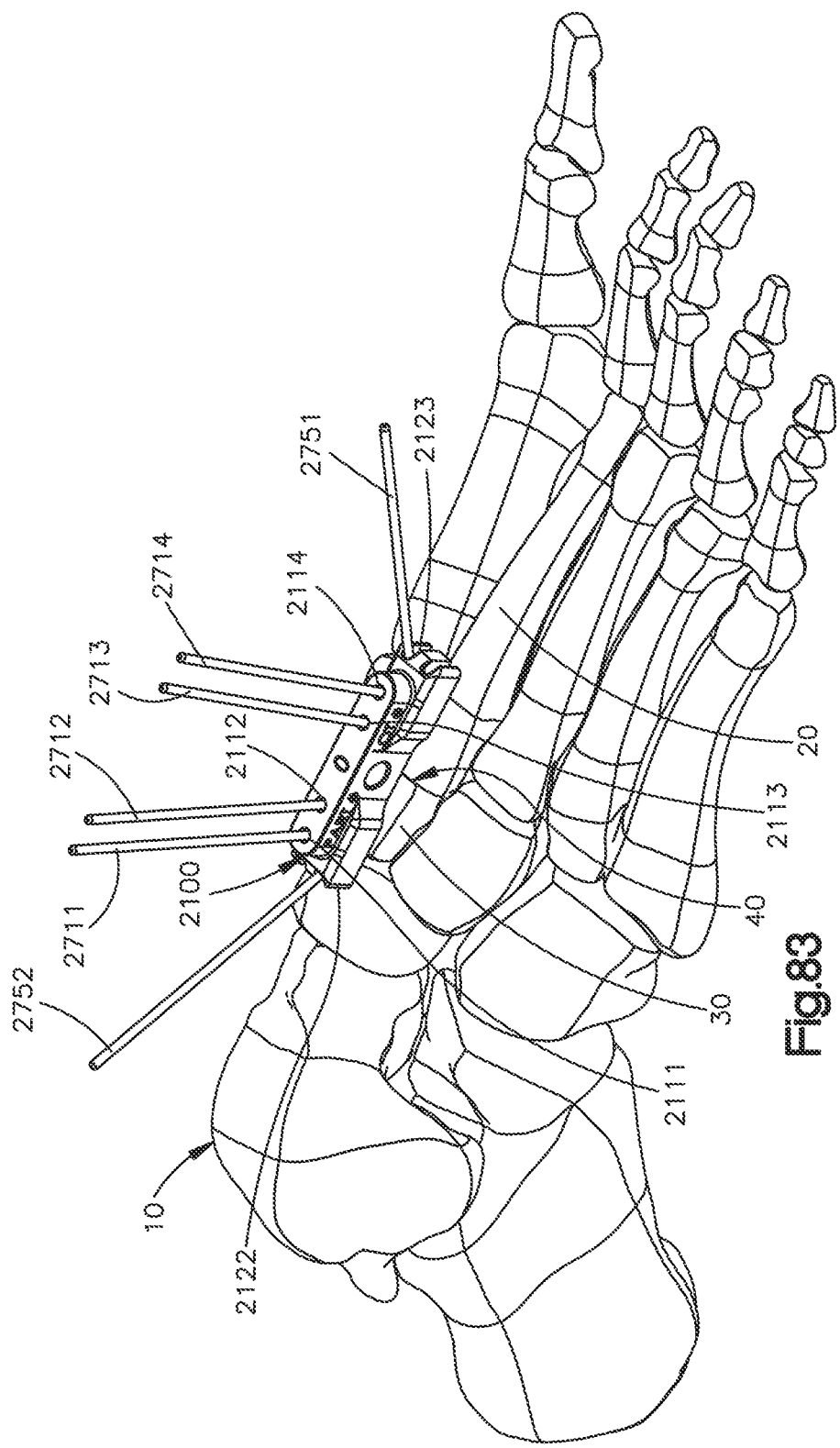
Figure 84:
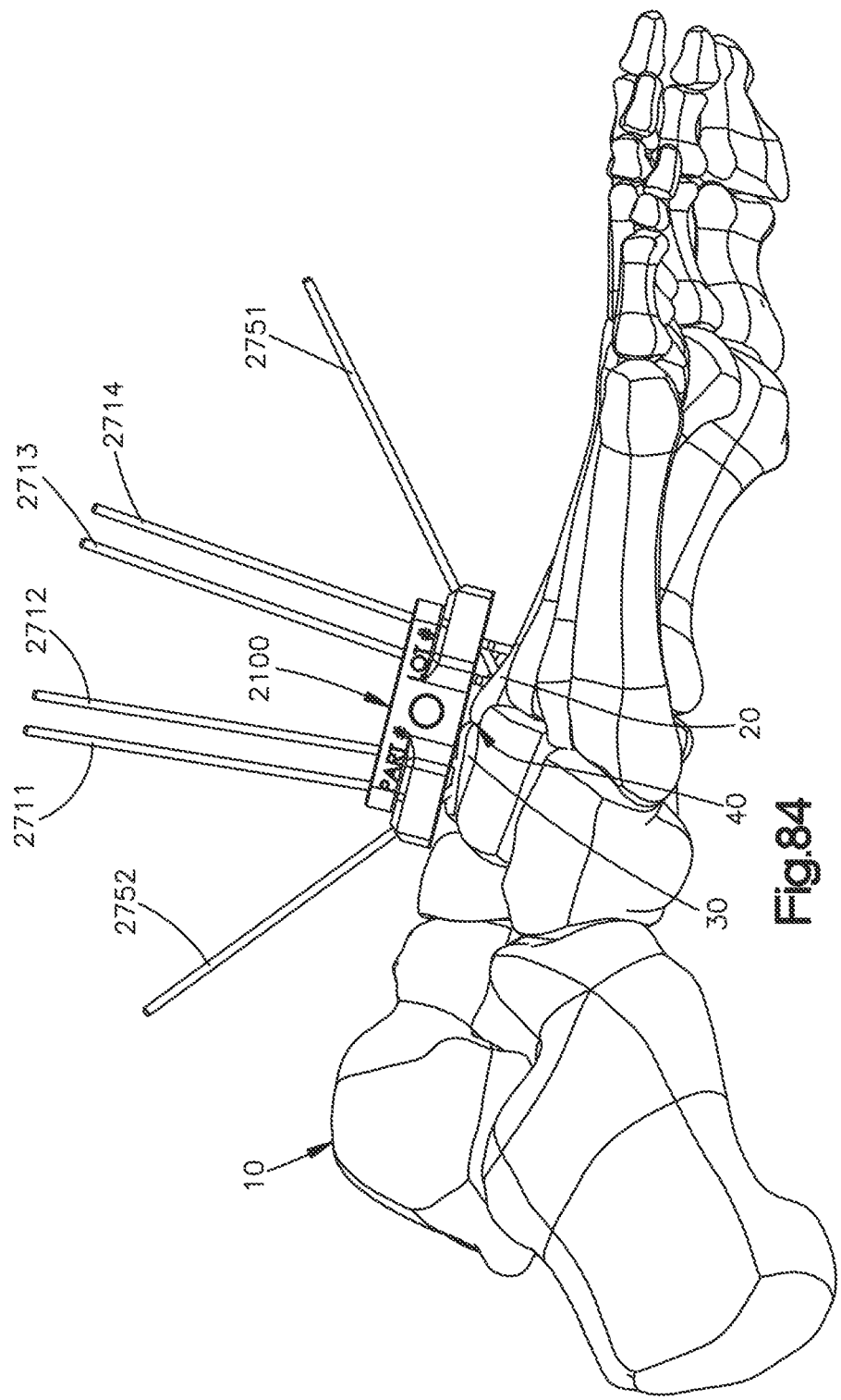
Figure 85:
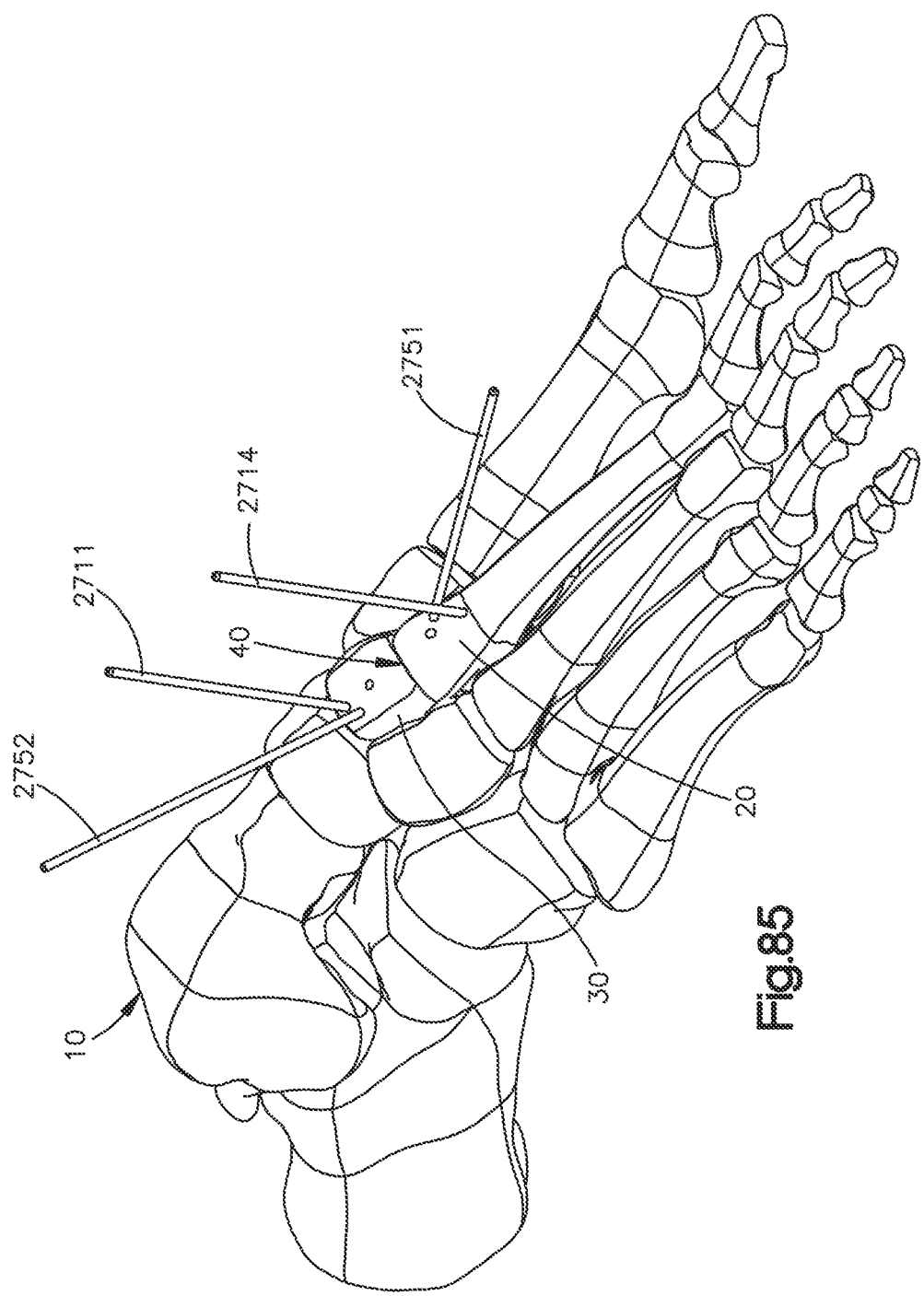
Figure 86:
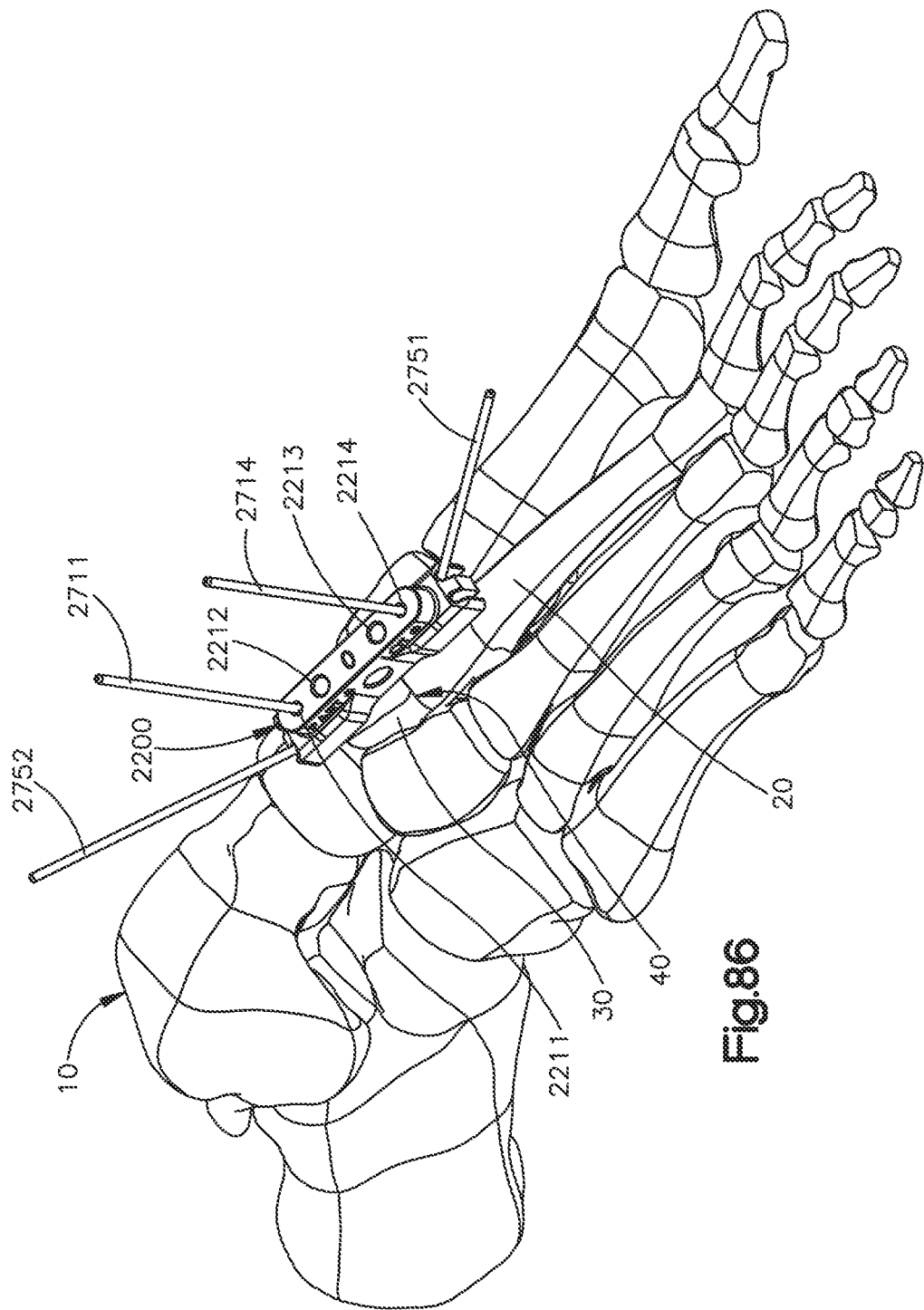
Figure 87:
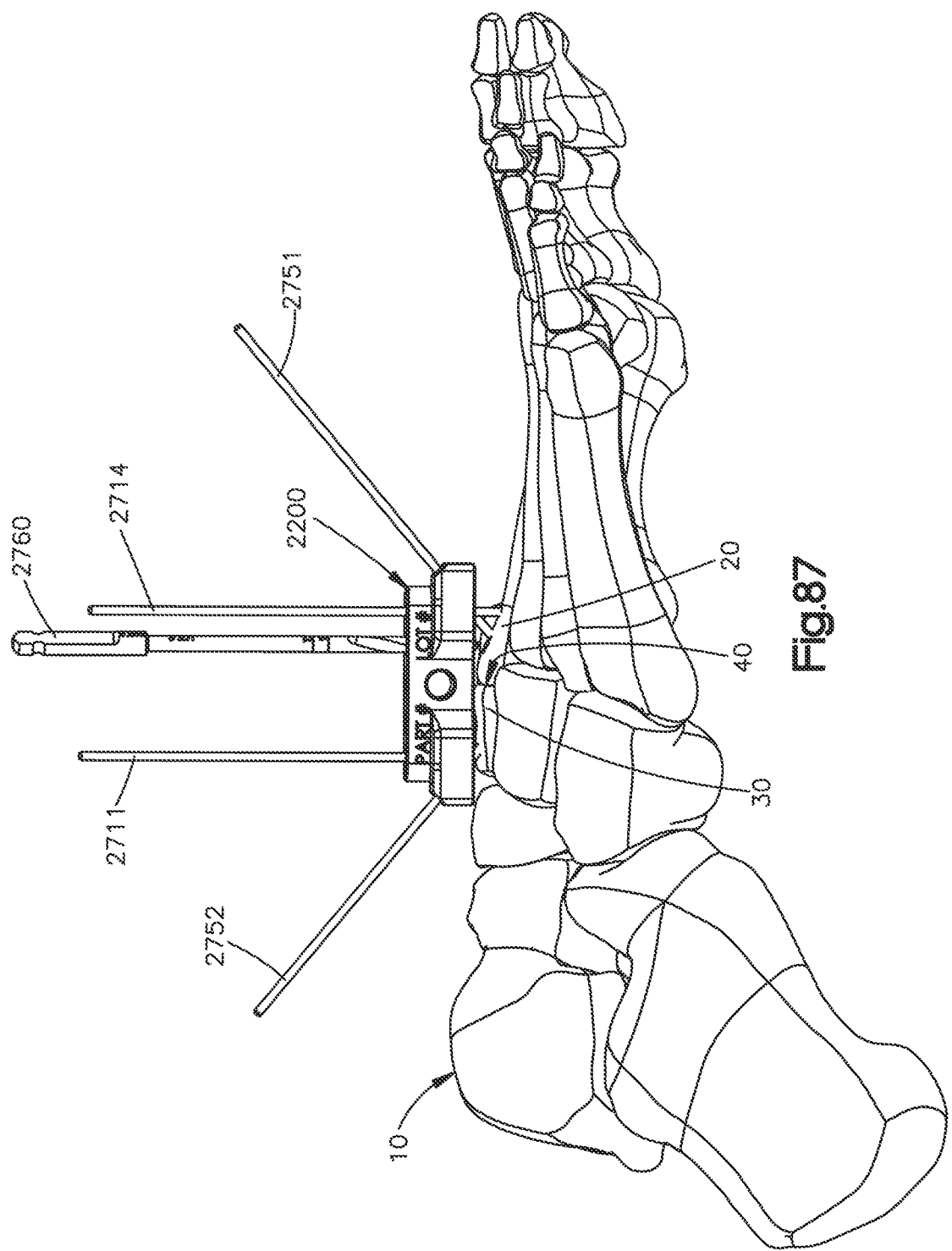
Figure 88:
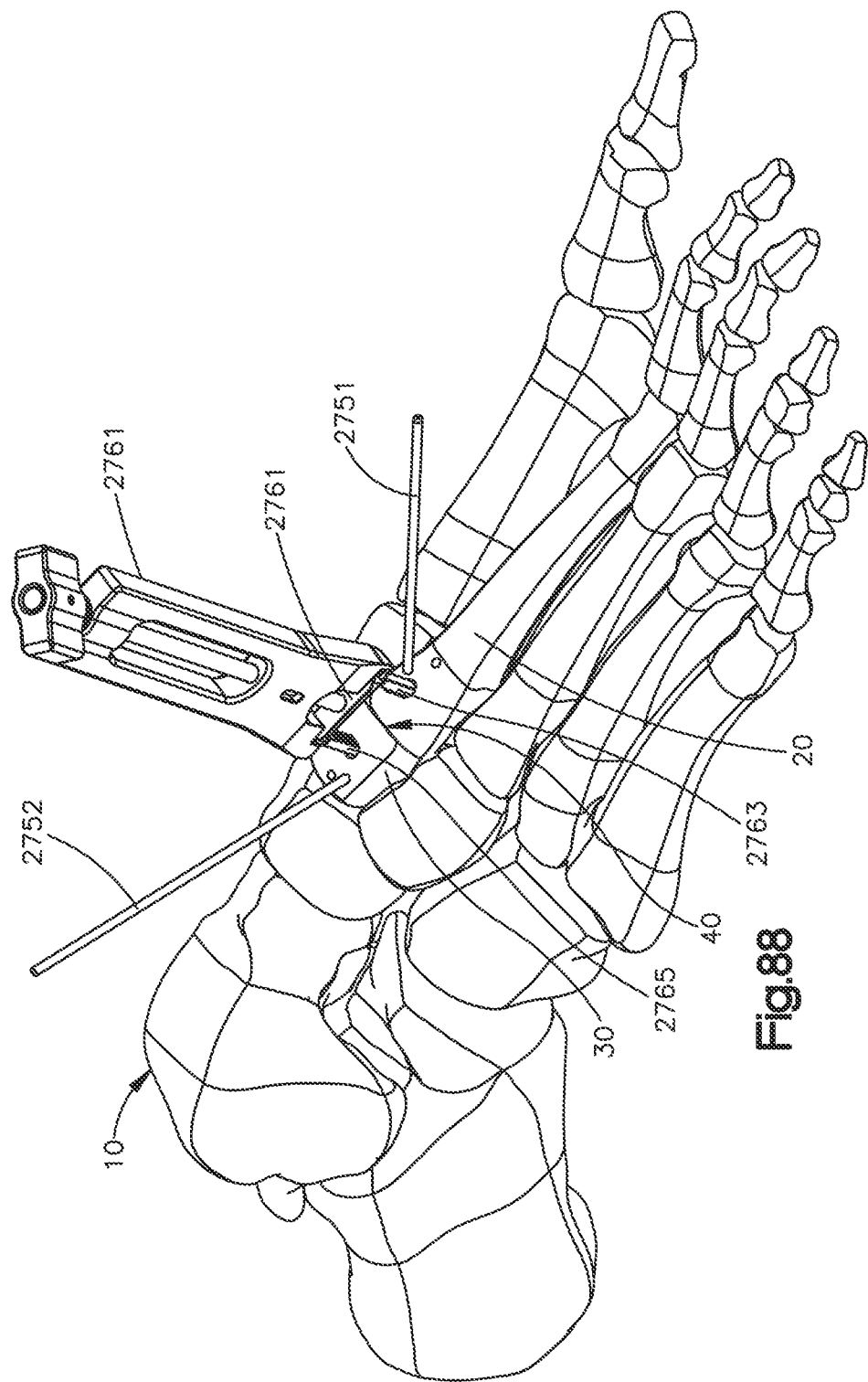
Figure 89:
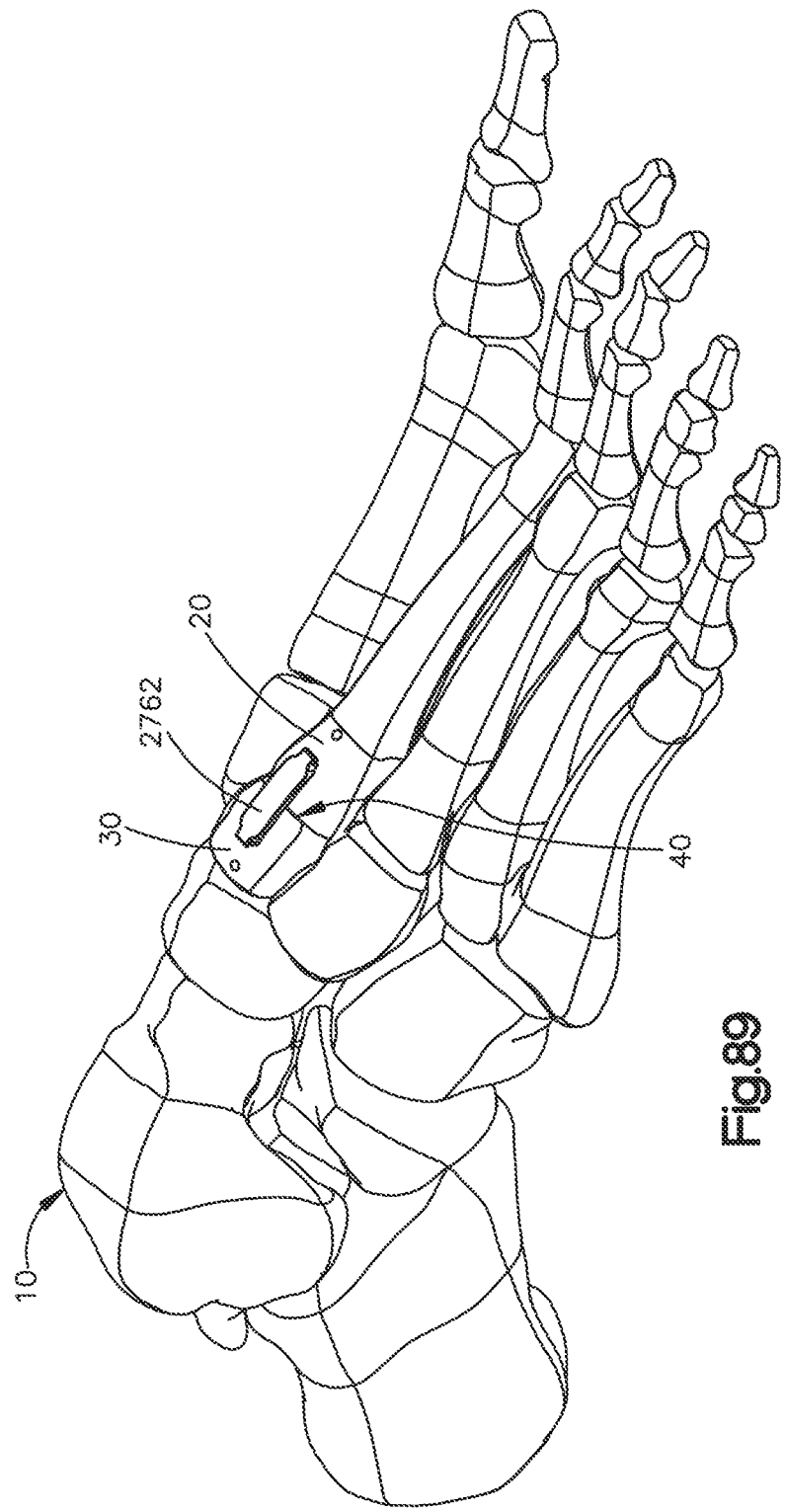

FIG. 69C shows a section view taken along the line 69C-69C in FIG. 69B;

FIG. 69D shows a section view taken along the line 69D-69D in FIG. 69B;

FIG. 70A shows a perspective view of a drill guide;

FIG. 70B shows a top view of the drill guide;

FIG. 70C shows a section view taken along the line 70C-70C in FIG. 70B;

FIG. 70D shows a section view taken along the line 70D-70D in FIG. 70B;

FIG. 71 shows an angle guide for aligning the pin placement guide to correct the metatarsus adductus deformity;

FIG. 72A shows a perspective view of another embodiment of a compressor block;

FIG. 72B shows a top view of the compressor block;

FIG. 72C shows a section view taken along the line 72C-72C in FIG. 72B;

FIG. 72D shows a section view taken along the line 72D-72D in FIG. 72B;

FIG. 73A shows a perspective view of a cut guide;

FIG. 73B shows a top view of the cut guide;

FIG. 73C shows a perspective view of another embodiment of a cut guide including pairs of guide holes at different spacings from a cut slot;

FIG. 73D shows a bottom plan view of the cut guide;

FIG. 74 shows a patient's foot with a locating pin inserted into a tarsometatarsal joint between a cuneiform bone and a metatarsal bone;

FIG. 75 shows a first portion of the pin placement guide of FIGS. 67A-67D inserted over the locating pin and a transverse guide inserted into the first portion of the pin placement guide;

FIG. 76A shows alignment of the first portion of the pin placement guide of FIG. 75 with a correction axis to correct the metatarsus adductus deformity;

FIG. 76B shows alignment of the first portion of the pin placement guide with the correction axis using an angle guide;

FIG. 77 shows first and second pins inserted through the first portion of the pin placement guide and into the cuneiform bone and a second portion of the pin placement guide inserted over the locating pin;

FIG. 78 shows alignment of the second portion of the pin placement guide along an axis of the metatarsal;

FIG. 79 shows third and fourth pins inserted through the second portion of the pin placement guide and into the metatarsal;

FIG. 80A shows a select one of the fixed-angle pin placemen guides of FIGS. 68A-68C shown inserted over a locating pin and fixed to the cuneiform and the metatarsal;

FIG. 80B shows the angle guide of FIG. 71 inserted over a locating pin to measure an angle between a metatarsal axis and a correction axis, and first and second pins driven through the angle guide and into the cuneiform;

FIG. 80C shows a select one of the fixed-angle pin placement guides of FIGS. 68A-68C corresponding to the measured angle inserted over the first and second pins;

FIG. 80D shows a select one of the fixed-angle pin placement guides of FIGS. 68A-68C corresponding to the measured angle inserted over the locating pin;

FIG. 81 shows resection of a first end of the metatarsal within the tarsometatarsal joint with a cut guide;

FIG. 82 shows resection of a first end of the cuneiform bone within the tarsometatarsal joint with the cut guide;

FIG. 83 shows compression of the tarsometatarsal joint using a compressor block and insertion of two cross pins to temporarily secure the tarsometatarsal joint in a compressed configuration;

FIG. 84 shows a side view of the compressed configuration of the tarsometatarsal joint;

FIG. 85 shows the compressor block removed and the second and third pins removed from the respective cuneiform and metatarsal bones;

FIG. 86 shows alignment of a drill guide with the cuneiform and metatarsal bones;

FIG. 87 shows pre-drilling a recess in the metatarsal bone with the drill guide;

FIG. 88 shows placement of a staple to secure the resected tarsometatarsal joint; and FIG. 89 shows the corrected tarsometatarsal joint with an embedded staple in the corrected configuration.

DETAILED DESCRIPTION

The following description is directed to certain implementations for the purpose of describing the innovative aspects of this disclosure. However, a person having ordinary skill in the art will readily recognize that the teachings herein can be applied in a multitude of different ways.

Generally described, the systems, devices, and methods described herein provide improved methods and tools that can be used to perform a Lapidus bunionectomy or other foot surgeries with desirable precision. Some or all of the tools and/or components described herein may be provided in a kit and can include a plurality of optional and/or interchangeable components that may be selected, positioned, secured, and or used at the time of the bunionectomy procedure. Accordingly, the systems, devices, and methods disclosed herein may allow a surgeon to perform foot surgeries more effectively, efficiently, and/or precisely than would be possible with conventional devices and procedures.

The embodiments described herein can be manufactured from a number of different materials or combinations of materials. Nitinol, stainless steel, titanium, and/or other materials may have desirable material properties for certain components described herein. Stainless steel and/or titanium may not possess shape memory or super elasticity, but may possess the mechanical properties for embodiments that may benefit from mechanical manipulation to achieve multiple configurations. Still other materials such as PEEK or other polymers may also possess material properties beneficial for the embodiments described herein. A combination of materials may also be preferred. For example, a combination of nitinol and titanium (e.g., a nitinol plate with titanium screws) may be the materials of choice for some embodiments. Those skilled in the art are aware of the typical materials and combinations of materials applicable to the current technology.

Figure 1:
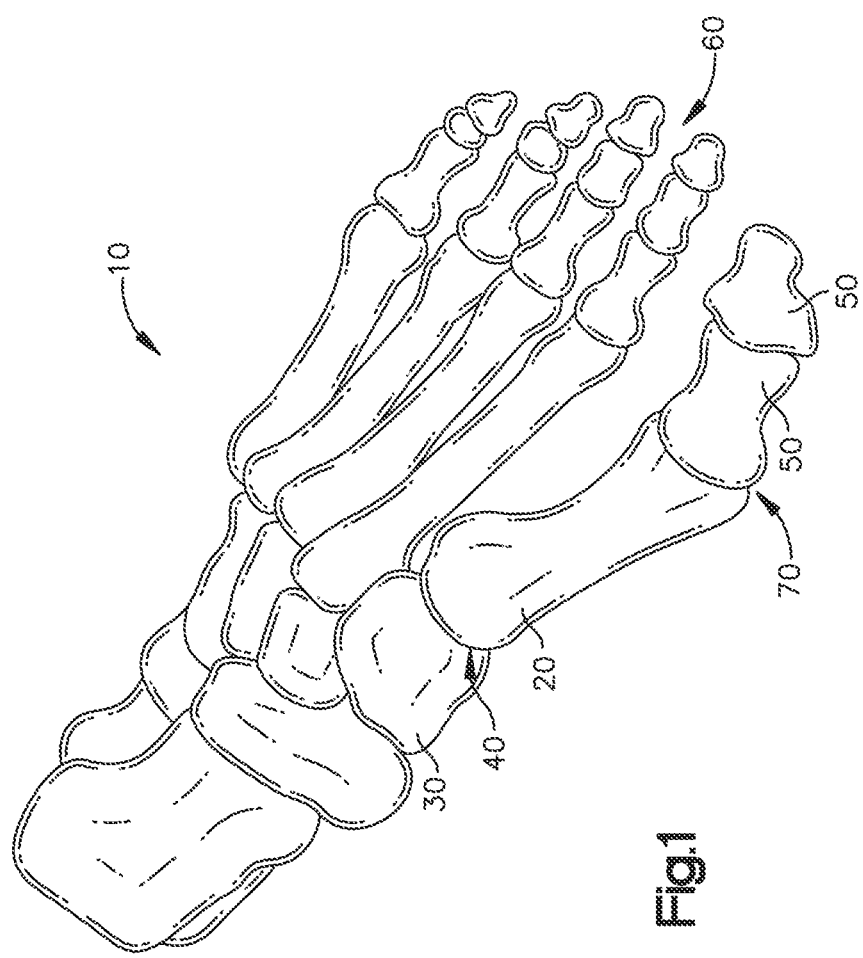
FIG. 1 is a perspective view of the bones of a foot having a bunion.

FIG. 1 is a perspective view of the bones of a foot 10 having a bunion, also known as hallux valgus. The foot 10 includes a first metatarsal 20 which articulates at its proximal end with the first cuneiform 30 (also known as the medial cuneiform) at the first tarsometatarsal (TMT) joint 40. The distal end of the first metatarsal 20 articulates with the phalanges 50 of the big toe. Intermetatarsal angle is defined as the angle between an axis of one metatarsal in relation to a second metatarsal, in the anatomic transverse plane. Rotation is defined as axial rotation about the axis of the metatarsal, in the anatomic frontal plane. A bunion as shown in FIG. 1 is characterized by an increased intermetatarsal angle and/or rotation of the first metatarsal 20 at the first TMT joint 40 such that the first metatarsal 20 extends away, or medially, from the remainder of the foot 10. When a bunion is present, the phalanges 50 of the big toe are typically angled inward, or laterally, toward the other phalanges 60, resulting in the characteristic bump at the metatarsophalangeal joint 70 which is the most prominent external indication of a bunion. The protruding metatarsophalangeal joint 70 may further be associated with a swollen bursal sac or osseous anomaly which may cause discomfort, difficulty with wearing shoes, and other inconveniences to the person having the bunion.

With reference to FIGS. 2A-7F, various devices and components are provided for use with an improved Lapidus bunionectomy procedure for correcting the TMT joint deformity of FIG. 1. Although the following description is made with reference to the Lapidus bunionectomy procedure, it will be understood that the various devices and components described herein are not limited to such procedures and may equally be used in other orthopedic procedures as will be understood by those skilled in the art.

Figure 2A:
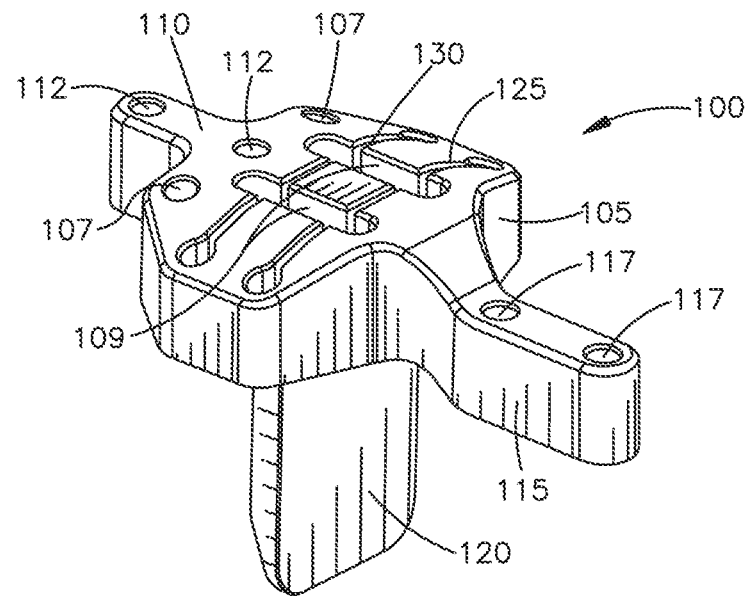
FIG. 2A is a perspective view of an example cut guide configured as a cutting guide and a pin guide for the Lapidus bunionectomy procedures described herein.
Figure 2B:
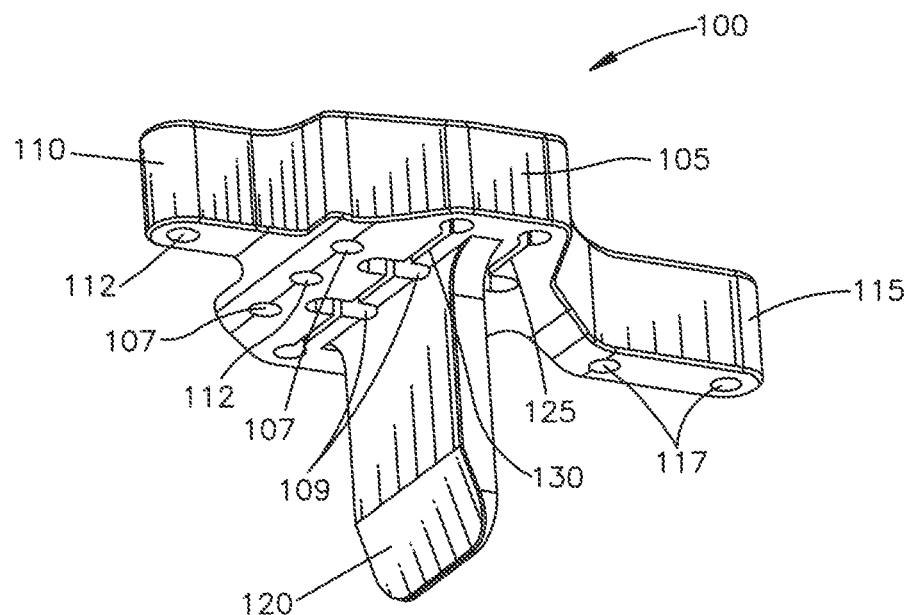
FIG. 2B is another perspective view of the example cut guide illustrated in FIG. 2A.
Figure 2C:
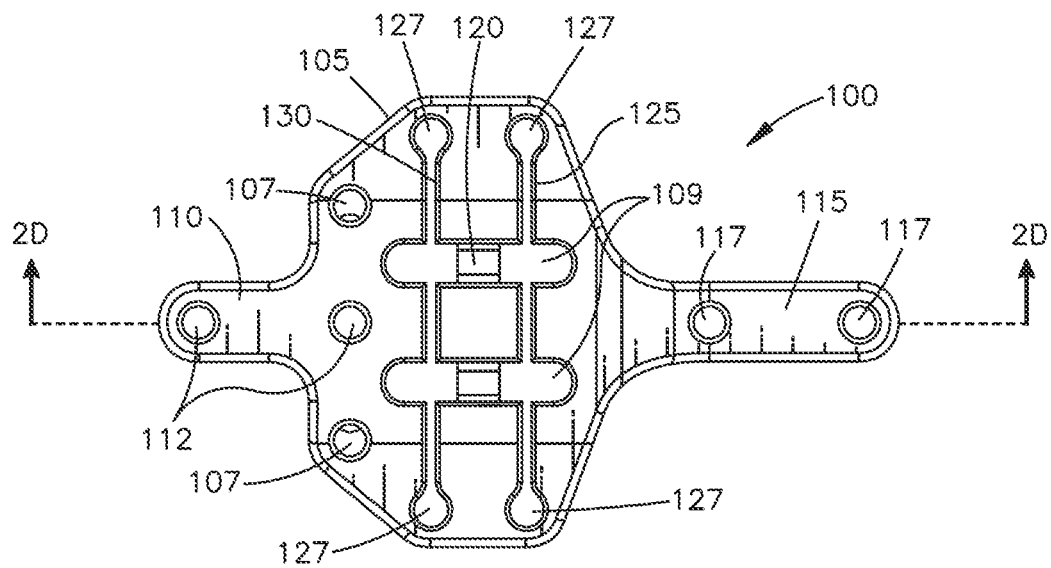
FIG. 2C is a top plan view of the example cut guide illustrated in FIG. 2A.
Figure 2D:
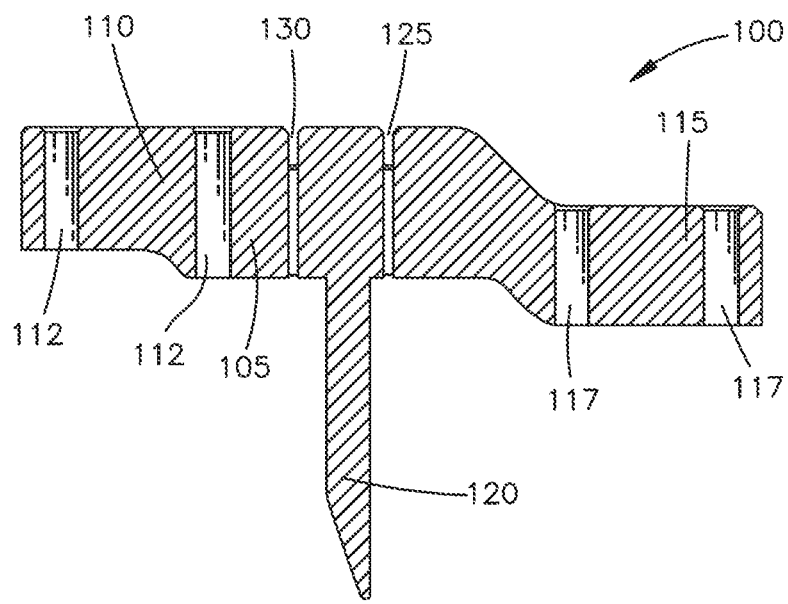
FIG. 2D is a cross-sectional view of the example cut guide illustrated in FIG. 2A.

FIGS. 2A-2D depict an example cut guide 100 configured as a cutting guide and a pin guide for the Lapidus bunionectomy procedures described herein. FIGS. 2A and 2B are upper and lower perspective views of the cut guide 100, respectively. FIG. 2C is a top plan view of the cut guide 100. FIG. 2D is a cross-sectional side elevation view of the cut guide 100 taken about the line 2D-2D in FIG. 2C. The cut guide 100 may be a single integrally formed component and may comprise a metal, a plastic, or other suitable material.

The cut guide 100 generally includes a body 105, a proximal extension 110, a distal extension 115, and a paddle 120. The paddle 120 is sized and shaped to seat within a joint such as a TMT joint (e.g., between the first metatarsal and the first cuneiform), for example, after removing soft tissue such as the joint capsule around the joint. The relatively narrower and sloped terminal portion of the paddle 120 may facilitate insertion of the paddle 120 into the joint. In some embodiments, the paddle 120 is integrally formed with the body 105.

The body 105 of the cut guide 100 includes a distal slot 125 and a proximal slot 130. The distal slot 125 and the proximal slot 130 each pass through the full thickness of the body 105 and are sized and shaped to serve as a positioning guide for a sawblade in order to facilitate precise saw cuts at each side of the joint. For example, the distal slot 125 may be positioned at a predetermined distance relative to the distal plane of the paddle 120 to facilitate cutting the base of the first metatarsal when the paddle 120 is positioned within the first TMT joint. Similarly, the proximal slot 130 may be positioned on the opposite side (proximal plane) of the paddle to facilitate cutting the first cuneiform. The distal slot 125 and the proximal slot 130 may be identically or similarly shaped (e.g., may have the same length and/or width) such that the metatarsal and cuneiform cuts can be performed with the same or same type of saw blade. In some embodiments, the distal slot 125 and the proximal slot 130 may be parallel to each other and/or to the paddle 120, or may be angled relative to the plane of the paddle 120. In some embodiments, relatively wider terminal sections 127 at the ends of the slots 125, 130 may be provided for the placement of additional guide wires during cutting to prevent a saw blade from making an excessively wide cut when using the cut guide 100.

Proximal pin holes 112 extend through the full thickness of the cut guide 100. One or both of the proximal pin holes 112 can be disposed on the proximal extension 110 or within the body 105. The proximal pin holes 112 can each have a substantially circular profile sized to accommodate a surgical pin or wire for temporarily securing the cut guide to the foot. The proximal pin holes 112 serve as a guide such that two proximal pins or wires can be inserted at a predetermined spacing relative to each other and relative to the plane along which the first cuneiform is cut by a saw blade through the proximal slot 130. The proximal pin holes 112 extend vertically parallel to each other, as shown in FIG. 2D.

Distal pin holes 117 extend through the full thickness of the distal extension 115. Similar to the proximal pin holes 112, the distal pin holes 117 can each have a substantially circular profile sized to accommodate a surgical pin or wire for temporarily securing the cut guide to the foot, and may have the same diameter as the proximal pin holes 112. The distal pin holes 117 serve as a guide such that two distal pins or wires can be inserted at a predetermined spacing relative to each other and relative to the plane along which the first metatarsal is cut by a saw blade through the distal slot 125. The distal pin holes 117 extend vertically parallel to each other and parallel to the proximal pin holes 112, as shown in FIG. 2D. A plane which intersects the axes of the proximal pin holes 112 may be coplanar with a plane which intersects the axes of distal pin holes 117. The combination of the pin holes form a linear array of holes, spanning the TMT joint. A bottom or bone-facing surface of the distal extension 115 may not be coplanar with a bottom or bone-facing surface of the body 105 and/or the proximal extension 110, which may allow the cut guide 100 to be placed closer to the bone while allowing space for the osseous anatomy of the proximal metatarsal and the medial cuneiform. Further details are provided in U.S. Pat. No. 10,292,713, which is incorporated herein by reference.

In some embodiments, the body 105 of the cut guide 100 further includes one or more additional openings, such as additional convergent pin holes 107 and/or longitudinal apertures 109. The convergent pin holes 107 may be utilized to insert one or more additional pins or wires if additional stability is desired during a bunionectomy procedure. The longitudinal apertures 109 extend transverse to the slots 125, 130 and may provide an opening to facilitate x-ray visualization and/or any other suitable surgical imaging procedure to confirm and/or monitor the alignment of the cut guide during a bunionectomy procedure.

Figure 2E:
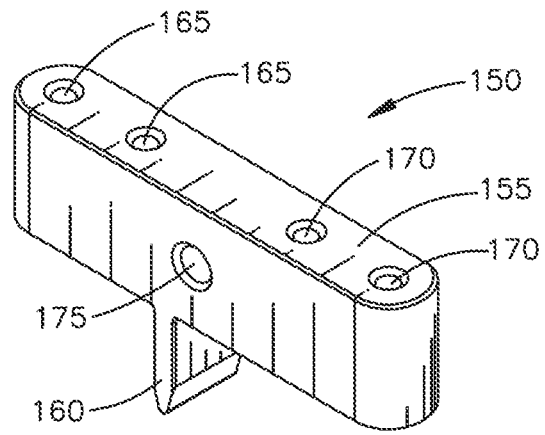
FIG. 2E is a perspective view of an example free-hand pin guide for orienting the insertion of pins in the absence of the cut guide of FIGS. 2A-2D.
Figure 2F:
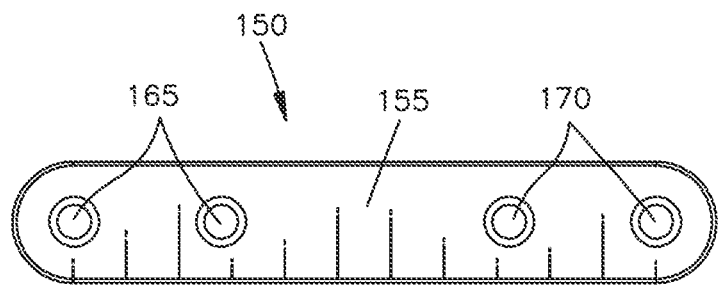
FIG. 2F is a top plan view of the free-hand pin guide illustrated in FIG. 2E.
Figure 2G:
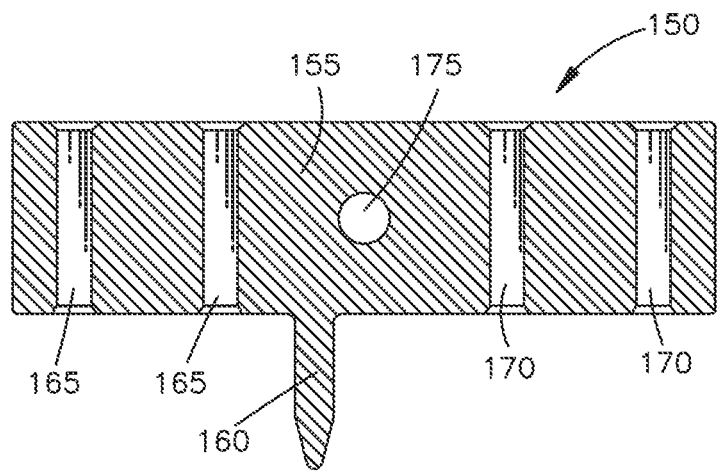
FIG. 2G is a cross-sectional view of the free-hand pin guide illustrated in FIG. 2E.

FIGS. 2E-2G depict an example free-hand pin guide 150 including an array of pin holes spanning the TMT joint for orienting the insertion of pins in the absence of the cut guide 100 of FIGS. 2A-2D. In some bunionectomy procedures, the cut guide 100 may not be used, for example, if the cut guide 100 does not fit within a joint, due to a surgeon's preference, or for any other reason that causes free-hand joint cuts to be made rather than cuts using the cut guide 100. The free-hand pin guide 150 generally comprises a body 155 and a paddle 160. Proximal pin holes 165 and distal pin holes 170 extend through the full thickness of the body 155. The proximal pin holes 165 may have the same relative spacing as the proximal pin holes 112 of the cut guide 100. Similarly, the distal pin holes 170 may have the same relative spacing as the distal pin holes 117 of the cut guide 100. A handle attachment aperture 175, which may be threaded, is provided for attaching a side-mounted handle which may assist the user in placing the free-hand pin guide 150. Similar to the proximal pin holes 112 and distal pin holes 117 of the cut guide 100, the proximal pin holes 165 and distal pin holes 170 of the free-hand pin guide 150 extend vertically parallel to each other. However, the spacing from the paddle 160 of the proximal pin holes 165 and the distal pin holes 170 of the free-hand pin guide 150 is slightly smaller than that of the proximal and distal pin holes 112, 117 relative to the paddle 120 of the cut guide 100 to compensate for the free-hand pin guide 150 being applied after the cuts have been made. Thus, the free-hand pin guide 150 allows the placement of pins or wires following a free-hand cut with the same spacing relative to the first TMT joint as if the cut guide 100 had been used to perform the cuts.

Figure 2H:
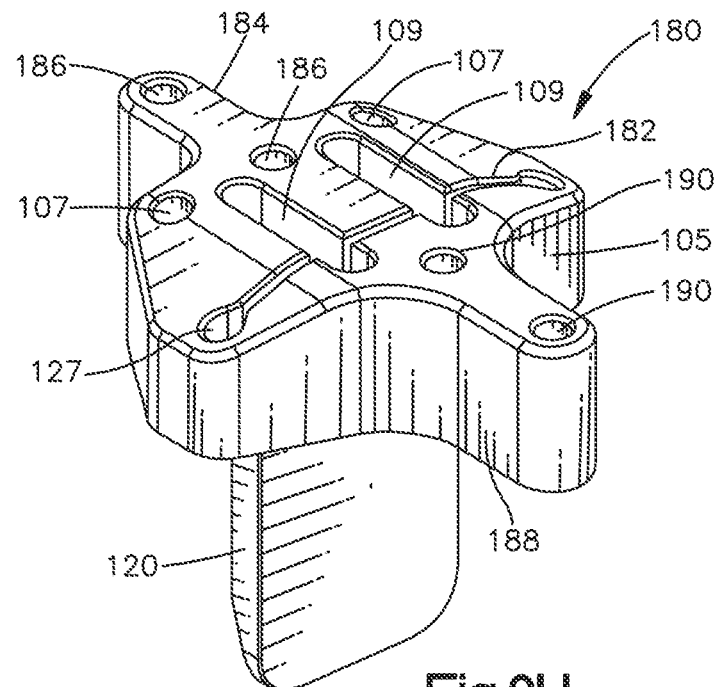
FIG. 2H is a perspective view of an example cut guide configured as a cutting guide and a pin guide for the Lapidus bunionectomy procedures described herein.
Figure 2I:
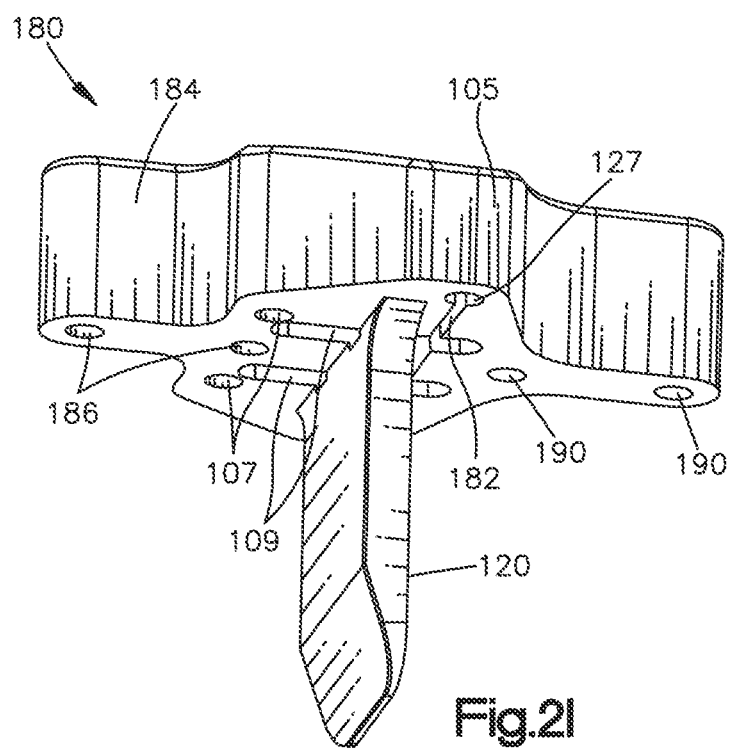
FIG. 2I is another perspective view of the cut guide of FIG. 2H.
Figure 2J:
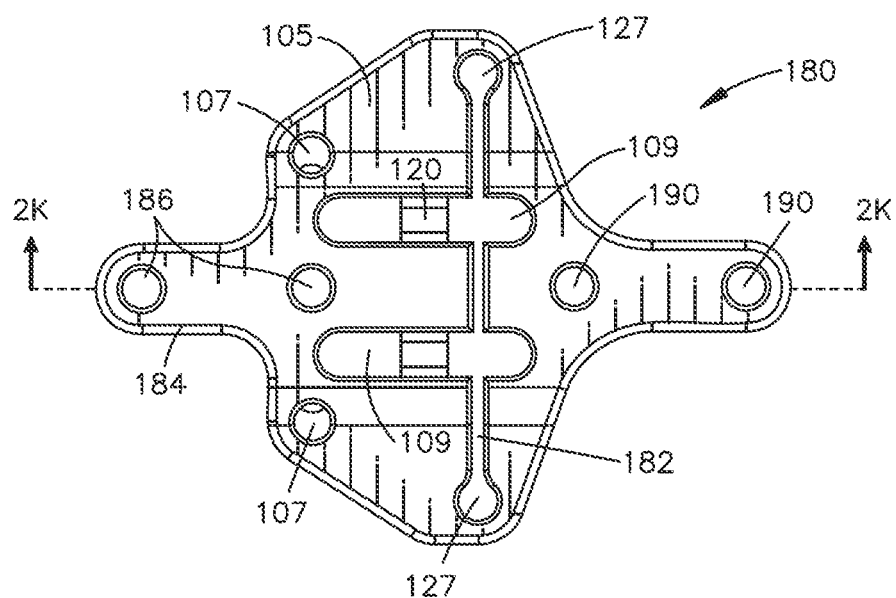
FIG. 2J is a top plan view of the cut guide of FIG. 2H.
Figure 2K:
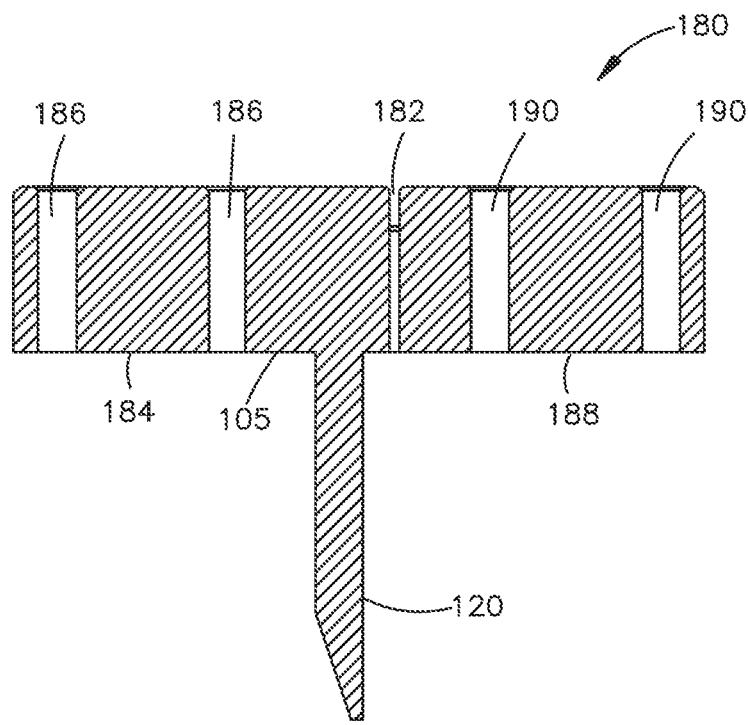
FIG. 2K is a cross-sectional view of the cut guide of FIG. 2H.

FIGS. 2H-2K depict an example reversible cut guide 180 configured as a cutting guide and a pin guide for the Lapidus bunionectomy procedures described herein. FIGS. 2H and 2I are upper and lower perspective views of the cut guide 180, respectively. FIG. 2J is a top plan view of the cut guide 180. FIG. 2K is a cross-sectional side elevation view of the cut guide 180 taken about the line 2K-2K in FIG. 2J. The cut guide 180 may be a single integrally formed component and may comprise a metal, a plastic, or other suitable material. The cut guide 180 is similar to the cut guide 100 of FIGS. 2A-2D, but may be reversible and is configured with a single slot 182 rather than proximal and distal slots 125, 130 of FIGS. 2A-2D.

The cut guide 180 generally includes a body 105, a first extension 184, a second extension 188, and a paddle 120. The paddle 120 is sized and shaped to seat within a joint such as a TMT joint (e.g., between the first metatarsal and the first cuneiform), for example, after removing soft tissue such as the joint capsule around the joint. The relatively narrower and sloped terminal portion of the paddle 120 may facilitate insertion of the paddle 120 into the joint. In some embodiments, the paddle 120 is integrally formed with the body 105.

The body 105 of the cut guide 180 includes a single cutting slot 182. The slot 182 passes through the full thickness of the body 105 and is sized and shaped to serve as a positioning guide for a sawblade in order to facilitate precise saw cuts at each side of the joint. For example, the slot 182 may be positioned at a predetermined distance relative to the plane of the adjacent surface of the paddle 120 to facilitate cutting the base of the first metatarsal or the first cuneiform, depending on the orientation of the cut guide 180, when the paddle 120 is positioned within the first TMT joint. In some embodiments, the slot 182 may be parallel to the paddle 120, or may be angled relative to the plane of the paddle 120. In some embodiments, relatively wider terminal sections 127 at the ends of the slot 182 may be provided for the placement of additional guide wires during cutting to prevent a saw blade from making an excessively wide cut when using the cut guide 180.

First pin holes 186 extend through the full thickness of the cut guide 180. One or both of the first pin holes 186 can be disposed on the first extension 184 or within the body 105. The first pin holes 186 can each have a substantially circular profile sized to accommodate a surgical pin or wire for temporarily securing the cut guide to the foot. The first pin holes 186 serve as a guide such that two pins or wires can be inserted at a predetermined spacing relative to each other and relative to the second pin holes 190. The first pin holes 186 extend vertically parallel to each other, as shown in FIG. 2K.

Second pin holes 190 extend through the full thickness of the cut guide 180. Similar to the first pin holes 186, the second pin holes 190 can each have a substantially circular profile sized to accommodate a surgical pin or wire for temporarily securing the cut guide 180 to the foot, and may have the same diameter as the first pin holes 186. The second pin holes 190 serve as a guide such that two distal pins or wires can be inserted at a predetermined spacing relative to each other and relative to the plane along which the first metatarsal or first cuneiform is cut by a saw blade through the slot 182. The second pin holes 190 extend vertically parallel to each other and parallel to the first pin holes 186, as shown in FIG. 2K. A plane which intersects the axes of the first pin holes 186 may be coplanar with a plane which intersects the axes of second pin holes 190. The combination of the pin holes form a linear array of holes, spanning the TMT joint. A bottom or bone-facing surface of the second extension 188 may be coplanar or substantially coplanar with a bottom or bone-facing surface of the body 105 and/or the first extension 184, which may allow the cut guide 180 to be placed across the TMT joint in either of two opposite orientations with the paddle 120 seated within the joint.

In some embodiments, the body 105 of the cut guide 180 further includes one or more additional openings, such as additional convergent pin holes 107 and/or longitudinal apertures 109. The convergent pin holes 107 may be utilized to insert one or more additional pins or wires if additional stability is desired during a bunionectomy procedure. The longitudinal apertures 109 extend transverse to the slot 182 and may provide an opening to facilitate x-ray visualization and/or any other suitable surgical imaging procedure to confirm and/or monitor the alignment of the cut guide during a bunionectomy procedure.

Figure 2L:
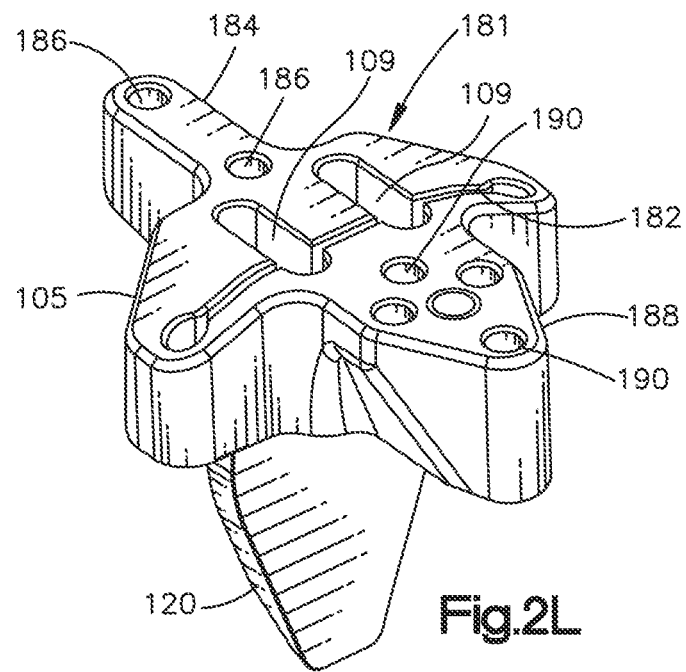
FIG. 2L is a perspective view of an example cut guide configured as a cutting guide and a pin guide for the Lapidus bunionectomy procedures described herein.
Figure 2M:
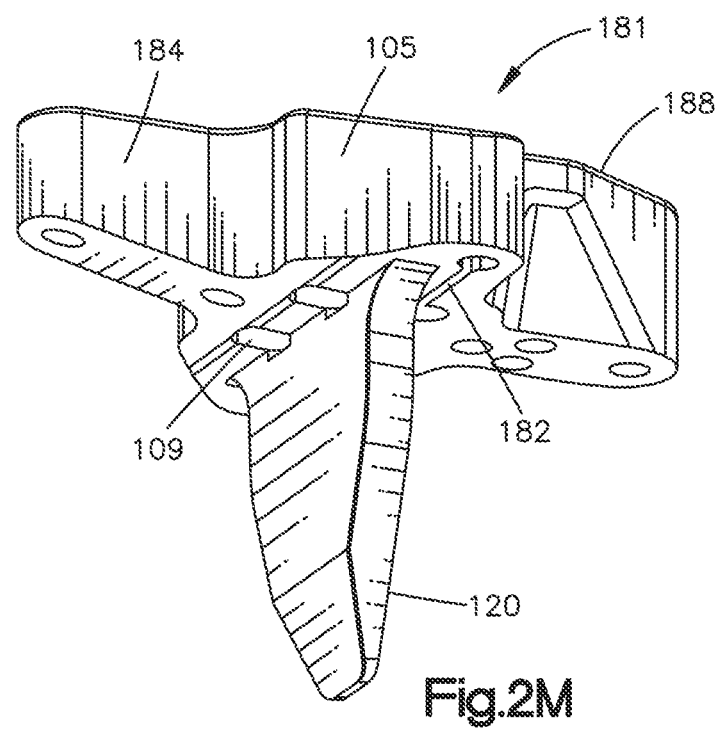
FIG. 2M is another perspective view of the cut guide illustrated in FIG. 2L.
Figure 2N:
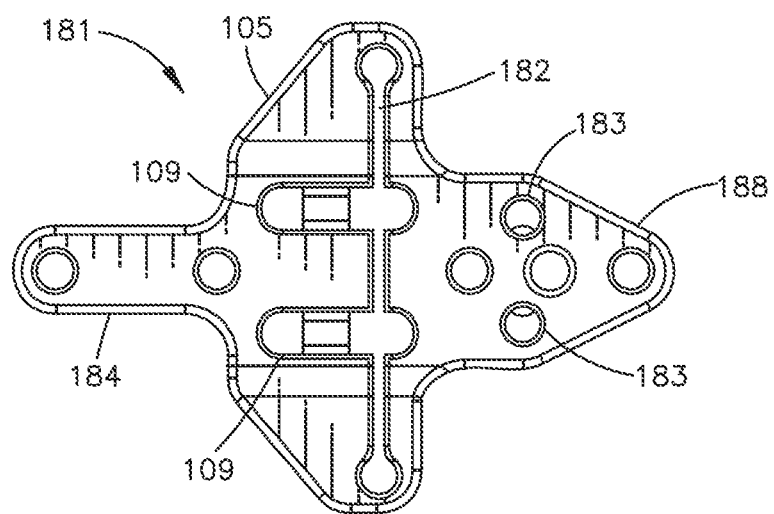
FIG. 2N is a top plan view of the cut guide illustrated in FIG. 2L.

FIGS. 2L-2N depict a further example reversible cut guide 181 configured as a cutting guide and a pin guide for the Lapidus bunionectomy procedures described herein.

FIGS. 2L and 2M are upper and lower perspective views of the cut guide 181, respectively. FIG. 2N is a top plan view of the cut guide 181. The cut guide 181 may be a single integrally formed component and may comprise a metal, a plastic, or other suitable material. The cut guide 181 is similar to the cut guide 180 of FIGS. 2H-2K, including a reversible configuration with a single slot 182.

The cut guide 181 generally includes a body 105, a first extension 184, a second extension 188, and a paddle 120. The first extension 184 and the second extension 188 can include first pin holes 186 and second pin holes 190 as described above with reference to FIGS. 2H-2K. The paddle 120 is sized and shaped to seat within a joint such as a TMT joint (e.g., between the first metatarsal and the first cuneiform), for example, after removing soft tissue such as the joint capsule around the joint. The relatively narrower and sloped terminal portion of the paddle 120 may facilitate insertion of the paddle 120 into the joint. In some embodiments, the paddle 120 is integrally formed with the body 105.

In the example embodiment of FIGS. 2L-2N, the body 105 of the cut guide 181 further includes one or more additional openings, such as additional convergent pin holes 183, extending through the second extension 188. The convergent pin holes 183 may be utilized to insert one or more additional pins or wires if additional stability is desired during a bunionectomy procedure. Similar to the cut guide 180 of FIGS. 2H-2K, longitudinal apertures 109 extend transverse to the slot 182 and may provide an opening to facilitate x-ray visualization and/or any other suitable surgical imaging procedure to confirm and/or monitor the alignment of the cut guide during a bunionectomy procedure.

Figure 3A:
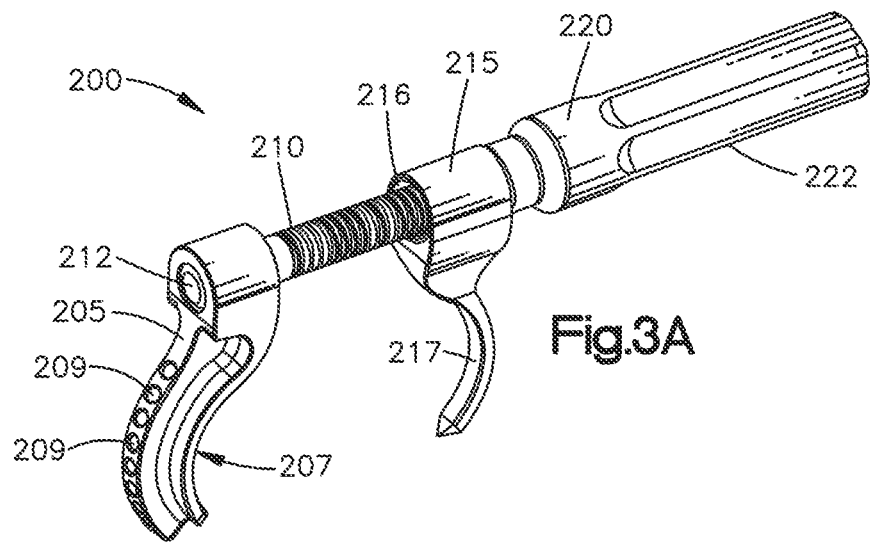
FIG. 3A is a perspective view of an example linear reducer configured to be used in the Lapidus bunionectomy procedures described herein.
Figure 3B:
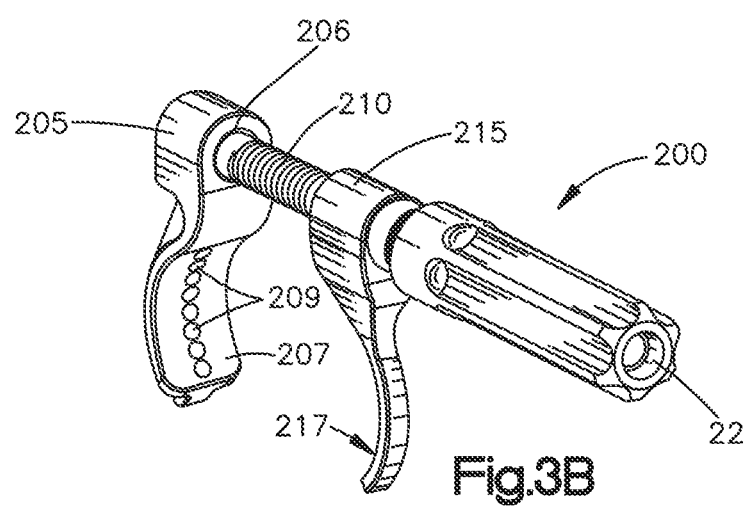
FIG. 3B is another perspective view of the linear reducer illustrated in FIG. 3A.
Figure 3C:
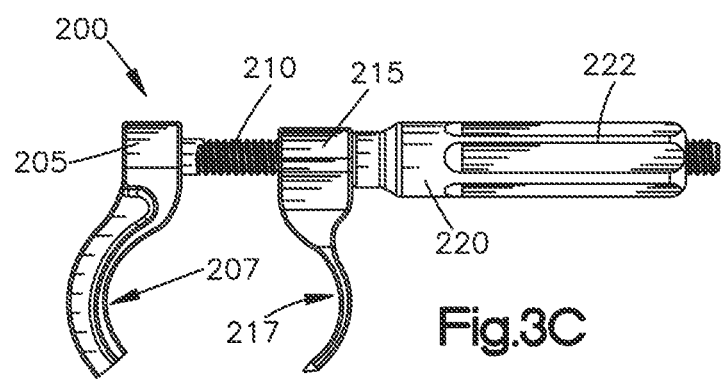
FIG. 3C is a side elevation view of the linear reducer illustrated in FIG. 3A.

FIGS. 3A-3H depict an example linear reducer 200 configured to be used in the Lapidus bunionectomy procedures described herein. With reference to FIGS. 3A-3C, the linear reducer 200 includes a medial hook 205, a threaded shaft 210, a lateral hook 215, and a handle 220. As will be described in greater detail with reference to FIGS. 10-14, the linear reducer 200 is suitable for applying correction within the transverse plane during a Lapidus bunionectomy procedure by moving the first and second metatarsals closer together to reduce the intermetatarsal angle, as well as maintaining the desired correction of the frontal plane when a pin is placed within medial hook pin holes 209.

The medial hook 205 includes a coupling aperture 206 sized and shaped to couple to a first end 212 of the threaded shaft 210. In some embodiments, the medial hook 205 may be fixedly coupled to the threaded shaft 210 such that the medial hook 205 is neither rotatable nor translatable relative to the threaded shaft 210. The medial hook 205 includes a curved engagement surface 207 configured to rest against the medial side of the foot. One or more medial hook pin holes 209 extend from the engagement surface 207 through the full thickness of the medial hook 205 such that a pin may be placed through the medial hook 205 to temporarily secure the medial hook 205 to the toe.

The lateral hook 215 includes a coupling aperture 216 sized and shaped to receive the threaded shaft 210 therethrough. The lateral hook 215 may have a smooth interior surface having a diameter at least as large as the full diameter of the threaded shaft 210 such that the lateral hook 215 can translate along the threaded shaft 210 without rotating. Other features of the coupling aperture may include a non-cylindrical profile such that, when the lateral hook 215 is assembled to the threaded shaft 210, the non-cylindrical profile prevents rotation of the lateral hook 215 about the axis of the threaded shaft 210. The lateral hook 217 includes a curved engagement surface 217 configured to rest against the lateral side of a bone such as the second metatarsal. In some embodiments, the engagement surface 217 may be inserted through an incision between, for example, the second and third toes such that the engagement surface 217 can be placed against the lateral side of the second metatarsal for transverse plane correction.

In various embodiments, the components of the linear reducer 200 may comprise a variety of materials. For example, the handle 220, the threaded shaft 210, the medial hook 205, and/or the lateral hook 205 may comprise a metal, a plastic or polymeric material, or the like. In some embodiments, the medial hook 205 and/or the lateral hook 215 may comprise a radiolucent material. Advantageously, a radiolucent material may be at least partially transmissive to x-rays or other radiation associated with medical imaging, so as to facilitate imaging of the bones of the foot while the linear reducer 200 is applied. Example radiolucent materials suitable for the medial hook 205 and/or the lateral hook 215 include carbon fiber, polymeric materials, and/or composite materials such as a carbon fiber reinforced polymer.

The handle 220 includes one or more grip features 222 such as knurling to facilitate a user's grip while rotating the handle 220. A threaded aperture 224 extends longitudinally through the handle 220. The interior threading of the threaded aperture 224 is sized and spaced to mesh with the exterior threading of the threaded shaft 210. In some embodiments, only a portion of the threaded aperture 224 is threaded, for example, with any remaining length drilled to a larger diameter to allow clear pass-through of the threaded shaft 210. Thus, the interior threading of the threaded aperture 224 allows the handle 220 to be translated to a desired position along the threaded shaft 210 by rotating the handle 220 about the threaded shaft 210. Accordingly, when a user wishes to decrease the spacing between the medial hook 205 and the lateral hook 215, the user twists the handle 220 clockwise about the threaded shaft 210 such that the handle 220 pushes the lateral hook 215 along the threaded shaft 210 toward the medial hook 205. Friction between the interior threading of the threaded aperture 224 and the exterior threading of the threaded shaft 210 prevents the lateral hook 215 and handle 220 from being pushed outward away from the medial hook 205 unless the handle 220 is twisted.

FIG. 3D illustrates an alternative embodiment of the lateral hook 215. In the alternative lateral hook 215 of FIG. 3D, the engagement surface 217 includes one or more bone engagement features 218 configured to provide an improved grip on the lateral surface of the second metatarsal bone during a Lapidus bunionectomy. In some cases, the bone engagement features 218 may reduce the probability of the lateral hook 215 sliding upward away from the second metatarsal during or following reduction of the intermetatarsal angle within the transverse plane.

Figure 3G:
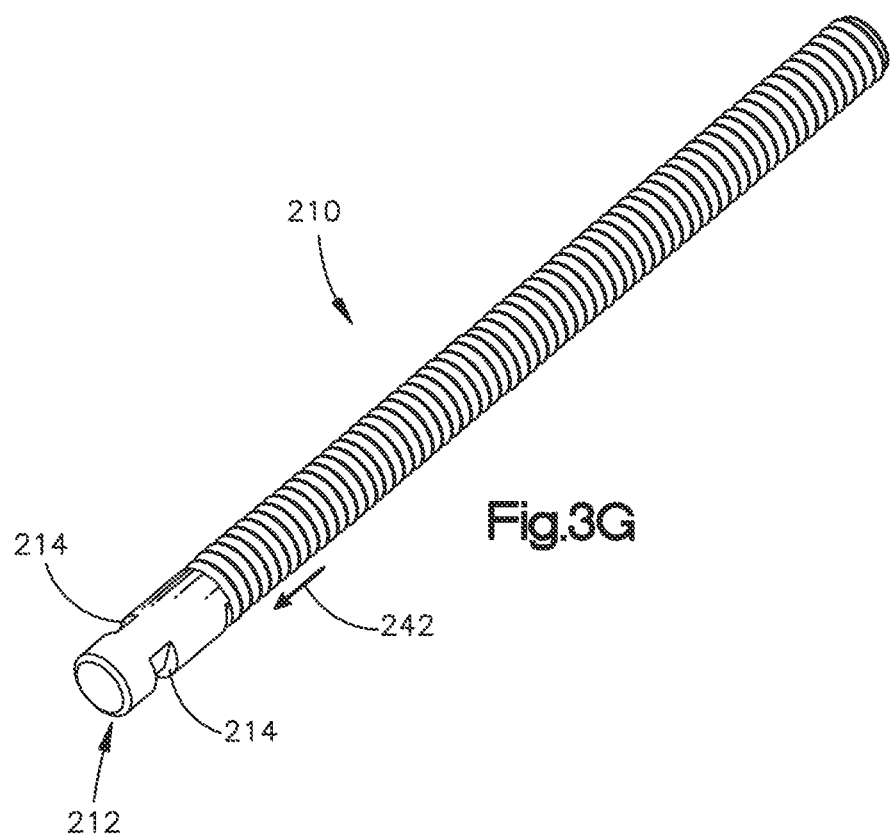
FIG. 3G is a perspective view of a threaded shaft of the linear reducer illustrated in FIG. 3A.

FIGS. 3E-3G illustrate a quick-release feature that may be incorporated at the medial hook of the linear reducer 200. In a quick-release embodiment of the linear reducer 200, the fixedly coupled medial hook 205 of FIGS. 3A-3C is replaced by a quick-release medial hook 235. The quick-release medial hook 235 includes an aperture 236 large enough to slidably accommodate the threaded shaft 210. A quick-release insert 237 is insertable within the upper portion of the quick-release medial hook 235. The quick-release insert 237 has a coupling aperture 239 including a locking portion 238 configured to interlock with notches 214 near the first end 212 of the threaded shaft 210. Thus, when the quick-release insert 237 is in the raised position shown in FIG. 3E, the locking portion 238 is engaged within the notches 214 to fixedly couple the quick-release medial hook 235 to the threaded shaft.

When it is desired to remove the linear reducer 200 from the foot, the quick-release insert 237 is pushed downward along the direction 240. As the quick-release insert 237 moves downward, the locking portion 238 disengages from the notches 214 in the threaded shaft 210, such that the entire quick-release medial hook becomes slidable along a longitudinal direction 242 relative to the threaded shaft 210. For example, with the quick-release medial hook 235 pinned to the bone, the threaded shaft 210 may be removed through the coupling aperture 216 of the lateral hook 215, and the lateral hook 215 may be removed from the foot substantially vertically. The medial hook 205 may then be unpinned and removed from the foot easily.

Figure 3H:
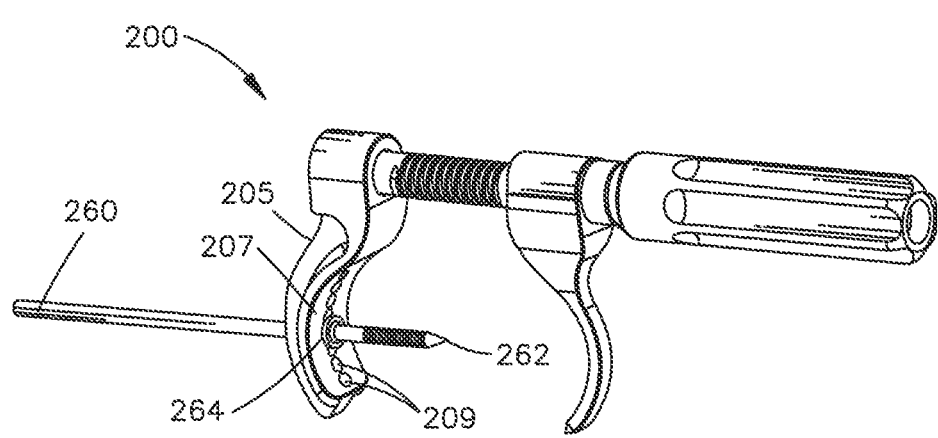
FIG. 3H is a perspective view of the linear reducer illustrated in FIG. 3A including a shouldered pin.

Referring now to FIG. 3H, in some embodiments a shouldered pin 260 may be used in conjunction with the linear reducer 200. Although any type of pin may be used, a shouldered pin 260 may advantageously prevent damage to the skin of the medial side of a foot when the linear reducer 200 is used. The shouldered pin 260 includes a tip 262 which enters the foot and a shoulder 264 which extends radially outward from the sides of the shouldered pin 260. The shoulder 264 is preferably larger than the medial hook pin holes 209 such that the shoulder 264 prevents the shouldered pin 260 from sliding outward through the medial hook pin hole 209. Accordingly, when the shouldered pin 260 is inserted into the medial side of a first metatarsal and the linear reducer 200 is manipulated to reduce the intermetatarsal angle of the foot, the lateral force exerted by the medial hook 205 is transferred to the first metatarsal via the shoulder 264, rather than through the skin along the engagement surface 207, reducing the probability of compression and/or damage to the skin of the foot. In some embodiments, a shouldered pin 260 may be used in conjunction with the quick-release medial hook 235 depicted in FIGS. 3E-3G.

Figure 4A:
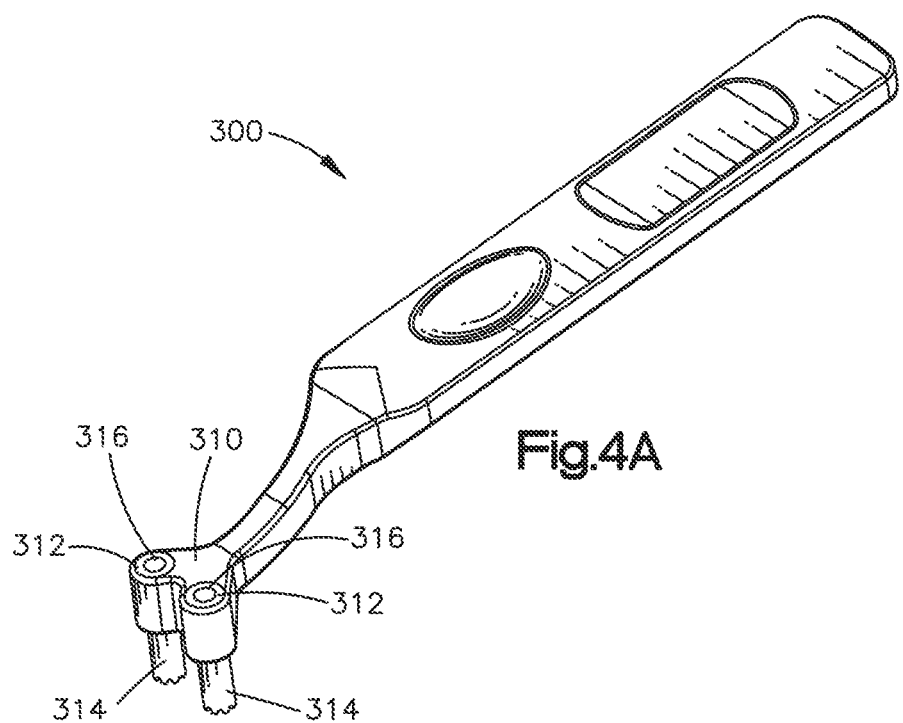
FIG. 4A is a perspective view of an example control handle configured to be used in the Lapidus bunionectomy procedures described herein.
Figure 4B:
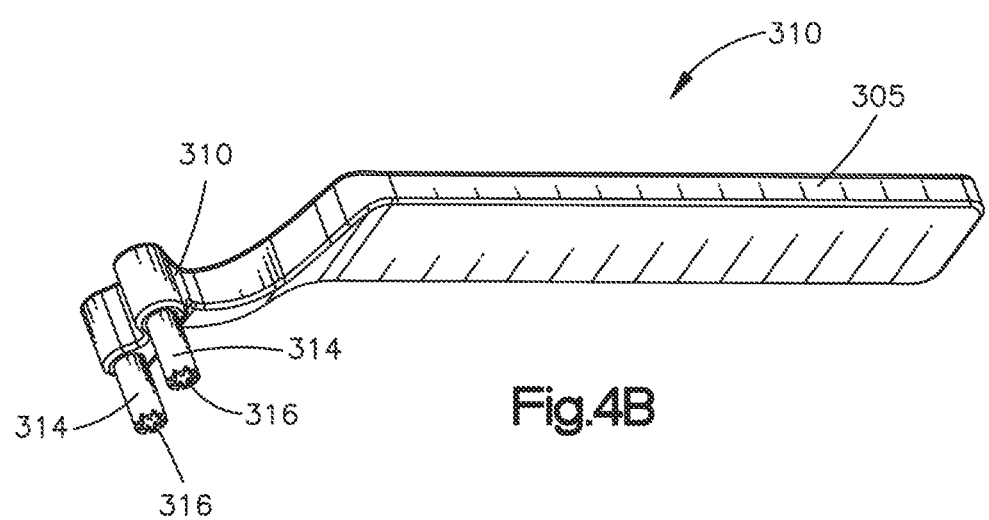
FIG. 4B is another perspective view of the control handle illustrated in FIG. 4A.

FIGS. 4A and 4B depict an example control handle 300 configured to be used in the Lapidus bunionectomy procedures described herein. As will be described in greater detail with reference to FIGS. 11-14, the linear reducer 200 is suitable for applying correction within the frontal plane or other planes during a Lapidus bunionectomy procedure by rotating the first metatarsal relative to the first cuneiform. The control handle 300 is only one example of a handle that could be attached to the cut guide 100. Those skilled in the art will appreciate that a variety of attachments may be made between a control handle and the cut guide 100 without departing from the scope of the present technology.

The control handle 300 includes a handle 305 and an engagement portion 310 connected to the handle. Apertures 312 within the engagement portion 310 and/or pin guides 314 disposed within the apertures 312 are spaced to receive pins placed within the first metatarsal according to the spacing of the distal pin holes 117 or 170 of the cut guide 100 or the free-hand pin guide 150. The spacing of the apertures 312 also corresponds to the spacing of the proximal pin holes 112 or 165. The spaces 316 within the pin guides 314 are suitably large to receive surgical pins or wires.

Figure 5A:
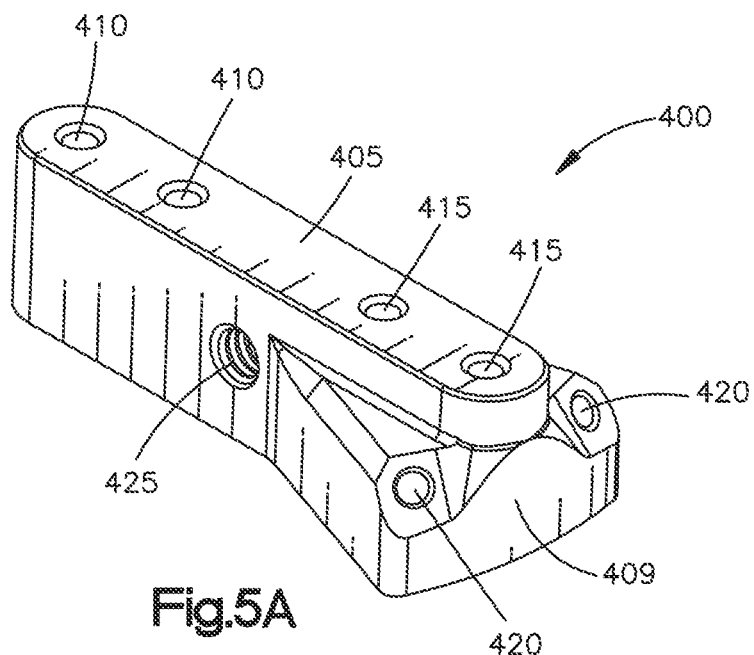
FIG. 5A is a perspective view of an example compressor block configured to be used in the Lapidus bunionectomy procedures described herein.
Figure 5B:
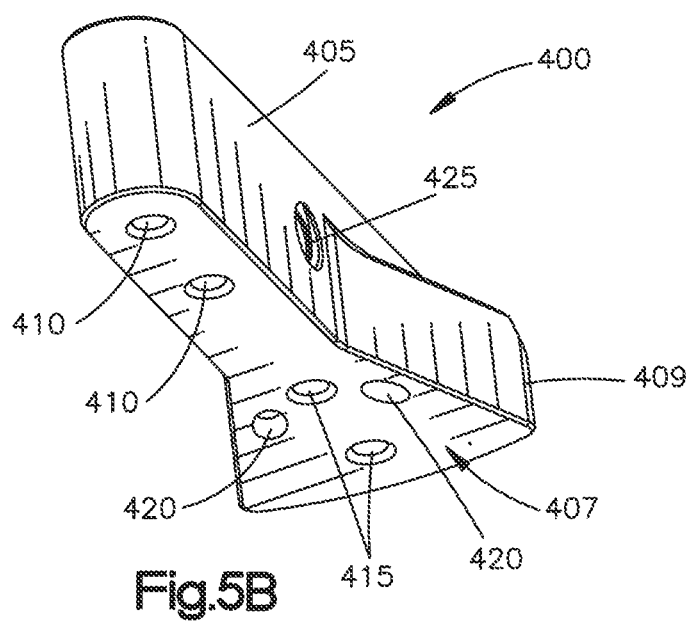
FIG. 5B is another perspective view of the compressor block illustrated in FIG. 5A.
Figure 5C:
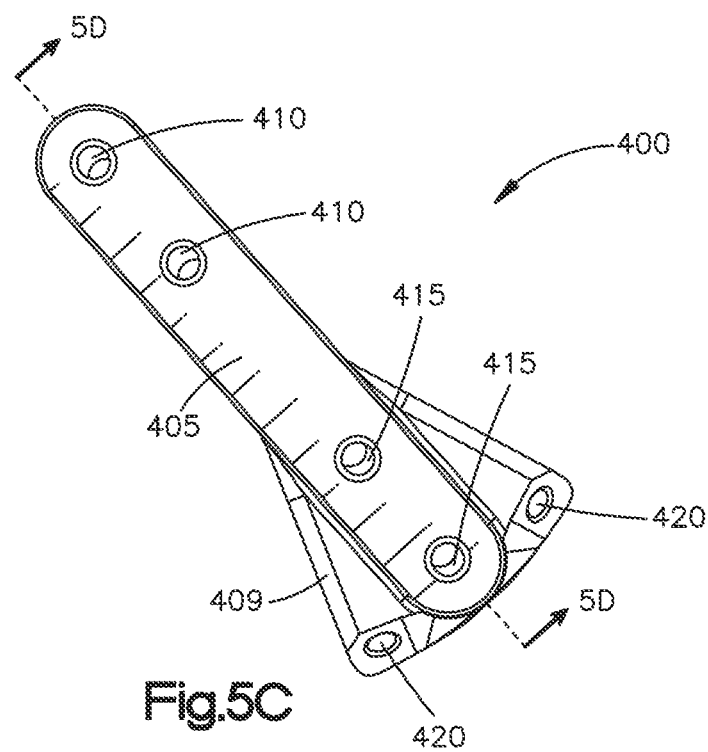
FIG. 5C is a top plan view of the compressor block illustrated in FIG. 5A.
Figure 5D:
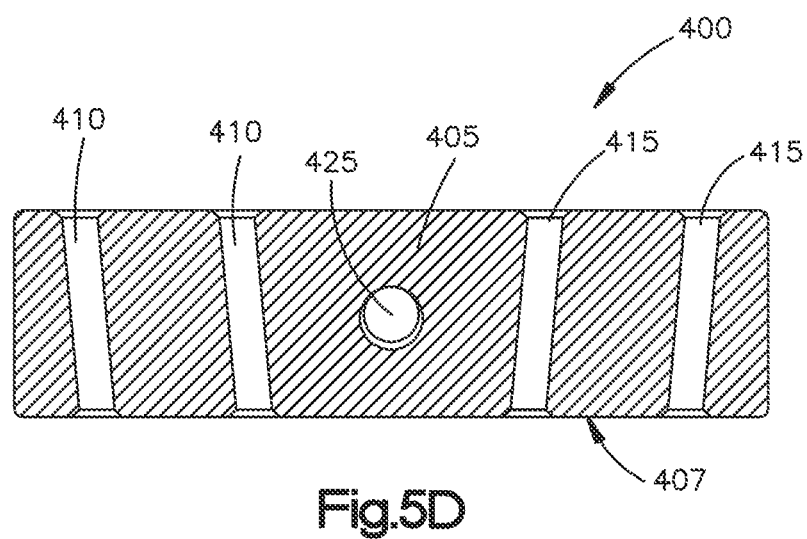
FIG. 5D is a cross-sectional view of the compressor block illustrated in FIG. 5A.

FIGS. 5A-5D depict an example compressor block 400 configured to be used in the Lapidus bunionectomy procedures described herein. FIGS. 5A and 5B are upper and lower perspective views of the compressor block 400, respectively. FIG. 5C is a top plan view of the compressor block 400. FIG. 5D is a cross-sectional side elevation view of the compressor block 400 taken about the line 5D-5D in FIG. 5C. As will be described in greater detail, with reference to FIGS. 16-18, the compressor block 400 is configured to assist in compressing and fixing a resected joint that has been free-hand cut or cut using the cut guide 100.

Figure 15:
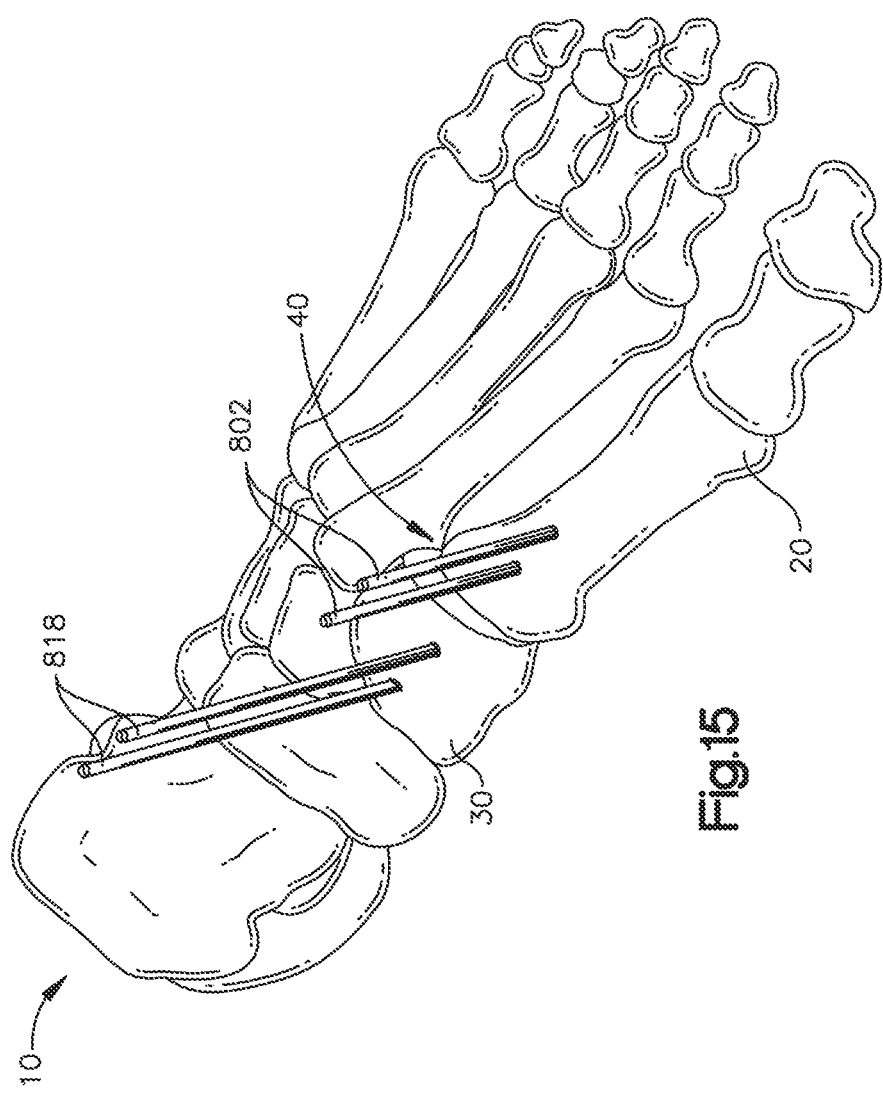
Figure 16:
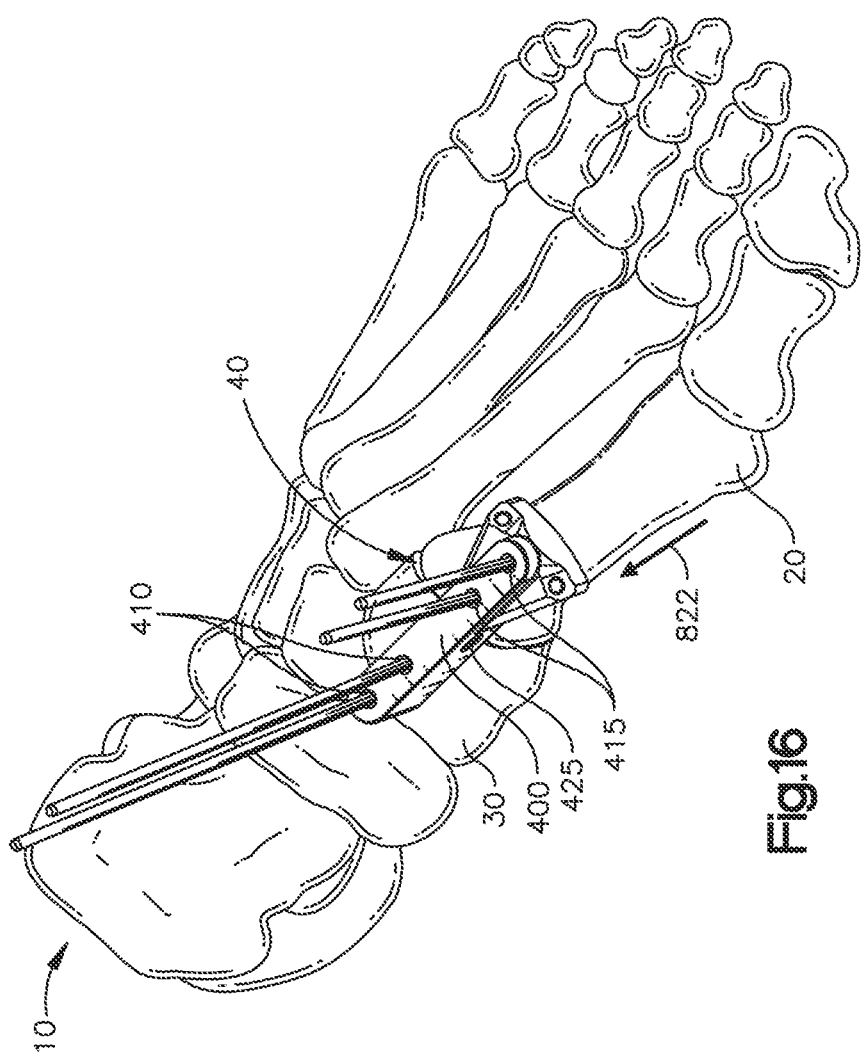

The compressor block 400 includes a body 405 having proximal pin holes 410 and distal pin holes 415 extending therethrough. The proximal pin holes 410 are spaced relative to each other by the same spacing as that of the proximal pin holes 112, 165 of the cut guide 100 and the free-hand pin guide 150. Similarly, the distal pin holes 415 are spaced relative to each other by the same spacing as that of the distal pin holes 117, 170 of the cut guide 100 and the free-hand pin guide 150. However, the proximal pin holes 410 and the distal pin holes 415 are each located closer to the center of the compressor block 400 than the proximal pin holes 112, 165 and the distal pin holes 117, 170 of the cut guide 100 and the free-hand pin guide 150. Additionally, as shown in the cross-sectional view of FIG. 5D, the proximal pin holes 410 and the distal pin holes 415 are not parallel and are disposed at converging angles such that their spacing at the bottom edge 407 of the compressor block 400 is relatively closer. Thus, parallel pins threaded into the proximal apertures 410 and the distal apertures 415 are compressed closer together as the compressor block 400 slides downward over the pins, as shown in FIGS. 15-16. A handle attachment aperture 425, which may be threaded, is provided for attaching a side-mounted handle which may assist the user in sliding the compressor block 400 downward to compress pins or wires passing through the compressor block 400.

Figure 17:
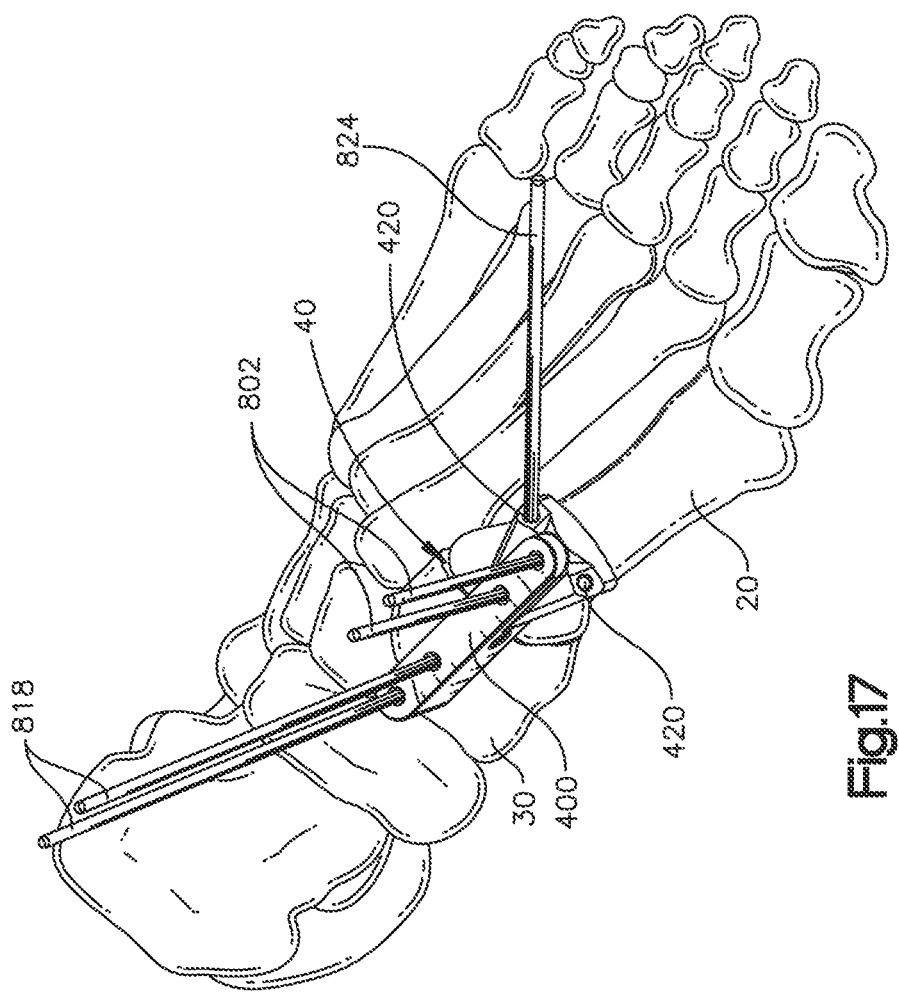
Figure 18:
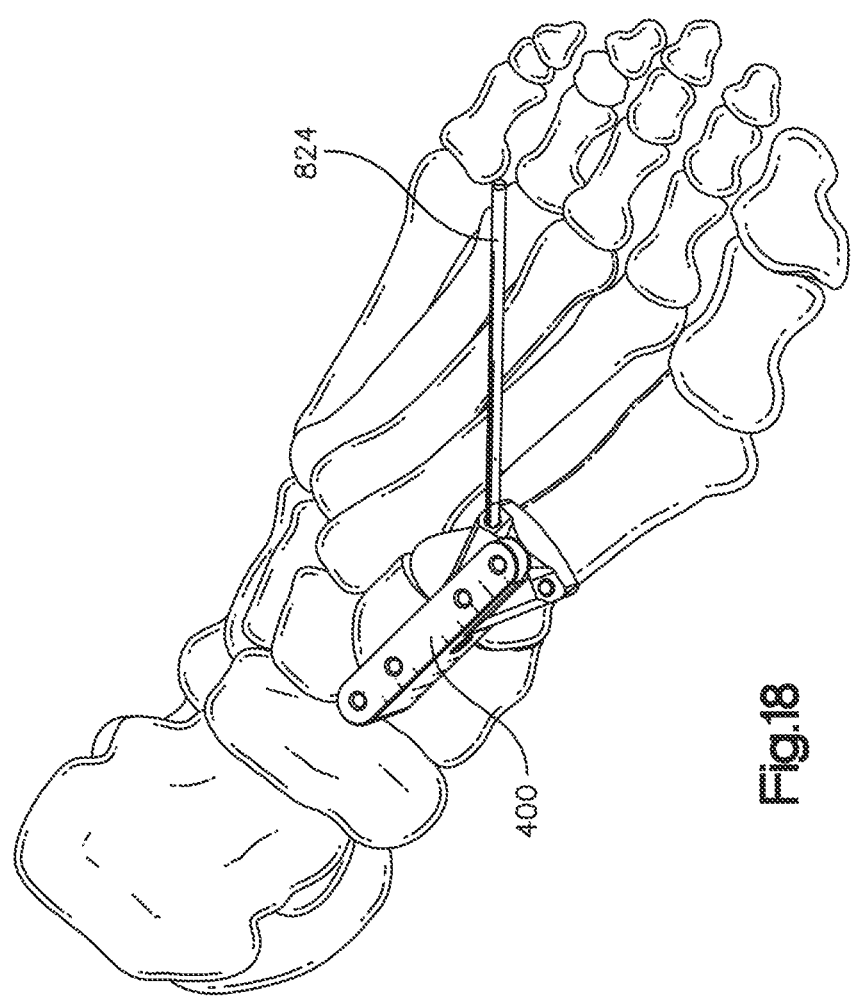

The compressor block 400 further includes widened section 409 containing cross pin holes 420. As shown in FIGS. 5A and 5B, each cross pin hole 420 extends downward and inward from an outer edge of the widened section 409 such that a pin or wire inserted into a cross pin hole 420 exits the bottom edge 407 of the compressor block 400 relatively nearer the centerline of the compressor block 400. As shown in FIGS. 16-18, the cross pin holes 420 are aligned such that, when the compressor block 400 is used in conjunction with the cut guide 100 or free-hand pin guide 150 at the first TMT joint, the compressor block 400 brings the cut faces of the resected first TMT joint into contact with each other and a pin inserted through either cross pin hole 420 will extend at an angle through the interface of the compressed joint to temporarily maintain contact at the joint face until the first cuneiform and the first metatarsal can be fixed by a plate or other fixing component.

FIGS. 6A-6G depict an example bone plate 500 and cross screw 530 configured to be used in the Lapidus bunionectomy procedures described herein. The bone plate 500 and/or the cross screw 530 can be formed of a variety of metals or alloys. For example, the bone plate may be formed of titanium, a shape-memory alloy such as nitinol, or the like.

The bone plate 500 is sized and shaped to be applied across a resected first TMT joint. Accordingly, the bone plate 500 comprises a body 505 including a staple aperture 510, cuneiform screw apertures 515, a metatarsal screw aperture 520, and a cross screw aperture 525. The staple aperture 510 includes two holes 512 sized and shaped to accommodate the two legs of a bone staple such that one of the legs is seated within the first cuneiform near the cuneiform screw apertures 515 and the other leg is seated within the first metatarsal near the metatarsal screw aperture 520 and the cross screw aperture 525.

The staple aperture 510 and each of the screw apertures 515, 520, 525 is shaped to include a countersink to reduce motion of staples and/or screws seated therein. In addition, the countersinks may allow a staple or screw applied therein to not extend significantly above the outer surface of the body 505 of the bone plate 500. Due to the angle at which a cross screw must be applied in the cross screw aperture 525, the cross screw aperture 525 has an elliptical shape when viewed perpendicular to the bone plate 500 (e.g., corresponding to a cylindrical profile along a screw path through the cross screw aperture 525) and includes a shelf 527 occupying approximately one half of the perimeter of the cross screw aperture 525. The shelf 527 is shaped to engage with the head of a cross screw when the cross screw is inserted at a pre-drilled angle, such that the cross screw securely engages the bone plate 500 and seats within the countersink.

Figure 6A:
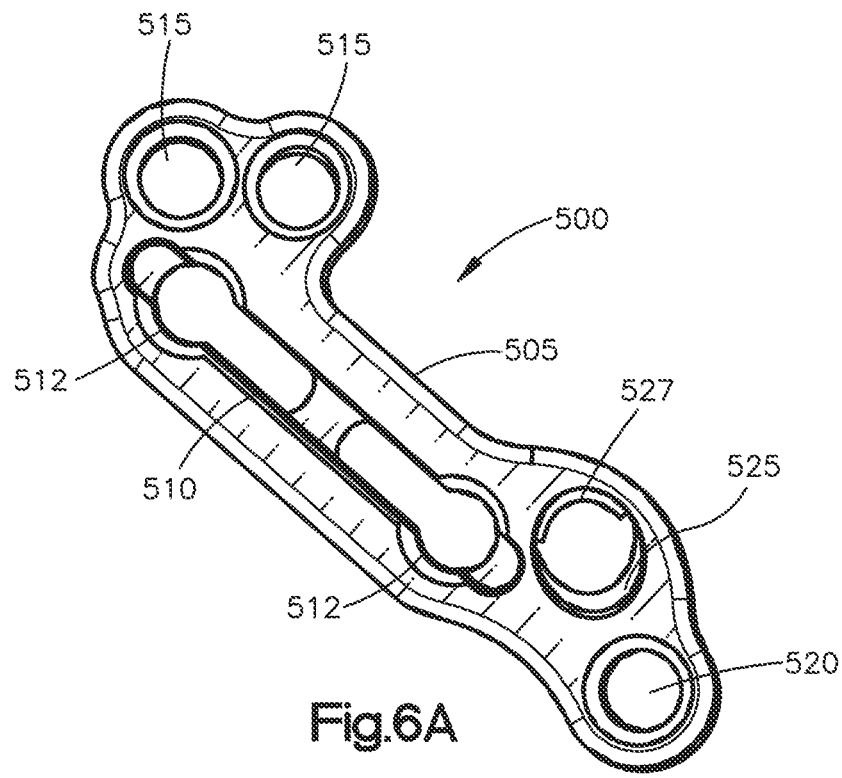
FIG. 6A is a top plan view of an example bone plate configured to be used in the Lapidus bunionectomy procedures described herein.
Figure 6B:
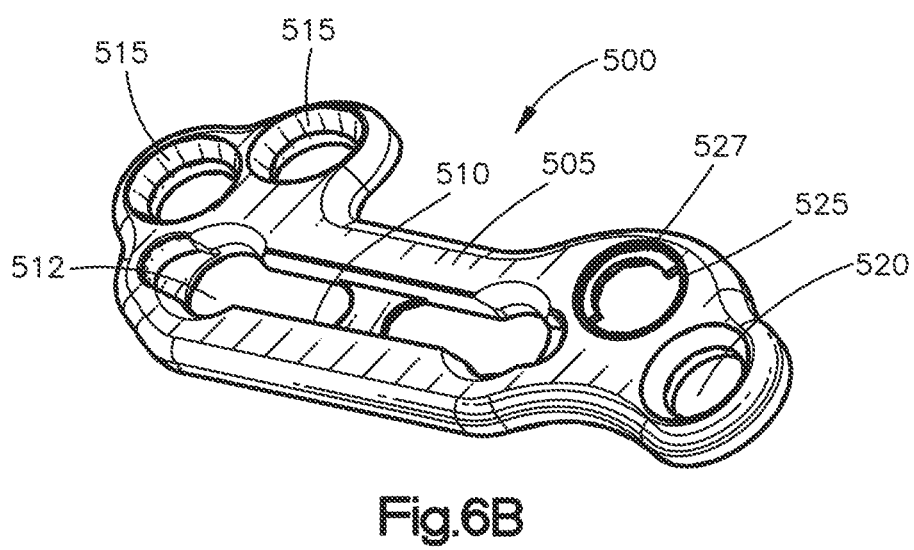
FIG. 6B is a perspective view of the bone plate illustrated in FIG. 6A.
Figure 6C:
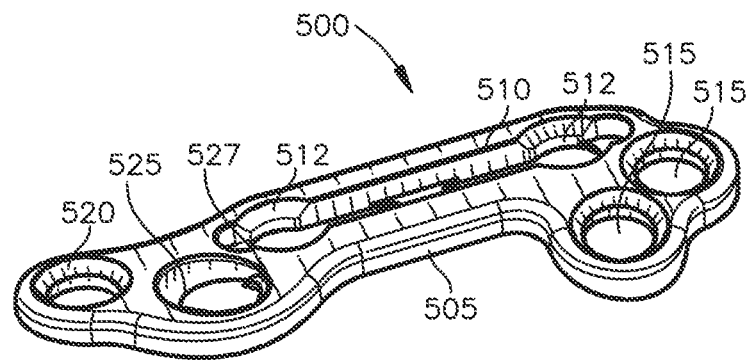
FIG. 6C is another perspective view of the bone plate illustrated in FIG. 6A.
Figure 6D:
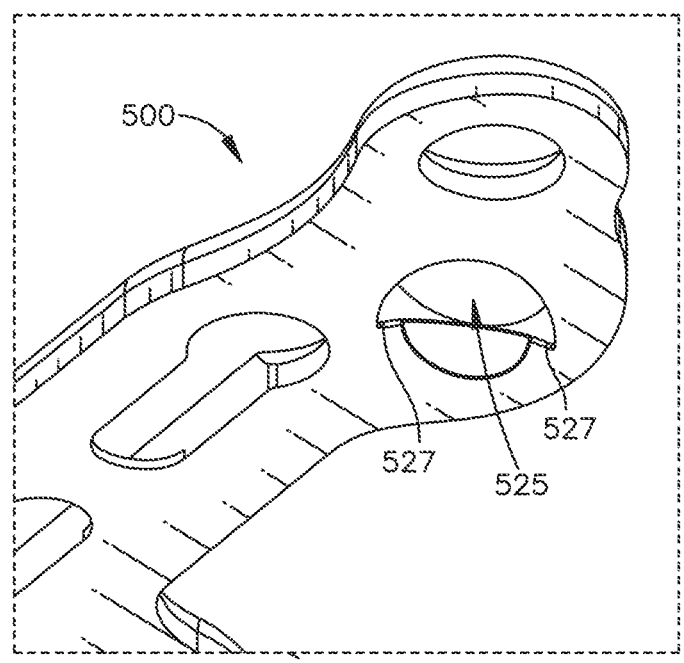
FIG. 6D is an enlarged perspective view of a portion of the bone plate illustrated in FIG. 6A.
Figure 6E:
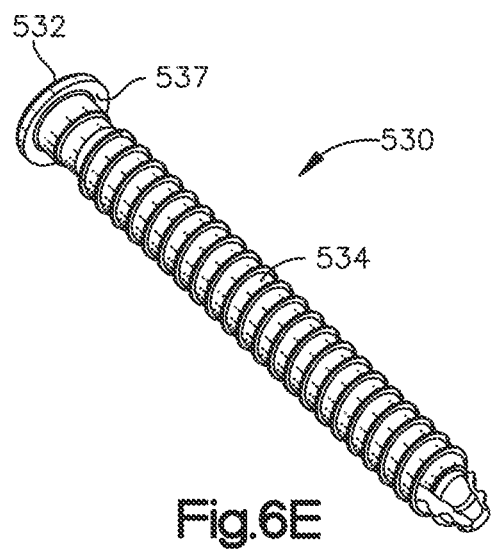
FIG. 6E is a perspective view of a cross screw usable with the bone plate illustrated in FIG. 6A.
Figure 6F:
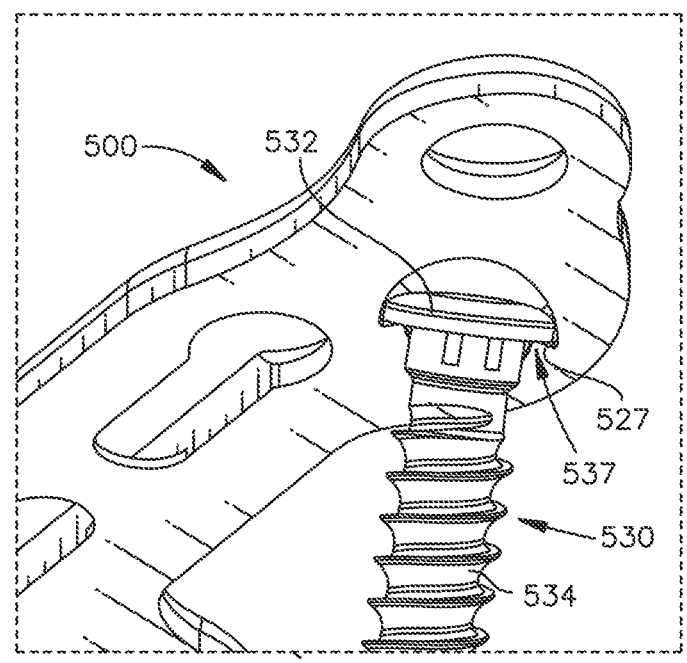
FIG. 6F is an enlarged perspective view of the cross screw of FIG. 6E shown inserted through the bone plate illustrated in FIG. 6A.
Figure 6G:
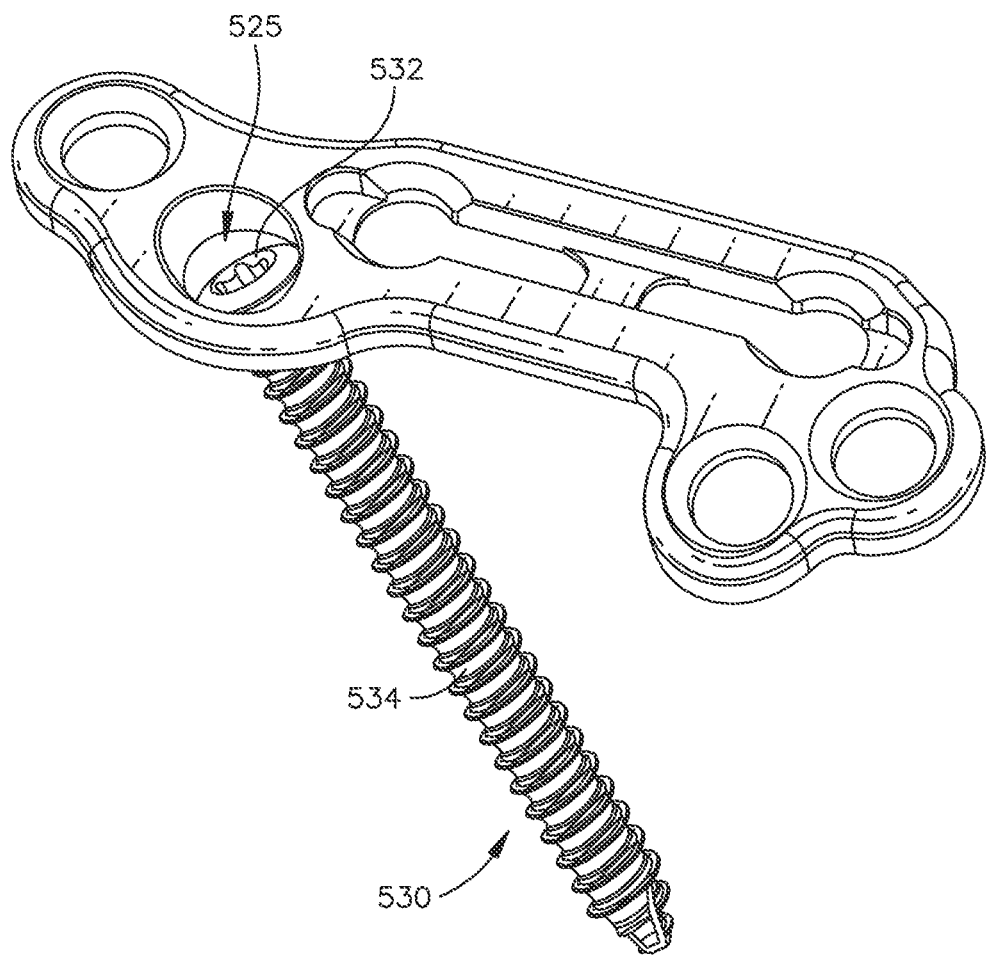
FIG. 6G is a perspective view of the cross screw of FIG. 6E shown inserted through the bone plate illustrated in FIG. 6A.

FIG. 6D is an expanded partial view of the bone plate 500, illustrating in detail the cross screw aperture 525 and the shelf 527. FIG. 6E illustrates an example cross screw 530 configured to be seated within the cross screw aperture 525, including a head 532 and a threaded shaft 534. As shown in FIG. 6D, which is taken perpendicular to an axis of a cross screw path, the shelf 527 can be canted or tapered such that an inner edge of the shelf 527 is higher relative to an outer edge where the shelf 527 meets the interior wall of the cross screw aperture 525. As shown in FIG. 6E, the head 532 of the cross screw 530 has an undercut shelf 537. The shelf 537 is tapered downward as the diameter increases in this embodiment. Accordingly, as shown in FIGS. 6F and 6G, when the cross screw 530 is inserted through the cross screw aperture 525, the undercut shelf 537 of the head 532 of the cross screw 530 engages with the upwardly tapering shelf 527 of the bone plate 500 such that the bone screw 530 seats at the desired angle within the bone.

Figure 7A:
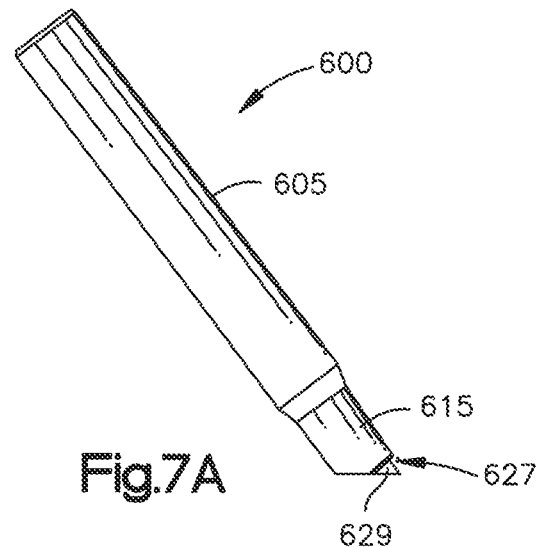
FIG. 7A is a perspective view of an example fixed-angle cross screw drill guide configured to be used in the Lapidus bunionectomy procedures described herein.
Figure 7B:
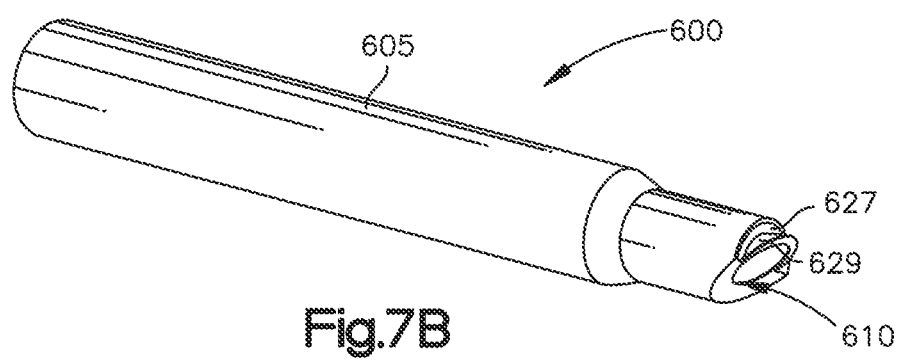
FIG. 7B is another perspective view of the fixed-angle cross screw drill guide illustrated in FIG. 7A.
Figure 7C:
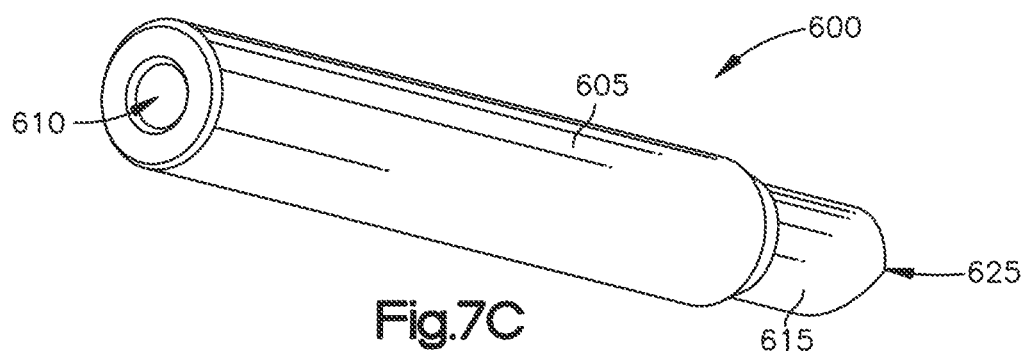
FIG. 7C is another perspective view of the fixed-angle cross screw drill guide illustrated in FIG. 7A.
Figure 7D:
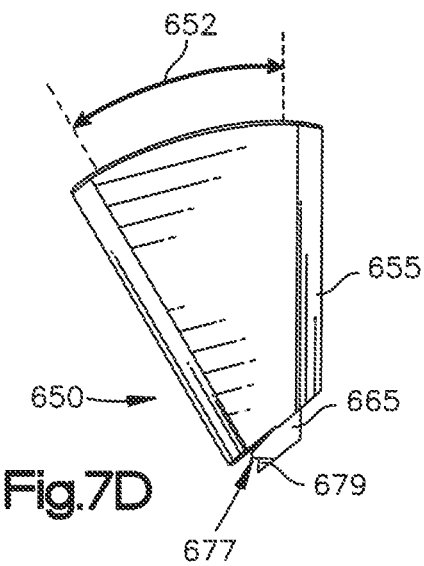
FIG. 7D is a side elevation view of an example variable-angle cross screw drill guide configured to be used in the Lapidus bunionectomy procedures described herein.
Figure 7E:
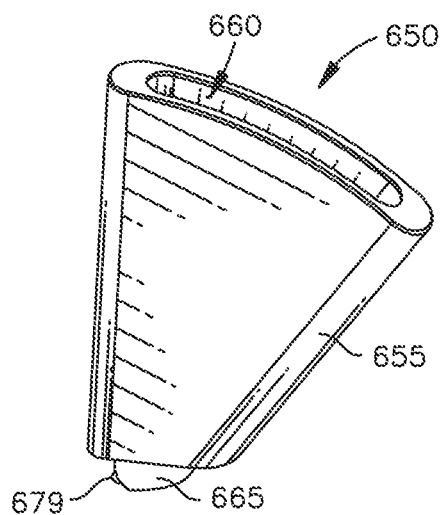
FIG. 7E is a perspective view of the variable-angle cross screw drill guide illustrated in FIG. 7D.
Figure 7F:
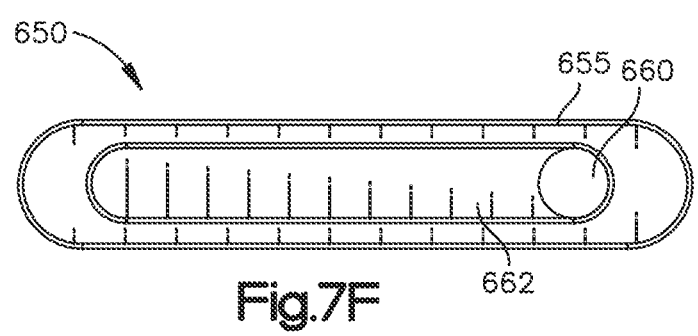
FIG. 7F is a top plan view of the variable-angle cross screw drill guide illustrated in FIG. 7D.

FIGS. 7A-7F depict example cross screw drill guides configured to be used in conjunction with the bone plate 500 when applying the cross screw through the cross screw aperture 525. FIGS. 7A-7C depict an example fixed-angle cross screw drill guide 600. FIGS. 7D-7F depict an example variable-angle cross screw drill guide 650 which allows a surgeon to select one of a range of angles for insertion of the cross screw.

The fixed-angle cross screw drill guide 600 includes a body 605 and a tip 615. A lengthwise aperture 610 extends through the full length of the body 605. The diameter of the lengthwise aperture 610 may be selected such that a drill bit, suitably sized to drill a pilot hole for a cross screw, can fit through the lengthwise aperture 610. In some embodiments, the diameter of the lengthwise aperture 610 may be selected such that a k-wire or other guide structure can fit through the lengthwise aperture 610, such that the guide may be removed, and a cannulated drill bit may be used to drill a pilot hole. The tip 615 includes a shelf engagement surface 627 and a toe 629. The toe 629 and the shelf engagement surface 627 are shaped such that the toe 629 can be seated within the cross screw aperture 525 with the shelf engagement surface 627 seated against the shelf 527 of the cross screw aperture 525. The elliptical shape of the cross screw aperture 525 defines a single stable orientation for seating the tip 615 of the fixed-angle cross screw drill guide 600 therein. The fixed-angle cross screw drill guide 600 facilitates consistent and reproducible application of a cross screw at a predetermined suitable angle to prevent bunion recurrence. Additionally, the fixed-angle cross screw drill guide 600 can force the entry of the drill bit into bone at a location concentric with the radius of curvature of the shelf 527 of the bone plate 500 (e.g., because a screw may still be able to pass through the bone plate 500 even if the hole is incorrectly drilled). Moreover, the fixed-angle cross screw drill guide 600 establishes the drill bit at an angle that prevents the cross screw from interfering with the staple leg, prevents the cross screw from crossing the TMT joint, and directs the cross screw toward the base of the second metatarsal or the second cuneiform.

The variable-angle cross screw drill guide 650 similarly includes a body 655 and a tip 665, as well as an aperture 660 extending through the body 655. The tip 665 has the same shape as the tip 615 of the fixed-angle cross screw drill guide 600, including a shelf engagement surface 677 and a toe 679, such that the elliptical shape of the cross screw aperture 525 similarly defines a single stable orientation for seating the tip 665 of the variable-angle cross screw drill guide 650 therein. The variable-angle cross screw drill guide 650 has a generally wedge-shaped body 655 surrounding a wedge-shaped slot 662 in communication with the aperture 660. The wedge-shaped slot 662 accommodates a range 652 of drilling angles whose paths pass through the aperture 660. Thus, while the elliptical shape of the cross screw aperture 525 defines a single seating orientation of the variable-angle cross screw drill guide 650, the wedge-shaped slot 662 allows the surgeon to select a variety of angles within a predetermined plane. The available drilling paths can range from a first extreme path which is perpendicular or nearly perpendicular relative to the bone plate 500, to a second extreme path at a smaller angle relative to the bone plate 500. Depending on the geometry of the bone structure of an individual foot, the variable-angle cross screw drill guide 650 can allow a surgeon to select a cross screw trajectory, for example, to enter the second metatarsal or the second cuneiform as desired.

With reference to FIGS. 8-24, an example Lapidus bunionectomy using certain devices disclosed herein will be described. Although the procedure of FIGS. 8-24 illustrates a particular implementation of a Lapidus bunionectomy using a specific subset of the devices disclosed herein, it will be understood that the components and steps illustrated and described with reference to FIGS. 8-24 may equally be applied in different sequences and/or with different combinations of components to correct a bunion.

Figure 8:
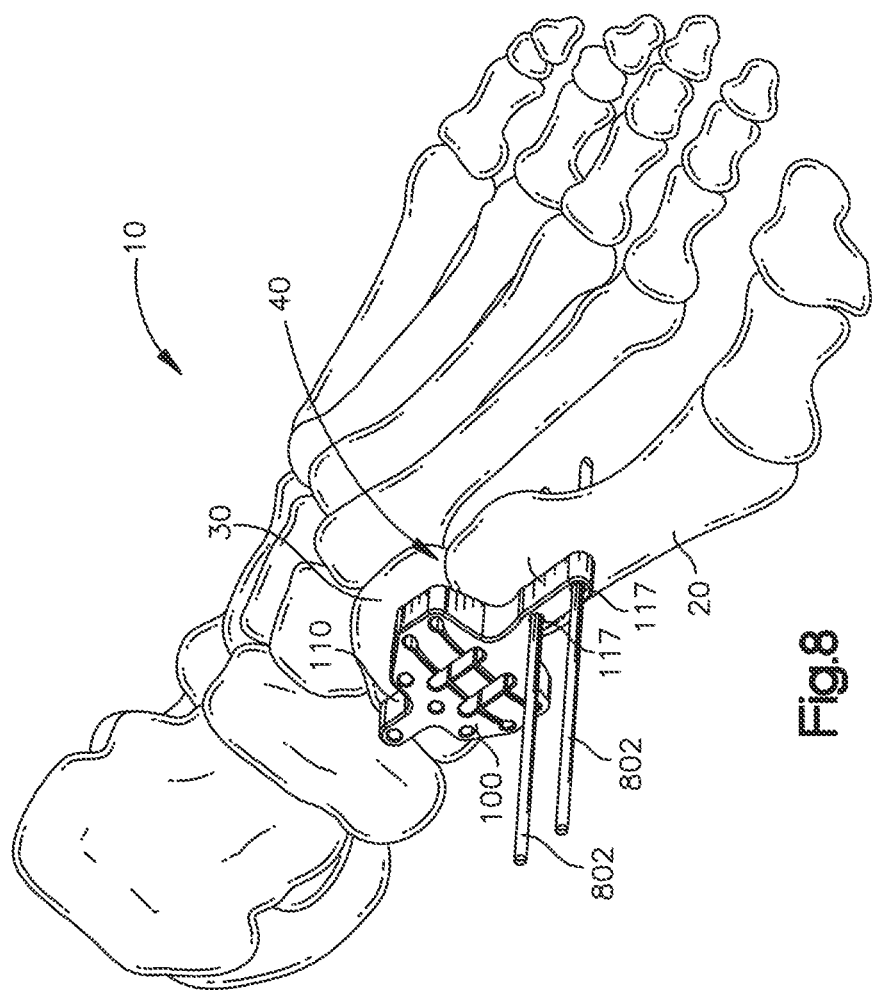

FIGS. 8-24 depict the bones of a foot 10 initially having a bunion. Similar to the foot 10 of FIG. 1, the foot 10 includes a first metatarsal 20 that is angled and rotated relative to the first cuneiform 30 at the first TMT joint 40 such that the big toe has an undesirable medial protrusion and an increased intermetatarsal angle. As shown in FIG. 8, the procedure may begin by placing and temporarily securing the cut guide 100 of FIGS. 2A-2D. Prior to placing the cut guide, the surgeon may prepare the first TMT joint 40 by making an incision such as a dorsomedial incisions to expose the first TMT joint 40 and excising soft tissue around the joint, such as the joint capsule or other soft tissue, to expose the first TMT joint 40 and create a space in which the paddle 120 (FIGS. 2A-2D) of the cut guide 100 can be seated.

Once the joint has been prepared, the cut guide 100 is placed by seating the paddle 120 (not visible in FIG. 8) within the first TMT joint 40 such that proximal extension 110 sits adjacent to or against the first cuneiform 30 and the distal extension 115 sits adjacent to or against the first metatarsal 20. The paddle 120 is inserted into the first TMT joint 40 such that the cut guide 100 is oriented along the axis of the first metatarsal 20. The alignment of the cut guide 100 may be confirmed under fluoroscopy or other suitable imaging technique before proceeding.

When the cut guide 100 has been placed and is suitably aligned, the cut guide 100 is temporarily secured relative to the first metatarsal 20 by inserting two metatarsal pins 802 or wires through the distal pin holes 117 of the distal extension 115 and into or through the first metatarsal 20. The metatarsal pins 802 or wires, as well as any of the other pins or wires described in the following description, may be, for example, a Kirschner wire ("K-wire"), or any other suitable type of wire or pin that can be placed into the bone to secure the cut guide 100.

Figure 9:
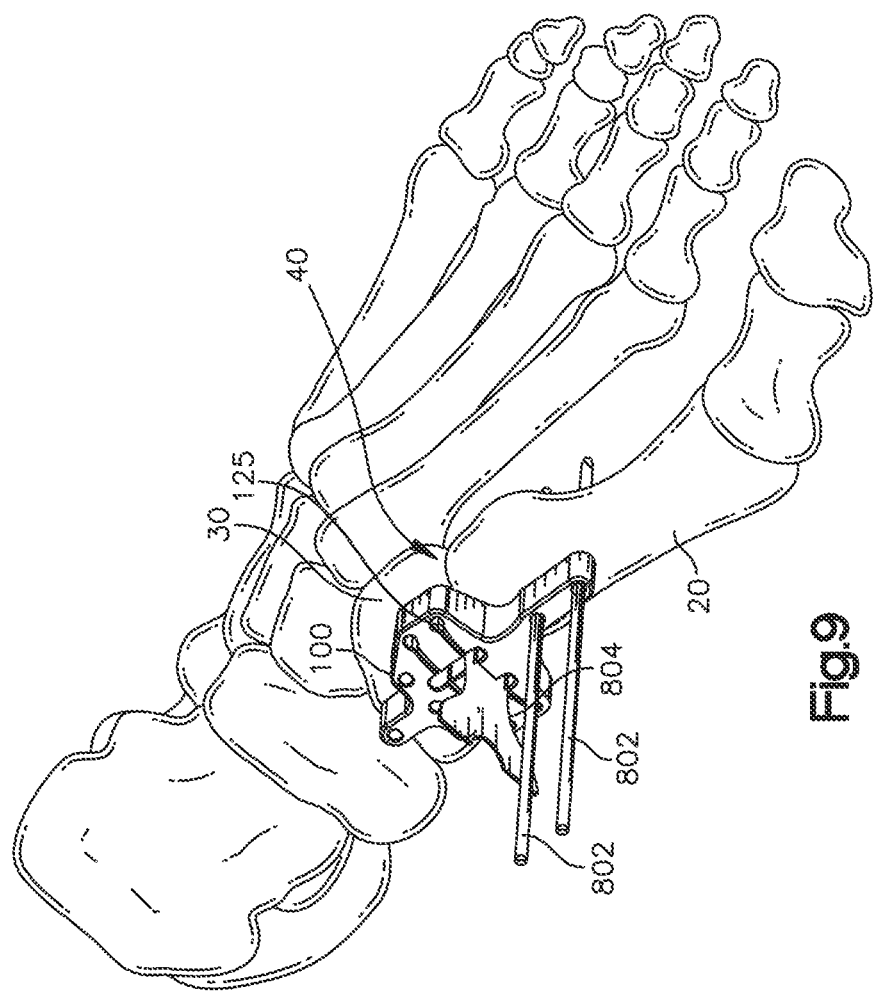

Continuing to FIG. 9, once the metatarsal pins 802 or wires are inserted, the base of the first metatarsal 20 is cut using a saw blade 804 inserted through the distal slot 125 of the cut guide 100.

Figure 10:
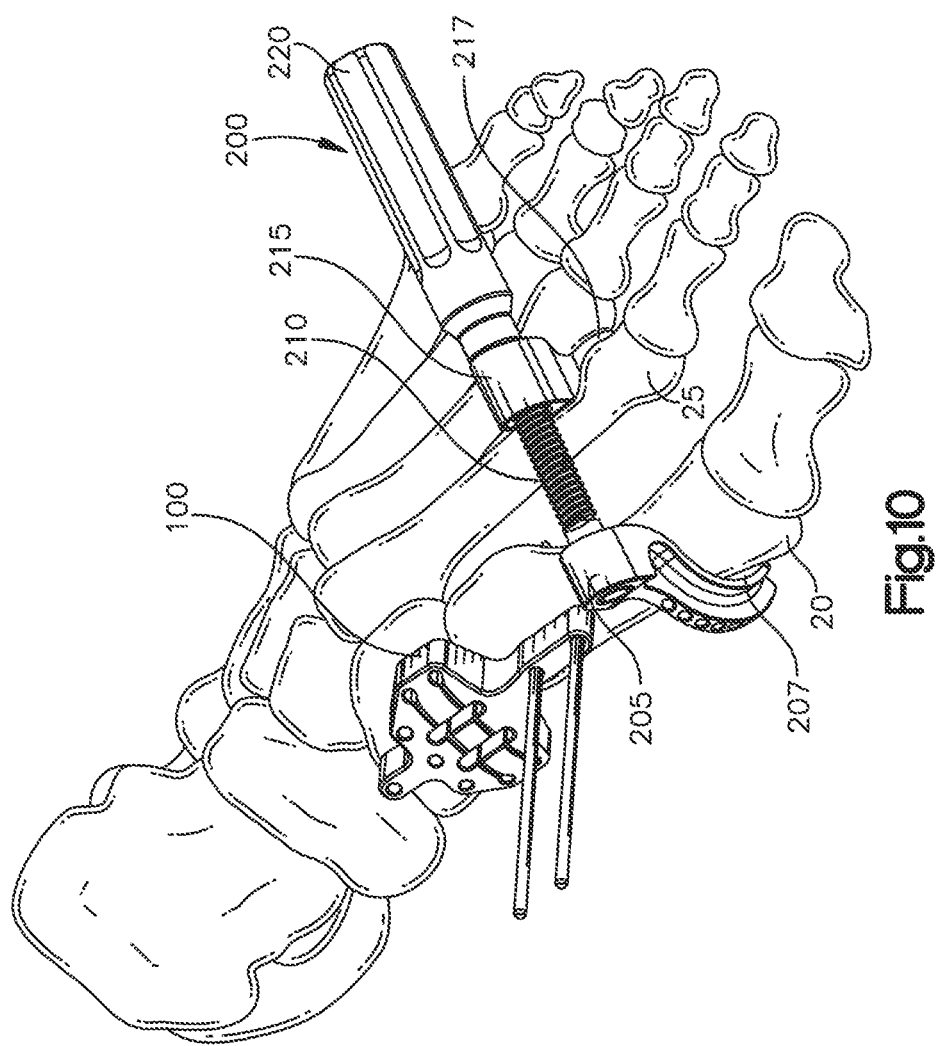

With reference to FIG. 10, a linear reducer 200 may be provisionally placed around the first metatarsal 20 and the second metatarsal 25. In some embodiments, an incision is made lateral of the second metatarsal 25 between the second and third toes to accommodate insertion of the lateral hook 215 such that the engagement surface 217 contacts the lateral side of the second metatarsal 25. The engagement surface 207 of the medial hook 205 is placed against the medial side of the first metatarsal 20, and the handle 220 of the linear reducer 200 may be turned clockwise relative to the threaded shaft 210 until the handle 220 contacts the lateral fork 215. The initial placement of the linear reducer 200 may be a provisional placement, without initially inserting any pins through the medial fork 205.

Figure 11:
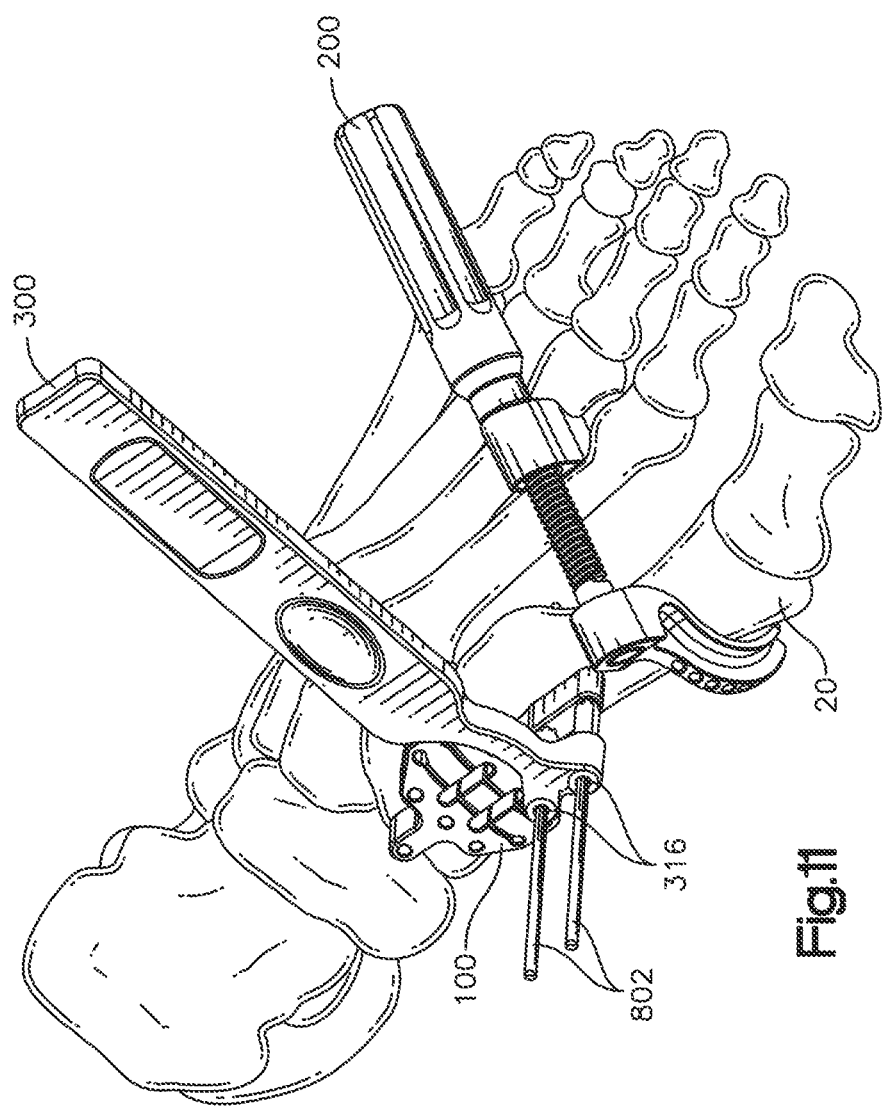
Figure 12:
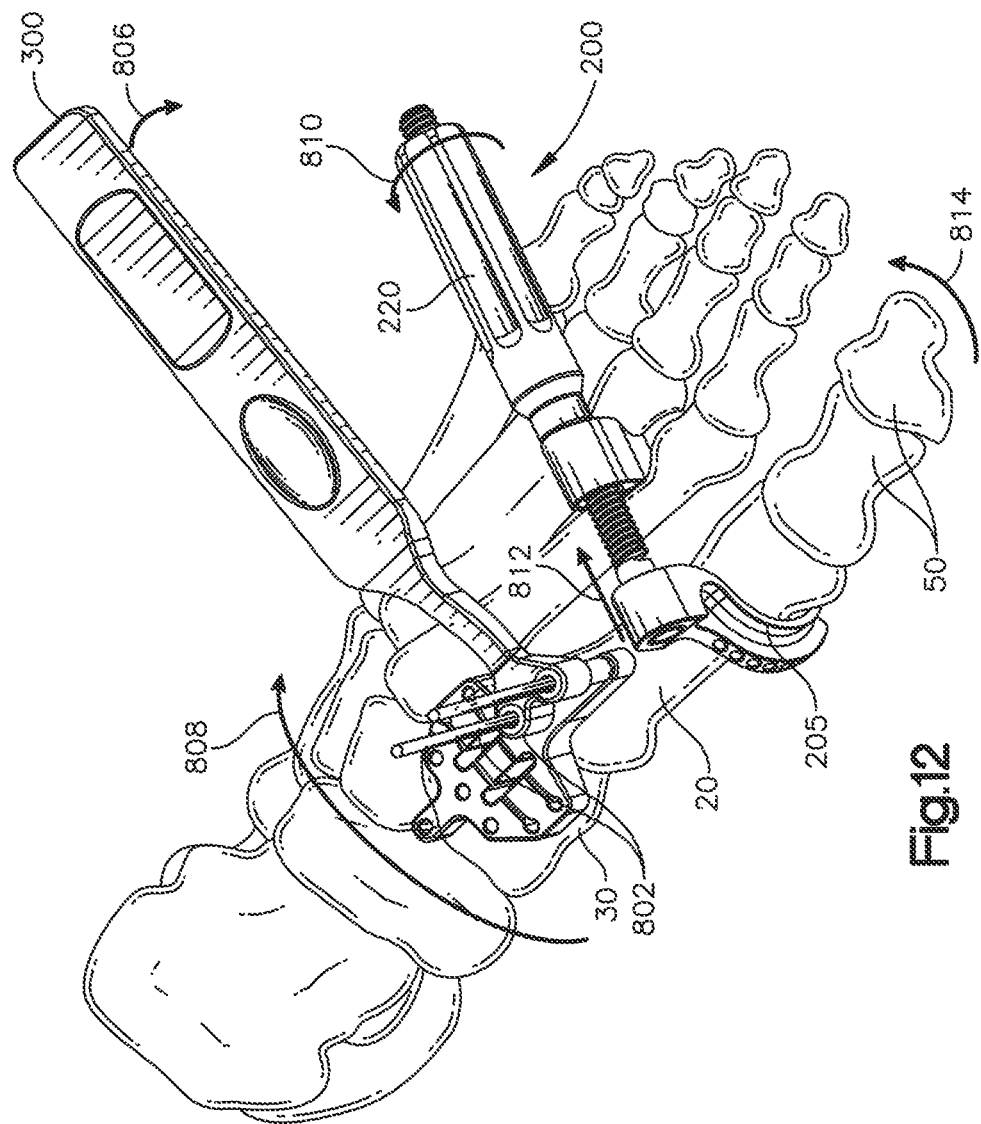

Continuing to FIG. 11, a control handle 300 may further be placed by inserting the metatarsal pins 802 through the spaces 316 within the pin guides 314 of the control handle 300. With reference to FIG. 12, the control handle 300 may then be rotated within the frontal plane to correct for rotation about the axis of the first metatarsal 20. For example, when a clockwise rotation 806 imparted to the control handle 300, the torque applied to the control handle 300 is transferred via the metatarsal pins 802 such that the first metatarsal and the phalanges 50 of the big toe are rotated clockwise 808. Additionally, any necessary adjustment of the joint within the sagittal plane may be applied manually at this time. In some embodiments, other corrections, such as application of torque in the transverse plane to reduce the intermetatarsal angle, could also be applied using the control handle 300. When the frontal plane and sagittal plane have been suitably corrected using the control handle 300, the surgeon may then proceed to adjust the position of the first metatarsal 20 in the transverse plane.

Figure 13:
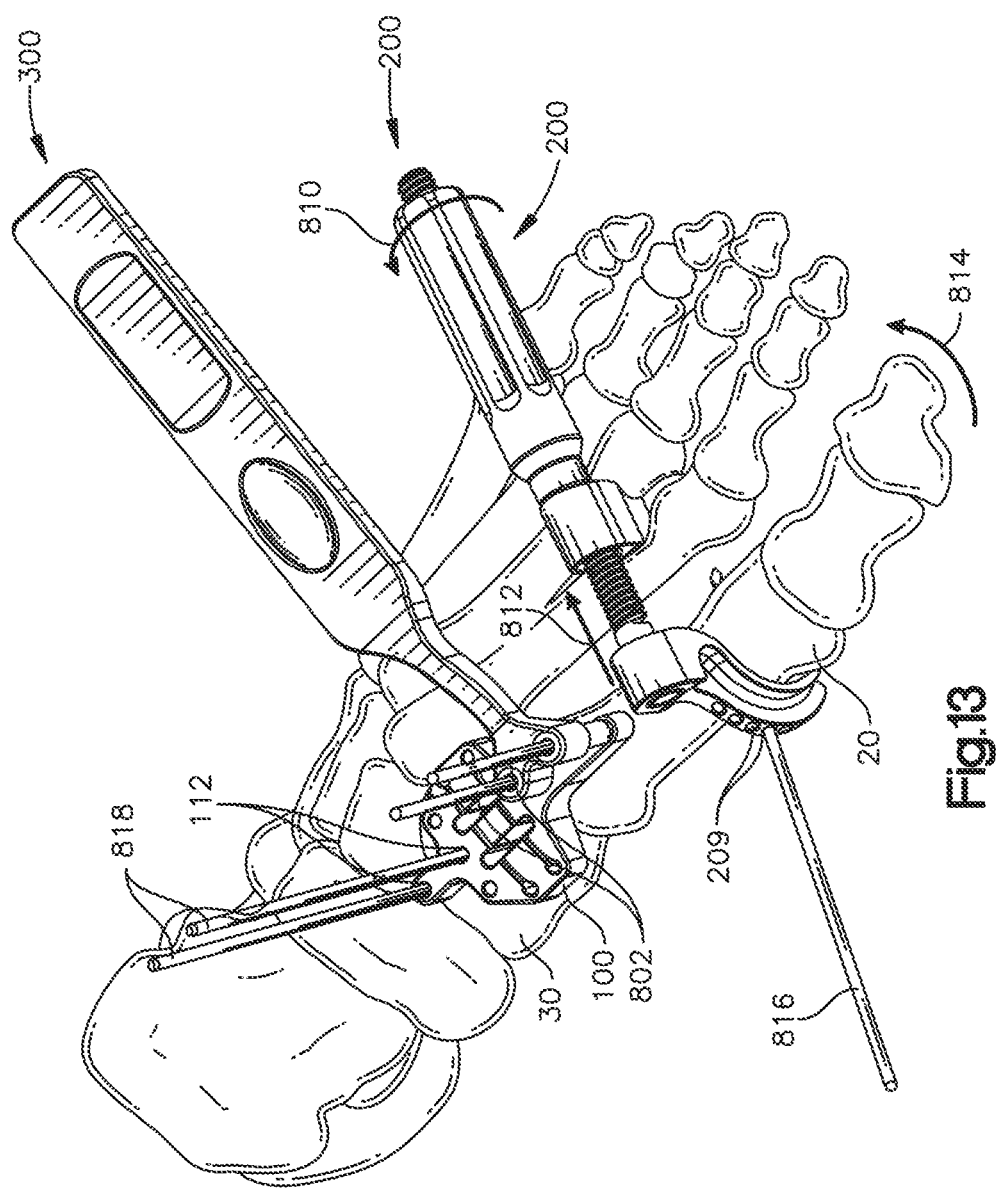

Referring jointly to FIGS. 12 and 13, the transverse plane may be corrected using the linear reducer 200. In some implementations, a medial hook pin 816 is inserted through one of the medial hook pin holes 209 and into or through the first metatarsal 20 to fix the rotational position of the first metatarsal 20 in the frontal plane (e.g., locking in the frontal plane correction previously applied using the control handle 300). The medial hook pin may be a shouldered pin, such that lateral pressure exerted by the medial hook 205 is applied directly to the first metatarsal 20 through the pin shoulder rather than being applied through the skin along the engagement surface 207 of the medial hook.

With or without insertion of a medial hook pin 816, a transverse plane correction may be applied by turning the handle 220 of the linear reducer 200. For example, a clockwise rotation 810 of the handle 220 reduces the distance along the threaded shaft between the medial fork 205 and the lateral fork 215, causing the medial fork 205 to move laterally along direction 812 relative to the lateral fork 215. As a result, the medial fork 205 applies a lateral force to the first metatarsal 20 in the transverse plane, causing a corresponding lateral movement 814 of the first metatarsal 20 within the transverse plane.

At this stage, the misalignment of the first TMT joint 40 has been addressed. With continued reference to FIG. 13, two cuneiform pins 818 or wires are inserted through the proximal pin holes 112 of the cut guide and into or through the first cuneiform 30. The cuneiform pins 818 or wires temporarily secure the cut guide 100 relative to the first cuneiform 30. At this point, the four pins 802 and 814 form an array that establishes and/or locks the surgeon's desired correction.

Figure 14:
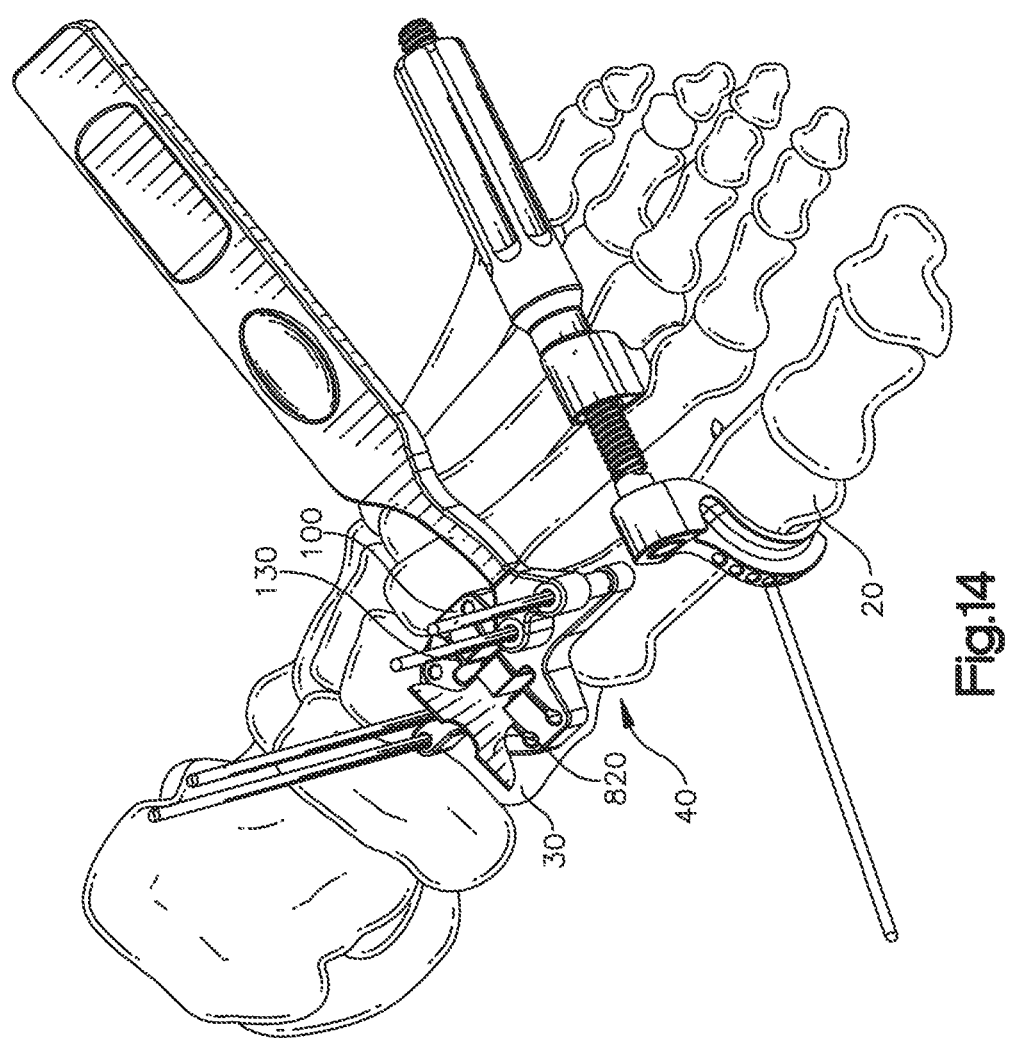

Continuing to FIG. 14, once the cuneiform pins 818 or wires are inserted, the base of the first cuneiform 30 is cut using a saw blade 820 inserted through the proximal slot 130 of the cut guide 100. Cutting the base of the first cuneiform 30 completes the excision of the first TMT joint 40. With reference to FIG. 15, the cut guide 100, the linear reducer 200, and the control handle 300 are removed from the foot 10. The control handle 300 can be removed by sliding upward until the control handle is free of the metatarsal pins 802 or wires. The cut guide 100 can similarly be removed by sliding the cut guide 100 upward until it is free of the metatarsal pins 802 or wires and the cuneiform pins 818 or wires. The linear reducer 200 is removed by removing the medial hook pin 816 and lifting the medial and lateral hooks 205, 215 away from the foot 10. In some embodiments, a quick-release medial hook 235 may be used to facilitate removal of the linear reducer. After removal of the cut guide 100, linear reducer 200, and control handle 300, the fully disarticulated first TMT joint is left with the metatarsal pins 802 or wires and cuneiform pins 818 or wires remaining in place. At this point, the surgeon may further use any desired means to distract and further prepare the joint in preparation for fusion.

Referring now to FIG. 16, the compressor block 400 is applied over the metatarsal pins 802 or wires and cuneiform pins 818 or wires. Preferably, the metatarsal pins 802 or wires are either shorter or longer than the cuneiform pins 818 or wires (e.g., by approximately the height of the compressor block 400 or more, as shown in FIG. 16). In the example of FIG. 16, the compressor block 400 is applied by first threading the proximal pin holes 410 onto the relatively longer cuneiform pins 818 or wires, followed by threading the distal pin holes 415 onto the relatively shorter metatarsal pins 802 or wires. As discussed above with reference to FIGS. 5A-5D, unlike the pin holes of the cut guide 100, the pin holes of the compressor block 400 are slightly closer together and tapered inward such that it may be difficult to attempt to insert all four pins or wires through the compressor block 400 simultaneously.

Due to the convergent angle of the proximal pin holes 410 to the distal pin holes 415, sliding the compressor block 400 downward over the cuneiform pins 818 or wires and the metatarsal pins 802 or wires pulls the metatarsal pins 802 or wires closer to the cuneiform pins 818 or wires. Thus, the application of the compressor block 400 causes the first metatarsal 20 to move along direction 822 toward the first cuneiform 30, bringing the cut face of the first metatarsal 20 into contact with the cut face of the first cuneiform 30. The angled holes cause a rotation of the pins in the sagittal plane so that the plantar side of the joint is compressed. This may be desirable, as compression on only the dorsal aspect of the bones may in some cases cause a plantar gapping of the joint which is undesirable for fusion.

Figure 19:
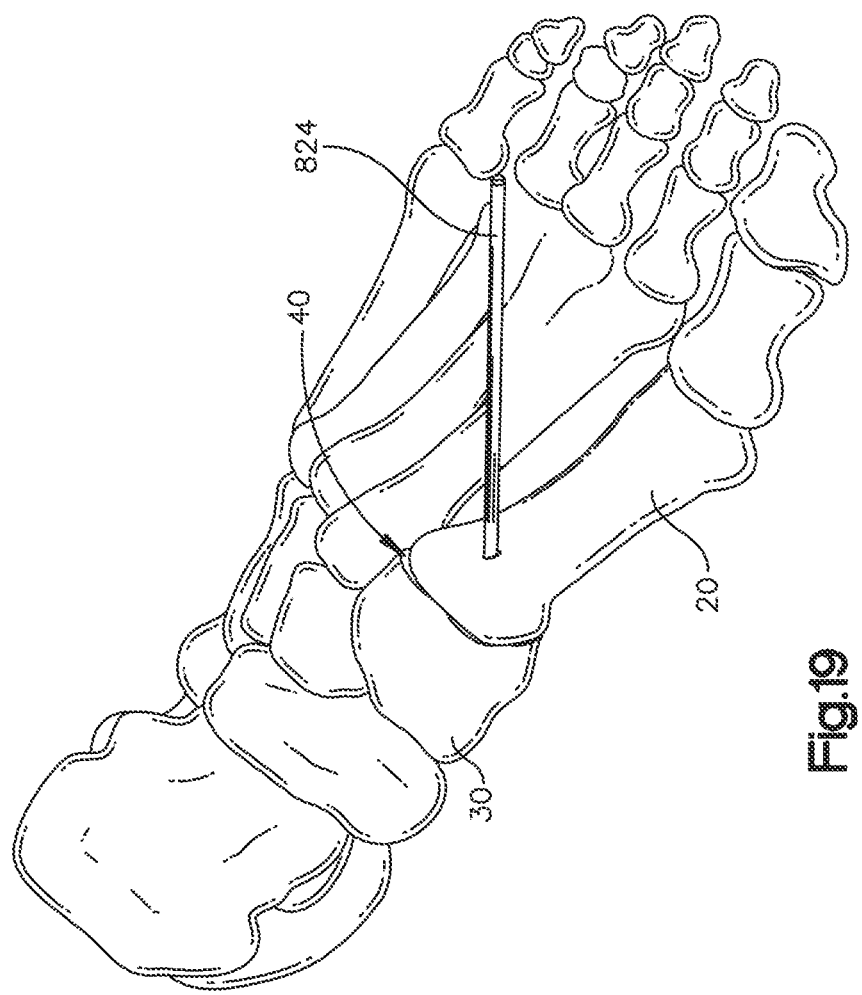

Continuing to FIG. 17, a cross pin 824 is then inserted through one of the cross pin holes 420 such that the cross pin 824 passes through the compressed joint to temporarily fix the joint in place. As shown in FIG. 18, the metatarsal pins 802 or wires and the cuneiform pins 818 or wires are removed. As shown in FIG. 19, the compressor block 400 may then be removed by sliding the compressor block outward along the cross pin 824, which remains in place to fix the joint until the bone plate 500 can be applied. Any number of cross pin hole trajectories could be applied to the compressor block 400 for placement of the crossing wire. Although the cross pin 824 is shown as being inserted distally and extending proximally into the joint, in other embodiments the compressor block 400 may have cross pin holes 420 located proximally instead of or in addition to distally. In such embodiments, the cross pin 824 would be inserted from a proximal end of the compressor block 400 and would extend distally through the joint.

Figure 20:
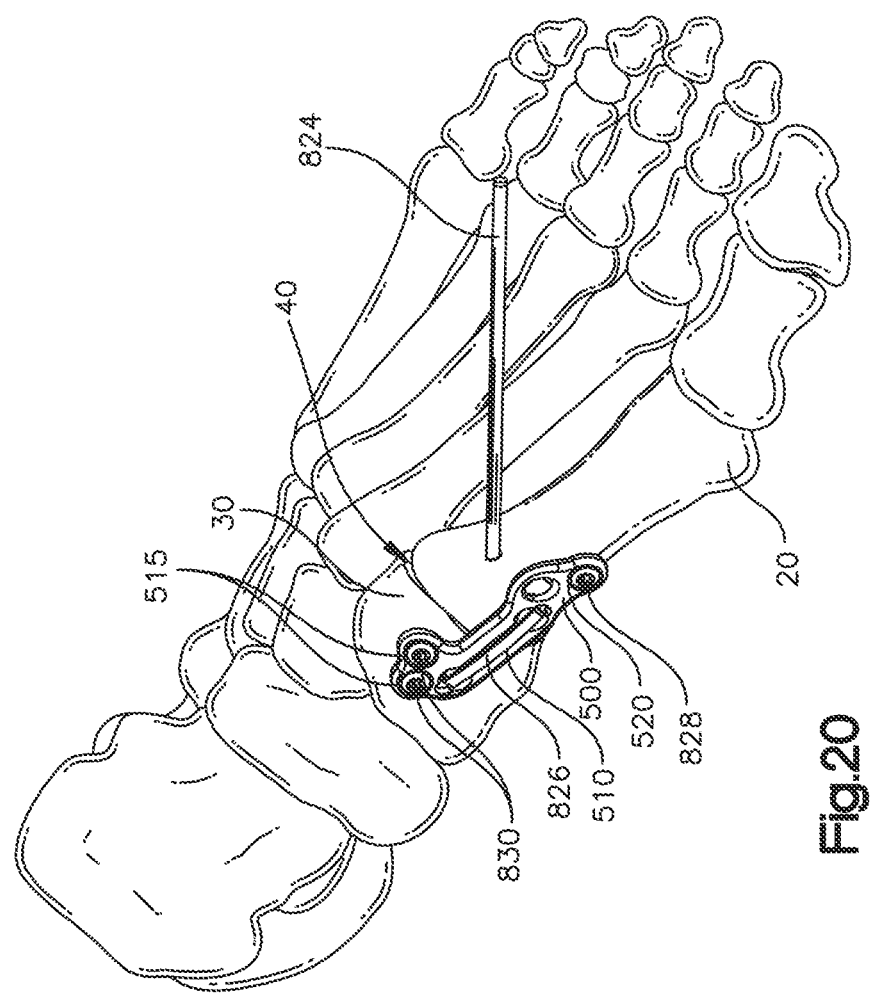
Figure 21:
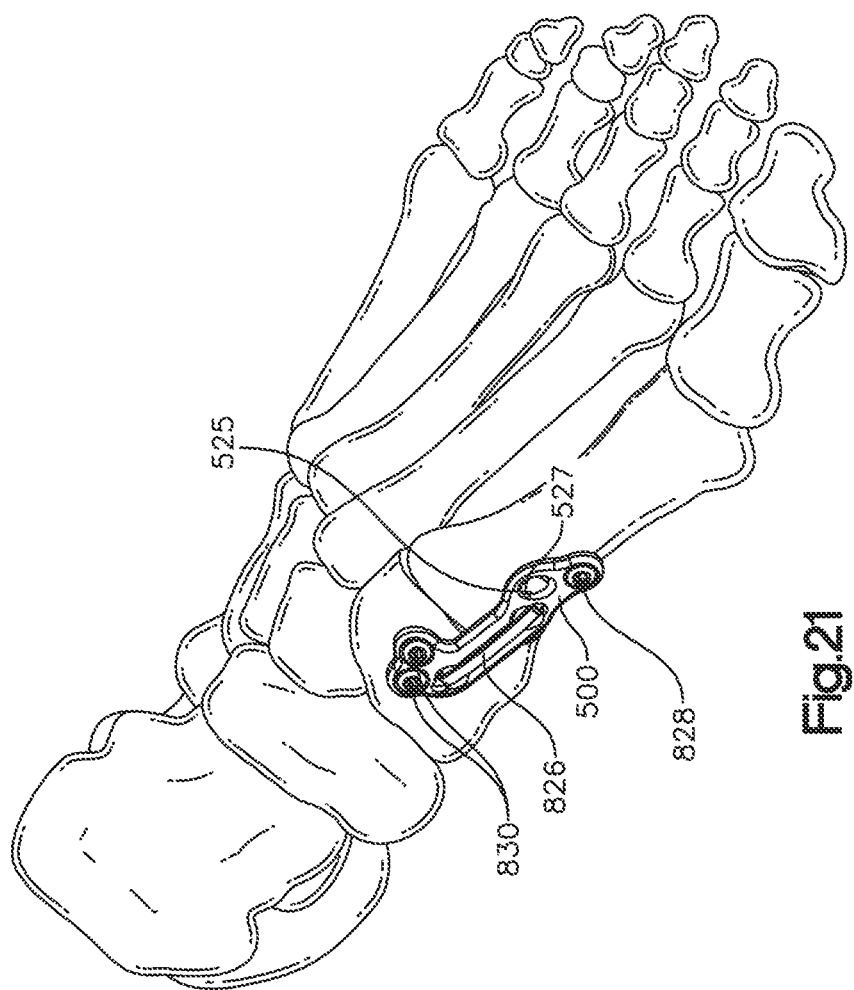

With reference to FIG. 20, while the joint is fixed in place by the cross pin 824, the bone plate 500 is placed across the resected first TMT joint 40. Pilot holes are drilled as necessary. In order to fix the first metatarsal 20 relative to the first cuneiform 30, a staple 826 is placed at the staple aperture 510, a metatarsal screw 828 is placed at the metatarsal screw aperture 520, and cuneiform screws 830 are placed at the cuneiform screw apertures 515. The staple 826, metatarsal screw 828, and cuneiform screws 830 can be placed in any order; however, it may be preferable to place the staple 826 and the metatarsal screw 828 prior to placing the cross screw 834. As shown in FIG. 21, when the first metatarsal 20 and the first cuneiform 30 have been fixed using the bone plate 500, the cross pin 824 is no longer necessary and can be removed. The staple 826 may be made of a shape-memory material. In some embodiments, the staple 826 is held in a deformed configuration wherein the staple legs are approximately parallel during insertion through the plate 500. After insertion, the staple 826 may be allowed to relax toward a non-deformed configuration, where the legs are angled towards each other. Thus, after insertion, the staple 826 provides a compression force across the TMT joint 40. More details regarding the plate-staple system may be found in U.S. Pat. No. 10,299,842, which is incorporated herein by reference in its entirety. More details regarding staples suitable for use as described herein can be found in U.S. Publication No. 2018/0317906, which is incorporated herein by reference in its entirety.

Figure 22:
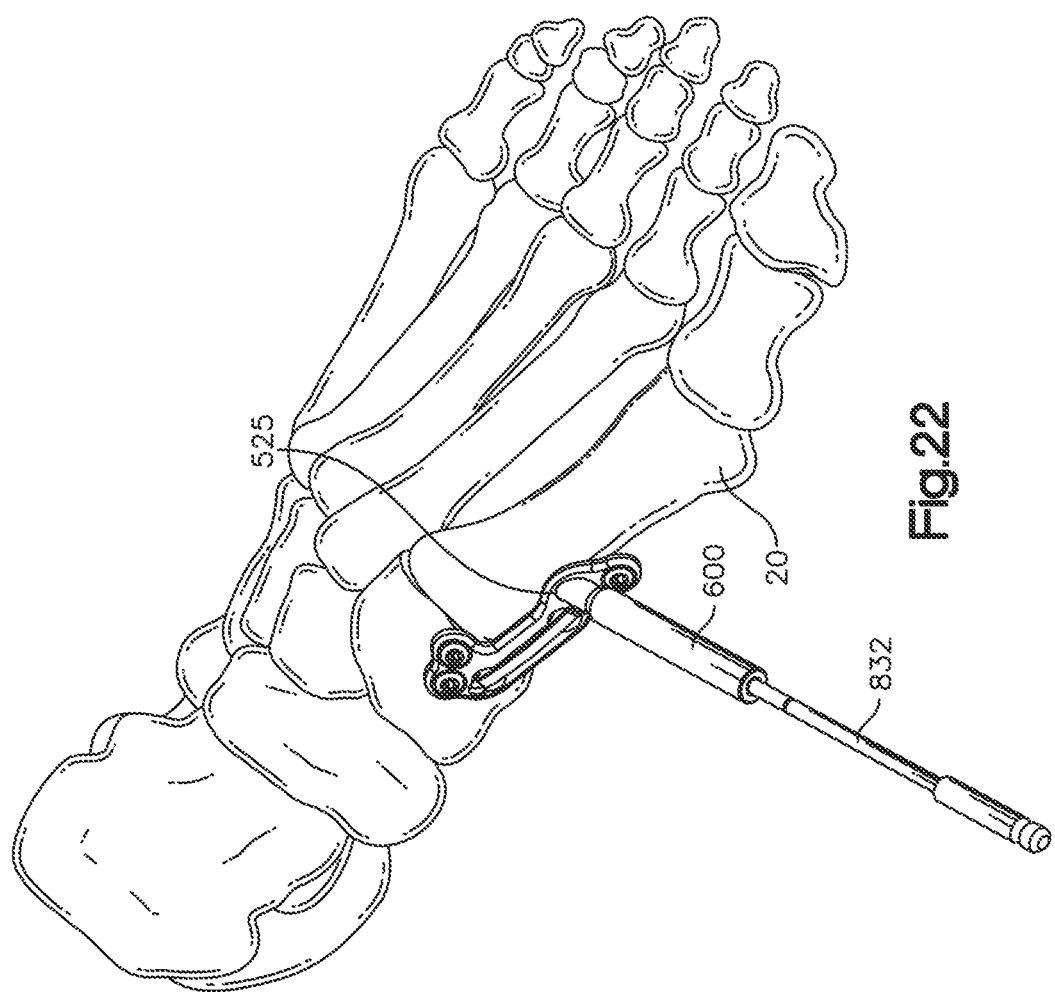

Continuing to FIG. 22, a cross screw drill guide is placed within the cross screw aperture 525 of the bone plate 500. Although the fixed-angle cross screw drill guide 600 of FIGS. 7A-7C is shown in FIG. 22, the procedure may equally be implemented using the variable-angle cross screw drill guide 650 of FIGS. 7D-7F. The cross screw drill guide 600 is seated in the cross screw aperture 525 by seating the shelf engagement surface 627 (or the shelf engagement surface 677 if the variable-angle cross screw drill guide 650 is used) against the shelf 527 of the cross screw aperture 525. A drill bit 832 is inserted through the cross screw drill guide 600 and turned to drill a pilot hole for a cross screw within the cross screw aperture 525. The drill bit 832 and the cross screw drill guide 600 are removed, and the cross screw 834 is placed at the cross screw aperture 525, completing the Lapidus bunionectomy procedure.

Figure 23:
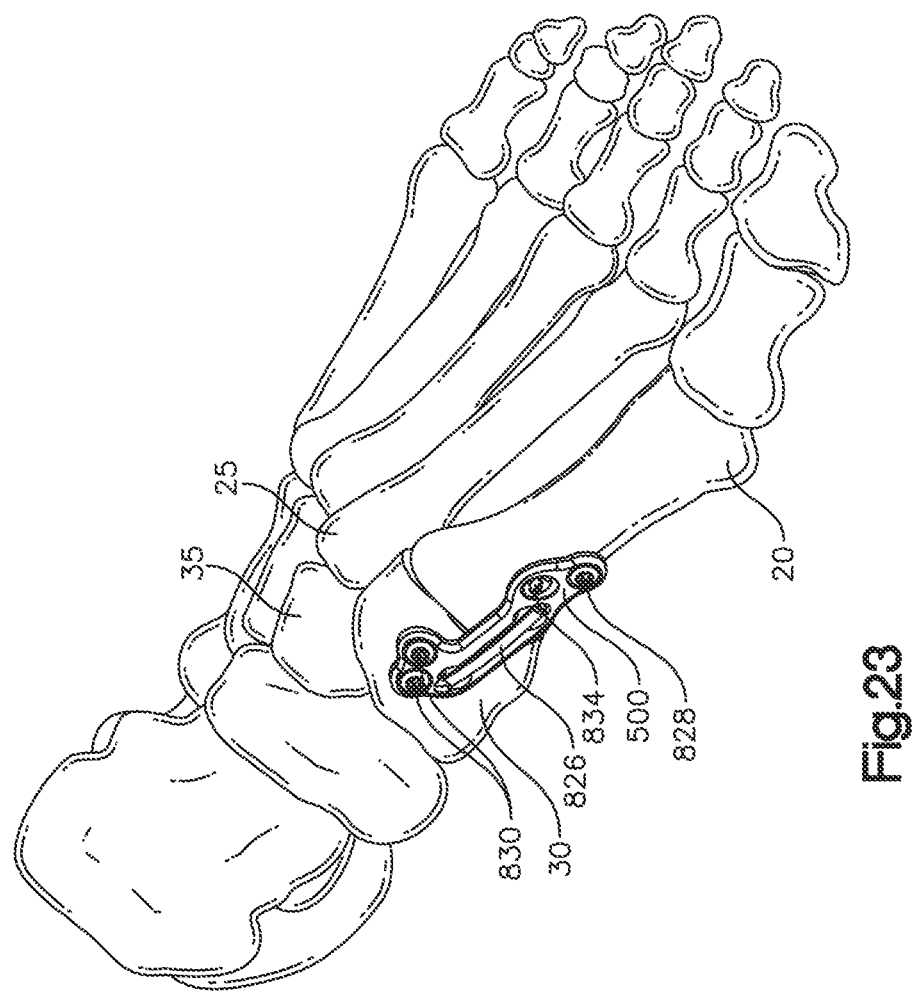
Figure 24:
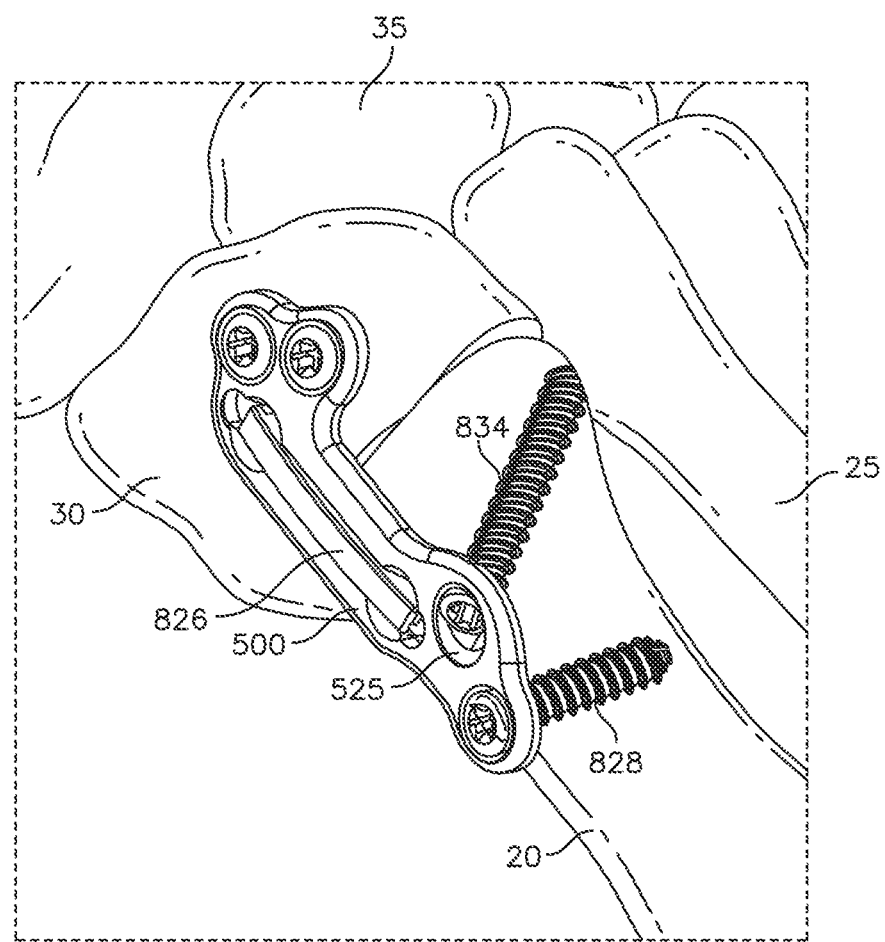

FIGS. 23 and 24 show the completed state of the Lapidus bunionectomy in accordance with the present technology. FIG. 24 is an enlarged view of a portion of the foot, in which the first metatarsal 20 is shown with transparency to illustrate the internal placement of the cross screw 834. As shown in FIGS. 23 and 24, the first metatarsal 20 is fixed in a desired orientation relative to the first cuneiform 30, with a reduced intermetatarsal angle relative to the second metatarsal 25, by the bone plate 500, the staple 826, the metatarsal screw 828, and the cuneiform screws 830.

Advantageously, the cross screw 834 further functions to prevent future recurrence of the bunion. As the foot may still experience daily pressure that could cause the bunion to return, the cross screw 834 anchors the first metatarsal 20 to either the second metatarsal 25 or the second cuneiform 35, depending on the geometry of the foot and the angle of insertion of the cross screw 834. Thus, the Lapidus bunionectomy of FIGS. 8-24 advantageously goes beyond merely repairing the bunion by providing an additional structural connection to more laterally disposed bones of the midfoot to prevent recurrence.

With reference to FIGS. 25-29, a portion of an alternative Lapidus bunionectomy using certain devices herein will be described. The portion of the Lapidus bunionectomy illustrated in FIGS. 25-29 provides an alternative method of performing the first metatarsal and first cuneiform cuts using the single-slotted cut guide 180 illustrated in FIGS. 2H-2K. Thus, as will be described in greater detail below, the portion of the Lapidus bunionectomy illustrated in FIGS. 25-29 may be used in conjunction with portions of the Lapidus bunionectomy illustrated in FIGS. 8-24 and/or with other bunionectomy procedures. Although the procedure of FIGS. 25-29 illustrates a particular implementation of a Lapidus bunionectomy using a specific subset of the devices disclosed herein, it will be understood that the components and steps illustrated and described with reference to FIGS. 25-29 may equally be applied in different sequences and/or with different combinations of components to correct a bunion.

Figure 25:
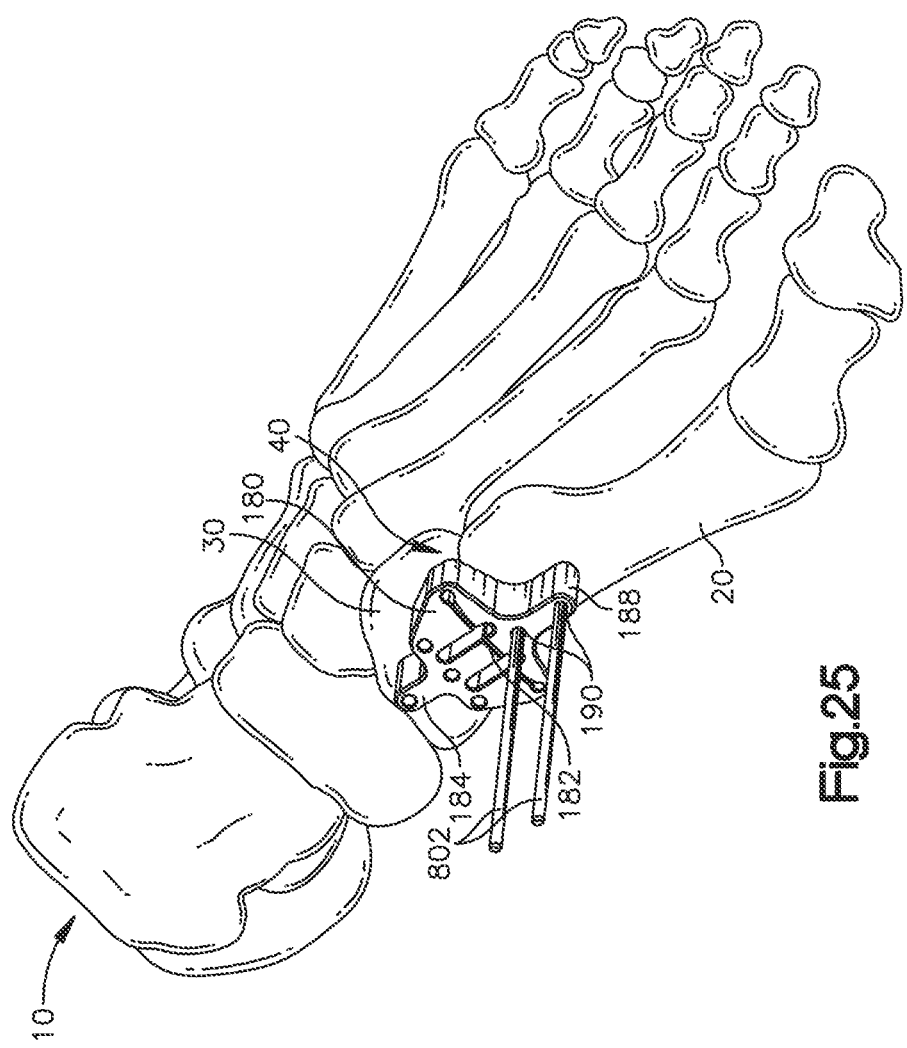

As shown in FIG. 25, the procedure may begin by placing and temporarily securing the cut guide 180 of FIGS. 2H-2K to the foot 10. Similar to the beginning configuration of FIG. 8, the first TMT joint 40 may have been prepared by making an incision such as a dorsomedial incision to expose the first TMT joint 40 and excising soft tissue around the joint, such as the joint capsule or other soft tissue, to expose the first TMT joint 40 and create a space in which the paddle 120 (FIGS. 2H-2K) of the cut guide 180 can be seated.

Once the joint has been prepared, the cut guide 180 is placed by seating the paddle 120 (not visible in FIG. 25) within the first TMT joint 40 such that the first extension 184 sits adjacent to or against the first cuneiform 30 and the second extension 188 sits adjacent to or against the first metatarsal 20. The paddle 120 is inserted into the first TMT joint 40 such that the cut guide 180 is oriented along the axis of the first metatarsal 20 with the slot 182 positioned over the first metatarsal 20. Alternatively, in some embodiments, the cut guide 180 may be oriented with the slot 182 positioned over the first cuneiform 30, and the bunionectomy may be performed such that the first cuneiform 30 is cut before the first metatarsal 20. The alignment of the cut guide 180 may be confirmed under fluoroscopy or other suitable imaging technique before proceeding.

When the cut guide 180 has been placed and is suitably aligned, the cut guide 180 is temporarily secured relative to the first metatarsal 20 by inserting one or more metatarsal pins 802 or wires through the second pin holes 190 of the second extension 188 and into or through the first metatarsal 20. The metatarsal pins 802 or wires, as well as any of the other pins or wires described in the following description, may be, for example, a Kirschner wire ("K-wire"), or any other suitable type of wire or pin that can be placed into the bone to secure the cut guide 180. Although two metatarsal pins 802 or wires are illustrated in this example, the cut guide 180 may be suitably robust and stable when held in place by the paddle 120 and a single metatarsal pin 802 or wire.

Figure 26:
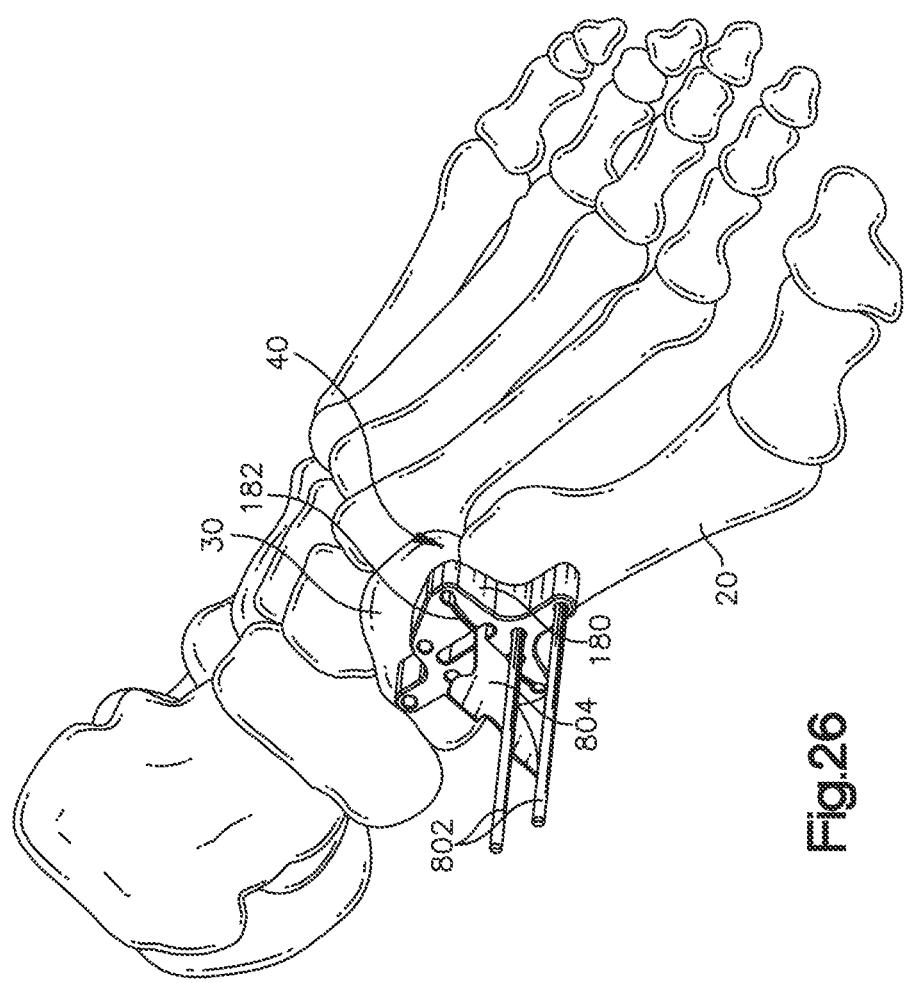

Continuing to FIG. 26, once the metatarsal pins 802 or wires are inserted, the base of the first metatarsal 20 is cut using a saw blade 804 inserted through the slot 182 of the cut guide 180.

Figure 27:
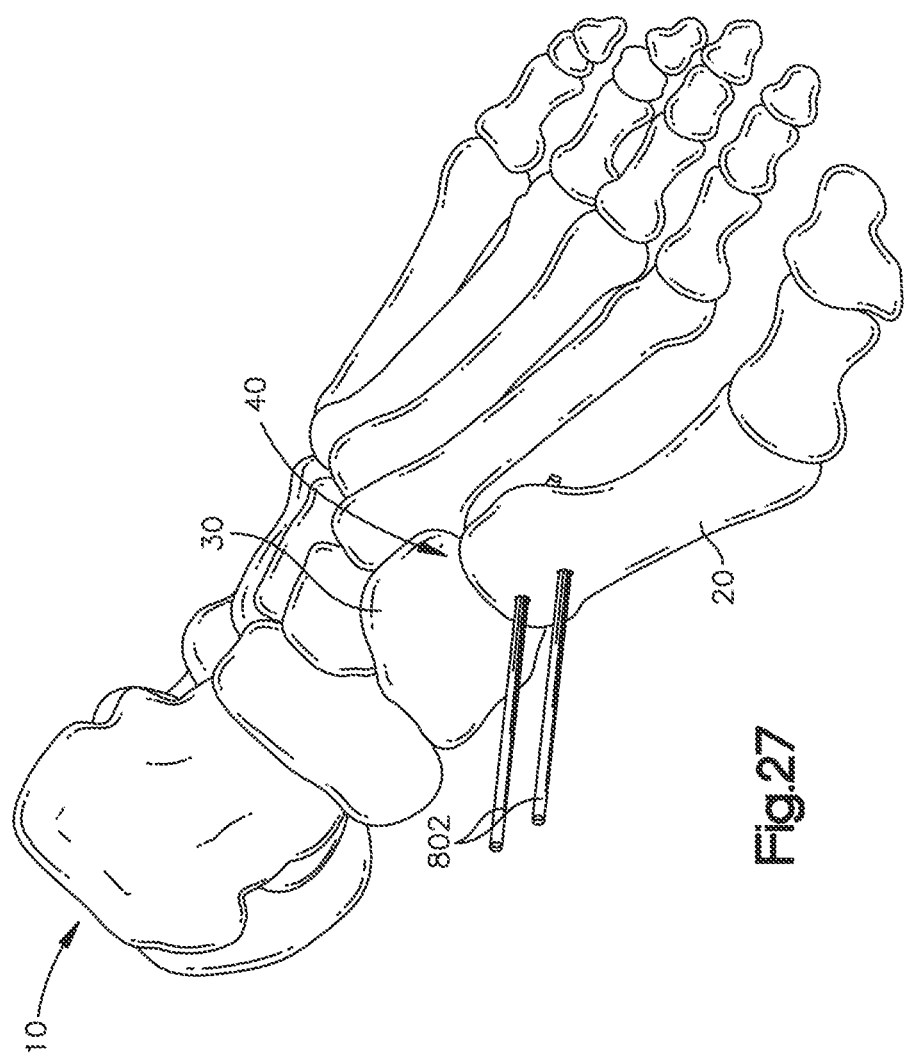
Figure 28:
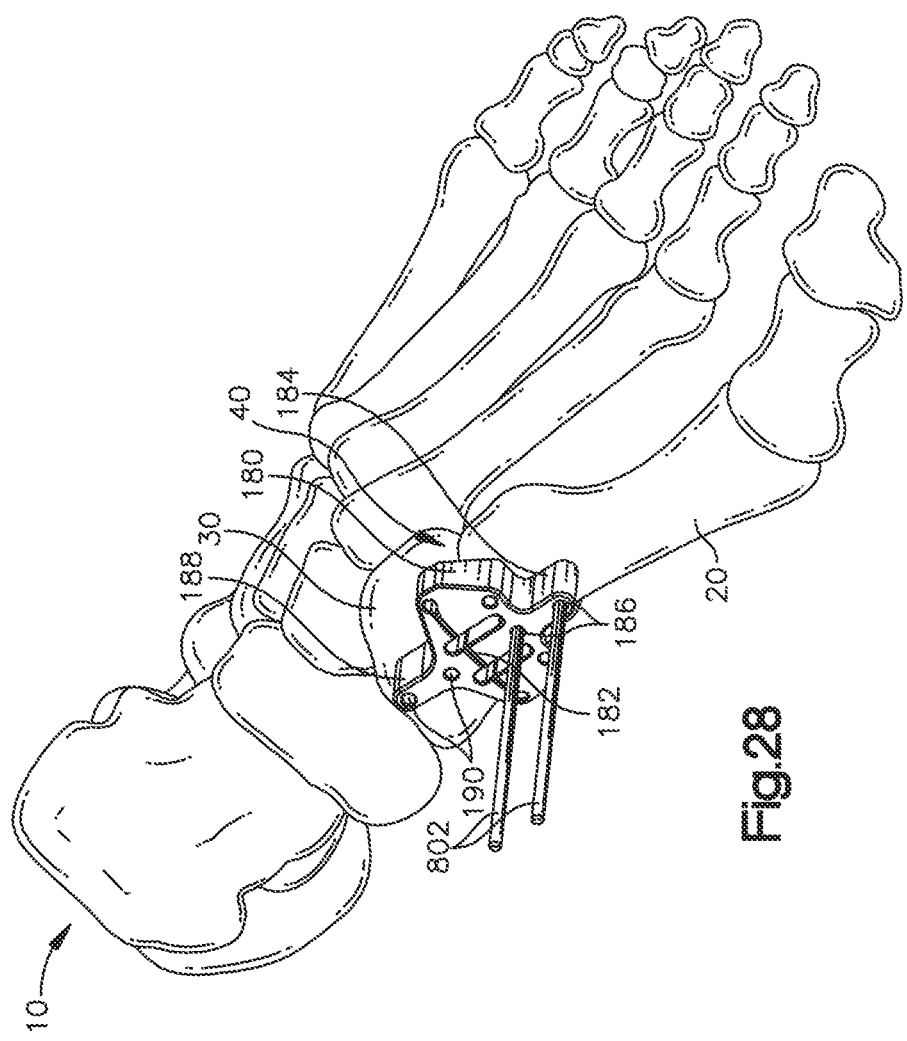

With reference to FIGS. 27 and 28, after the base of the first metatarsal 20 is cut, the cut guide 180 can be reoriented such that the same slot 182 can be used to guide the cutting of the first cuneiform 30 which occurs later in the Lapidus bunionectomy procedure. The cut guide 180 can be removed by sliding the cut guide 180 upward until the second pin holes 190 are free of the metatarsal pins 802 or wires, as shown in FIG. 27. At this stage, the resected portion of the bone from the first metatarsal 20 (or from the first cuneiform 30 if the first cuneiform 30 was cut first) can be removed from the foot 10. The cut guide 180 can then be reversed (e.g., rotated 180 degrees about an axis parallel to the metatarsal pines 802 or wires). The metatarsal pins 802 or wires may then be inserted through the first pin holes 186, and the cut guide 180 may be moved downward along the metatarsal pins 802 or wires until the paddle 120 is again seated within the first TMT joint 40, as shown in FIG. 28. In some embodiments, the first pin holes 186 and second pin holes 190 have a different spacing about the center of the paddle 120. For example, the first pin holes 186 may be closer to the paddle 120 by a distance equal to the thickness of the bone removed by the first cut, such that reversing the cut guide 180 results in the paddle 120 resting firmly against the cut surface of the first metatarsal 20.

In the configuration of FIG. 28, due to the reversal of the cut guide 180, the second holes 190 are disposed above the first cuneiform 30 and the slot 182 is positioned to guide cutting of the first cuneiform 30 rather than the first metatarsal 20. From the state illustrated in FIG. 28, the Lapidus bunionectomy procedure can proceed substantially as shown and described with reference to FIGS. 10-13 for correction of the position of the first metatarsal 20 and phalanges 50 in the frontal and transverse planes. In the same process described with reference to FIG. 13, two cuneiform pins 818 or wires are inserted through the second pin holes 190 of the cut guide 180 and into or through the first cuneiform 30. The cuneiform pins 818 or wires temporarily secure the cut guide 180 relative to the first cuneiform 30. At this point, the four pins 802 and 814 form an array that establishes and/or locks the surgeon's desired correction.

Figure 29:
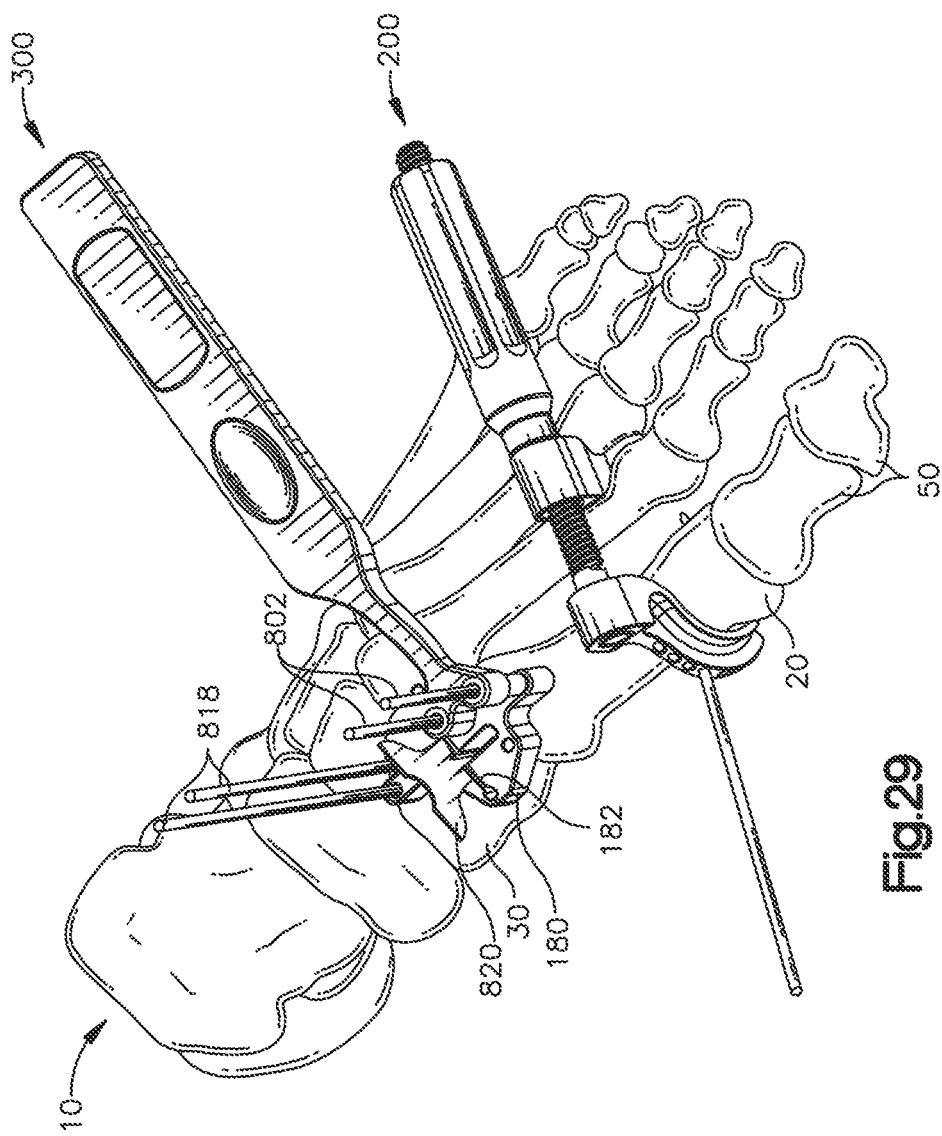

Referring now to FIG. 29, due to the reversal of the cut guide 180 following cutting of the first metatarsal 20, the slot 182 is now positioned on the cuneiform side of the first TMT joint 40. Thus, following correction of the bunion in at least the frontal and/or transverse planes and the placing of the cuneiform pins 818 or wires, the slot 182 is positioned to guide the cutting of the first cuneiform 30.

Once the cuneiform pins 818 or wires are inserted, the base of the first cuneiform 30 is cut using a saw blade 820 inserted through the slot 182 of the cut guide 180. Cutting the base of the first cuneiform 30 completes the excision of the first TMT joint 40. The cut guide 180, the linear reducer 200, and the control handle 300 may then be removed from the foot 10 by the same or similar operations to those described above with reference to FIG. 15. After removal of the cut guide 180, linear reducer 200, and control handle 300, the fully disarticulated first TMT joint 40 is left with the metatarsal pins 802 or wires and cuneiform pins 818 or wires remaining in place. At this point, the surgeon may further use any desired means to distract and further prepare the joint in preparation for fusion. The remainder of the Lapidus bunionectomy procedure may then proceed substantially as shown and described with reference to FIGS. 16-24.

With reference to FIGS. 30A-32C, various additional devices and components are provided for use with an improved Lapidus bunionectomy procedure for correcting the TMT joint deformity of FIG. 1. The devices and components of FIGS. 30A-32C may be used to perform additional optional steps in the Lapidus bunionectomy procedures described herein, such as additional removal of bone and/or additional rotational correction of the frontal plane prior to fixation. Although the following description is made with reference to the Lapidus bunionectomy procedure, it will be understood that the various devices and components described herein are not limited to such procedures and may equally be used in other orthopedic procedures as will be understood by those skilled in the art.

Figure 30A:
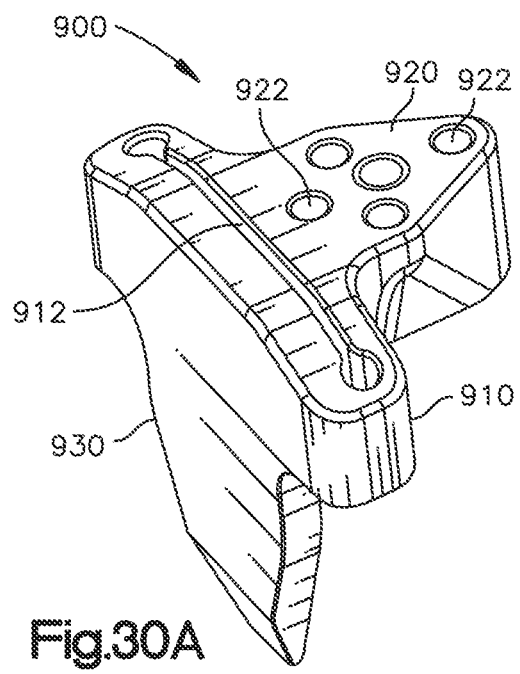
FIG. 30A is a perspective view of an example cut guide configured as a re-cutting guide and a pin guide for the Lapidus bunionectomy procedures described herein.
Figure 30B:
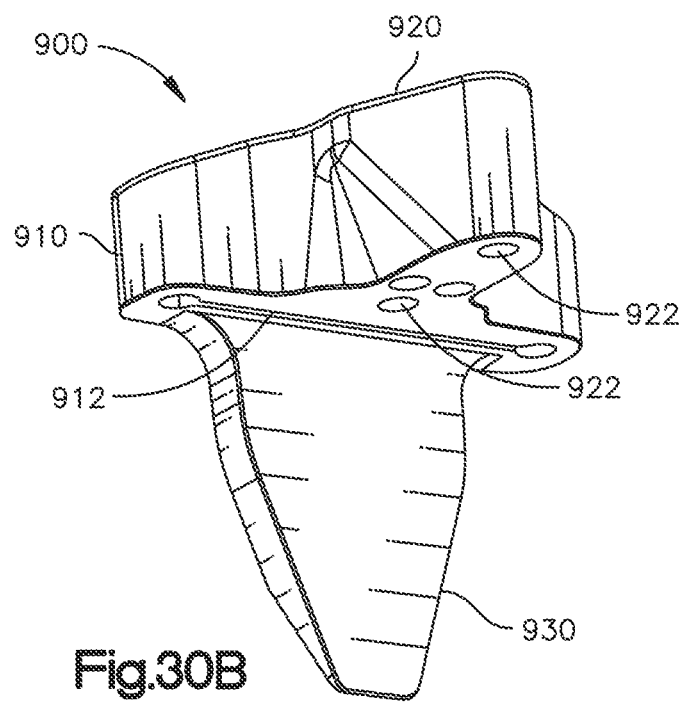
FIG. 30B is another perspective view of the cut guide illustrated in FIG. 30A.
Figure 30C:
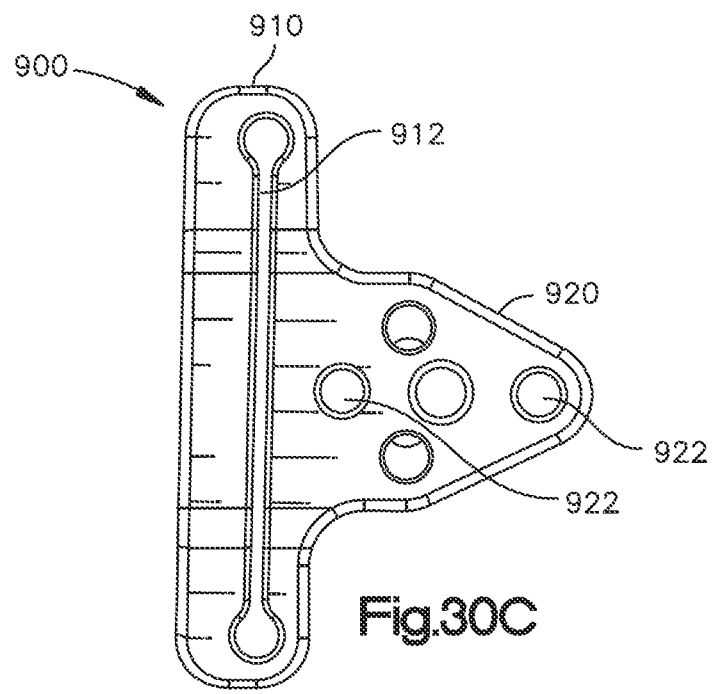
FIG. 30C is a top plan view of the cut guide illustrated in FIG. 30A.

FIGS. 30A-30C depict a cut guide 900 configured as a re-cut guide and a pin guide for the Lapidus bunionectomy procedures described herein. In some Lapidus bunionectomy procedures, a surgeon may desire to remove additional bone from the first metatarsal and/or from the first cuneiform at the first TMT joint during the procedure. For example, the edges of the first metatarsal and/or first cuneiform forming the TMT joint may have varying levels of concavity in different individuals, such that some first metatarsals and/or first cuneiforms may need to have more bone cut away in order to reach a plane at which interior bone is exposed over the full cross-section of the cut area.

FIGS. 30A and 30B are upper and lower perspective views of the cut guide 900, respectively. FIG. 30C is a top plan view of the cut guide 900. The cut guide 900 may be a single integrally formed component and may comprise a metal, a plastic, or other suitable material. The cut guide 900 may be sized and shaped to be used in conjunction with (e.g., after) another cut guide such as the cut guide 181 of FIGS. 2L-2N.

The cut guide 900 generally comprises a body 910, an extension 920, and a paddle 930. The extension 920 can have a size and shape similar or identical to the second extension 188 of the cut guide 181 and can include pin holes 922 having a spacing corresponding to the spacing of second pin holes 190 of the cut guide 181. The body 910 includes a slot 912. The paddle 930 is sized and shaped to seat within a joint such as a TMT joint, for example.

To accomplish the desired re-cut functionality, the spacing between the slot 912 and the pin holes 922 of the cut guide 900 is closer than the corresponding spacing in an associated cut guide used for the initial joint cutting. For example, in a kit including a cut guide 900 and a cut guide 181 (FIGS. 2L-2N), the distance between the slot 912 and the nearer of the pin holes 922 is shorter than the distance between the slot 182 and the nearer of the second pin holes 190 of the cut guide 180. Accordingly, after cut is made using the cut guide 181 held in place by pins extending through the second pin holes 190, the cut guide 181 can be removed and the cut guide 900 can be placed over the same pins through pin holes 922 such that the slot 912 defines a cutting plane closer to the pins for re-cutting. Use of the cut guide 900 as a re-cut guide will be described in greater detail with reference to FIGS. 33-35.

Figure 31A:
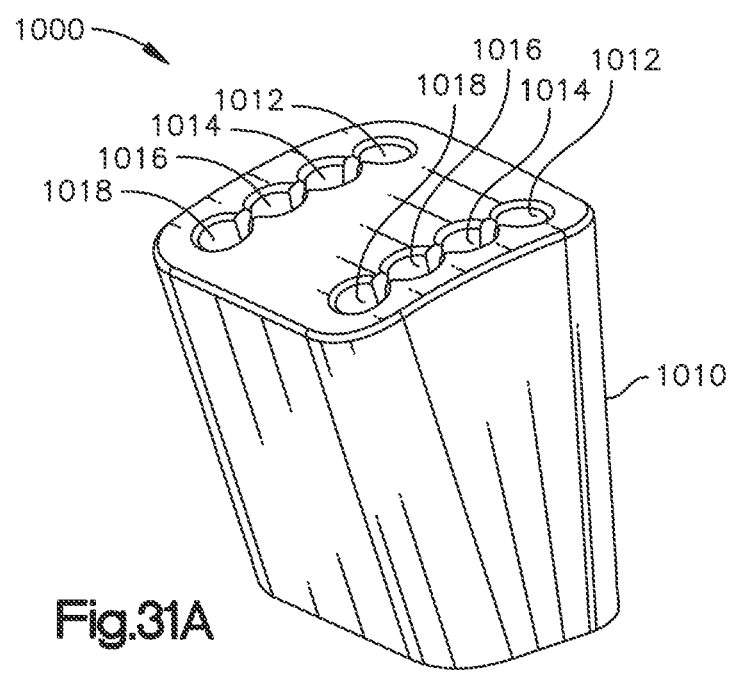
FIG. 31A is a perspective view of an example realignment guide configured as a pin guide for frontal plane adjustment in the Lapidus bunionectomy procedures described herein.
Figure 31B:
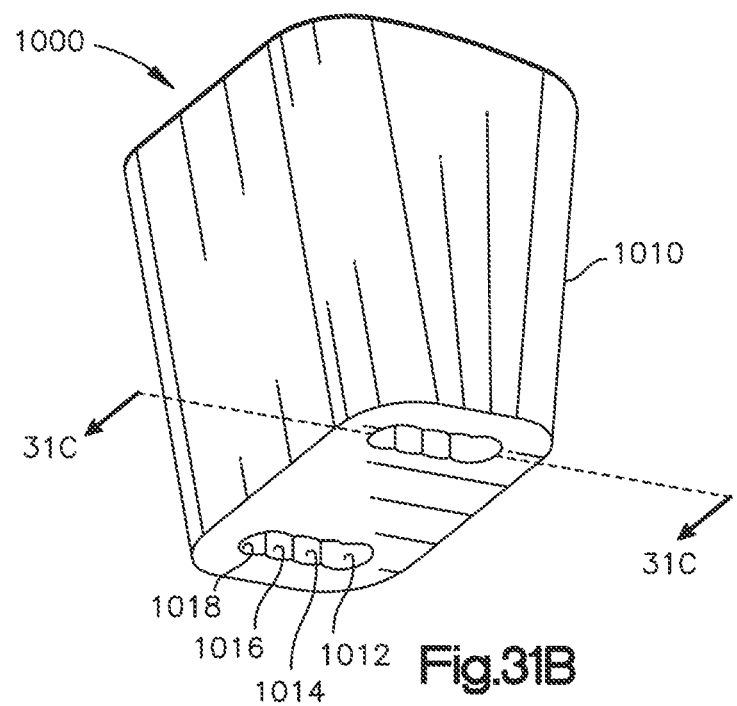
FIG. 31B is another perspective view of the realignment guide illustrated in FIG. 31A.
Figure 31C:
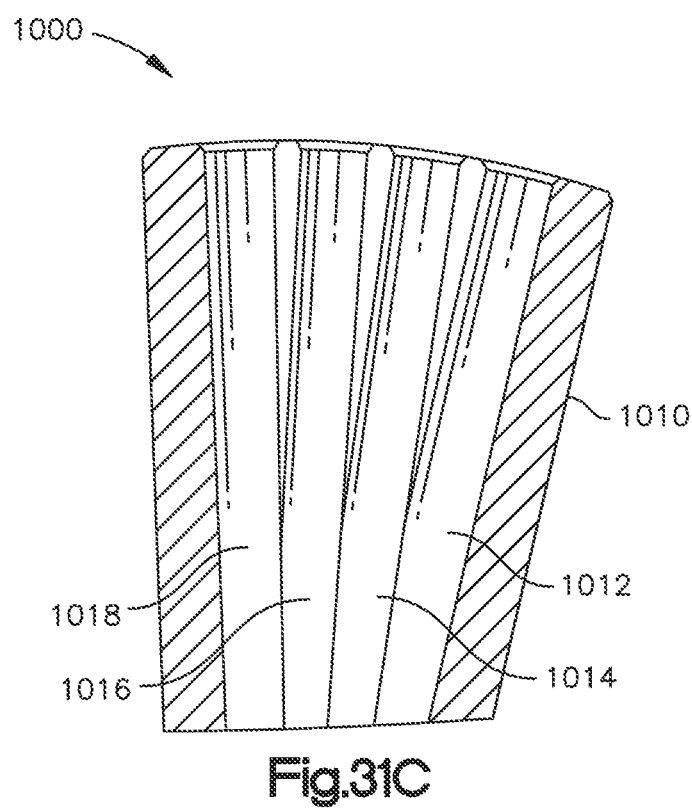
FIG. 31C is a cross-sectional view of the realignment guide illustrated in FIG. 31A.

FIGS. 31A-31C depict an example realignment guide 1000 configured as a pin guide for frontal plane adjustment in the Lapidus bunionectomy procedures described herein. FIGS. 31A and 31B are upper and lower perspective views of the realignment guide 1000, respectively. FIG. 31C is a cross-sectional side elevation view of the realignment guide 100 taken about the line 31C-31C in FIG. 31B. The realignment guide 1000 includes a body 1010 having two or more pairs of pin holes therethrough. The body 1010 is generally wedge-shaped and may be integrally formed from a metal, a plastic, or other suitable material.

In the example realignment guide 1000 of FIGS. 31A-31C, the body 1010 includes four pairs of pin holes 1012, 1014, 1016, and 1018. Each pair of pin holes 1012, 1014, 1016, 1018 may be parallel, and the pairs are oriented in a converging configuration. Each pair of pin holes 1012, 1014, 1016, 1018 may be spaced apart by a distance corresponding to the pin hole spacing of an associated cut guide (e.g., cut guide 180, 181, 900, etc.). The pin holes 1012, 1014, 1016, 1018 may thus be used to implement further frontal plane correction by being placed over an existing pair of pins and serving as a guide for placement of a second pair of similarly spaced, parallel pins at a predetermined angular offset about a metatarsal bone relative to the existing pair. the use of the realignment guide 100 will be described in greater detail with reference to FIGS. 39-48.

Figure 32A:
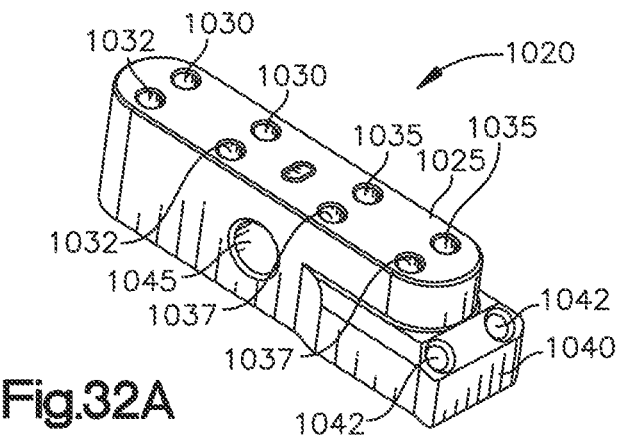
FIG. 32A is a perspective view of an example realignment guide configured as a pin guide for frontal plane adjustment in the Lapidus bunionectomy procedures described herein.
Figure 32B:
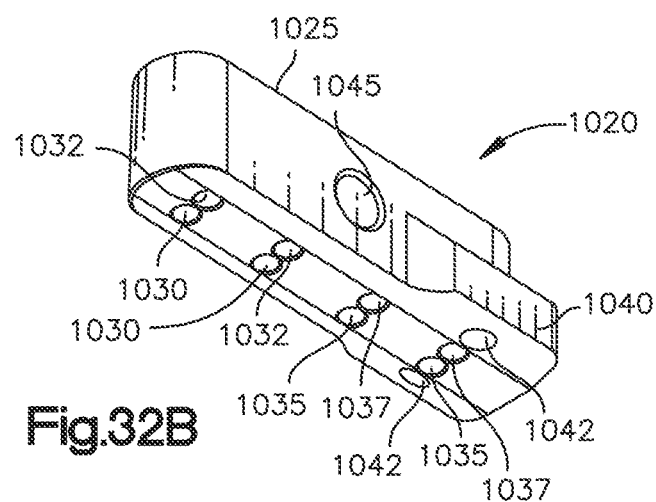
FIG. 32B is another perspective view of the realignment guide illustrated in FIG. 32A.
Figure 32C:
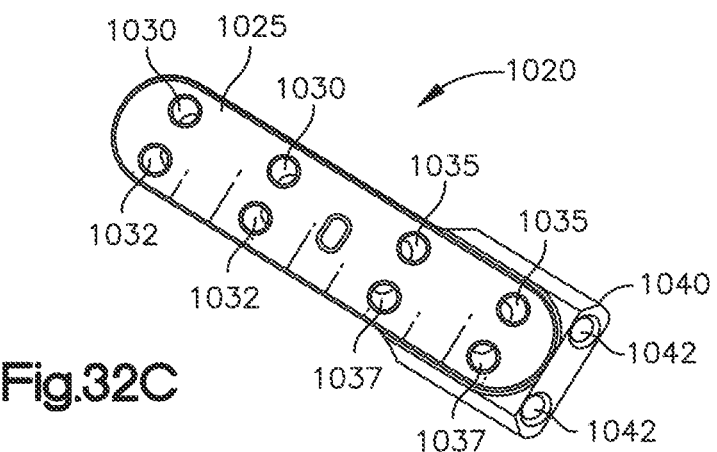
FIG. 32C is a top plan view of the realignment guide illustrated in FIG. 32A.

FIGS. 32A-32C depict an example realignment guide 1020 configured as a pin guide and a compressor block for frontal plane adjustment in the Lapidus bunionectomy procedures described herein. FIGS. 32A and 32B are upper and lower perspective views of the realignment guide 1020, respectively. FIG. 32C is a top plan view of the realignment guide 1020. The realignment guide 1020 may be integrally formed form a metal, a plastic, or other suitable material. The realignment guide 1020 may have a shape generally similar to the compressor block 400 and can function as both a realignment guide and a compressor block in operation.

The realignment guide 1020 includes a body 1025 having two pairs of proximal pin holes 1030, 1032 and two pairs of distal pin holes 1035, 1037. Similar to the proximal pin holes 410 and the distal pin holes 415 of the compressor block 400, the proximal pin holes 1030, 1032 and distal pin holes 1035, 1037 are convergent toward the middle of the realignment guide 1020. A widened section 1040 can include cross pin holes 1042 for additional stabilization and/or for temporary fixation while permanent fixation devices are placed. As will be described in greater detail with reference to FIGS. 36-38, the realignment guide 1020 may be used to implement additional frontal plane correction of the first metatarsal without requiring the insertion of additional pins into the bone.

Figure 35:
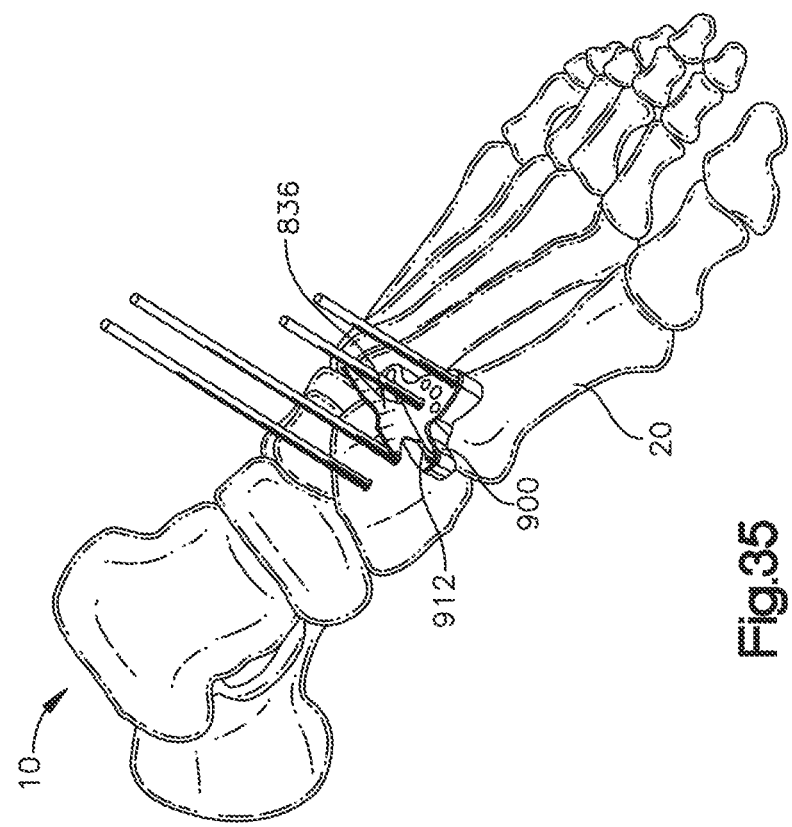

FIGS. 33-35 are perspective views of the bones of a foot 10, sequentially illustrating a re-cutting portion of an example Lapidus bunionectomy procedure performed using the example bunionectomy devices disclosed herein. The re-cutting portion of the Lapidus bunionectomy illustrated in FIGS. 33-35 may be performed at any time after an initial cut has been made to the first metatarsal 20 and/or to the first cuneiform 30, where further removal of bone is desired. For example, in some procedures, a surgeon may examine the cut end of a first metatarsal 20 and/or first cuneiform 30 and determine that further bone should be removed due to concavity of the bone or a desired spacing. Thus, as will be described in greater detail below, the portion of the Lapidus bunionectomy illustrated in FIGS. 33-35 may be used in conjunction with any of the other Lapidus bunionectomy procedures described herein.

As shown in FIG. 33, the re-cutting portion may begin with the foot 10 in a configuration similar to that of FIG. 15. In the configuration of FIG. 33, a cut guide (e.g., cut guide 100, cut guide 180, cut guide 181, etc. as disclosed elsewhere herein) may have been used to remove a portion of the first metatarsal 20 and/or the first cuneiform 30. Metatarsal pins 802 and/or cuneiform pins 818 may remain in the foot 10 following removal of the cut guide that was used to make the initial cuts to the first metatarsal 20 and/or first cuneiform 30. In the example re-cutting portion illustrated in FIGS. 33-35, it is desired to remove an additional portion of the first metatarsal 20 facing the first TMT joint 40.

Continuing to FIG. 34, the cut guide 900, configured as a re-cut guide, is placed by inserting the metatarsal pins 802 through the pin holes 922 of the cut guide 900 and sliding the cut guide 900 onto the metatarsal pins 802 until the cut guide 900 is seated against the previously cut face of the first metatarsal 20. In this configuration of FIG. 34, the slot 912 of the cut guide 900 is aligned closer to the metatarsal pins 802 than the TMT joint-facing end of the first metatarsal 20 due to the closer spacing of the cut guide 900 relative to that of the cut guides 100, 180, 181. Once the cut guide 900 is placed, the base of the first metatarsal 20 can be re-cut using a saw blade 836 inserted through the slot 912 of the cut guide 900. The remainder of the Lapidus bunionectomy procedure may the proceed substantially as shown and described with reference to FIGS. 16-24 or as described elsewhere herein. It will be understood that the re-cutting described above may be applied equally to the first metatarsal 20 or to the first cuneiform 30.

Figure 36:
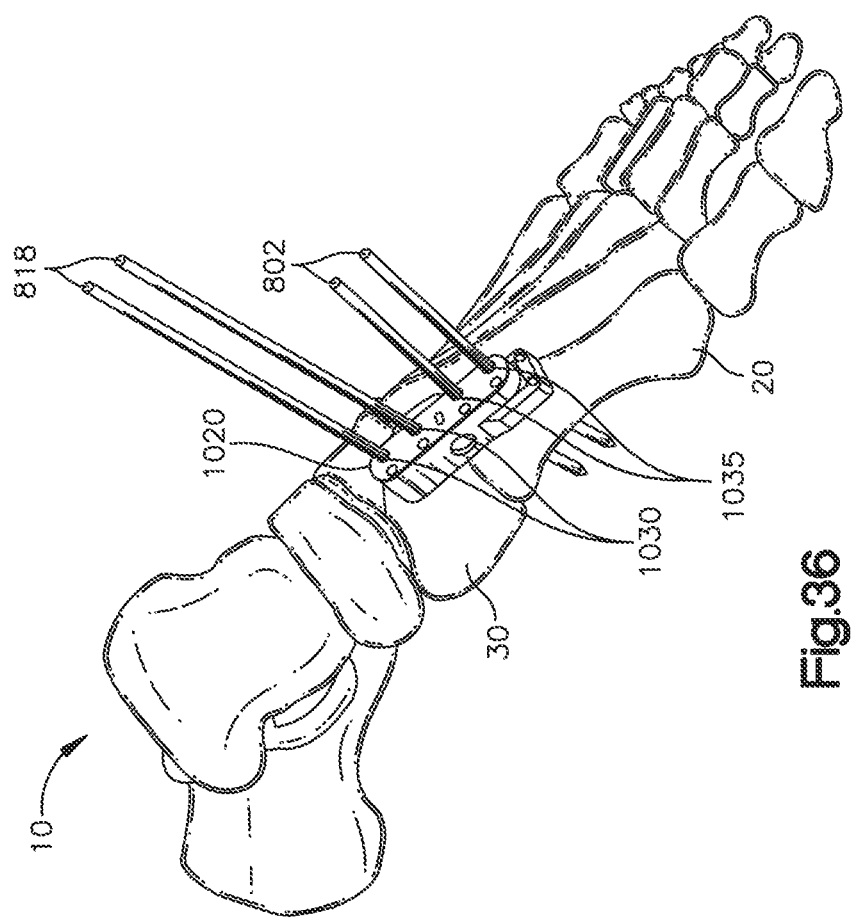
Figure 37:
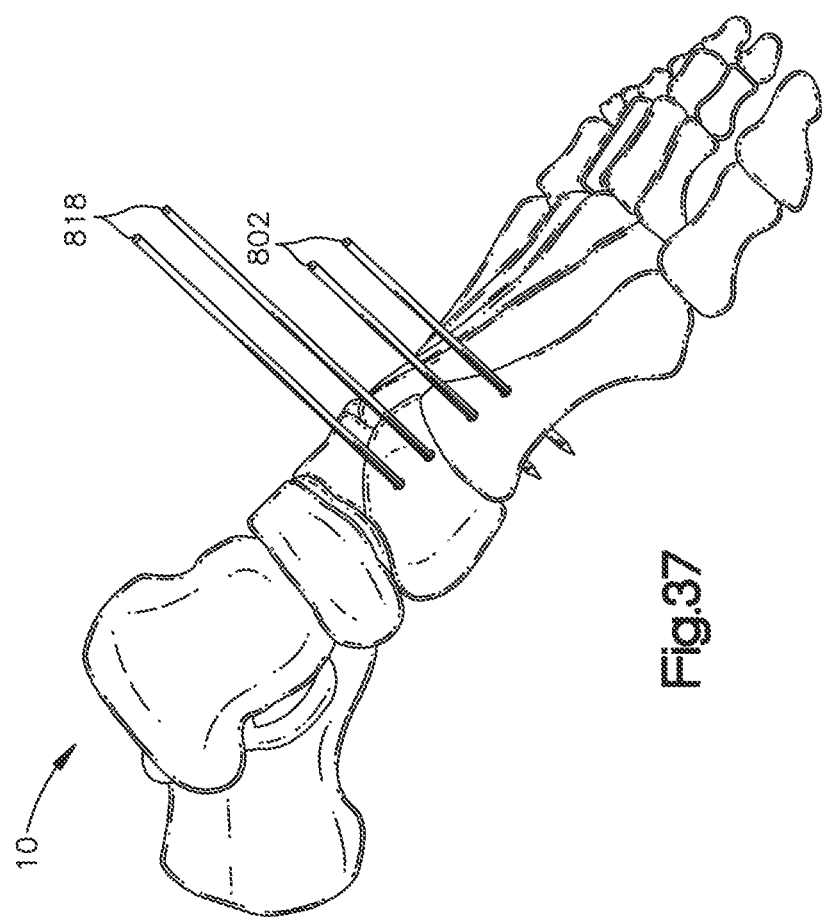
Figure 38:
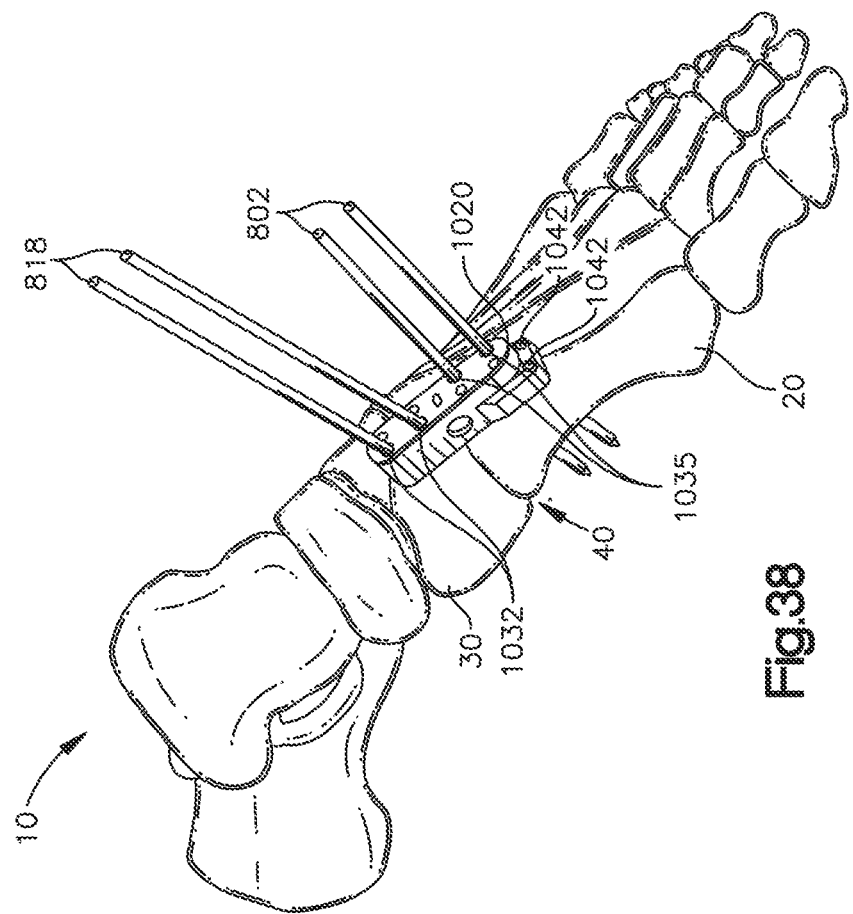
Figure 39:
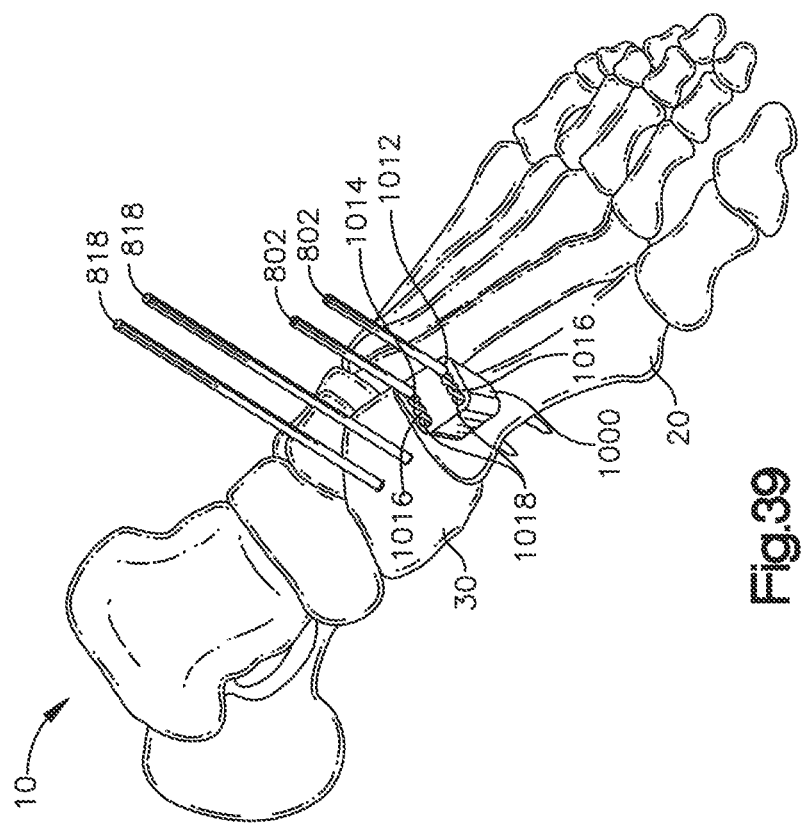

FIGS. 36-38 are perspective views of the bones of a foot 10, sequentially illustrating a frontal plane realignment portion of an example Lapidus bunionectomy procedure using the realignment guide 1020 illustrated in FIGS. 32A-32C. The frontal plane realignment portion of the Lapidus bunionectomy illustrated in FIGS. 36-38 may be performed at any time after the first metatarsal 20 and the first cuneiform 30 have been cut, and prior to fixation, as described elsewhere herein. As the realignment guide 1020 is configured as both a pin guide and a compressor block for frontal plane realignment, the realignment portion illustrated in FIGS. 36-38 may be performed instead of or in addition to (e.g., before or after) the compression portion of the Lapidus bunionectomy as illustrated in FIGS. 16-18. For example, in some procedures, a surgeon may perform an initial frontal plane correction and may subsequently determine, such as when initially fitting the compressor block as shown in in FIG. 16, that further correction or realignment of the first metatarsal 20 in the frontal plane is needed.

The frontal plane realignment begins with the foot 100 in a configuration as illustrated in FIG. 15 or 33 described above, in which metatarsal pins 802 remain in the first metatarsal 20 and cuneiform pins 818 remain in the first cuneiform 30 following cutting of the bones using the cut guides described herein. The realignment portion continues to the configuration shown in FIG. 36, as the realignment guide 1020 is placed by inserting the metatarsal pins 802 through a first pair of distal pin holes 1035 and inserting the cuneiform pins 818 through a first pair of proximal pin holes 1030. When the metatarsal pins 802 and the cuneiform pins 818 are disposed within pairs of holes on the same side of the realignment guide 1020 as shown in FIG. 36, the realignment guide 1020 functions similarly to the compressor block 400, compressing the cut ends of the first metatarsal 20 and the first cuneiform 30 without applying any frontal plane realignment. At the stage illustrated in FIG. 36, the surgeon may determine that the initial frontal plane adjustment was insufficient, and that the first metatarsal 20 should be realigned by further clockwise rotation to reach a desired alignment.

As shown in FIGS. 37 and 38, the realignment guide 1020 is removed from the foot 10 (FIG. 37) and replaced over the cuneiform pins 818 and metatarsal pins 802. However, in replacing the realignment guide 1020, the cuneiform pins 818 are inserted through the second pair of proximal pin holes 1032, which are angularly displaced relative to the first pair of proximal pin holes 1030. The metatarsal pins 802 are inserted through the same first pair of distal pin holes 1035 through which they were previously inserted in FIG. 36. Thus, the replacement of the realignment guide 1020 effects a further clockwise rotational adjustment of the first metatarsal 20 and compresses the TMT joint 40 for fixation. Alternatively, a counterclockwise adjustment may be performed by reinserting the cuneiform pins 818 through the same first pair of proximal pin holes 1030 and inserting the metatarsal pins 802 through the second set of distal pin holes 1037. Following realignment as shown in FIGS. 36-38, the Lapidus bunionectomy procedure can proceed to fixation of the bones of the TMT joint 40, for example, as shown and described with reference to FIGS. 17-24. The cross pin 824 for temporary fixation, as shown in FIGS. 18-20, can be inserted through either of the cross pin holes 1042.

FIGS. 39-48 are perspective views of the bones of a foot, sequentially illustrating a frontal plane realignment portion of an example Lapidus bunionectomy procedure using the realignment guide 1000 illustrated in FIGS. 31A-31C. The frontal plane realignment portion of the Lapidus bunionectomy illustrated in FIGS. 39-48 may be performed at various stages of the procedure, for example, prior to placement of the compressor block as illustrated in FIG. 16. In some embodiments, the frontal plane realignment portion of the Lapidus bunionectomy illustrated in FIGS. 39-48 may be performed after an initial placement of the compressor block 400 indicates that more or less frontal plane correction is needed prior to fixation. As will be described in greater detail, realignment using the realignment guide 1000 differs from realignment using the realignment guide 1020 (e.g., FIGS. 36-38) in that the realignment guide 1000 guides the placement of a second pair of metatarsal pins, rotationally displaced relative to the initial pair of metatarsal pins, which may then be used in combination with the compressor block 400 to complete the frontal plane realignment.

The frontal plane realignment begins with the foot 100 in a configuration as illustrated in FIG. 15 or 33 described above, in which metatarsal pins 802 remain in the first metatarsal 20 and cuneiform pins 818 remain in the first cuneiform 30 following cutting of the bones using the cut guides described herein. The realignment portion continues to the configuration shown in FIG. 39, as the realignment guide 1000 is placed by inserting the metatarsal pins 802 through a first pair of pin holes 1012 of the realignment guide 1000. In this configuration, the other three pairs of pin holes 1014, 1016, 1018 define pin placement locations for three increasing amounts of clockwise frontal plane realignment. Alternatively, if counterclockwise frontal plane realignment is desired, the realignment guide 1000 would be placed by inserting the metatarsal pins 802 through the fourth pair of pin holes 1018 such that the other three pairs of pin holes 1012, 1014, 1016 would define pine placement locations for counterclockwise frontal plane realignment.

Figure 40:
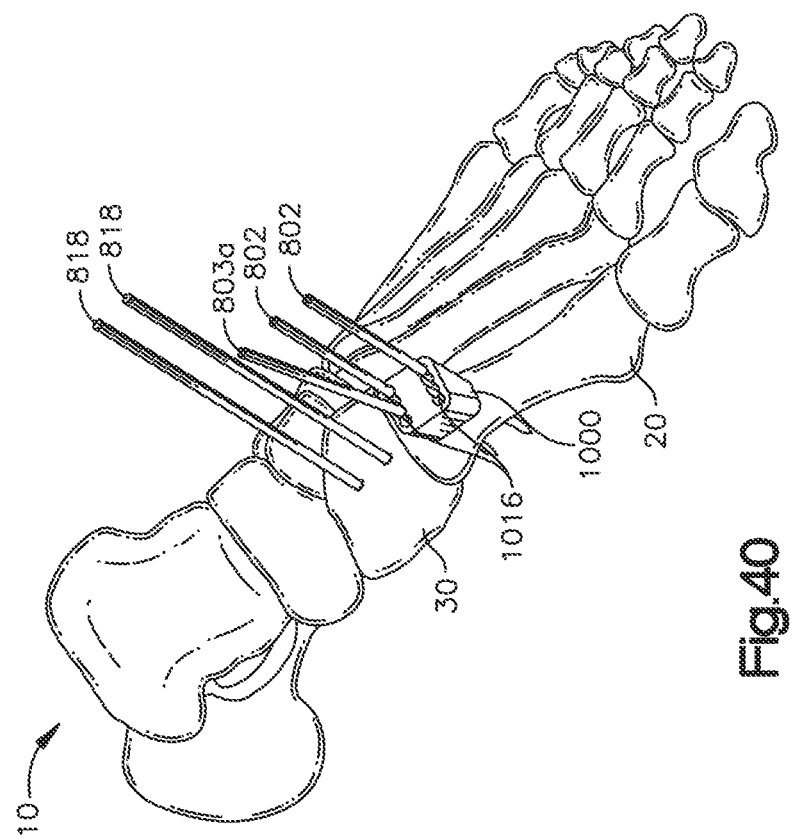

After the realignment guide 1000 is placed, the process continues to FIG. 40 as a first substitute metatarsal pin 803a is partially inserted into the first metatarsal 20 through one of the pair of pin holes 1016. Due to the convergence of the paths of the pin holes 1012, 1014, 1016, 1018 within the first metatarsal 20, it may be impossible or undesirable to fully insert substitute metatarsal pin while the metatarsal pins 802 remain inserted. Accordingly, the first substitute metatarsal pin 803a may be only partially inserted such that the first substitute metatarsal pin 803a does not impinge upon the corresponding metatarsal pin 802. Preferably, the first substitute metatarsal pin 803a extends sufficiently into the bone so as to retain the position and orientation of the realignment guide 1000 relative to the first metatarsal 802 if one of the metatarsal pins 802 is removed.

Figure 41:
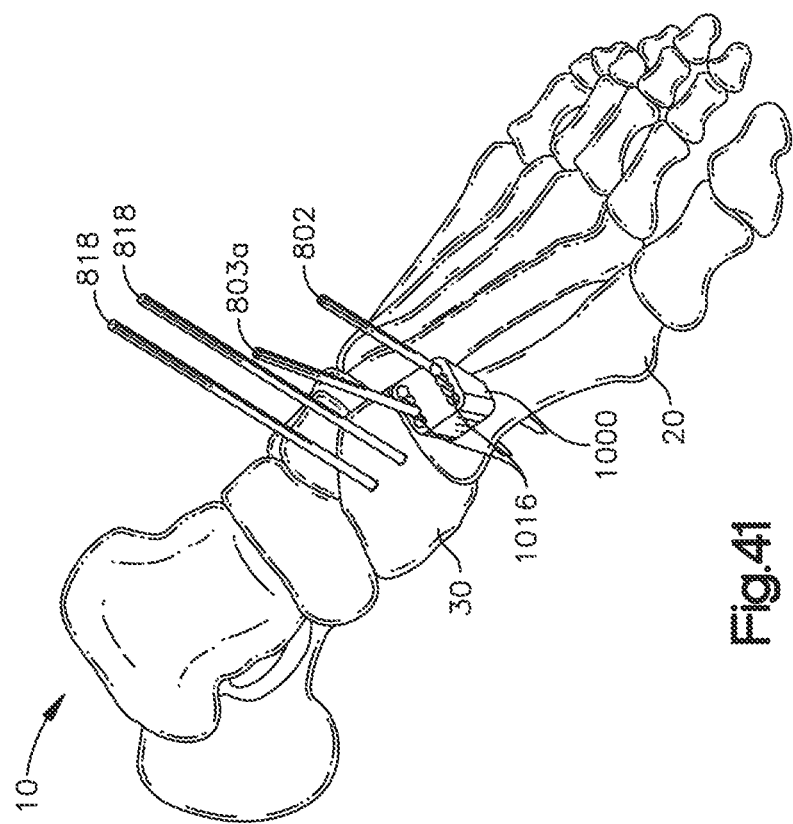
Figure 42:
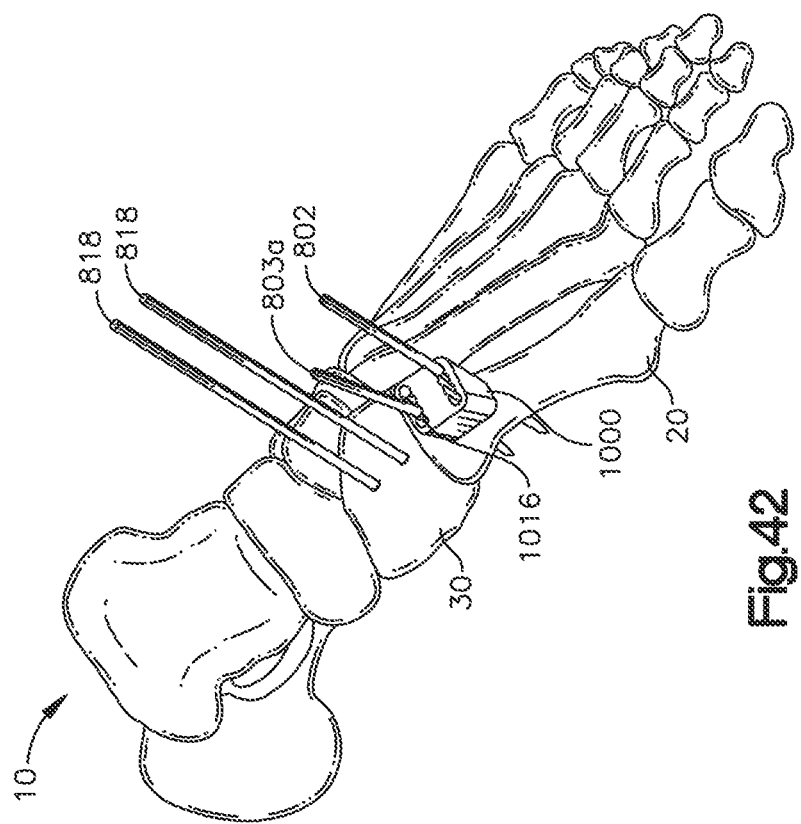

Continuing to FIG. 41, the proximal metatarsal pin 802 corresponding to the first substitute metatarsal pin 803a is removed from the first metatarsal 20. In this configuration, the partially inserted first substitute metatarsal pin 803a and the remaining metatarsal pin 802 are sufficient to maintain the position and orientation of the realignment guide 1000 relative to the first metatarsal. As shown in FIG. 42, the first substitute metatarsal pin 803a can then be inserted further through the pin hole 1016 and the first metatarsal to a fully inserted position, with the realignment guide 1000 serving as a pin placement guide for the first substitute metatarsal pin 803a.

Figure 43:
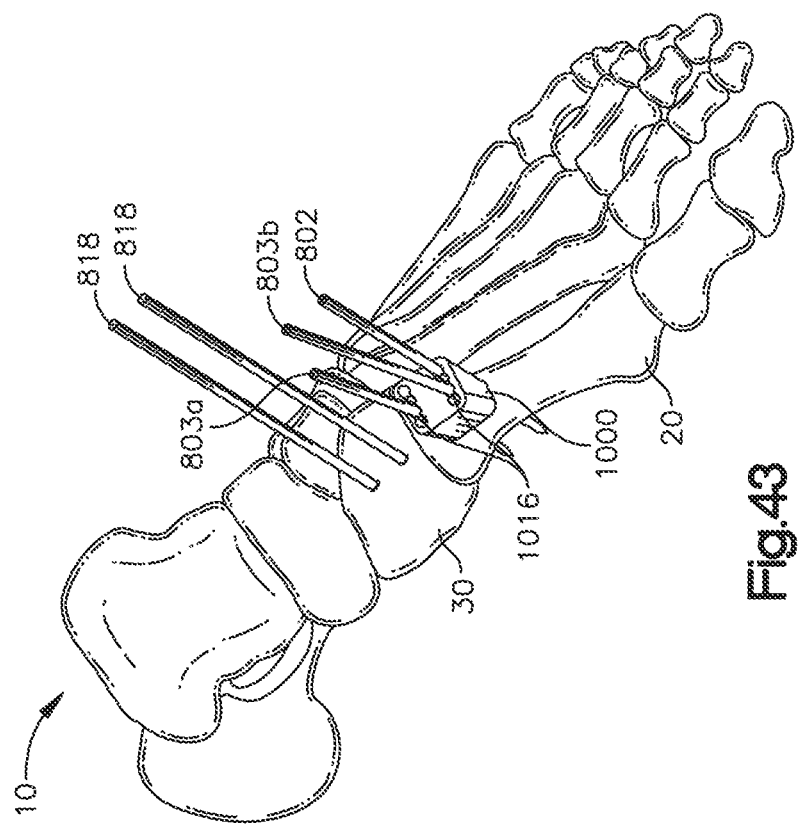
Figure 44:
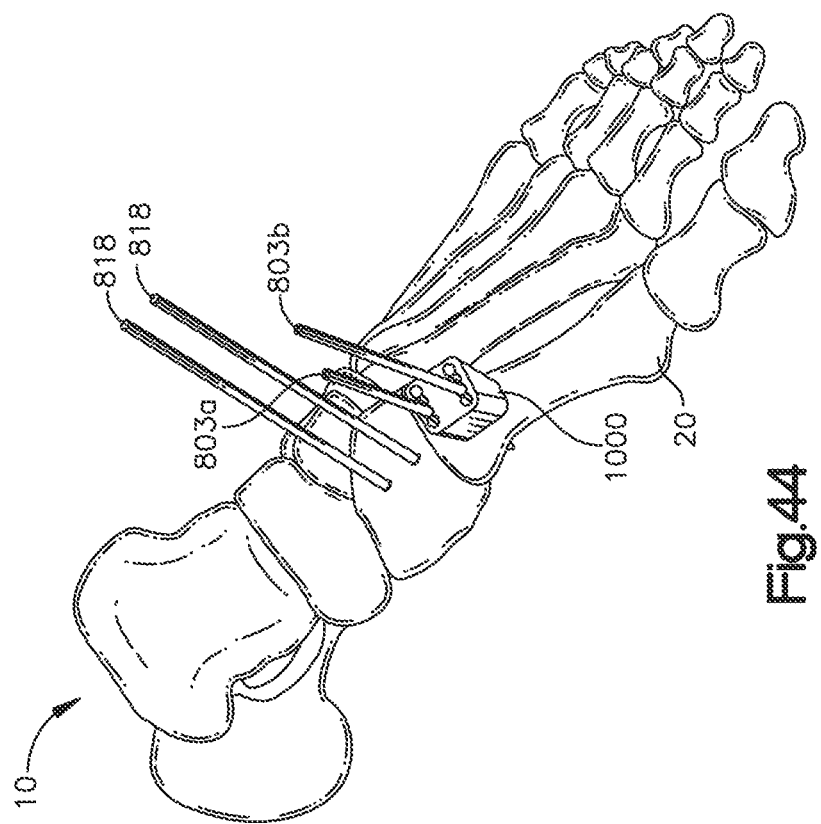
Figure 45:
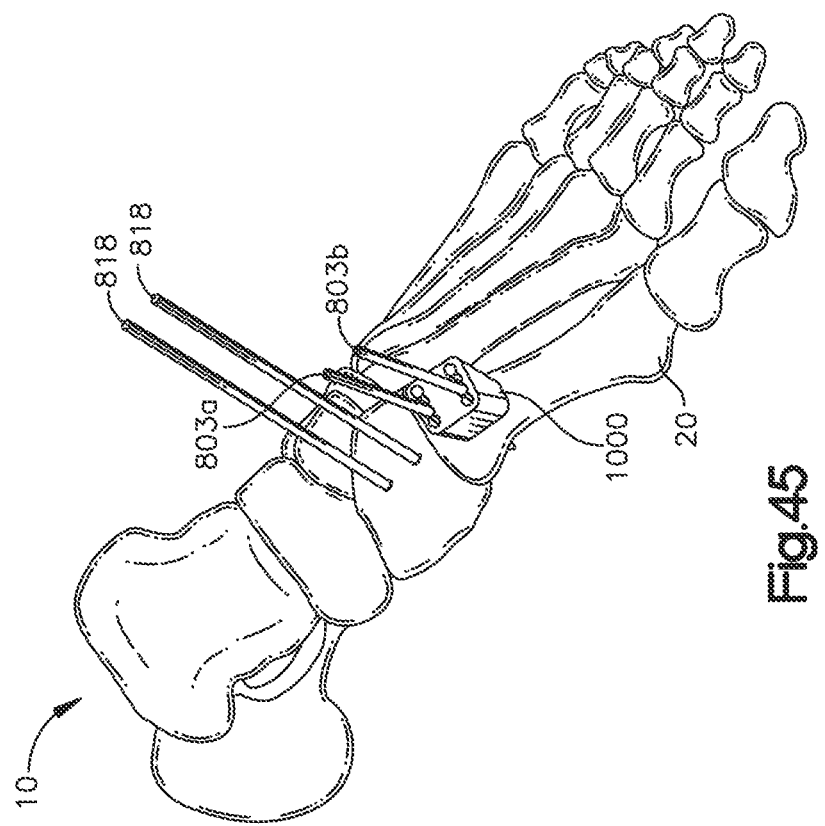

Continuing to FIGS. 43-45, a similar replacement procedure is performed for the remaining metatarsal pin 802. As shown in FIG. 43, a second replacement metatarsal pin 803b is partially inserted through the other pin hole of the pair of pin holes 1016. As shown in FIG. 44, the remaining metatarsal pin 802 is removed to allow the second replacement metatarsal pin 803b to be fully inserted. As shown in FIG. 45, the second replacement metatarsal pin 803b is further inserted through the realignment guide 1000.

Figure 46:
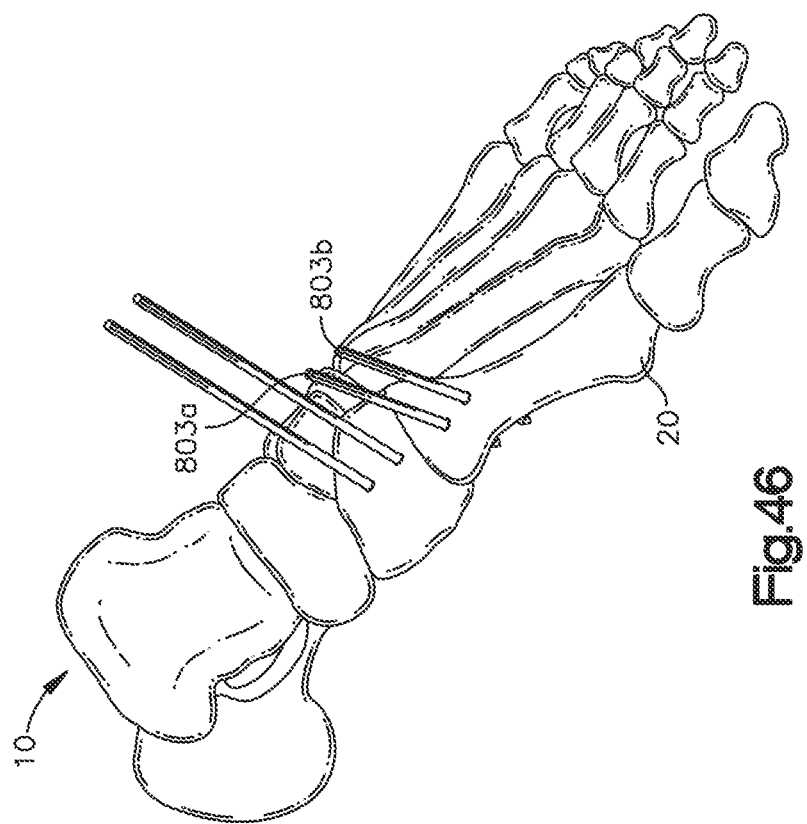
Figure 47:
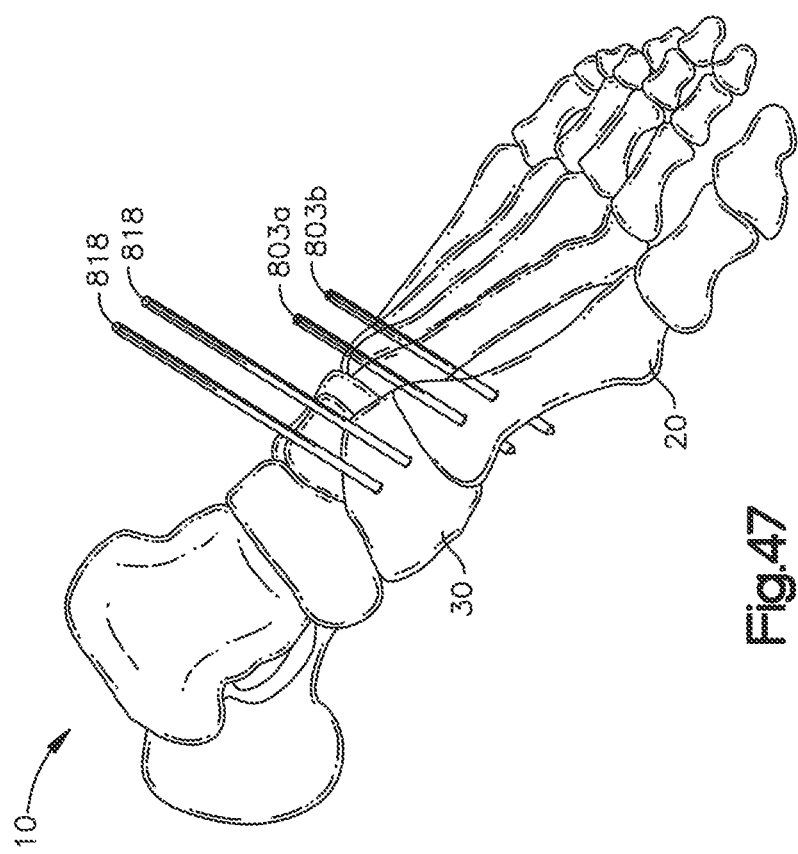
Figure 48:
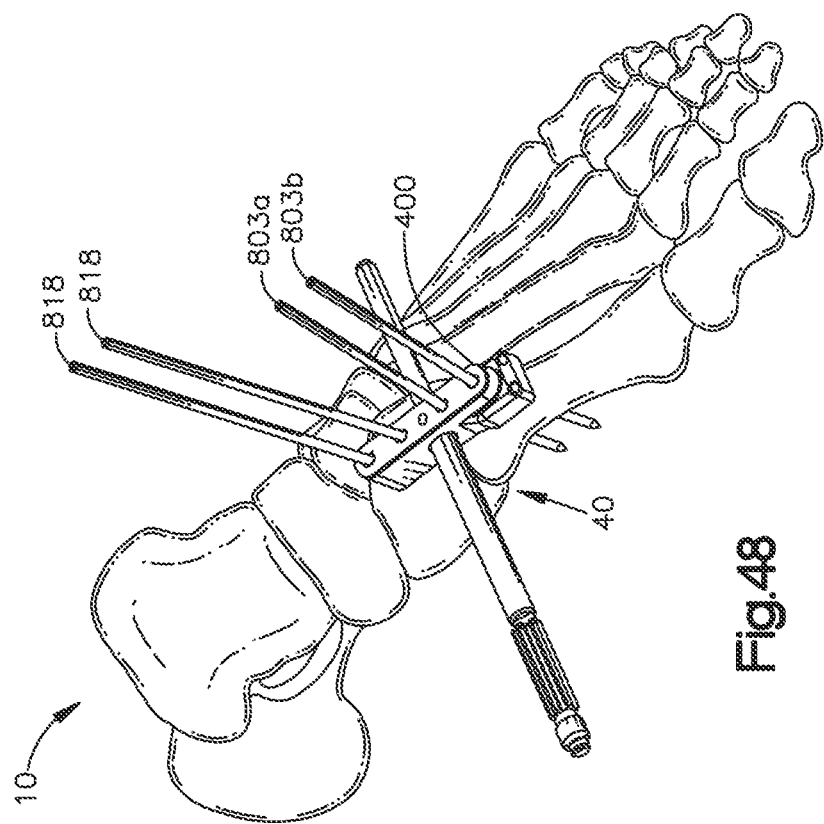

Continuing to FIG. 46, the realignment guide 1000 is removed from the foot 10 such that the replacement metatarsal pins 803a, 803b remain in the first metatarsal 20 with the same spacing but angularly displaced relative to the metatarsal pins 802 that were removed. As shown in FIG. 47, the first metatarsal 20 is then rotated within the frontal plane relative to the first cuneiform 30 into the final orientation in which the replacement metatarsal pins 803a, 803b are aligned with the cuneiform pins 818. Following this final frontal plane realignment process, a compressor block such as compressor block 400 may then be placed over the cuneiform pins 818 and the replacement metatarsal pins 803a, 803b to compress the TMT joint 40 for fixation. The Lapidus bunionectomy procedure may then proceed to conclusion, for example, as shown and described with reference to FIGS. 17-24.

FIGS. 49A-50B depict an example cut guide 1100 configured as a cutting guide and a pin guide for a joint fusion procedure and particularly for fusion of the TMT joint (for example, fusion of the second or third TMT joint or any other TMT joint as desired). The cut guide 1100 may be a single integrally formed component and may comprise a metal, a plastic, or other suitable material.

The cut guide 1100 generally includes a body 1105, a first or proximal end portion 1110, a second or distal end portion 1115, and a paddle 1120. The paddle 1120 is sized and shaped to seat within a joint between a first bone and a second bone (e.g., between a metatarsal and a cuneiform or cuboid bone) after removing soft tissue such as the joint capsule around the joint. The relatively narrower and sloped terminal portion of the paddle 1120 may facilitate insertion of the paddle 1120 into the joint. In some embodiments, the paddle 1120 is integrally formed with the body 1105.

The body 1105 of the cut guide 1100 includes a slot 1125. The slot 1125 can pass through the full thickness of the body 1105 and is sized and shaped to serve as a positioning guide for a sawblade or other cutting instrument in order to facilitate precise cuts at each side of the joint. For example, the slot 1125 may be positioned at a predetermined spacing distance relative to the distal plane of the paddle 1120 to facilitate cutting the base (i.e. end) of the first bone when the paddle 1120 is positioned within the joint. Similarly, slot 1125 may be positioned on the opposite side (proximal plane) of the paddle to facilitate cutting the base of the second bone. The slot 1125 can be identically or similarly shaped (e.g., may have the same length and/or width) such that the first bone and second bone cuts can be performed with the same or same type of saw blade. In some embodiments, the slot 1125 can be parallel to the paddle 1120, or may be angled relative to the plane of the paddle 1120. In some embodiments, relatively wider terminal sections 1127 at the ends of the slot 1125 may be provided for the placement of additional guide wires during cutting to prevent a saw blade from making an excessively wide cut when using the cut guide 1100.

A proximal pin hole 1112 extends through the full thickness of the cut guide 1100. The proximal pin hole 1112 can be disposed on the proximal end portion 1110 or within the body 1105. The proximal pin hole 1112 can each have a substantially circular profile sized to accommodate a surgical pin or wire for temporarily securing the cut guide to the first bone and/or the second bone, as discussed further below. The proximal pin hole 1112 serves as a guide such that a pin or wire can be inserted at a predetermined spacing relative to the paddle 1120 and/or relative to the plane along which the first bone and/or second bone are cut by a saw blade through the slot 1125. Although the example cut guide 1100 of FIGS. 49A-50B includes a single proximal pin hole 1112, in some embodiments the cut guide 1100 may include a plurality of proximal pin holes 1112 to provide additional stability. For example, the cut guide 1100 may include two or more proximal pin holes 1112 aligned along a centerline of the cut guide 1100 perpendicular to the slot 1125.

The proximal end portion 1110 can further include one or more additional proximal pin holes 1111. The additional proximal pin holes 1111 can be spaced at a predetermined spacing from the proximal pin hole 1112. The proximal pin holes 1111, 1112 may extend vertically parallel to each other or may be skewed having non-parallel trajectories, as shown in FIG. 50A. The proximal pin hole 1112 or pin holes can be aligned along a centerline of the guide 1100 (e.g., transverse to the plane of the cut slot 1125).

Distal pin hole 1117 extends through the full thickness of the distal extension 1115. Similar to the proximal pin hole 1112, the distal pin hole 1117 can have a substantially circular profile sized to accommodate a surgical pin or wire for temporarily securing the cut guide to the foot, and may have the same diameter as the proximal pin hole 1112. The distal pin hole 1117 serves as a guide such that a distal pin or wire can be inserted at a predetermined spacing relative to the plane along which the first bone is cut by a saw blade through the slot 1125 and/or the paddle 1120. The distal pin hole 1117 extend vertically parallel to the proximal pin hole 1112, as shown in FIG. 50B. A plane which intersects the axes of the proximal pin hole 1112 may be coplanar with a plane which intersects the axis of distal pin hole 1117. The distal pin hole 1117 can be aligned along a centerline of the guide 1100. Although the example cut guide 1100 of FIGS. 49A-50B includes a single distal pin hole 1117, in some embodiments the cut guide 1100 may include a plurality of distal pin holes 1117 to provide additional stability. For example, the cut guide 1100 may include two or more distal pin holes 1117 aligned along a centerline of the cut guide 1100 perpendicular to the slot 1125.

A bottom 1102 or bone-facing surface of the body 1105 can be planar across the distal end portion 1115 and/or the proximal end portion 1110. Alternatively, the bottom 1102 of the distal extension 1115 and/or the proximal end portion 1110 may not be coplanar with a bottom or bone-facing surface of the body 1105, which may allow the cut guide 1100 to be placed closer to the first or second bones while allowing space for the osseous anatomy of the first bone and the second bone. Further details are provided in U.S. Pat. No. 10,292,713, which is incorporated herein by reference.

In some embodiments, the body 1105 of the cut guide 1100 further includes one or more additional openings, such as additional convergent pin holes 1111 and/or longitudinal apertures 1109. The convergent pin holes 1111 may be utilized to insert one or more additional pins or wires if additional stability is desired. The longitudinal apertures 1109 extend transverse to the slot 1125 and may provide an opening to facilitate x-ray visualization and/or any other suitable surgical imaging procedure to confirm and/or monitor the alignment of the cut guide during a procedure.

Figure 51A:
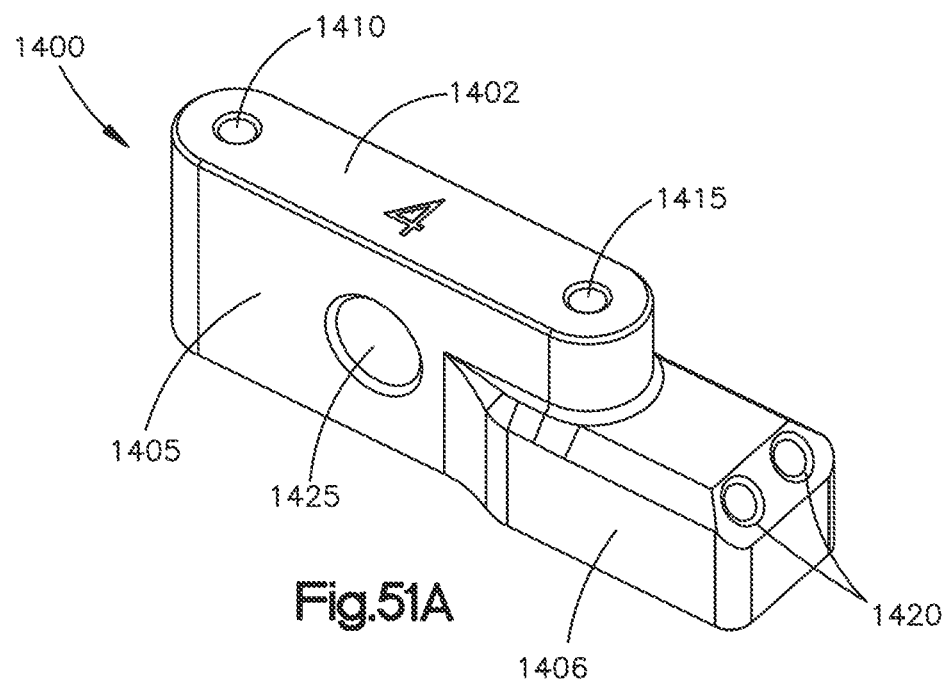
FIG. 51A is a perspective view of a compressor block configured to be used in the joint fusion procedures described herein.
Figure 51B:
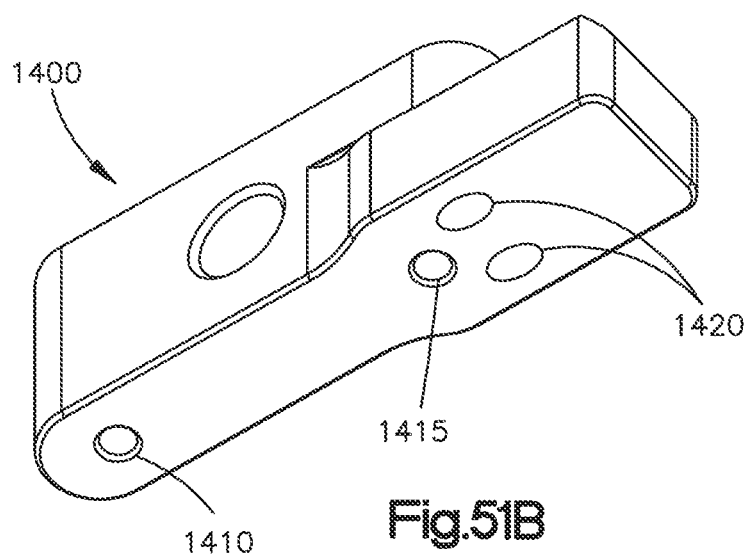
FIG. 51B is another perspective view of the compressor block of FIG. 51A.

FIGS. 51A-52C depict an example compressor block 1400 configured to be used in the joint fusion procedures described herein. In some embodiments, the compressor block 1400 may be configured for a combination of realignment and compression (e.g., a RAC block). FIGS. 51A and 51B are upper and lower perspective views of the compressor block 1400, respectively. FIG. 52A is a top plan view of the compressor block 1400. FIG. 52B is a cross-sectional side elevation view of the compressor block 1400 taken about the line 52B-52B in FIG. 52A. FIG. 52C is a cross-sectional side elevation view of the compressor block 1400 taken about the line 52C-52C in FIG. 52A. As will be described in greater detail, with reference to FIG. 59, the compressor block 1400 is configured to assist in compressing and fixing a resected joint that has been free-hand cut or cut using the cut guide 1100.

Figure 59:
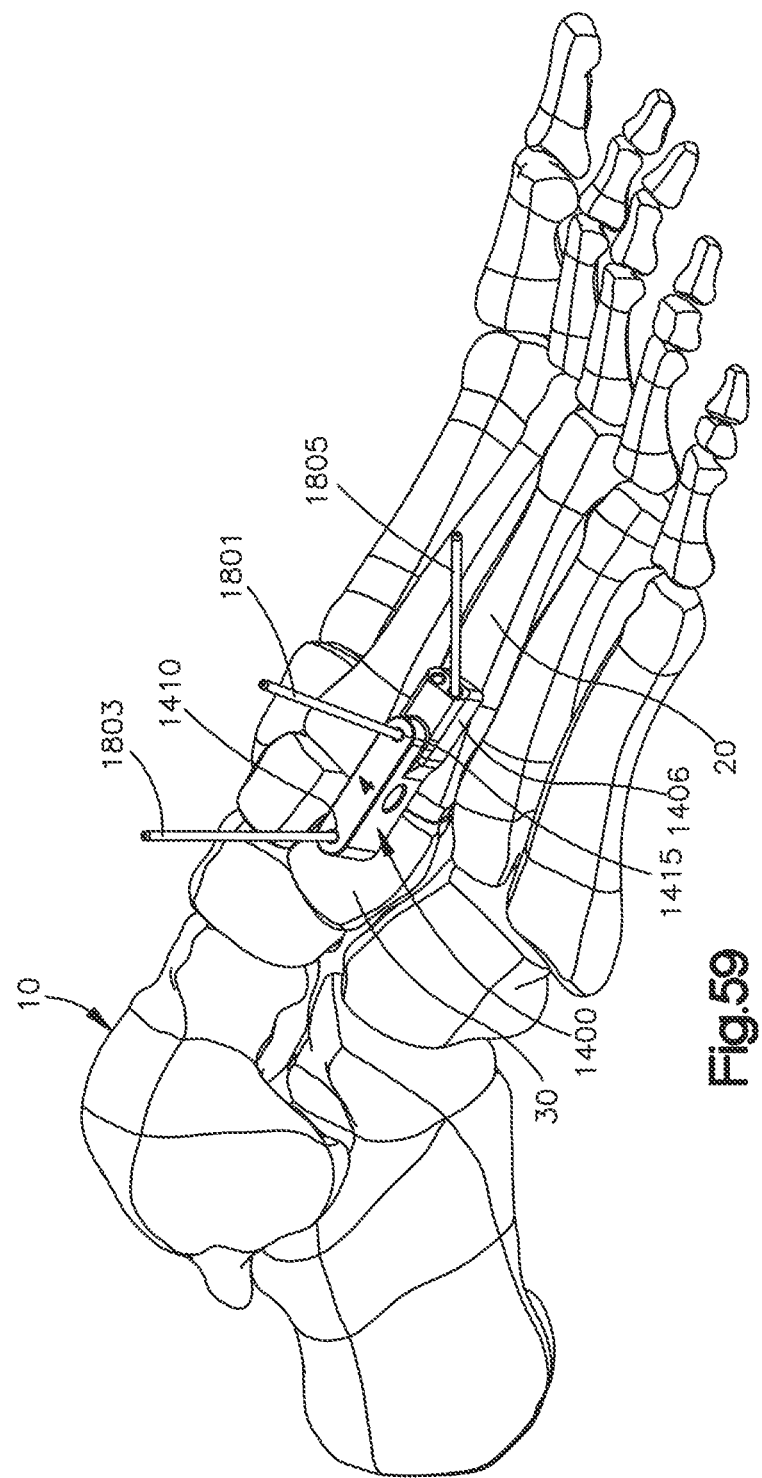

The compressor block 1400 includes a body 1405 having an upper surface 1402 and a lower surface 1404. The upper surface 1402 and/or the lower surface 1404 can be planar. The body 1405 can include a proximal pin hole 1410 and a distal pin hole 1415 extending therethrough from the upper surface 1402 to the lower surface 1404. The proximal pin hole 1410 and the distal pin holes 1415 can be located closer each other and/or to the center of the compressor block 1400 than the proximal pin hole 1112 and the distal pin hole 1117 of the cut guide 1100. Additionally, the proximal pin hole 1410 and/or the distal pin holes 1415 can be non-parallel and/or are disposed at converging angles such that their spacing at the bottom surface 1404 of the compressor block 1400 is relatively closer than at the upper surface 1402. Thus, parallel pins passing through the proximal apertures 1410 and the distal apertures 1415 are compressed closer together as the compressor block 1400 slides downward over the pins, as shown in FIG. 59.

A handle attachment aperture 1425, which may be threaded, is provided for attaching a side-mounted handle which may assist the user in sliding the compressor block 1400 downward to compress pins or wires passing through the apertures 1410, 1415 of the compressor block 1400.

The compressor block 1400 further includes section 1406 containing cross pin holes 1420. As shown in FIG. 52B the cross pin holes 1420 extend downward and inward from an outer edge of the widened section 1406 such that a pin or wire inserted into a cross pin hole 1420 exits the bottom 1404 of the compressor block 1400 relatively nearer the centerline of the compressor block 1400. The cross pin holes 1420 are aligned such that, when the compressor block 1400 is used in conjunction with the cut guide 1100 or free-hand pin guide 1150 at the joint, the compressor block 1400 brings the cut faces of the resected first bone and second bone towards one another and/or into contact with each other or a spacer. A pin inserted through either cross pin hole 1420 will extend at an angle through the interface of the compressed joint to temporarily maintain contact at the joint face until the second bone and the first bone can be fixed by a plate or other fixing component. In some embodiments, section 1406 may include bone-facing slots rather than cross pin holes 1420 (e.g., slots open to the lower surface 1404 of the compressor block 1400 along their entire length). Bone-facing slots may allow the compressor block to be removed from the bone while pins remain inserted in the bone through the apertures 1410, 1415 and one or both cross pin holes 1420.

Figure 53C:
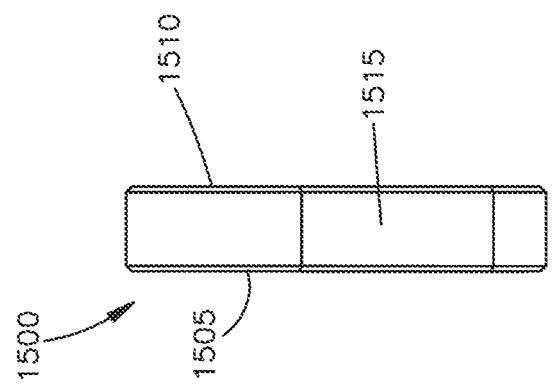
FIG. 53C is a side elevation view of the spacer of FIG. 53A.
Figure 53B:
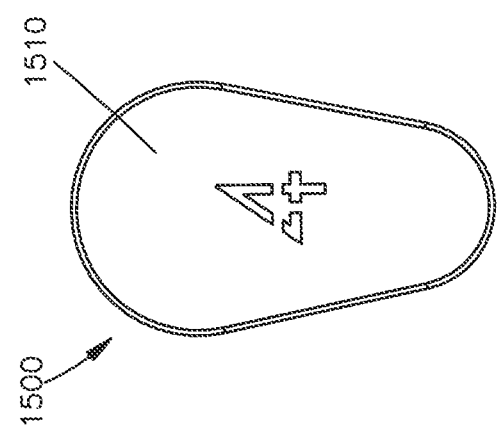
FIG. 53B is a top plan view of the spacer of FIG. 53A.
Figure 53A:
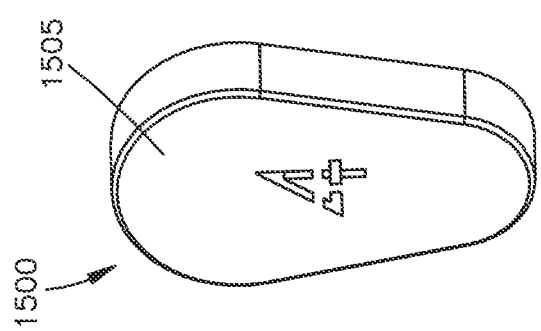
FIG. 53A is a perspective view of a spacer configured to be placed within a joint during the joint fusion procedures described herein.

With reference to FIGS. 53A-53C, a spacer 1500 can be included between resected faces of the first bone and the second bone in the fused joint. The spacer 1500 can be sized and shaped to position the first and second bone relative to on another in the desired resected position. In some embodiments, the spacer 1500 may have an appropriate thickness to serve as a substitute for removed joint tissue, such as to maintain a preexisting length of the ray of the foot. In some embodiments, the thickness may be selected to correspond to a thickness of tissue removed by the cut guide 1100 and/or to a spacing of the compressor block 1400. The spacer 1500 can include opposite planar faces 1505, 1510. In various embodiments, the opposite planar faces 1505, 1510 may be parallel, or may be non-parallel. For example, non-parallel opposite planar faces 1505, 1510 may allow the spacer 1500 to serve as a wedge insert for correction conditions such as metatarsus adductus. An outer periphery 1515 can be generally oval or oblong in shape, although this is not required. The spacers can be sold in packs of various sizes, shapes, and/or thicknesses for fitting within different bodily joints. The spacer 1500 can comprise a plastic, gel, foam, metal, or other suitable material. The spacer 1500 can comprise a generally rigid or elastic material.

FIGS. 54-65 depict a joint 40 between a first bone such as the cuneiform 30 and a second bone such as the metatarsal 20. Here, the joint 40 between the first and second bones 20 and 30 such as the TMT joint, is depicted in the bones of a foot 10. As shown in FIG. 54, the procedure may begin by placing and temporarily securing the cut guide 1100. Prior to placing the cut guide, the surgeon may prepare the joint 40 by making an incision such as a dorsal incisions to expose the joint 40 and excising soft tissue around the joint, such as the joint capsule or other soft tissue, to expose the joint 40 and create a space in which the paddle 11120 of the cut guide 1100 can be seated.

Once the joint has been prepared, the cut guide 1100 is placed by seating the paddle 1120 (not visible in FIG. 54) within the joint 40 such that proximal extension 1110 sits adjacent to or against the first bone 30 and the distal extension 1115 sits adjacent to or against the second bone 20. The paddle 1120 is inserted into the joint 40 such that the cut guide 1100 is oriented along the axis of the second bone 20. The alignment of the cut guide 1100 may be confirmed under fluoroscopy or other suitable imaging technique before proceeding.

Figure 56:
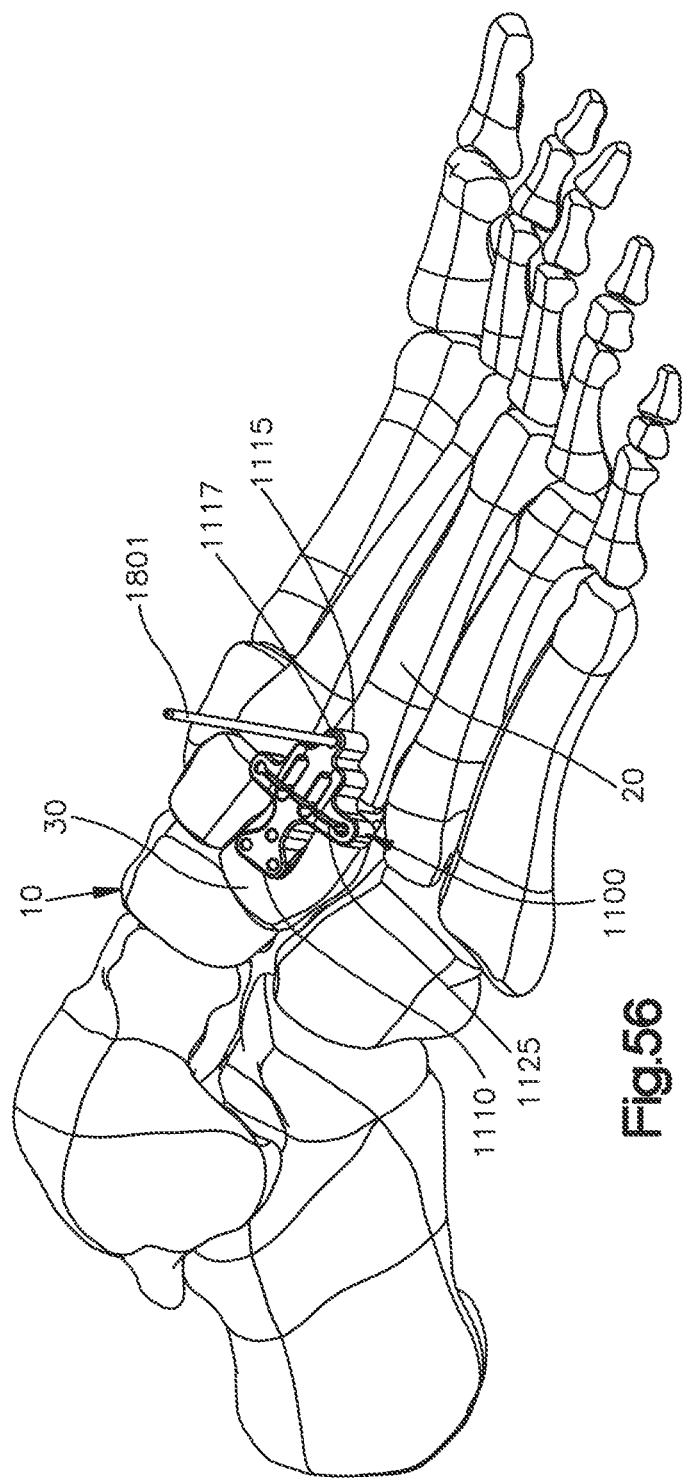

Continuing to FIG. 56, the cut guide 1100 is placed and is suitably aligned in a first configuration with the proximal end portion 1110 aligned with the second bone and the distal end portion 1115 aligned with the first bone. The slot 1125 can be aligned with the base of the second bone 20. The cut guide 1100 is temporarily secured relative to the second bone 20 by inserting a first bone pin 1801 or wire through the proximal pin hole 1112 of the proximal end portion 1110 and into or through the second bone 20. Another bone pin 1802 or wire can be inserted into the second bone through the aperture 1111. Optionally, another bone pin (not shown) can be inserted through the distal pin hole 1117 and into the first bone. The bone pin 1801 or wire, as well as any of the other pins or wire described in the following description, may be, for example, a Kirschner wire ("K-wire"), or any other suitable type of wire or pin that can be placed into the bone to secure the cut guide 1100.

Once the bone pins 1801, 1802 or wire are inserted as shown in FIG. 55, the base of the second bone 20 is cut using a saw blade 1824 inserted through the slot 125 of the cut guide 1100.

With reference to FIG. 56, the cut guide 1100 can be removed and reversed and placed in a second configuration with the proximal end portion 1110 aligned with the first bone and the distal end portion 1115 aligned with the second bone. The slot 1125 can be aligned with the base of the first bone 30. In the second configuration, the bone pin 1802 can be removed from the second bone 20. The distal end portion 1115 can be held in place by inserting the distal aperture 1117 over the bone pin 1801. A bone pin 1803 can be inserted through the proximal pin hole 1112 and into or through the first bone 30. Another bone pin 1804 or wire can be inserted into the first bone through the aperture 1111.

Figure 57:
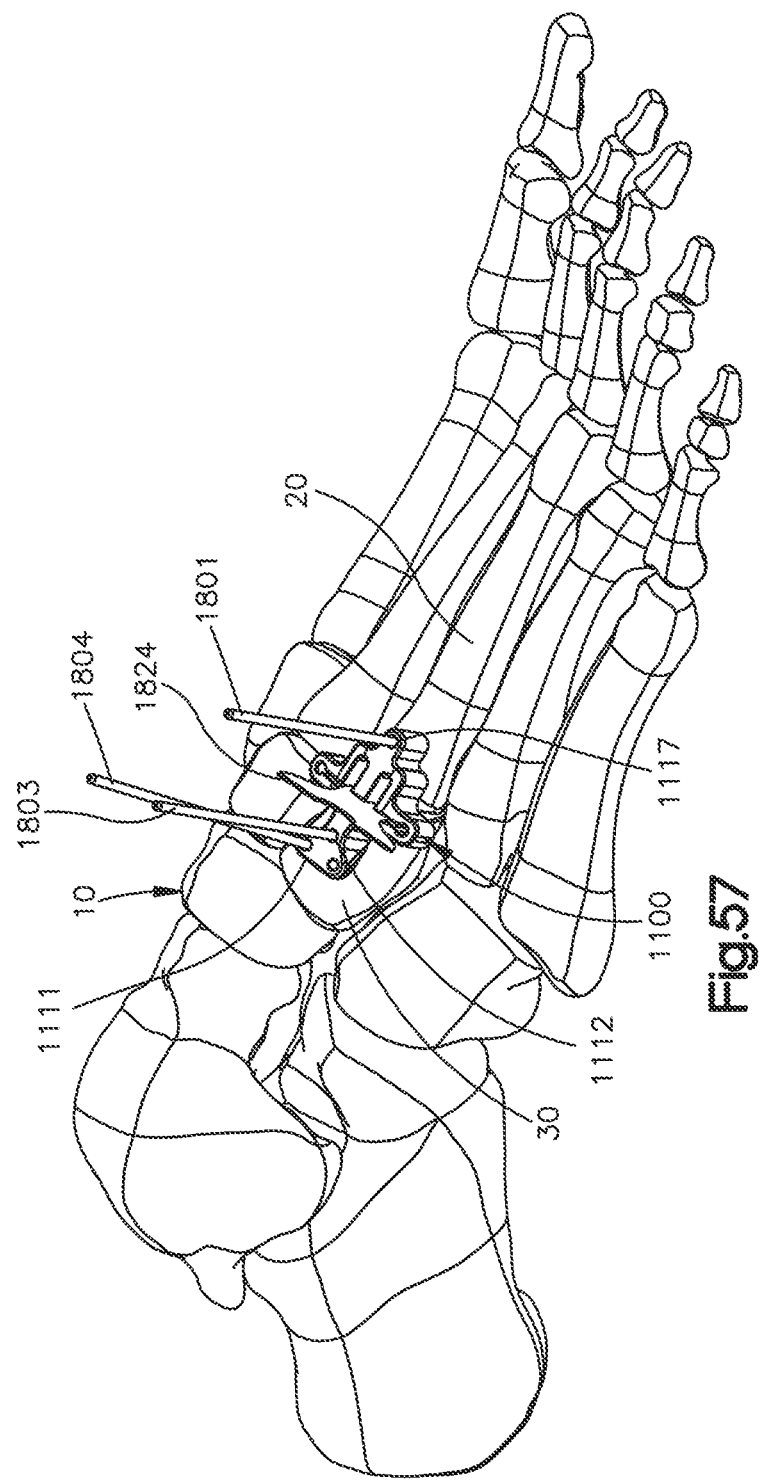

Referring to FIG. 57, once the bone pins 1803, 1804 or wire are inserted, the base of the first bone 30 is cut using a saw blade 824 inserted through the slot 1125 of the cut guide 1100. Cutting the base of the first bone 30 completes the excision of the joint 40.

Figure 58:
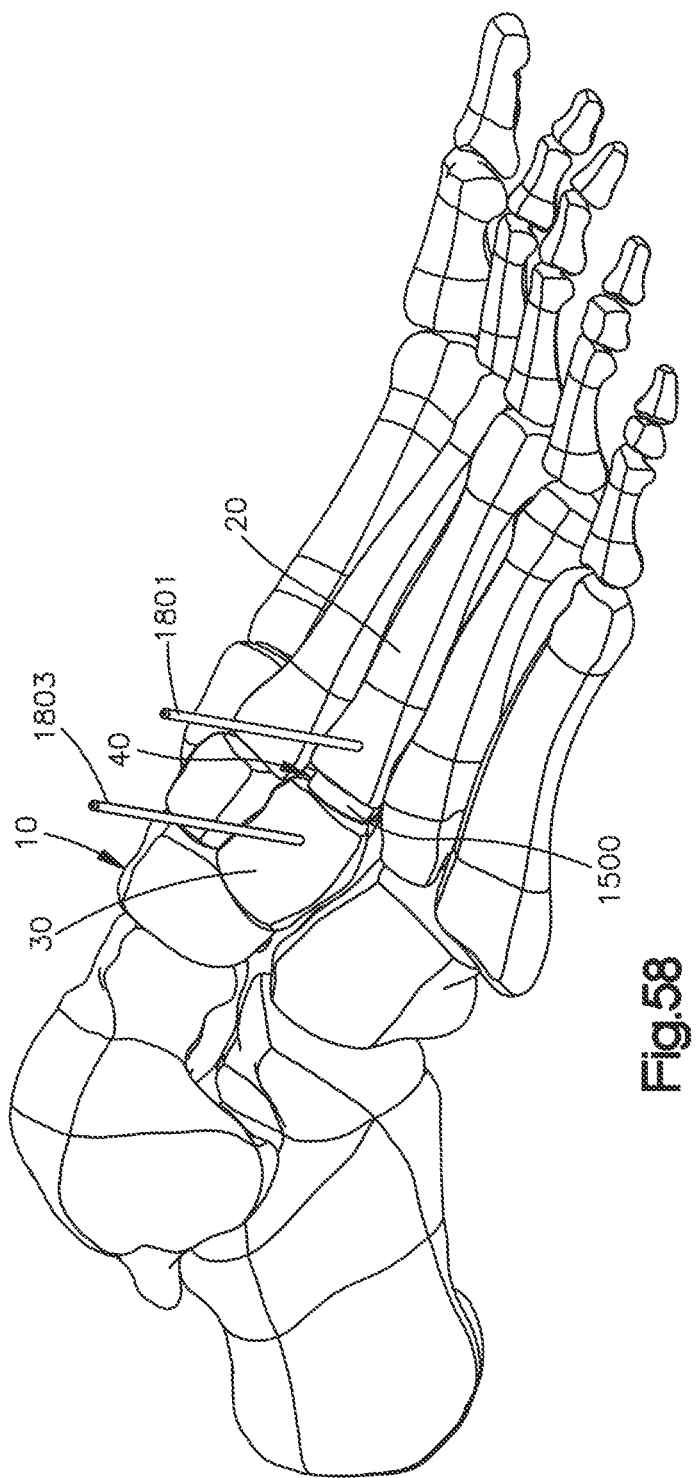

As shown in FIG. 58, the cut guide 1100 can then be removed. The bone pins 1801, 1803 can be left in place within the first and second bones 30, 20. A spacer 1500 can be inserted between the first and second bones 20, 20. The spacer 1500 can fit between resected faces of the first and second bones 30, 20. The spacer 1500 can be sized relatively similar to the resected faces of the first or second bones 30, 20. The spacer 1500 can prevent over-compression of the joint 40 during the following compression steps. In some embodiments, the spacer 1500 may be omitted.

Referring now to FIG. 59, the compressor block 1400 is applied over the bone pin 1801 or wire and bone pin 1803 or wire. Preferably, the bone pin 1801 or wire are either shorter or longer than the bone pin 1803 or wire (e.g., by approximately the height of the compressor block 1400 or more, as shown in FIG. 59). In the example of FIG. 59 the compressor block 1400 is applied by first threading the proximal pin holes 1410 onto the bone pin 1803 or wire and by threading the distal pin hole 1415 onto the bone pin 1801 or wire. As discussed above, unlike the pin holes of the cut guide 1100, the pin holes of the compressor block 1400 are slightly closer together and tapered inward such that it may be difficult to attempt to insert additional pins or wire through the compressor block 1400 simultaneously.

Due to the convergent angle of the proximal pin holes 1410 to the distal pin hole 1415, sliding the compressor block 1400 downward over the bone pin 1803 or wire and the bone pin 1801 or wire pulls the bone pin 1801 or wire closer to the bone pin 1803 or wire. Thus, the application of the compressor block 1400 causes the second bone 20 to move toward the first bone 30, bringing the cut faces of the first and second bones into contact with the face of the spacer 1500 (or into contact with each other if no spacer is used). The angled holes cause a rotation of the pins in the sagittal plane so that the plantar side of the joint is compressed. This may be desirable, as compression on only the dorsal aspect of the bones may in some cases cause a plantar gapping of the joint which is undesirable for fusion.

A cross pin 1805 is then inserted through one of the cross pin holes 1420 such that the cross pin 1805 passes through the compressed joint to temporarily fix the joint in place. The bone pin 1801 or wire and the bone pin 1803 or wire are removed. The compressor block 1400 may then be removed by sliding the compressor block outward along the cross pin 1805, which remains in place to temporarily fix the joint. Any number of cross pin hole trajectories could be applied to the compressor block 1400 for placement of the crossing wire. Although the cross pin 1805 is shown as being inserted distally and extending proximally into the joint, in other embodiments the compressor block 1400 may have cross pin holes 1420 located proximally instead of or in addition to distally. In such embodiments, the cross pin 1805 would be inserted from a proximal end of the compressor block 1400 and would extend distally through the joint.

Figure 60:
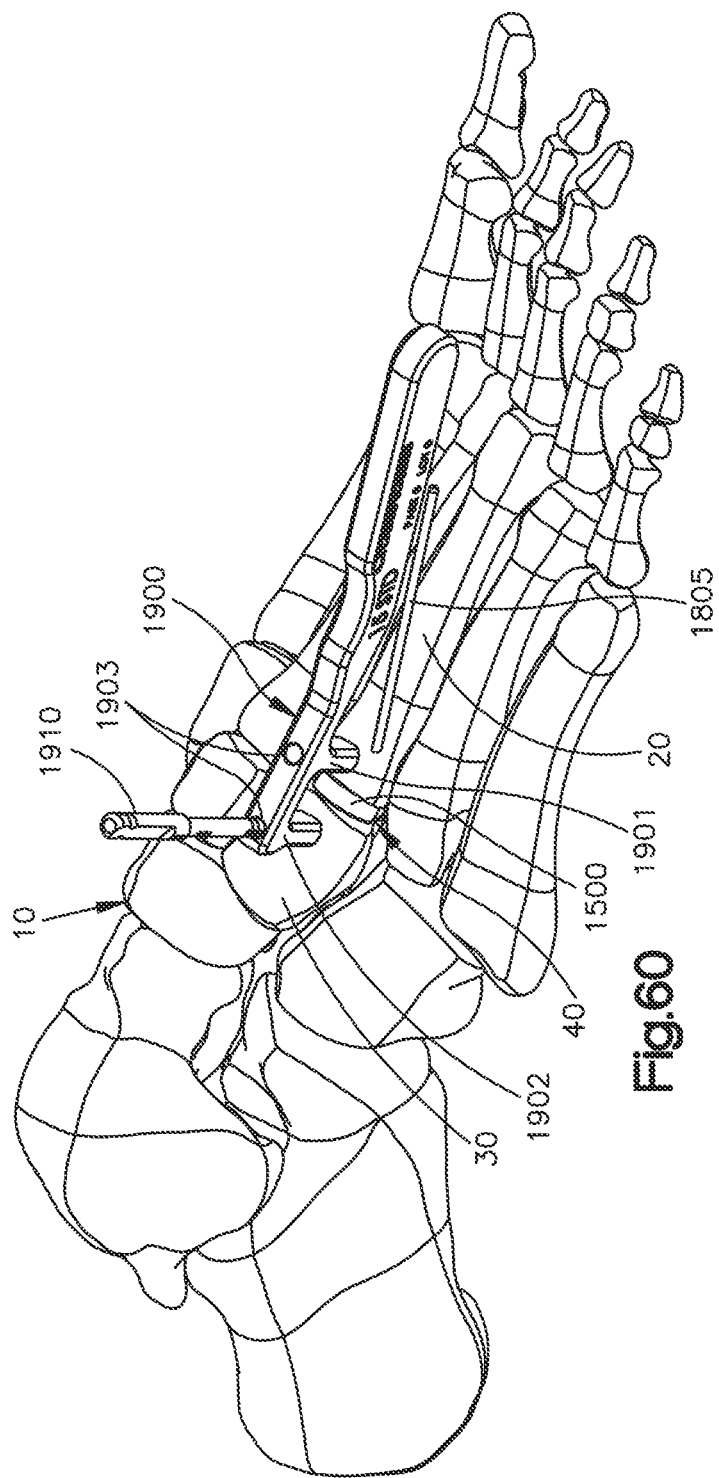
Figure 61:
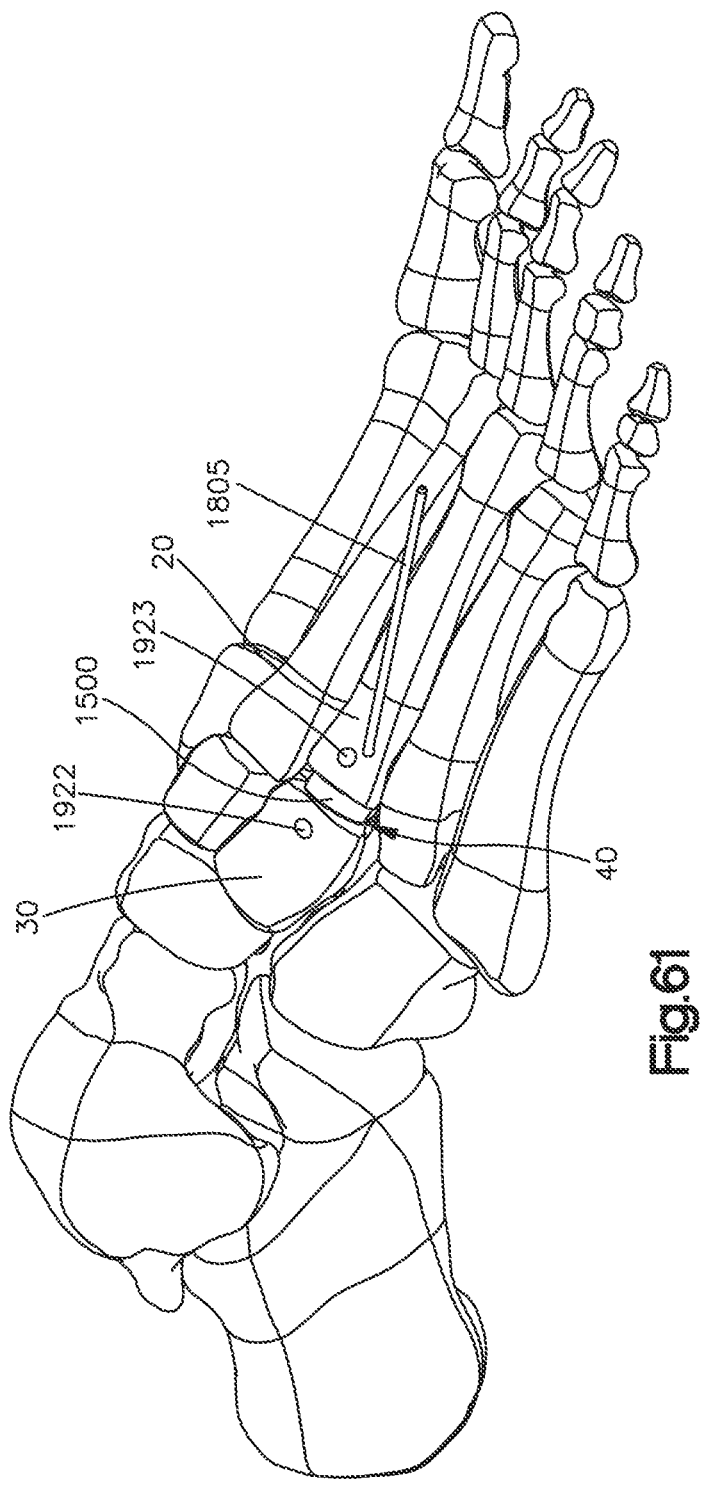
Figure 62:
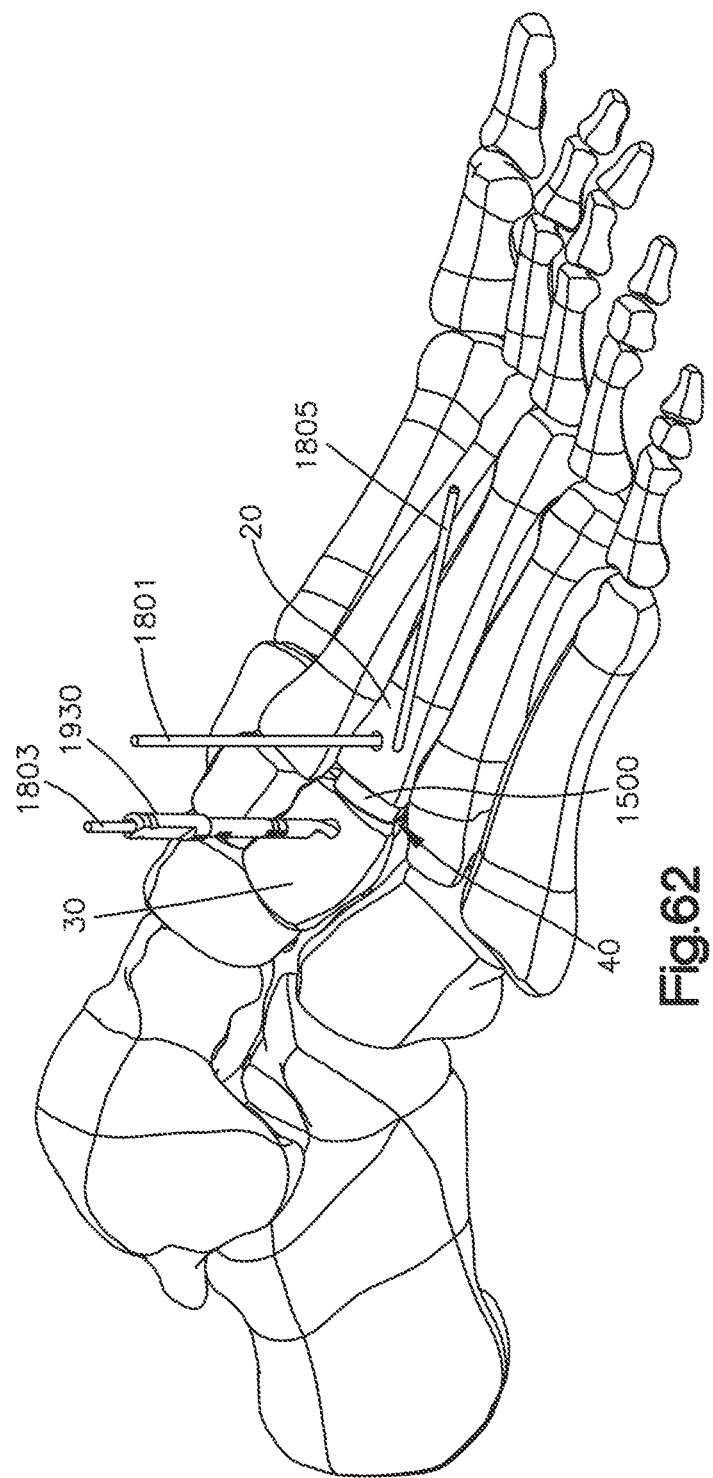
Figure 63:
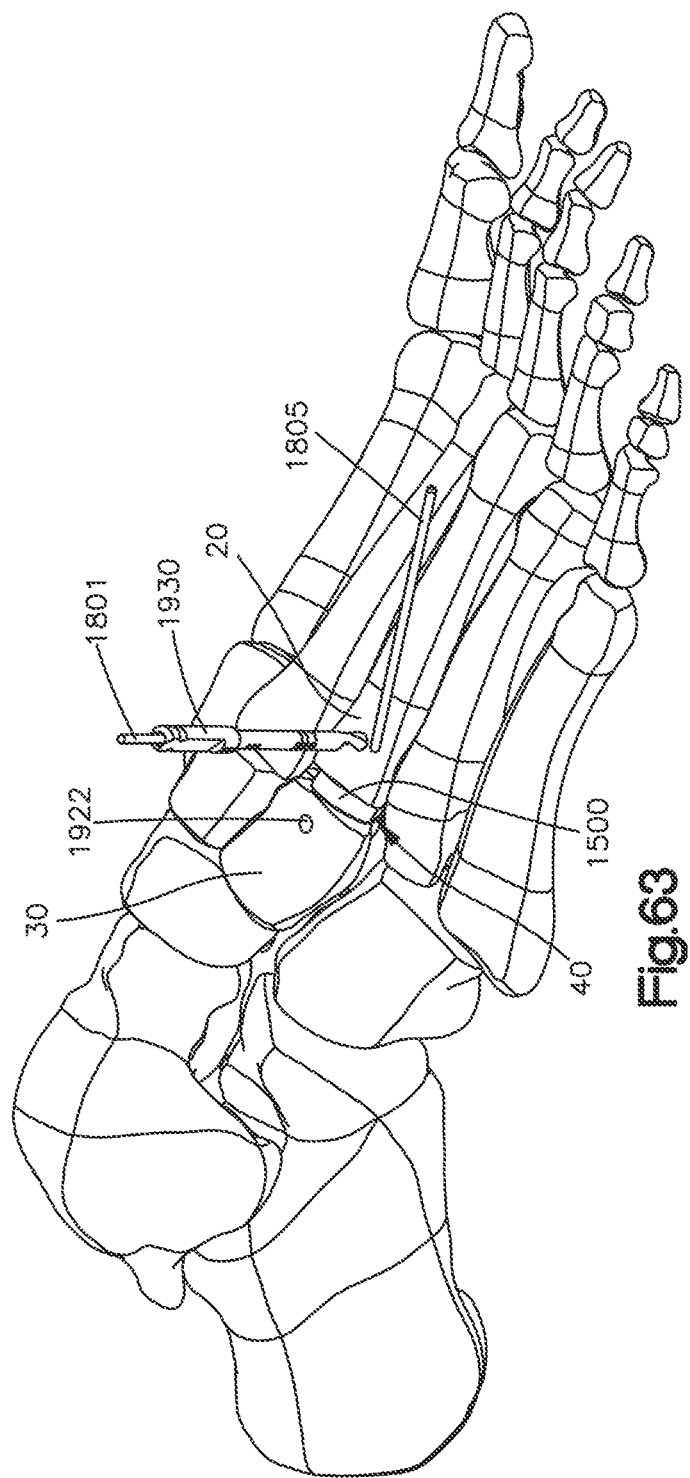

With reference to FIGS. 60-61, the while the joint 40 is fixed in place by the cross pin 1805, a drill guide 1900 is placed across the resected joint 40. A first element 1901 of the drill guide 1900 having a drill guide hole 1903 is aligned with the second bone 20, and a second element 1902 of the drill guide 1900 having a drill guide hole 1903 is aligned with the first bone 30. In some examples, the first and second elements 1901 and 1902 can seat against the second bone 20 and the first bone 30, respectively. First and second pilot holes 1922 and 1923 can be created as desired into the first and second bones 30 and 20, for instance using a drill 1910 through the drill guide holes 1903 of the drill guide 1900. The pilot holes 1922 and 1923 may align with apertures previously created by insertion of the pins 1801 and 1803 into the first and second bones 30 and 20, respectively. The drill guide 1900 is further described in U.S. Pat. App. No. 2018/0353172, the entirety of which is hereby incorporated by reference. Alternatively, the pilot holes 1922 and 1923 can be prepared by replacing the pins 1801, 1803 and using a cannulated reamer 1930 along the respective pin 1801, 1803, as shown in FIGS. 62-63. The pins 1801, 1803 can then be removed.

Figure 64:
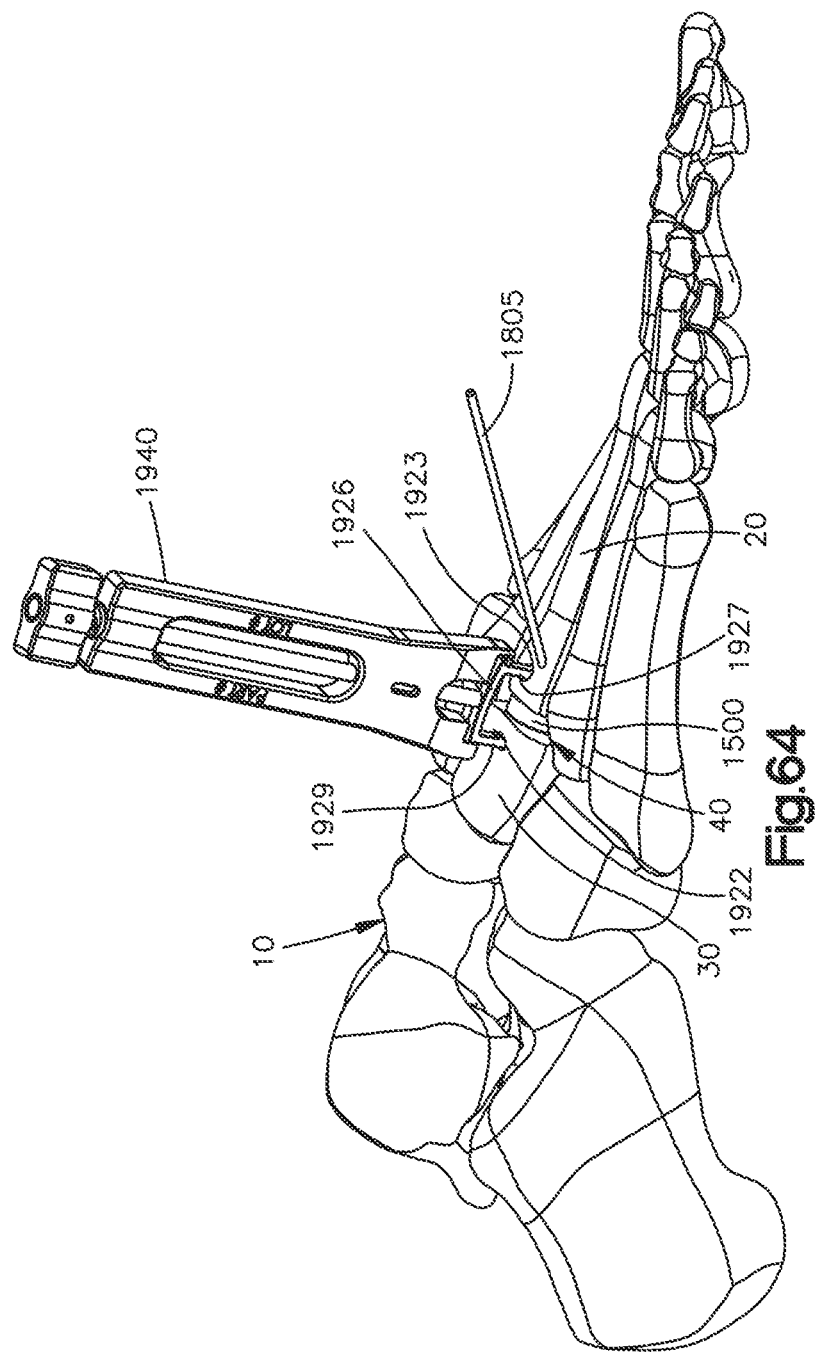
Figure 65:
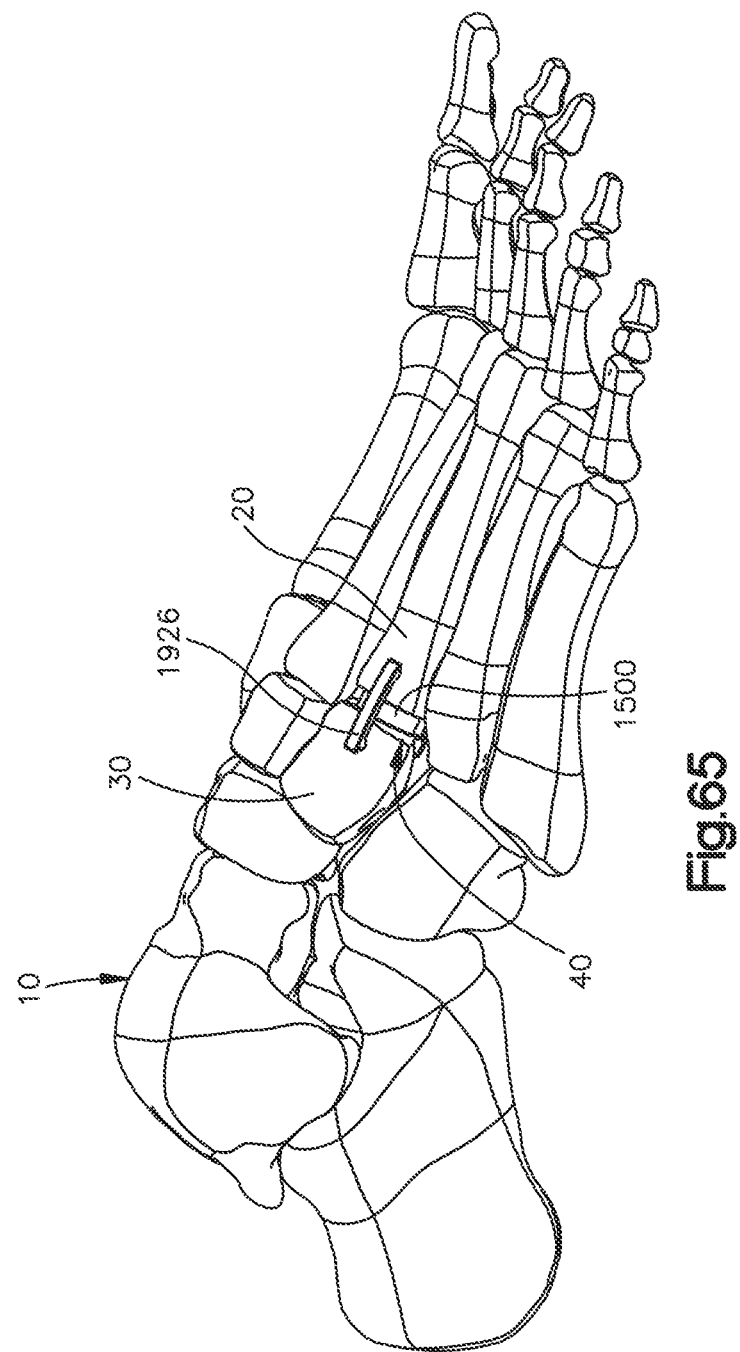

Referring to FIGS. 64-65, in order to fix the second bone 20 relative to the first bone 30, a staple 1926 can be inserted across the resected joint 40. The staple 1926 can be gripped and tensioned using an applicator 1940, as shown and described in U.S. Pat. App. No. 2018/0353172. A first leg 1927 of the staple 1926 can be inserted into the second bone 20 through the pilot hole 1923. A second leg 1929 of the staple 1926 can be inserted into the second bone 20 through the pilot hole 1922. The applicator 1940 can then release the staple 1926, allowing the staple to compress the resected joint. Alternatively, or in addition, the joint may be secured using a bone plate and/or cross screw, or any other desired fixation device suitable for fixing the second bone 20 relative to the first bone 30. More details regarding the plate-staple system may be found in U.S. Pat. No. 10,299, 842, which is incorporated herein by reference in its entirety. More details regarding staples suitable for use as described herein can be found in U.S. Publication No. 2018/0317906, which is incorporated herein by reference in its entirety.

Metatarsus Adductus Surgery with Pin Placement Guide

Figure 66B:
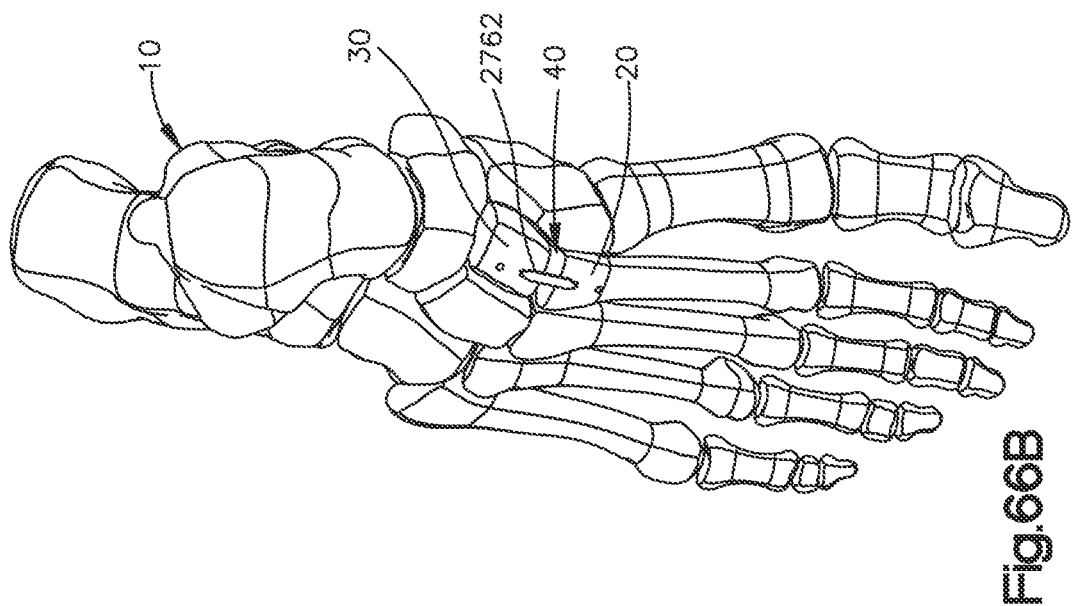
Figure 66A:
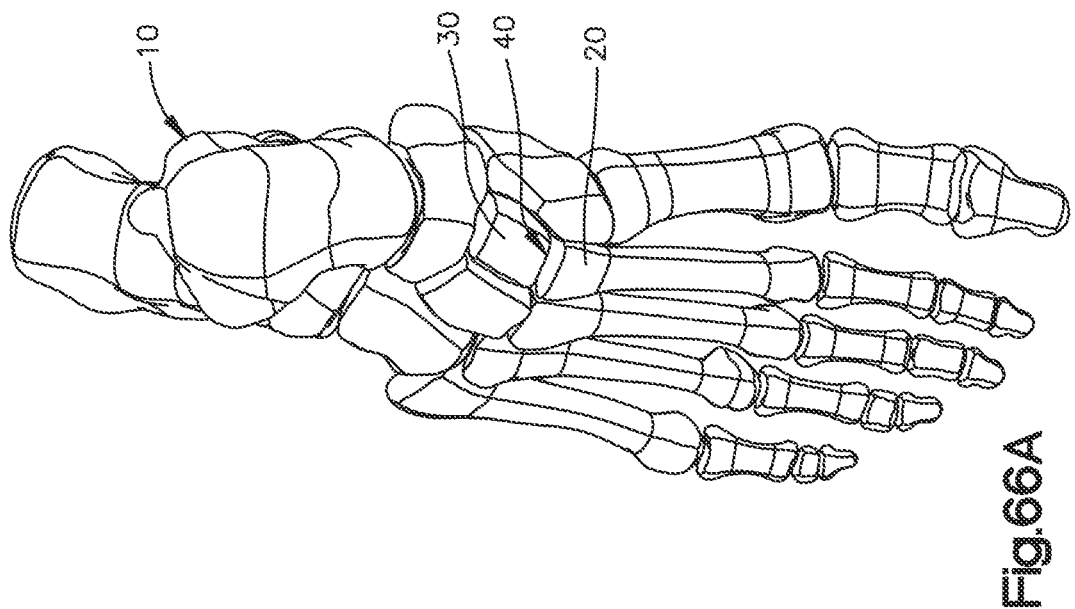

FIG. 66A shows a foot 10 that includes a metatarsus adductus deformity between a first bone, such as the intermediate cuneiform 30, and a second bone such as the second metatarsal 20 at the second tarsometatarsal joint 40. Metatarsus adductus includes misalignment of the metatarsal 20 which can cause the toes to point inward when walking ("pigeon toe" deformity).

FIG. 66B shows an adjusted angle of the metatarsal 20 by fixation of the tarsometatarsal joint 40 by an implant such as a staple 2762 using the techniques described below. Although described herein in terms of metatarsus adductus deformity between the metatarsal 20 and the cuneiform 30, the techniques and systems can be applied to realignment and/or fixation procedures between any two bones in the human body to address any relevant deformity.

FIGS. 67A-D illustrate a pin placement guide 2000. The pin placement guide 2000 can include a proximal or first portion 2001 and a distal or second portion 2002. In one example, the first portion 2001 and the second portion 2002 can be joined at an interface 2003. For instance, the first portion 2001 can define a first pivot aperture 2021, and the second portion 2002 can define a second pivot aperture 2041. The first and second pivot apertures 2021 and 2041 can receive a pin that defines the interface 2003 that pivotally couples the first and second portions 2001 and 2002 to each other.

FIGS. 67A-B illustrate the first portion 2001 of the pin placement guide 2000. The first portion 2001 can include a first body 2004 that can be formed out of a solid material such as a metal or plastic. The first body 2004, and thus the first portion 2001, can define a first lower or bone-facing surface 2007 and a first upper surface 2006 that is opposite the lower or bone-facing surface 2007. A bone-facing direction can thus be defined from the upper surface 2006 to the bone-facing surface 2007. An opposite upward direction can be defined from the bone-facing surface 2007 to the upper surface 2006. The first portion 2001 can include a first outer region 2010 that defines a first outer end of the first portion 2001, and a first inner region 2020 that defines a first inner end of the first portion 2001. The inner first region 2020 can define the first pivot aperture 2021. The inner end of the first portion 2001 can be disposed adjacent a respective inner end of the second portion 2002. The inner and outer ends of the first portion 2001 can be opposite each other along a respective longitudinal direction of the first portion 2001. The outer end can be spaced from the inner end in a longitudinally outward direction as defined by the first body 2004 of the first portion 2001. Conversely, the inner end can be spaced from the outer end in a longitudinally inward direction as defined by the first body 2004 of the first portion 2001.

The first outer region 2010 can extend out from the first inner region 2020 in a longitudinally outward direction. The pin placement guide 2000 can include a first aperture 2011, such as a first pin hole, that extends through the first portion 2001, and in particular through the first outer region 2010 of the first body 2004 from the upper surface 2006 to the bone-facing surface 2007. Thus, the first aperture 2011 is spaced from the first pivot aperture 2021 in the longitudinally outward direction. The pin placement guide 2000 can include a second aperture 2012, such as a second pin hole, that extends through the first portion 2001, and in particular through the first outer region 2010 of the first body 2004 from the upper surface 2006 to the bone-facing surface 2007. The second aperture can be spaced from the first aperture 2011 in the longitudinally outward direction. Thus, the first aperture 2011 can be disposed between the second aperture 2012 and the first pivot aperture 2021. The first and second apertures 2011 and 2012 can extend along respective first and second central axes that are parallel to each other. In one example, the first and second central axes can be oriented perpendicular to either or both of the upper and bone-facing surfaces 2006 and 2007.

The pin placement guide 2000 can include a transverse aperture 2015 that extends through the first portion 2001, and in particular through the first outer region 2010. In particular, the transverse aperture 2015 can be spaced from the second aperture 2012 in the longitudinally outward direction. Thus, the second aperture 2012 can be disposed between the transverse aperture 2015 and the first aperture 2011. The transverse aperture 2015 can extend through respective first and second sides that are opposite each other and extend from the upper surface 2006 to the bone-facing surface 2007. In one example, the transverse aperture 2015 can extend along a central axis that is oriented along a direction perpendicular to the longitudinal direction of the first portion 2001, and also perpendicular to a direction that separates the upper surface 2006 from the bone-facing surface 2007. In other embodiments, the transverse aperture 2015 may be oriented in an alternative direction that is suitable for alignment with certain anatomical features (for instance to form a reference with respect to a metatarsal correction axis as described in more detail below). As will be described in more detail below, the transverse aperture 2015 can receive a transverse guide 2715 (see FIG. 76A) that can be coupled to the first portion 2001.

As described above, the first portion 2001 can define the first pivot aperture 2021 that extends through the first inner region 2020 in the bone-facing direction from the upper surface 2006 to the bone-facing surface 2007. The upper surface 2006 at the first inner region 2020 can be recessed in the bone-facing direction with respect to the upper surface 2006 at the first outer region 2010. In one example, the upper surface 2006 at the first inner region 2020 can be recessed in the bone-facing direction with respect to the upper surface 2006 at the first outer region 2010 by a distance equal to at least 50% of the height of the first outer region 2010. The height of the first outer region 2010 can be measured from the upper surface 2006 at the first outer region 2010 to the bone-facing surface 2007 at the first outer region 2010. Thus, the first inner region 2020 can disposed at a lower portion, such as a lower half, of the first portion 2001.

The first pivot aperture 2021 can extend along a respective central axis that is oriented substantially perpendicular to the upper surface 2006 at the first inner region 2020. Further, the central axis of the first pivot aperture 2021 can be oriented parallel with one or both of the central axes of the first and second pin apertures 2011, 2012. Further, the central axis of the first pivot aperture 2021, along with the central axes of the first and second apertures 2011 and 2012, can be oriented substantially perpendicular with respect to the central axis of the transverse aperture 2015. The first pivot aperture 2021 can have a diameter that different than the respective diameters of either or both of the first and second apertures 2011 and 2012. For instance, the diameter of the first pivot aperture 2021 can be greater than the diameters of the first and second apertures 2011 and 2012. The diameters of the first and second apertures 2011 and 2012 can be substantially equal to each other, or different than each other as desired. In one example, any two or all of the central axes of the first aperture 2011, the second aperture 2012, and the pivot aperture 2021 can be aligned along a straight first longitudinal axis 2016 of the first portion 2001. The first longitudinal axis 2016 can be a longitudinally central axis of the first portion 2001 in some examples.

Referring now to FIGS. 67C-67D in particular, the second portion 2002 of the pin placement guide can include a second body 2005 that can be formed out of a solid material such as a metal or plastic. The second body 2005, and thus the second portion 2002, can define a second lower or bone-facing surface 2009 and a second upper surface 2008 that is opposite the second lower or bone-facing surface 2009. A bone-facing direction can thus be defined from the upper surface 2008 to the bone-facing surface 2009. An opposite upward direction can be defined from the bone-facing surface 2009 to the upper surface 2008. The second portion 2002 can include a second outer region 2030 that defines an outer end of the second portion 2002, and a second inner region 2040 that defines a second inner end of the second portion 2002. The second inner region 2040 of the second portion 2002 can define the second pivot aperture 2041. The first and second pivot apertures 2021 and 2041 can combine so as to define a locating aperture 2023 that receives a locating pin 2710 (see FIG. 76) to locate the pin placement guide 2000 on the patient's foot. The inner end of the second portion 2002 can be disposed adjacent the inner end of the first portion 2001. The inner and outer ends of the second portion 2002 can be opposite each other along a respective longitudinal direction of the first portion 2002. The outer end of the second portion 2002 can be spaced from the inner end of the second portion 2002 in a longitudinally outward direction as defined by the second body 2005 of the second portion 2002. Conversely, the inner end of the second portion 2002 can be spaced from the outer end of the second portion 2002 in a longitudinally inward direction as defined by the second body 2005 of the second portion 2002.

The second outer region 2040 can extend out from the second inner region 2020. The pin placement guide 2000 can include a third aperture 2013, such as a third pin hole, that extends through the second portion 2002, and in particular through the second outer region 2040 of the second body 2005 from the second upper surface 2008 to the second bone-facing surface 2009. Thus, the third aperture 2013 is spaced from the second pivot aperture 2041 in the longitudinally outward direction of the second portion 2002. The pin placement guide 2000 can include a fourth aperture 2014, such as a fourth pin hole, that extends through the second portion 2002, and in particular through the second outer region 2040 of the second body from the upper surface 2008 to the bone-facing surface 2009. The fourth aperture 2014 can be spaced from the third aperture 2013 in the longitudinally outward direction of the second portion 2002. Thus, the third aperture 2013 can be disposed between the fourth aperture 2014 and the second pivot aperture 2041. The third and fourth apertures 2013 and 2014 can extend along respective third and fourth central axes that are parallel to each other. In one example, the third and fourth central axes can be oriented perpendicular to either or both of the upper and bone-facing surfaces 2008 and 2009. The third and fourth apertures 2013 and 2014 can be referred to as first and second apertures 2013 of the second portion 2002.

The pin placement guide 2000 can further include an oblique aperture 2031 that extends into the second portion 2002. For instance, the oblique aperture 2031 can extend into the inner end defined by the second inner region 2040. In one example, the oblique aperture 2031 extends in the bone-facing direction as it extends in the longitudinally inward direction defined by the second body 2005 of the second portion 2002. The oblique aperture can terminate without extending into the fourth aperture 2014. Thus, a handle inserted into the oblique aperture 2031 does not interfere with a pin that extends into the fourth aperture 2014. The oblique aperture 2031 can be internally threaded so as to threadedly mate with the handle, thereby attaching the handle to the second portion 2002.

As described above, the second portion 2002 can define the second pivot aperture 2041 that extends through the second inner region 2040 in the bone-facing direction from the second upper surface 2008 to the second bone-facing surface 2009. The second bone-facing surface 2009 at the second inner region 2040 can be recessed in the upward direction with respect to the bone-facing surface 2008 at the second outer region 2030. In one example, the second bone-facing surface 2009 at the second inner region 2040 can be recessed in the upward direction with respect to the second bone-facing 2009 at the second outer region 2030 by a distance equal to at least 50% of the height of the second outer region 2030. The height of the second outer region 2030 can be measured from the second upper surface 2008 at the second outer region 2030 to the second bone-facing surface 2009 at the second outer region 2010. Thus, the second inner region 2020 can disposed at an upper half of the second portion 2002.

The second pivot aperture 2041 can extend along a respective central axis that is oriented substantially perpendicular to the second upper surface 2008 at the inner region 2040. Further, the central axis of the second pivot aperture 2041 can be oriented parallel with one or both of the central axes of the third and fourth apertures 2013 and 2014. Further, the central axis of the second pivot aperture 2041, along with the central axes of the third and fourth apertures 2013 and 2014, can be oriented oblique with respect to the central axis of the oblique aperture 2031. The second pivot aperture 2041 can have a diameter that different than the respective diameters of either or both of the third and fourth apertures 2013 and 2014. For instance, the diameter of the second pivot aperture 2041 can be greater than the diameters of the third and fourth apertures 2013 and 2014. The diameters of the third and fourth apertures 2013 and 2014 can be substantially equal to each other, or different than each other as desired. In one example, any two or all of the central axes of the third aperture 2013, the fourth aperture 2014, and the second pivot aperture 2041 can be aligned along a straight second longitudinal axis 2036 of the second portion 2002. The second longitudinal axis 2036 can be a longitudinally central axis of the second central longitudinal portion 2002 in some examples.

Referring now to FIGS. 67A-67D, the pin placement guide 2000 can define an assembled configuration whereby the first pivot aperture 2021 is aligned with the second pivot aperture 2041. When the first and second pivot apertures 2021 and 2041 are aligned with each other, a locating pin 2710 (see FIG. 76) can be inserted into the first and second pivot apertures 2021 and 2041 so as to couple the second portion 2002 to the first portion 2001. Each of the first and second portions 2001 and 2002 can pivot relative to each other about a pivot axis that is defined by the central axis of the locating pin 2710. In this regard, the locating pin 2710 can be referred to as a pivot pin. As either or both of the first and second portions 2001 and 2002 angulate with respect to the other of the first and second portions 2001 and 2002, an angle defined by the first longitudinal axis 2016 and the second longitudinal axis 2036 is adjusted.

In one example, the lower surface 2009 of second inner region 2040 of the second portion 2002 can face the upper surface 2006 of the first inner region 2020 of the first portion 2001. Therefore, the first inner region 2020 and the second inner region 2040 can extend or project in a complimentary manner such that the first upper surface 2006 of the first portion 2001 slides along the lower surface 2009 of the second portion 2002 angulation of either or both of the first and second portions 2001 and 2002 of the pin placement guide 2000 relative to each other. It should be appreciated that the configurations of the first and second inner regions 2020 and 2040 can be reversed, such that the lower surface 2007 of first inner region 2020 of the first portion 2001 can face the upper surface 2008 of the second inner region 2040 of the second portion 2002.

Referring now also to FIGS. 68A-C, it should be appreciated that while the first and second portions 2001 and 2002 of the pin placement guide 2000 can be configured to angulate with respect to each other in one example, the system can alternatively include a plurality or a kit of fixed-angle pin placement guides, such as a first fixed-angle pin placement guide 2000A, a second fixed-angle pin placement guide 2000B, and a third fixed-angle pin placement guide 2000C. Each of the fixed-angle pin placement guides 2000A-2000C can be configured as described above with respect to the pin placement guide 2000 of FIGS. 67A-67D, with the exception that the first portion 2001 and the second portion 2002 are angularly fixed to each other. In particular, the first and second portions 2001 and 2002 can be monolithic with each other so as to define a single unitary body of the respective pin placement guides 2000A-2000C. The pin placement guides 2000A-2000C can define a single locating aperture 2023 that extends through the first and second portions 2001 and 2002 in the manner described above. Thus, the locating aperture 2023 can receive the locating pin 2710 (see FIG. 76), such that the pin placement guides 2000A-2000C can pivot about the locating pin 2710.

The first and second portions 2001 and 2002 of the pin placement guides 2000A-2000C can define respective different angles with respect to each other. Because the first and second portions 2001 and 2002 are not pivotable with respect to each other, the angles can be referred to as fixed angles. The fixed angle of the fixed-angle pin placement guides 2000A-2000C can be defined by the first and second longitudinal axes 2016 and 2036. The fixed angle of the guides 2000A-2000C is contrasted with the variable or adjustable angles provided by the cut guide 2000 when the first and/or second portions 2001 and 2002 are angulated about the pivot pin, as described with respect to the pivot guide 2000 with reference to FIGS. 67A-67D. In one example, the first and second portions 2001 and 2002 of the first pin placement guide 2000A can define a first fixed angle θ1. The first and second portions 2001 and 2002 of the second pin placement guide 2000B can define a second fixed angle θ2 that is different than the first fixed angle θ1. The first and second portions 2001 and 2002 of the second pin placement guide 2000B can define a third fixed angle θ3 that is different than the first and second fixed angles θ1 and θ2.

While three such pin placement guides 2000A-2000C are shown, it should be appreciated that the system can include a kit of any number of pin placement guides as desired, each having different fixed angles. The angles defined by the first and second portions 2001 and 2002 of the fixed pin placement guides can vary as desired in increments of approximately 1 degree, approximately 2 degrees, approximately 3 degrees, approximately 4 degrees, approximately 5 degrees, approximately 6 degrees, approximately 7 degrees, approximately 8 degrees, approximately 9 degrees, approximately 10 degrees, or by any alternative value as desired. The angles of the pin placement guides can be anywhere in a range of angles from 1 degree up to 30 degrees in one example, though it should be appreciated that the range of angles can be any suitable range as desired. As will be appreciated from the description below, a select one of the fixed pin placement guides 2000A-2000C can be selected for use to depending on the angle defined by the metatarsal and the desired correction axis of the metatarsal. For instance, the select one of the fixed pin placement guides 2000A-2000C can be selected to most closely match the angle defined by the metatarsal and the desired correction axis of the metatarsal.

FIGS. 69A-69D show a compressor block 2100. The compressor block 2100 can include a body including a lower bone-facing surface 2016 and an opposed upper surface 2105. The body can be a solid material comprising a metal or plastic around the material. The upper surface 2015 can be planer. The lower surface 2016 can be planer. The upper surface 2015 can be parallel with the lower surface 2016. A handle attachment aperture 2125, which may be threaded, is provided for attaching a side-mounted handle which may assist the user in sliding the compressor block 2100 downward to compress pins or wires passing through the compressor block 2100.

The compressor block 2100 can include a first pin aperture 2111, a second pin aperture 2112, a third pin aperture 2113, and/or a fourth pin aperture 2114. The pin apertures or pin holes 2111-2114 can extend from the upper surface 2105 to the lower surface 2106 as through-holes. The first and second pin apertures 2111, 2112 can extend along parallel axes. The third and fourth pin apertures 2113, 2114 can extend along parallel axes. The first pin aperture 2111 can extend along an axis that is at an angle α with respect to the lower surface 2106. The second pin aperture 2112 can extend along an axis that is at an angle b with respect to the lower surface 2106. The angles a and b can be less than 90 degrees and/or equivalent to each other. A lower end of the pin aperture 2111 at the lower surface 2106 can be closer to a centerline of the compressor block 2100 than an upper end of the pin aperture 2111 at the upper surface 2105. A lower end of the pin aperture 2112 at the lower surface 2106 can be closer to a centerline of the compressor block 2100 than an upper end of the pin aperture 2112 at the upper surface 2105. The pin aperture 2113 can extend along an axis that is at an angle c with respect to the lower surface 2106. The pin aperture 2114 can extend along an axis that is at an angle d with respect to the lower surface 2106. The angles c and d can be less than 90 degrees and/or equivalent to each other. A lower end of the pin aperture 2113 at the lower surface 2106 can be closer to a centerline of the compressor block 2100 than an upper end of the pin aperture 2113 at the upper surface 2105. A lower end of the pin aperture 2114 at the lower surface 2106 can be closer to a centerline of the compressor block 2100 than an upper end of the pin aperture 2114 at the upper surface 2105. The angles a, b, c, and d can be equivalent angles.

The compressor block 2100 can include one or more cross pin receiving spaces such as the cross pin receiving spaces 2121, 2122, 2123 and 2124. The cross pin receiving spaces can each define a line that is at an angle with respect to the lower surface 2106. The angle can be an acute angle. The angle can be less than 90 degrees. The angle can be less than any of the angles a-d of the pin apertures. As shown, each cross pin receiving space extends downward and inward from an outer edge of a widened section such that a pin or wire inserted into a cross pin receiving space exits the lower surface 2106 of the compressor block 2100 relatively nearer the centerline. The cross pin receiving space are aligned such that, when the compressor block 2100 is used in conjunction with a cut guide or free-hand pin guide at the joint 40, the compressor block 2100 brings the cut faces of the resected joint into 40 contact with each other. A pin inserted through cross any pin receiving space will extend at an angle through the interface of the compressed joint to temporarily fix contact at the joint until the cuneiform 30 and the metatarsal 20 can be permanently fixed by a staple, plate, screw, or other fixing component.

The cross pin receiving spaces may include bone-facing slots (e.g., slots open to the lower surface 2106 of the compressor block 2100 along their entire length) or cross pin holes (e.g., aperture with diameters). Bone-facing slots may allow the compressor block to be removed from the joint 40 while pins remain inserted in the joint.

FIGS. 70A-D show a guide block 2200 for pre-drilling the joint 40. The guide block 2200 can include a body including a lower or bone-facing surface 2006 and an upper surface 2205 opposite the lower surface 2206. The body can be a solid material comprising a metal or plastic around the material. The upper surface 2205 can be planer. The lower surface 2206 can be planer. The upper surface 2205 can be parallel with the lower surface 2206. A handle attachment aperture 2225, which may be threaded, is provided for attaching a side-mounted handle which may assist the user in sliding the guide block 2200 downward to compress pins or wires passing through the guide block 2200.

The guide block 2200 can include a first pin aperture 2211, a first drill aperture 2212, a second drill aperture 2213, and/or a fourth pin aperture 2214. The apertures or pin holes 2211-2114 can extend from the upper surface 2205 to the lower surface 2206 and provide through-holes. The apertures 2211-2214 can extend along parallel axes. Axes can be perpendicular to the upper and lower surfaces 2205, 2206. The second and third apertures 2212, 2213 can have larger diameters than the first and fourth apertures 2211, 2214. The second and third apertures 2212, 2213 be configured to receive a drill, reamer, or other removal tool for removing material from bone. The first and fourth apertures 2211, 2214 can be sized to receive pins configured to align the second and third apertures 2212, 2213. The first and fourth apertures 2211, 2214 can align the second and third apertures 2212, 2213 according to the spacing between the apertures 2111-2114 of the assembled pin placement guide 2000.

The guide block 2200 can include one or more cross pin receiving spaces such as the cross pin receiving spaces 2221, 2222, 2223 and 2224. The cross pin receiving spaces can define a line that is at an angle with respect to the lower surface 2206. The angle can be an acute angle. The angle can be less than 90 degrees. As shown in each cross pin receiving space extends downward and inward from an outer edge of a widened section such that a pin or wire inserted into a cross pin receiving space exits the lower surface 2206 of the guide block 2200 relatively nearer the centerline. The cross pin receiving spaces may include bone-facing slots (e.g., slots open to the lower surface 2206 of the guide block 2200 along their entire length). Bone-facing slots may allow the guide block 2200 to be slid over pins (in the first and fourth apertures 2211, 2214) to accommodate cross pins already in the bone within the cross pin receiving spaces. In other embodiments, apertures 2211 and 2214 may be at a convergent angle, similar to those described in the compression block in FIG. 69A-D while apertures 2212 and 2213 may remain parallel to each other.

FIG. 71 illustrates an angle guide 2300. The angle guide 2300 can include a first or pin end portion 2310 and a second or protractor end portion 2320 that is opposite the first end portion 2310. The first end portion 2310 can be elongate along a reference line which can be defined by a centerline 2303 of the angle guide 2300. The angle guide 2300 can include one or more spacing indicators, such as first and second apertures 2321 and 2322. The first and second apertures 2321 and 2322 can extend along respective central axes that can intersect the centerline 2303. Thus, it can be said that the first and second apertures 2321 and 2322 are aligned along the centerline 2303. As will be described in more detail below, the indicator of the first end portion 2310 as defined by either or both of the first and second apertures 2321 and 2322 can be used to align the first and second apertures 2011 and 2012 of the first portion 2001 of the pin placement guide 2000 (see FIG. 67B) with the cuneiform bone 30 during a surgery. The diameters of the first and second apertures 2321 and 2322 of the angle guide 2300 can be the same as the diameters of the first and second apertures 2011 and 2012 of the first portion.

The second or protractor end portion 2320 can include a first and/or second set of angle demarcations 2311 (e.g., between 5° and 40°). Each angle demarcation identifies the angle with respect to the centerline 2303. The angle demarcations 2311 can extend outwardly from the centerline 2303 of the angle guide 2300. The angle guide 2300 can define a notch 2302 or other suitable alignment marker that extends into the second end portion 2320, and can be aligned with the centerline 2303 between the two sets of angle demarcations 2311. The angle demarcations 2311 can include a first set of angle demarcations 2311a that are arranged in a first direction from the notch 2302, and a second set of angle demarcations 2311b that are arranged in a second direction from the notch 2302 that is opposite the first direction. The angle demarcations 2311 can extend about a locating aperture 2301, and can be radially aligned with the locating aperture 2301. The centerline 2303 can extend through the locating aperture 2301 and the notch 2302. The angle guide 2300 can include a locating aperture 2301 that extends therethrough at a location between the first end portion 2310 and the second end portion 2320.

The protractor end portion 2320 can be used to determine a correction axis for the metatarsal 20 in a corrected configuration. As described further below, the angle guide 2300 can be mounted on a pin that extends through the locating aperture 2301. The protractor end portion 2320 can be aligned with the metatarsal at a desired angle of correction. The centerline 2303 can define (e.g., align with) a correction axis. The indicator on the first end portion 2310 can indicate where the first portion 2001 (see FIG. 67B) can be aligned and pins inserted into the cuneiform 30 through the first portion 2001 to fix a position of the first portion 2001 of the pin placement guide 2000 along the correction axis.

FIGS. 72A-D show another embodiment of a compressor block 2400. The compressor block 2400 can include a body including a lower or bone-facing surface 2406 and an upper surface 2405 opposite the lower surface 2406. The body can be a solid material comprising a metal or plastic around the material. The upper surface 2405 can be planer. The lower surface 2406 can be planer. The upper surface 2405 can be parallel with the lower surface 2406. A handle attachment aperture 2425, which may be threaded, is provided for attaching a side-mounted handle which may assist the user in sliding the compressor block 2400 downward to compress pins or wires passing through the compressor block 2400.

The compressor block 2400 can include a first pin aperture 2411 and a second pin aperture 2412. The pin apertures or pin holes 2411, 2412 can extend from the upper surface 2405 to the lower surface 2406 and provide through-holes. The first pin aperture 2411 can extend along an axis that is at an angle $\alpha$ with respect to the lower surface 2406. The second pin aperture 2412 can extend along an axis that is at an angle b with respect to the lower surface 2406. The angles a and b can be less than 90 degrees and/or equivalent to each other. A lower end of the pin aperture 2411 at the lower surface 2406 can be closer to a centerline of the compressor block 2400 than an upper end of the pin aperture 2411 at the upper surface 2405. A lower end of the pin aperture 2412 at the lower surface 2406 can be closer to a centerline of the compressor block 2400 than an upper end of the pin aperture 2412 at the upper surface 2405.

The compressor block 2400 can include one or more cross pin receiving spaces such as the cross pin receiving spaces 2421, 2422. The cross pin receiving spaces can define a line that is at an angle with respect to the lower surface 2406. The angle can be an acute angle. The angle can be less than 90 degrees. As shown in each cross pin receiving space extends downward and inward from an outer edge of a widened section such that a pin or wire inserted into a cross pin receiving space exits the lower surface 2406 of the compressor block 2400 relatively nearer the centerline. The cross pin receiving space are aligned such that, when the compressor block 2400 is used in conjunction with a cut guide or free-hand pin guide at the joint 40, the compressor block 2400 brings the cut faces of the resected joint into 40 contact with each other. A pin inserted through cross any pin receiving space will extend at an angle through the interface of the compressed joint to temporarily fix contact at the joint face until the cuneiform 30 and the metatarsal 20 can be permanently fixed. The cross pin receiving spaces may include bone-facing slots (e.g., slots open to the lower surface 2406 of the compressor block 2400 along their entire length) or cross pin holes (e.g., aperture with diameters). Bone-facing slots may allow the compressor block to be removed from the bone while pins remain inserted in the bone through the cross pin receiving spaces.

FIGS. 73A-B show a first embodiment of a cut guide 2500. The cut guide 2500 can include a first end portion 2501. The first end portion 2501 can include a pair of first and second guide apertures 2511 and 2512. The spacing between the first and second guide apertures 2511 and 2512 can be the same as the spacing between the apertures 2011 and 2012, and/or the spacing between the apertures 2013 and 2014 on the pin placement guide 2000. The cut guide 2500 can include a second end portion 2502. The second end portion 2502 can include a cut slot 2510. The cut slot 2510 can extend along a plane that is parallel with axes of the guide apertures 2511, 2512. The plane of the cut slot 2510 can be perpendicular with a line extending through the guide aperture 2511, 2512, as shown in a top plane. Optionally, the cut guide 2500 can be reversible.

FIGS. 73C-D show a second embodiment of a cut guide 2600. The cut guide 2600 can include a first end portion 2601. The first end portion 2601 can include a plurality of pairs of first and second guide apertures. The plurality of pairs can include pairs 2631-33. The spacing between the first and second guide apertures of each pair 2631-2633 can be the same as the spacing between the apertures 2011, 2012 or the apertures 2013, 2014 on the pin placement guide 2000. In one example, a first pair of apertures 2631 can include a closer aperture that is spaced closer to the cut slot 2610 than the other aperture, wherein the closer aperture of the first pair 2631 is spaced from the cut slot 210 a first distance a. A second pair of apertures 2632 can include a closer aperture that is spaced closer to the cut slot 2610 than the other aperture, wherein the closer aperture of the second pair 2632 is spaced from the cut slot 210 a second distance b that can be less than the first distance a. A third pair of apertures 2633 can include a closer aperture that is spaced closer to the cut slot 2610 than the other aperture, wherein the closer aperture of the third pair 2633 is spaced from the cut slot 210 a third distance c that can be less than each of the first distance a and the second distance b. The cut guide 2600 can include a second end portion 2602. The second end portion 2602 can include the cut slot 2610. The cut slot 2610 can extend along a plane that is parallel with axes of the pairs of guide apertures 2631-2633. The plane of the cut slot 2610 can be perpendicular with a line extending through each of the pairs of guide apertures 2631-2633 in the top plane. Optionally, the cut guide 2600 can be reversible.

Each of the pairs of guide apertures 2631-2633 can be spaced laterally a distance from the cut plane 2610. As illustrated, the first pair 2631 can be spaces a first distance a, the second pair 2632 can be spaced a second distance b, and the third pair 2633 can be spaced a third distance c. The spacings a-c can be different and/or progressively shorter. This allows a user to select among the pairs of guide apertures 2631-2633 to locate the cut plane of the slot 2610 in a desirable location, such as with an end of the metatarsal 20 or cuneiform 30 to resect the joint 40.

FIGS. 74-88 illustrate a surgery of the foot 10 to correct a foot deformity or a deformity between any two bones. As shown in FIG. 74, a patient's foot 10 can be surgically corrected at a joint such as a tarsometatarsal joint 40 between a first bone such as a cuneiform 30 and a second bone such as a metatarsal 20. A locating pin 2710 can be inserted into the joint 40. The locating pin 2710 can be constructed as desired, for instance as a K-wire. The locating pin 2710 can be inserted between a first end of the metatarsal 20 and a first end of the cuneiform 30 as shown in FIG. 74. This joint 40 can be generally tight, such that the locating pin 2710 can be securely implanted once inserted therein.

In FIG. 75, the first inner region 2020 of the first portion 2001 of the pin placement guide 2000 can be placed over the locating pin 2710. The first pivot aperture 2021 can slide over the locating pin 2710 so as to receive the locating pin 2710. It can therefore be said that a portion of the pin placement guide 2000 can be placed over the locating pin 2710. Thus, the first portion 2001 can be pivotable with respect to the joint 40 about the locating pin 2710. As the first portion 2001 pivots about the locating pin 2710, the first and second apertures 2011 and 2012 are positionally adjusted with respect to the underlying cuneiform 30. Thus, the outer region 2010 can be aligned with the cuneiform 30 by pivoting about the locating pin 2710 to a desired position. In particular, the respective central axes of the first and second apertures 2011 and 2012 can be aligned with the cuneiform 30. A transverse guide pin 2715 can be inserted through the transverse aperture 2015 in the outer region 2010. The transverse guide pin 2715 can provide a handle to orient the first portion 2001 and/or form an alignment reference guide.

As shown in FIGS. 76A, the first portion 2001 can be aligned along a correction axis 2720. That is, the respective central axes of the first and second apertures 2011 can be aligned along the correction axis 2720. Accordingly, the first longitudinal axis 2016 of the first portion 2001 can be substantially aligned with the correction axis 2720. Thus, the central axis of the first pivot aperture 2021 can be aligned with the respective central axes of the first and second apertures 2011 and 2012 along the correction axis 2720. The correction axis 2720 can represent approximately the intended position of the metatarsal 20 in a corrected configuration of the foot 10. The correction axis 2720 can be determined by the orientation of the first longitudinal axis 2016 of the first portion 2001 when the first portion 2001 is fixed to the cuneiform 30. Accordingly, it can be desirable to properly align the first portion 2001 on the cuneiform 30.

According to one method of aligning the first portion 2001 shown in FIG. 76A, the transverse guide 2715, which can be configured as a guide rod, is inserted into the transverse aperture 2015 (see FIG. 67A) and oriented substantially perpendicular to the first longitudinal axis 2016, and thus perpendicular to the correction axis 2720. In particular, the transverse guide 2715 can be elongate along a central transverse axis 2721 that is substantially perpendicular with the correction axis 2720 (with respect to a top view of the foot as shown in FIGS. 76A-76B). In certain implementations the transverse axis 2721 can be aligned to extend over the cuboid 32 and the navicular bone 31 as shown in a top view in FIG. 76A. That is, the transverse axis 2721 can be aligned with the cuboid 32 and the navicular bone 31 in the anatomical inferior direction. More specifically, a first portion of the transverse axis 2721 can be aligned with a central portion of the cuboid 32. An opposed second portion of the transverse axis 2721 can extend approximately over a joint 34 between the navicular bone 31 and the cuneiform 30. When the transverse guide 2715 is so positioned, the first longitudinal axis 2016 can substantially extend along the correction axis 2720. The orientation transverse guide 2715 can be adjusted as desired so that the first portion 2021 is aligned with the desired correction axis 2720.

Referring now to FIG. 76B, another method is provided for aligning the first portion 2001 to the cuneiform 30 using the angle guide 2300. In particular, as will now be described, the angle guide 2300 can be used to identify the correction axis 2720. The angle guide 2300 can be used by placing the locating aperture 2301 over the locating pin 2710, such that the locating pin 2710 is received in the locating aperture 2301. The angle guide 2300 is thus pivotable with respect to the patient's foot 10 about the locating pin 2710 to a position whereby the first end portion 2310 is disposed over the first portion 2001. The protractor end portion 2320 of the angle guide 2300 can be aligned at a desirable angle with the metatarsal 20 (e.g., along a central axis thereof). At the desired angle, the centerline 2303 of the angle guide 2300 can be substantially aligned along the correction axis 2720. The first end portion 2310 can be aligned with, for instance placed over, the cuneiform 30. The indicator on the first end portion 2310 can be used to mark positions for aligning the first portion 2001 with the cuneiform 30. The first and second apertures 2011 and 2012 of the first portion 2001 can be aligned with the indicator. For example, while the centerline 2303 of the angle guide 2300 is substantially aligned along the correction axis 2720, the respective first and second apertures 2321 and 2322 of the angle guide 2300 can be aligned with the respective first and second apertures 2011 and 2012 of the first portion 2001.

A first pin 2711, such as a k-wire, can be inserted through the first aperture 2011 and into the cuneiform 30. The first pin 2711 can also extend through the first aperture 2321 of the angle guide 2300 (e.g., if not removed). Similarly, the second pin 2712, such as a k-wire, can be inserted through the second aperture 2012 and into the cuneiform 30. The second pin 2712 can also extend through the first aperture 2321 of the angle guide (e.g. if not removed). The first longitudinal axis 2016 can extend along substantially the same direction as the correction axis 2720. That is, the first longitudinal axis 2016 can extend parallel to and/or aligned with the correction axis 2720. The central axes of the first and second apertures 2011 and 2012 can intersect the correction axis 2720.

As shown in FIG. 77, after aligning the first portion 2001 with the cuneiform 30, at least one first pin can be inserted through the first portion 2001 and into the cuneiform 30 so as to fix the first portion 2001 to the cuneiform 30. For instance, the first pin 2711 is inserted through the first aperture 2011 and into the cuneiform 30 to fix the position of the first portion 2001 along the correction axis 2720. The second pin 2712 can further be inserted through the second aperture 2012. If the first and second pins 2711 and 2712 were also inserted through the first and second apertures 2321 and 2322 of the angle guide 2300, the angle guide 2300 can be subsequently removed from the first and second pins 2711 and 2712 and the locating pin 2710. Alternatively, the angle guide 2300 can be removed from the locating pin 2710 prior to insertion of the first and second pins 2711 and 2712 through the first portion 2001 and into the cuneiform 30.

As shown in FIG. 77, the second portion 2002 of the pin placement guide 2000 can be coupled to first portion 2001 in the manner described above. In particular, the second portion 2002 can be inserted over the locating pin 2710 such that the locating pin 2710 is received in the second pivot aperture 2041. The locating pin 2710 can be sized to be received in the pivot apertures 2021 and 2041, but sized greater than the first, second, third, and fourth apertures 2011-2014 to prevent the inadvertent insertion of the locating pin 2710 into any of the apertures 2011-2014 that are configured to receive pins that extend into the cuneiform or metatarsal. The handle 2730 can be attached to the second portion 2002 (e.g., at recess 2031) in the manner described above to facilitate maneuvering the second portion 2002 about the locating pin 2710.

As shown in FIGS. 78-79, the second portion 2002 of the pin placement guide 2000 can then pivoted relative to the first portion 2001 about the pivot axis as defined by the locating rod 2710 such that the second portion 2002 is aligned with the metatarsal 20. The second portion 2002 can then be aligned with an axis 2723 of the metatarsal 20, such as at a proximal end of the metatarsal 20. The axis 2723 can generally extend along the metatarsal 20 from a first end of the metatarsal to a second end of the metatarsal. The second longitudinal axis 2036 can extend along substantially the same direction as the metatarsal axis 2723. That is, the second longitudinal axis 2036 can extend parallel to and/or can be aligned with the axis 2723 of the metatarsal 20. After alignment of the second portion 2002 with the metatarsal 20, an angle can be defined between the first and second portions 2001 and 2002 as defined by the first and second longitudinal axes 2016 and 2036. At least one second pin can be driven through the second portion 2002 and into the metatarsal 20 to fix the second portion to the metatarsal 20. For instance, the third and fourth pins 2713 and 2714, which can be configured as k-wires, can be driven through the respective third and fourth apertures 2013 and 2014 and into the metatarsal 20 to fix the second portion 2002 to the metatarsal 20 as shown in FIG. 79.

Referring next to FIG. 80A, another method is provided for fixing the first portion 2001 to the cuneiform 30 and fixing the second portion 2002 to the metatarsal. In particular, one of the fixed-angle pin placement guides 2000A-2000C can be inserted over the locating pin 2710, such that the locating pin 2710 is received by the locating aperture 2023. It can therefore be said that at least a portion of a pin placement guide can be placed over the locating pin 2710 so as to receive the locating pin 2710. For instance a portion of the pin placement guide can be placed over the locating pin 2710 as described above with respect to FIG. 75). Alternatively, an entirety of the pin placement guide 2000A can be placed over the locating pin 2710 as shown in FIG. 80A. As shown in FIG. 80A, the locating pin 2710 can be inserted through each of the first portion 2001 and the second portion 2002 that is monolithic with the first portion 2001.

While the first fixed-angle pin placement guide 200A is shown as selected, any one of the fixed-angle pin placement guides can be selected that visually appear to conform to the cuneiform 30 and metatarsal 20. As described above, the transverse alignment guide 2715 can extend through the first portion 2021, and can be oriented such that first longitudinal axis 2016 of the first portion 2001 extends substantially along the correction axis 2720. When the first longitudinal axis 2016 of the first portion 2001 extends substantially along the correction axis 2720, it can be determined whether the second portion 2002 is substantially aligned with the metatarsal 20 along the metatarsal axis 2723. If so, then the selected one of the fixed-angle pin placement guides 2000A-2000C has the correct fixed angle and can be fixed to the cuneiform 30 and the metatarsal 20. If the second portion 2002 is not aligned with the metatarsal, then another one of the fixed-angle pin placement guides 2000A-2000C can be selected and placed over the locating pin 2710.

This process repeats until a proper fixed-angle pin placement guide has been selected whose second portion 2002 is substantially aligned with the metatarsal 20 when the first longitudinal axis 2016 of the first portion 2001 extends along the correction axis 2720. Once the proper fixed-angle pin placement guide has been selected, the first portion 2001 is aligned with the cuneiform 30, and the second portion 2002 is aligned with the metatarsal 20. At least one first pin can be driven through the first portion 2001 and into the cuneiform, and at least one second pin can be driven through the second portion 2002 and into the metatarsal. For instance, the first and second pins 2711 and 2712 can be driven through the first and second apertures 2011 and 2012, respectively, and into the underlying cuneiform 30, and the third and fourth pins 2713 and 2714 can be driven through the third and fourth apertures 2013 and 2014 and into the metatarsal 20.

Referring now to FIG. 80B, yet another method is provided for fixing the first portion 2001 to the cuneiform 30 and fixing the second portion 2002 to the metatarsal 20. In particular, the angle guide 2300 can be used to identify the correction axis 2720 and measure an angle between the correction axis 2720 and the metatarsal axis 2723. A select one of the fixed-angle pin placement guides 2000A-2000C whose fixed angle corresponds to the measured angle can be fixed to the cuneiform 30 and the metatarsal 20. In particular, the angle guide 2300 inserted over the locating pin 2710 such that the locating pin 2710 is received in the locating aperture 2301. The angle guide 2300 is thus pivotable with respect to the patient's foot 10 about the locating pin 2710 to a position whereby the first end portion 2310 is disposed over the first portion 2001. The angle guide 2300 can be positioned such that the first portion 2310 extends over the cuneiform so that the first and second apertures 2321 and 2322 of the angle guide 2300 are aligned with the cuneiform 30. The angle guide 2300 can be oriented such that the centerline 2303 is oriented along the correction axis 2720. Next, the angle defined by the centerline 2203 or the correction axis 2720 and the metatarsal axis 2723 can be measured.

A select one of the fixed-angle pin placement guides 2000A-2000C that corresponds to the measured angle can then be fixed to the cuneiform 30 and the metatarsal 20. In one example, the select one of the fixed-angle pin placement guides 2000A-2000C can be the fixed-angle pin placement guide that most closely corresponds to the measured angle. In one example, first and second pins 2711 and 2712 can be inserted into the cuneiform at respective locations defined by the first and second apertures 2011 and 2012, respectively. In one example, the first and second pins 2711 and 2712 can be driven through the first and second apertures 2011 and 2012, respectively, and into the cuneiform 30. Thus, the angle guide 2300 can have a thickness from its bone-facing surface to its opposed outer surface that is suitable to guide the pins 2711 and 2712 into the cuneiform 30.

Referring now to FIG. 80C, the angle guide 2300 can be removed from the first and second pins 2011 and 2012 and the locating pin 2710. The select one of the fixed angle guides 2000A can be inserted over the first and second pins 2711 and 2712, such that the first and second pins 2711 and 2712 that were previously driven into the cuneiform 30 are received in the first and second apertures 2011 and 2012 of the first portion 2001. The select one of the fixed angle guides 2000A can also be inserted over the locating pin 2710, such that the locating pin 2710 is received in the locating aperture 2023. Alternatively, the locating pin 2710 can be removed prior to placement of the select one of the fixed angle guides 2000A is inserted over the first and second pins 2711 and 2712. Next, the third and fourth pins 2713 and 2714 can be driven through the third and fourth apertures 2013 and 2014 of the second portion 2002 and into the metatarsal 20. If the locating pin 2710 is received in the locating aperture 2023, the locating pin 2710 can be subsequently removed, for instance once the select one of the angle guides 2000A is fixed to the cuneiform 30 and the metatarsal 20. As described above, while the select one of the fixed-angle pin placement guides can be defined by the first fixed-angle pin placement guide 2000A is illustrated as, the select one of the fixed-angle pin placement guides can be defined by any suitable one of the fixed-angle pin placement guides among the kit of fixed-angle pin placement guides.

Referring to FIGS. 80B and 80D, in another example, once the angle between the centerline 2303 of the angle guide 2300, or the correction axis 2720, and the metatarsal axis 2723 has been measured and the select one of the fixed-angle pin placement guides 2000A has been identified, the angle guide 2300 can be removed from the locating pin 2710. Next, the select one of the fixed-angle pin placement guides 2000A can be inserted over the locating pin 2710. The select one of the fixed-angle pin placement guides 2000A can then pivot about the locating pin 2710 such that the first and second apertures 2011 and 2012 are aligned with the cuneiform 30, and the third and fourth apertures 2013 and 2014 are aligned with the metatarsal 20. The pins 2711-2714 can then be driven through the apertures 2011-2014, respectively (see FIG. 80C), so as to fix the select one of the fixed-angle pin placement guide 2000A to the cuneiform 30 and the metatarsal 20. The locating pin 2710 can then be removed from the joint 40 and the locating aperture 2023.

Referring now to FIG. 81, the variable-angle or fixed-angle pin placement guide can be removed, and the joint 40 can be excised and/or the metatarsal 20 and the cuneiform 30 resected. First, the locating pin 2710 can be removed, along with the pin placement guide. The cut guide 2500 can then be inserted over the third and fourth pins 2713 and 2714, such that the third and fourth pins 2713 and 2714 are inserted into the first and second guide apertures 2511 and 2512, respectively, which aligns the cut slot 2510 with the joint 40 (e.g., at an end of the metatarsal 20). A resection tool 2740, such as a saw, can be inserted through the cut slot 2510 to resect the bone into a resected face of the metatarsal and/or remove cartilage of the joint 40. Alternatively, the cut guide 2600 can be used. A user can select among the pairs of guide slots 2631-2633 into which the third and fourth pins 2713 and 2714 can be received to align the cut slot 2610 with the desired location on the joint 40.

As show in in FIG. 82, the orientation of the cut guide 2500 can be reversed and positioned over the first and second pins 2711 and 2712 such that the first and second pins 2711 and 2712 are received through the first and second guide apertures 2511 and 2512, respectively, of the cut guide 2500 to align the cut slot 2510 with the joint 40 (e.g., at an end of the cuneiform 30). The resection tool 2740 can be inserted through the cut slot 2510 to resect the joint 40 including a first end of the cuneiform 30 to form a resected face of the cuneiform. While the metatarsal has been shown as being resected before resected of the cuneiform, it should be appreciated that the cuneiform can alternatively be resected before resection of the metatarsal.

As shown in FIGS. 83-84, the compressor block 2100 can be inserted over the four pins 2711-2714 through the respective apertures 2111-2114. The angle of the apertures 2111-2114 can move the resected faces of the cuneiform 30 and the metatarsal 20 toward each other and/or alter an angle of the metatarsal 20 relative to the cuneiform 30, thereby reducing the resected joint 40 to a compressed configuration. In particular, the resected faces of the cuneiform 30 and the metatarsal 20 can be compressed to abut each other. Optionally, a spacer block of the type described herein can be inserted into the resected joint. The compressor block 2100 can create a compressed configuration of the joint 20. The compressor block 2100 can also drive the metatarsal 20 to angularly move such that the metatarsal 20 is substantially aligned with the correction axis 2720.

In the compressed configuration, one or more cross pins, such as first and second cross pins 2751 and 2752 can be inserted through the cross pin receiving spaces (e.g., 2121-2124) to temporarily fix the position of the joint 40. In particular, the first cross-pin 2751 can be inserted through a respective select one of the first cross pin receiving spaces 2121 and 2123, and the second cross-pin 2752 can be inserted through a respective select one of the second cross-pin receiving spaces 2122 and 2123. The selection of the cross pin receiving spaces can be performed such that the select ones of the cross pin receiving spaces align the respective cross-pins 2751 and 2752 with the resected joint 40. Thus, the cross pins 2751 and 2752 can extend through both the resected faces of the cuneiform 30 and the metatarsal 20 and across the resected joint 40.

FIG. 85 shows the compressor block 2200 removed from the pins 2711-2714. The removal is possible because there is some flexing of the pins 2711-2714 within the apertures 2111-2114. Otherwise, the angle that is created by the compressor block 2100 would make it difficult to remove from the pins 2711-2714 from the apertures once the resected joint 40 is fixed by the cross pins (i.e., because of the acute angle of the apertures 2111-2114). The compressor block 2100 can be removed with the cross pins 2751, 2752 in place because of the open slots on the bottom surface 2106.

FIGS. 86-87 show assembly of the drill guide 2200 with the joint 40 along the first and the fourth pins 2711, 2714. The second and third pins 2712, 2712 can be removed from the joint 40 before or after insertion of the drill guide 2200. The apertures 2211, 2214 can be received over the respective first and the fourth pins 2711, 2714. This can align the drill apertures 2212, 2213 with the cuneiform 30 and the metatarsal 20. The drill apertures 2212, 2213 can be aligned with the holes where the second and fourth pins 2712, 2713 were removed. Pilot holes can be drilled into the cuneiform 30 and the metatarsal 20 by a drill or reamer 2760. The drill 2760 can be inserted through the drill apertures 2212, 2213. Alternatively, the pilot holes can be prepared using a cannulated reamer along the respective pins 2712, 2713 before removal thereof.

In order to fix the joint 40, a staple 2762 can be inserted. The staple 2762 can be gripped and tensioned using an applicator 2761, as shown and described in U.S. Pat. App. No. 2018/0353172. A first leg 2763 of the staple 2762 can be inserted into the metatarsal 20 through a pilot hole. A second leg 2765 of the staple 2762 can be inserted into the cuneiform 30 through a pilot hole. The applicator 2761 can then release the staple 2762, allowing the staple to compress the resected joint. Alternatively, or in addition, the joint may be secured using a bone plate and/or cross screw, or any other desired fixation device suitable for fixing the joint 40. More details regarding an exemplary plate-staple system may be found in U.S. Pat. No. 10,299,842, which is incorporated herein by reference in its entirety. More details regarding staples suitable for use as described herein can be found in U.S. Publication No. 2018/0317906, which is incorporated herein by reference in its entirety.

The embodiments described herein are exemplary. Modifications, rearrangements, substitute processes, etc. may be made to these embodiments and still be encompassed within the teachings set forth herein. Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently rather than sequentially.

The phrases "connected to," "coupled to," and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method of fusing a joint between a cuneiform and a metatarsal to correct metatarsus adductus, the method comprising:
    inserting a locating pin into the joint;
    inserting the locating pin into a first portion of a pin placement guide;
    pivoting the first portion of the pin placement guide about the locating pin, such that the first portion is aligned with the cuneiform, and the first portion is aligned with a correction axis for the metatarsal bone;
    inserting at least one first pin through the first portion and into the cuneiform;
    aligning a second portion of the pin placement guide with the metatarsal;
    inserting at least one second pin through the second portion and into the metatarsal;
    removing the pin placement guide from the locating pin, the at least one first pin, and the at least one second pin;
    cutting the cuneiform and the metatarsal so as to excise the joint; and
    compressing the joint to reduce the joint to a compressed configuration whereby metatarsal is substantially aligned with the correction axis.

2. The method of claim 1, further comprising the step of fixing the first bone with the second bone while the joint is in the compressed configuration.

3. The method of claim 2, wherein the compressing step comprises inserting the at least one first pin and the at least one second pin through respective pin holes of a compressor block that are convergent such that the pin holes are more closely spaced at a bottom surface of the compressor block relative to the top surface.

4. The method of claim 3 wherein the fixing step comprises inserting a cross pin through a cross pin recess in the compressor block and into the cuneiform and metatarsal bones across the joint in the compressed configuration.

5. The method of claim 4, wherein the cross pin recess includes an open lower slot, the method comprising the step of removing the compressor block from the cross pin, such that the cross pin is removed from the cross pin recess.

6. The method of claim 2, wherein the fixing step comprises placing a staple over the joint such that a first leg of the staple is seated within the metatarsal bone and a second leg of the staple is seated within the cuneiform.

7. The method of claim 1, wherein the step of pivoting the first portion performs the step of aligning the second portion of the pin placement guide with the metatarsal.

8. The method of claim 7, wherein the pin placement guide is a fixed-angle pin placement guide, whereby the first and second portions are monolithic with each other.

9. The method of claim 8, further comprising the step of selecting a select one of a kit of fixed-angle pin placement guides to define the fixed-angle pin placement guide whereby the second portion is aligned with the metatarsal when the first portion is aligned with the cuneiform and the correction axis.

10. The method of claim 1, wherein the step of aligning the second portion of the pin placement guide comprises pivoting the second portion with respect to the first portion about the locating pin.

11. The method of claim 1, wherein the step of inserting at least one first pin comprises inserting first and second pins through first and second apertures, respectively, of the first portion and into the cuneiform.

12. The method of claim 11, wherein respective central axes of the first and second apertures are aligned along a straight axis, and the step of pivoting the first portion of the pin placement guide about the locating pin causes the straight axis to be substantially aligned with the correction axis.

13. The method of claim 12, wherein the step of inserting at least one second pin through the second portion comprises inserting third and fourth pins through respective third and fourth apertures of the second portion and into the metatarsal.

14. The method of claim 1, wherein the step of pivoting the first portion comprises aligning a transverse guide that extends through the first portion with a cuboid bone and a navicular bone, the transverse guide extending along a transverse axis perpendicular to the correction axis.

15. The method of claim 1, further comprising the step of inserting an angle guide over the locating pin, such that a first end portion of the angle guide is aligned with the cuneiform, wherein a second end portion of the angle guide comprises a protractor centered at the locating pin.

16. The method of claim 1, wherein the protractor identifies an angle between a central axis of the metatarsal bone and the correction axis.

17. The method of claim 1, wherein the cutting step comprises, after the removing step, inserting the at least one first pin into a cut guide so as to align a slot of the cut guide with the metatarsal proximal to the joint, and cutting a base of the metatarsal through the slot.

18. The method of claim 17, wherein the cutting step further comprises reversing a position of the cutting guide such that the slot is aligned with after the removing step, inserting the at least one first pin into a cut guide so as to align a slot of the cut guide with the joint, and cutting a base of the cuneiform through the slot.

19. The method of claim 18, wherein the cut guide that comprises a plurality of pairs of first and second alignment holes, each pair of first and second alignment holes having a different spacing from a slot.

\* \* \* \* \*